US012733061B2

(12) United States Patent
Kim

(10) Patent No.: US 12,733,061 B2
(45) Date of Patent: Sep. 8, 2026

(54) METHOD AND APPARATUS FOR HANDLING A PROTOCOL SUPPORTING SUSPENSION AND RESUMPTION OF SECONDARY CELL GROUP (SCG) IN DUAL CONNECTIVITY TECHNOLOGY SUPPORTED BY NEXT-GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/394,549

(22) Filed: Dec. 22, 2023

(65) Prior Publication Data

US 2024/0129991 A1 Apr. 18, 2024

Related U.S. Application Data

(63) Continuation of application No. 17/382,739, filed on Jul. 22, 2021, now Pat. No. 11,856,630.

(30) Foreign Application Priority Data

Jul. 22, 2020 (KR) ........................ 10-2020-0091073
Sep. 3, 2020 (KR) ........................ 10-2020-0112342

(51) Int. Cl.
*H04W 76/20* (2018.01)
*H04L 1/1867* (2023.01)
(Continued)

(52) U.S. Cl.
CPC ........... *H04W 76/20* (2018.02); *H04L 1/1896* (2013.01); *H04W 24/08* (2013.01); *H04W 28/06* (2013.01);
(Continued)

(58) Field of Classification Search
None
See application file for complete search history.

(56) References Cited

U.S. PATENT DOCUMENTS

2014/0053243 A1* 2/2014 Walsh ..................... H04L 63/08 726/4
2016/0044744 A1 2/2016 Lee et al.
(Continued)

FOREIGN PATENT DOCUMENTS

CN 111093237 A 5/2020
CN 111225396 A 6/2020
(Continued)

OTHER PUBLICATIONS

European Search Report dated Jul. 29, 2024; European Appln. No. 21 847 099.5-1206.
(Continued)

*Primary Examiner* — Fadi Haj Said
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology. A method performed by a terminal in a wireless communication system is provided. The method comprises receiving, from a first base station associated with a master cell group (MCG), a first radio resource control (RRC) message including a second RRC message generated by a second base station associated with a secondary cell group (SCG), identifying first information indicating a deactivation of the SCG included in the second RRC message, and determining to deactivate the
(Continued)

SCG based on the first information indicating the deactivation of the SCG.

20 Claims, 48 Drawing Sheets

(51) Int. Cl.

| | |
|---|---|
| ***H04W 24/08*** | (2009.01) |
| ***H04W 28/06*** | (2009.01) |
| ***H04W 72/0453*** | (2023.01) |
| ***H04W 74/00*** | (2009.01) |
| ***H04W 74/0833*** | (2024.01) |
| ***H04W 74/0836*** | (2024.01) |
| ***H04W 74/0838*** | (2024.01) |
| ***H04W 76/15*** | (2018.01) |
| ***H04W 76/19*** | (2018.01) |
| ***H04W 80/02*** | (2009.01) |

(52) U.S. Cl.

CPC ..... *H04W 72/0453* (2013.01); *H04W 74/002* (2013.01); *H04W 76/15* (2018.02); *H04W 76/19* (2018.02); *H04W 80/02* (2013.01); *H04W 74/0833* (2013.01); *H04W 74/0836* (2024.01); *H04W 74/0838* (2024.01)

(56) References Cited

U.S. PATENT DOCUMENTS

| | | | | |
|---|---|---|---|---|
| 2017/0013668 | A1 | 1/2017 | Chang et al. | |
| 2017/0149546 | A1 | 5/2017 | Zhang et al. | |
| 2017/0181216 | A1 | 6/2017 | Worrall et al. | |
| 2019/0182881 | A1 | 6/2019 | Teyeb et al. | |
| 2019/0342911 | A1 | 11/2019 | Talarico et al. | |
| 2019/0363861 | A1 | 11/2019 | Qiu et al. | |
| 2020/0022215 | A1 | 1/2020 | Takahashi et al. | |
| 2020/0077308 | A1 | 3/2020 | Kim et al. | |
| 2020/0107392 | A1 | 4/2020 | Yi et al. | |
| 2020/0245390 | A1 | 7/2020 | Ali et al. | |
| 2020/0267631 | A1 | 8/2020 | Yilmaz et al. | |
| 2020/0323032 | A1 | 10/2020 | Kim et al. | |
| 2020/0329524 | A1 | 10/2020 | Park et al. | |
| 2020/0337108 | A1* | 10/2020 | Wu | H04W 76/27 |
| 2020/0374961 | A1 | 11/2020 | Ingale et al. | |
| 2021/0168893 | A1* | 6/2021 | Al | H04W 28/0268 |
| 2021/0227409 | A1 | 7/2021 | Siomina et al. | |
| 2021/0251040 | A1 | 8/2021 | Tang et al. | |
| 2021/0352750 | A1 | 11/2021 | Cheng et al. | |
| 2022/0007256 | A1 | 1/2022 | Ozturk et al. | |
| 2022/0046522 | A1 | 2/2022 | Kim et al. | |
| 2022/0141904 | A1 | 5/2022 | Yilmaz et al. | |
| 2022/0174758 | A1 | 6/2022 | Pan et al. | |
| 2022/0264686 | A1 | 8/2022 | Tsai | |
| 2023/0128847 | A1* | 4/2023 | Purkayastha | H04W 72/231 370/329 |
| 2023/0254866 | A1* | 8/2023 | Wang | H04W 72/21 370/328 |

FOREIGN PATENT DOCUMENTS

| | | | |
|---|---|---|---|
| EP | 4 149 148 | A1 | 3/2023 |
| IN | 201937032087 | A | 10/2019 |
| KR | 10-2019-0107170 | A | 9/2019 |
| WO | 2018/230849 | A1 | 12/2018 |
| WO | 2018/231021 | A1 | 12/2018 |
| WO | 2020/126390 | A2 | 6/2020 |
| WO | 2022/097755 | A1 | 5/2022 |
| WO | 2022/168767 | A1 | 8/2022 |

OTHER PUBLICATIONS

International Search Report dated Oct. 21, 2021, issued in International Patent Application No. PCT/KR2021/009513.

NEC; "Discussion on S-RLF recovery"; 3GPP TSG RAN2 Meeting #86; Seoul, South Korea; May 19-23, 2014; R2-142406 (Year: 2014).

ZTE Corporation (Rapporteur); Report on Email Discussion [108#55][DCCA] MCG SCell and SCG configuration with RRC Resume (ZTE); 3GPP TSG-RAN WG2 Meeting #109-e; R2-2000249; XP51848890A; Feb. 24-Mar. 6, 2020; e-Meeting; Feb. 14, 2020.

ZTE; Discussion on SCG deactivation and activation; 3GPP TSG-RAN WG3 #110-e; R3-205990; XP 51945581A; Nov. 2-12, 2020; Online; Oct. 23, 2020.

European Search Report dated Jul. 20, 2023; European Appln. No. 21847099.5-1213 / 4108043 PCT/KR2021009513.

Chinese Office Action dated Aug. 20, 2025, issued in Chinese Patent Application No. 202180060039.0.

Indian Office Action dated Mar. 23, 2026; Indian Appln. No. 202237076621.

* cited by examiner 25-15

25-20

26-15

26-20

30-15

| | Case 1 | Case 2 |
|---|---|---|
| Key generation | 4 | 1 |
| # of bus use | 4 | 1 |
| Efficiency of bus | Low | High |
| # of integrity (HW call) | 4 | 1 |
| # of MAC-I | 4 | 1 |
| # of ciphering (HW call) | 4 | 1 |
| Efficiency of HW | Low | High |
| Delay at RX side | Low | Low |
| # of header set | 4 | 1 |

METHOD AND APPARATUS FOR HANDLING A PROTOCOL SUPPORTING SUSPENSION AND RESUMPTION OF SECONDARY CELL GROUP (SCG) IN DUAL CONNECTIVITY TECHNOLOGY SUPPORTED BY NEXT-GENERATION MOBILE COMMUNICATION SYSTEM

CROSS-REFERENCE TO RELATED APPLICATION(S)

This application is a continuation application of prior application Ser. No. 17/382,739 filed on Jul. 22, 2021, which issued as U.S. Pat. No. 11,856,630 on Dec. 26, 2023; and which is based on and claims priority under 35 U.S.C. § 119(a) of a Korean patent application number 10-2020-0091073 filed on Jul. 22, 2020 in the Korean Intellectual Property Office, and of a Korean patent application number 10-2020-0112342 filed on Sep. 3, 2020 in the Korean Intellectual Property Office, the disclosure of each of which is incorporated by reference herein in its entirety.

BACKGROUND

1. Field

The disclosure relates to a method and an apparatus for efficiently operating an idle bandwidth part in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, with the development of a next-generation mobile communication system, a method and an apparatus for preventing processing latency that may be generated when carrier aggregation or dual connectivity is configured and activated in a terminal in which a connection with a network is configured or when the carrier aggregation or the dual connectivity is used and then deactivated are needed. Further, a method and an apparatus for improving an encryption or decryption procedure, an integrity protection or verification procedure, or a procedure such as Automatic Repeat Request (ARQ) or the like, which significantly influence a data processing time, or enabling parallel processing are needed.

The above information is presented as background information only to assist with an understanding of the disclosure. No determination has been made, and no assertion is made, as to whether any of the above might be applicable as prior art with regard to the disclosure.

SUMMARY

Carrier Aggregation (CA) or Dual Connectivity (DC) may be used to provide a service having a high data rate and low latency to a User Equipment (UE) in a next-generation mobile communication system. However, a method of preventing processing latency that may be generated when carrier aggregation or dual connectivity is configured in the UE having a connection with a network and then activated or when carrier aggregation or dual connectivity is used and then deactivated. Particularly, if the UE maintains a plurality of cells in an activated state in order to use the carrier aggregation or the dual connectivity, the UE is required to monitor a Physical Downlink Control Channel (PDCCH) for each cell, so that battery consumption of the UE may increase. On the other hand, if the UE maintain a plurality of cells in a deactivated state in order to reduce battery consumption of the UE, data transmission/reception latency may occur due to latency generated when the plurality of cells are activated through the use of the carrier aggregation or the dual connectivity. In the above description or the disclosure, the cell may indicate a PCell (primary cell) or an SCell (secondary cell, for example, an SCell configured in a Master Cell Group (MCG)), a PSCell (primary secondary cell, for example, a PCell of a Secondary Cell Group (SCG)), or an SCell (for example, an SCell configured in a Secondary Cell Group (SCG)).

Further, since a very high data rate should be supported in the next-generation mobile communication system, a method of improving procedures such as a ciphering or deciphering procedure, an integrity protection or verification procedure, an Automatic Repeat Request (ARQ) operation, or the like, which significantly influence a data processing time, or enabling parallel processing is needed.

Aspects of the disclosure are to address at least the above-mentioned problems and/or disadvantages and to provide at least the advantages described below. Accordingly, an aspect of the disclosure is to provide a new dormant mode or suspension mode or a deactivated mode to allow the UE in a Radio Resource Control (RRC)-connected mode having a connection with a network to rapidly activate and deactivate the carrier aggregation or the dual connectivity in the next-generation mobile communication system. The disclosure proposes a method of operating the new dormant (hibernation, dormancy, or suspension) mode in units of bandwidths (bandwidth part-level), in units of cells, or in units of cell groups (for example, secondary cell groups) to rapidly activate the carrier aggregation or the dual connectivity and save a UE battery.

Another aspect of the disclosure is to provide procedures such as an efficient ciphering or deciphering procedure, integrity protection or verification procedure, Automatic Repeat Request (ARQ) operation, or the like to support a very high data rate through a high data processing rate in the next-generation mobile communication system, thereby maximizing efficiency of a data processing procedure and enabling more parallel processing is provided.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a first base station associated with a master cell group (MCG), a first radio resource control (RRC) message including a second RRC message generated by a second base station associated with a secondary cell group (SCG), identifying first information indicating a deactivation of the SCG included in the second RRC message, and determining to deactivate the SCG based on the first information indicating the deactivation of the SCG.

In accordance with another aspect of the disclosure, a method performed by a first base station associated with an MCG in a wireless communication system is provided. The method includes transmitting, to a second base station associated with an SCG, a first request message for a deactivation of the SCG, as a response to the first request message, receiving, from the second base station, a first acknowledgement message including a first RRC message generated by the second base station, the first RRC message including first information indicating the deactivation of the SCG, and transmitting, to a terminal, a second RRC message including the first RRC message generated by the second base station. The SCG is deactivated based on the first information indicating the deactivation of the SCG included in the second RRC message.

In accordance with another aspect of the disclosure, a terminal in a wireless communication system is provided. The terminal includes a transceiver and a controller. The controller is configured to receive, from a first base station associated with an MCG via the transceiver, a first RRC message including a second RRC message generated by a second base station associated with an SCG, identify first information indicating a deactivation of the SCG included in the second RRC message, determine to deactivate the SCG based on the first information indicating the deactivation of the SCG.

In accordance with another aspect of the disclosure, a first base station associated with an MCG in a wireless communication system is provided. The first base station includes a transceiver and a controller. The controller is configured to transmit, to a second base station associated with an SCG via the transceiver, a first request message for a deactivation of the SCG, as a response to the first request message, receive, from the second base station via the transceiver, a first acknowledgement message including a first RRC message generated by the second base station, the first RRC message including first information indicating the deactivation of the SCG, and transmit, to a terminal via the transceiver, a second RRC message including the first RRC message generated by the second base station. The SCG is deactivated based on the first information indicating the deactivation of the SCG included in the second RRC message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 29A:
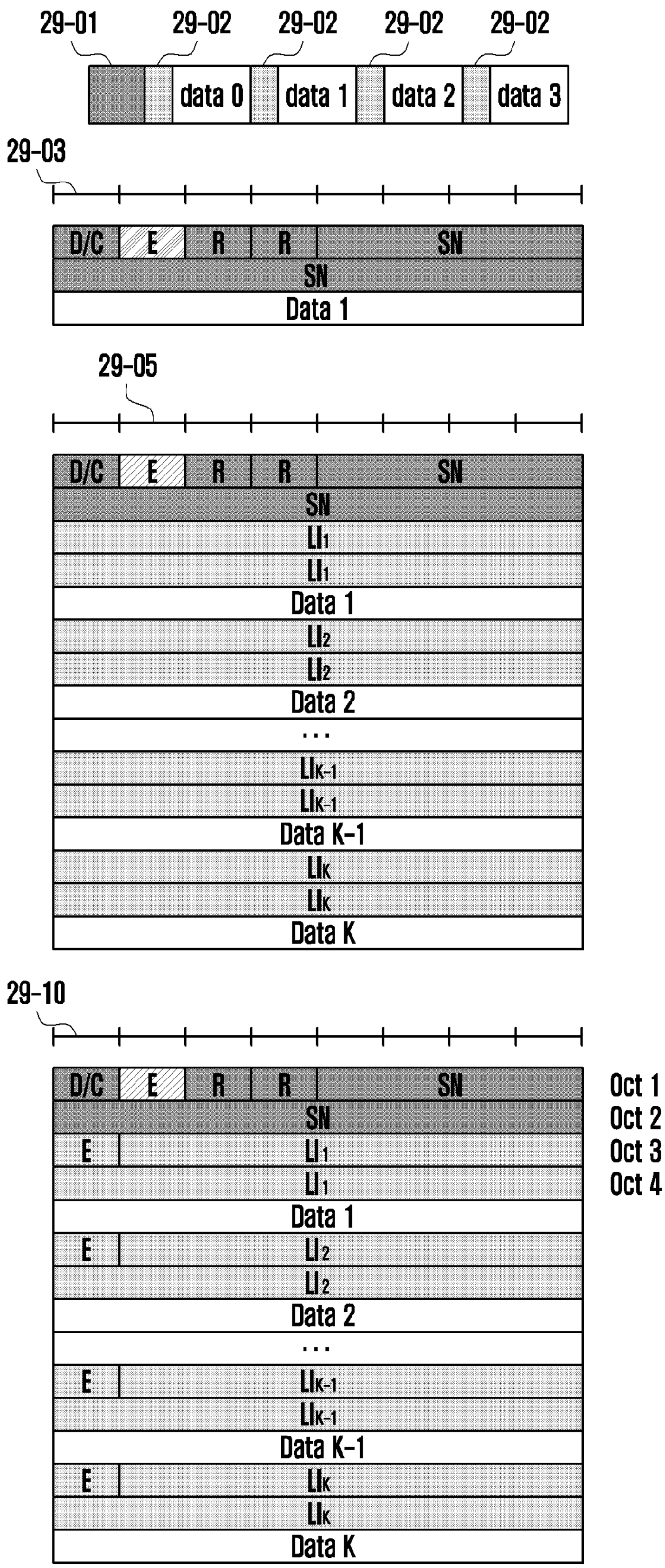
Figure 29B:
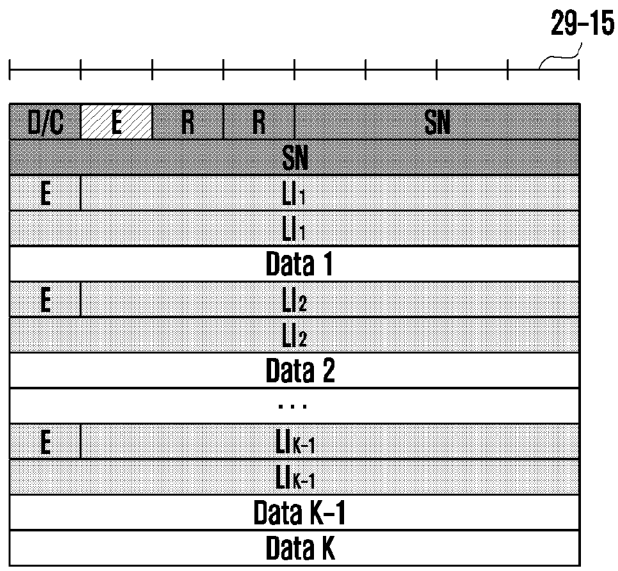
Figure 29B:
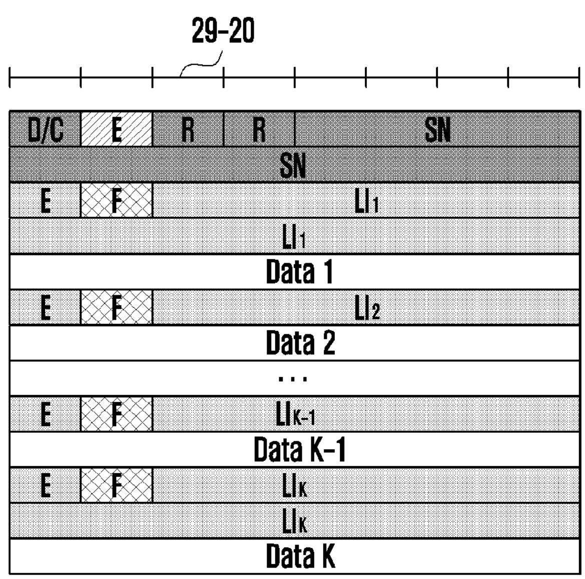
Figure 29C:
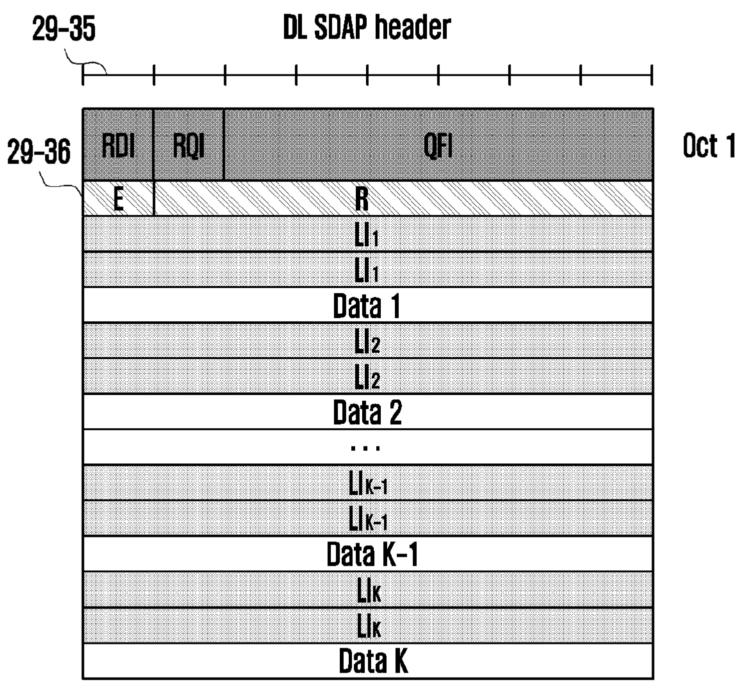
Figure 29C:
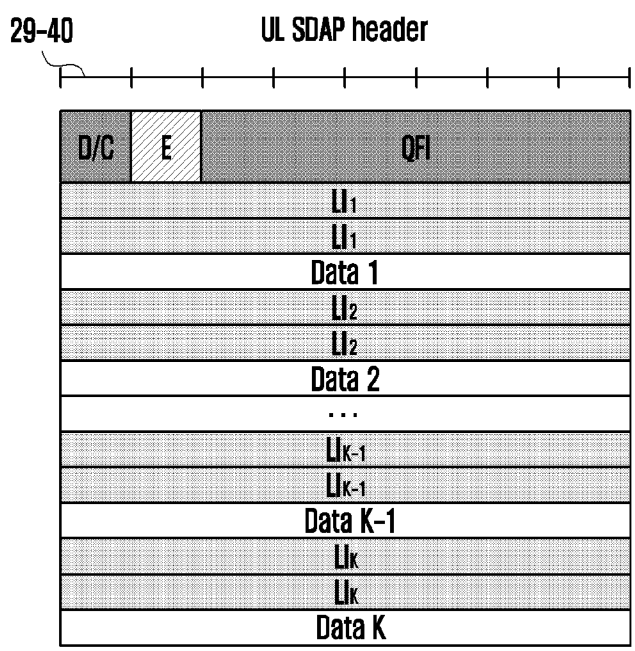
Figure 29D:
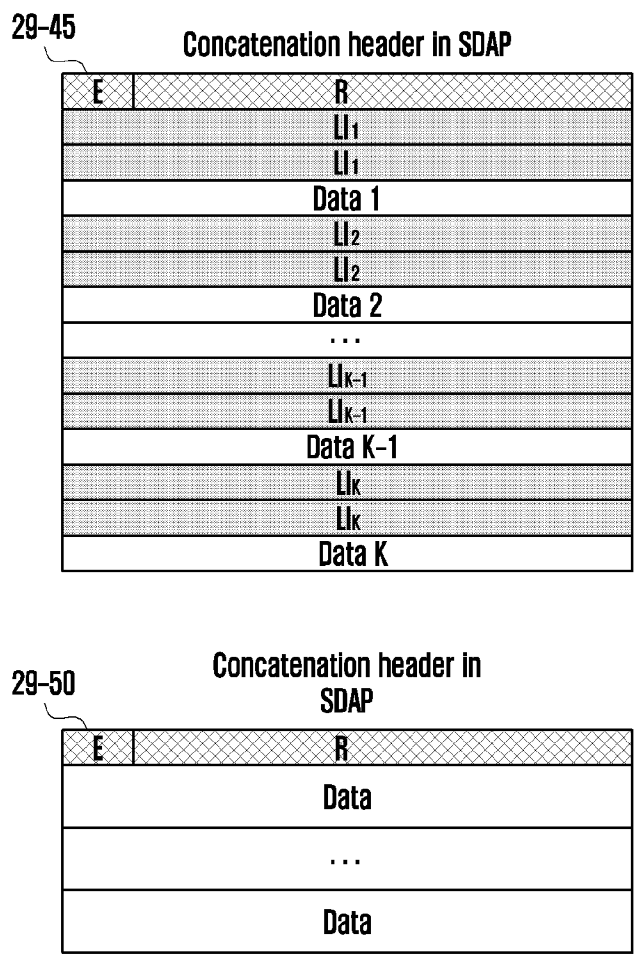
Figure 30:
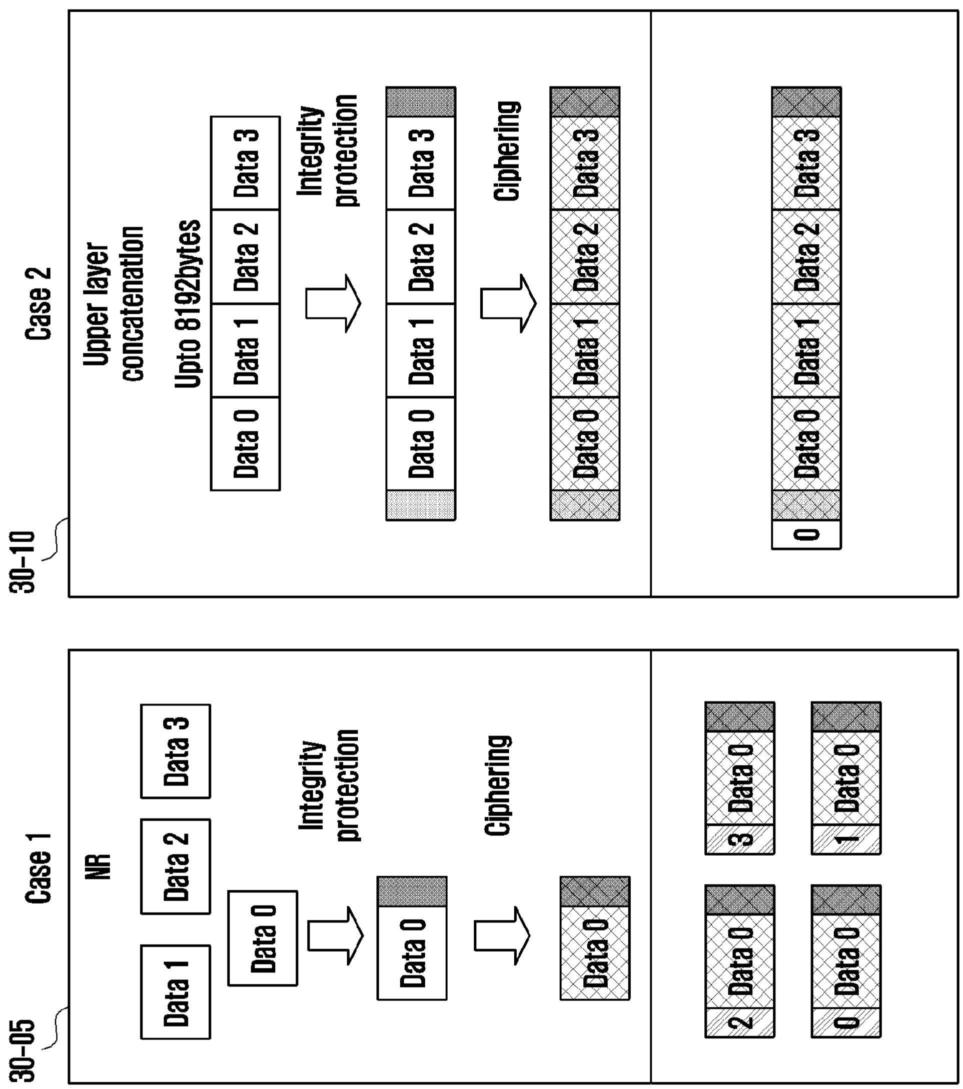
Figure 31A:
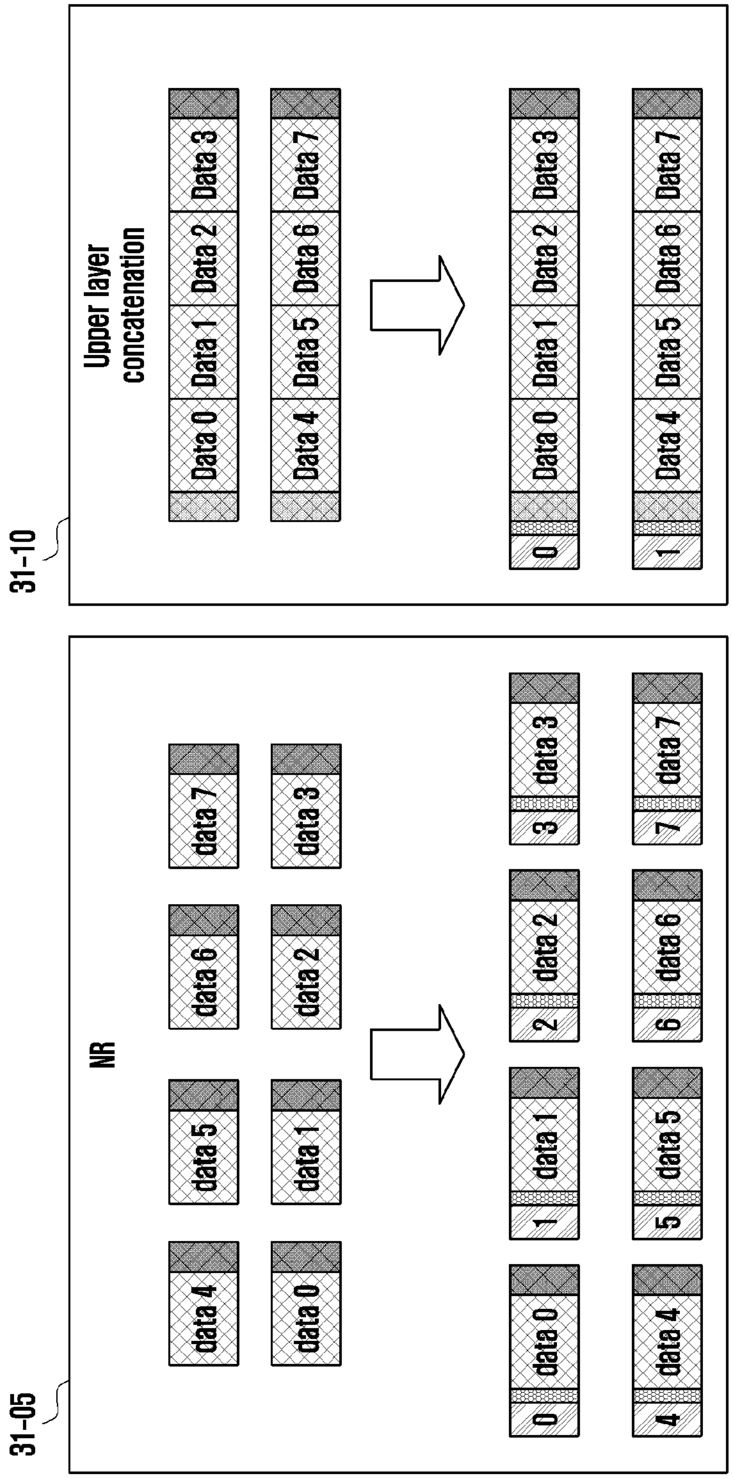
Figure 31B:
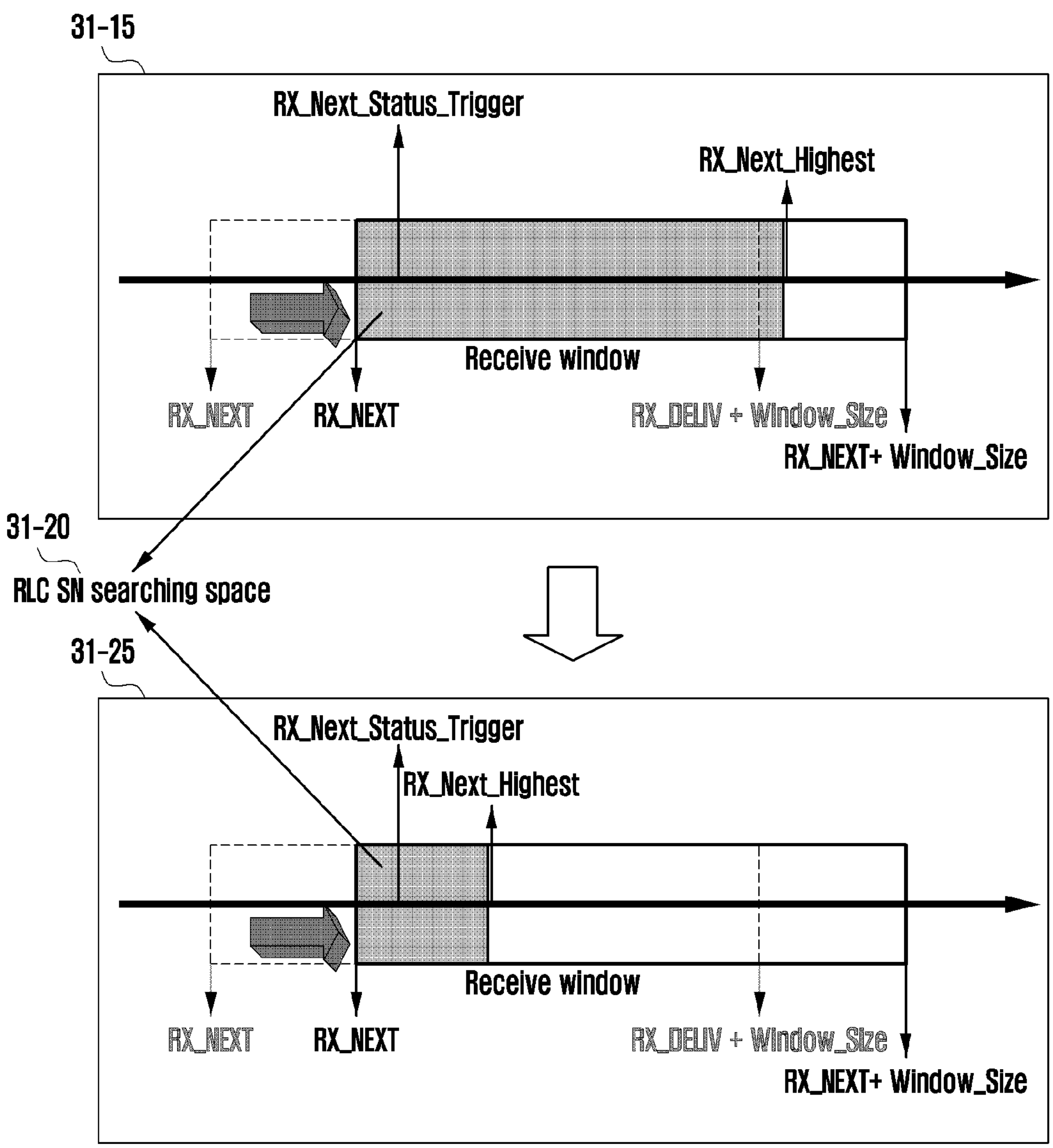
Figure 32:
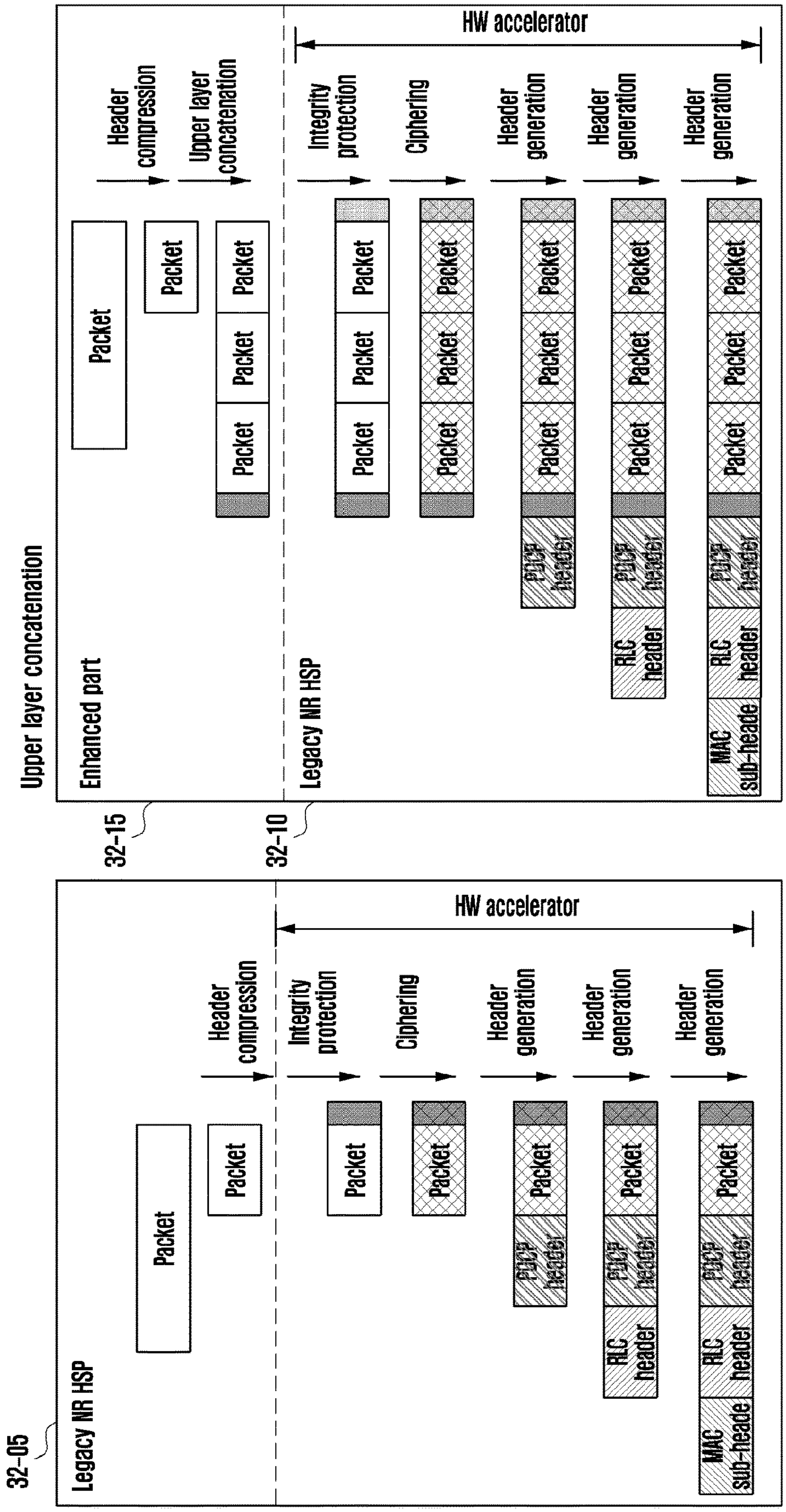
Figure 33:
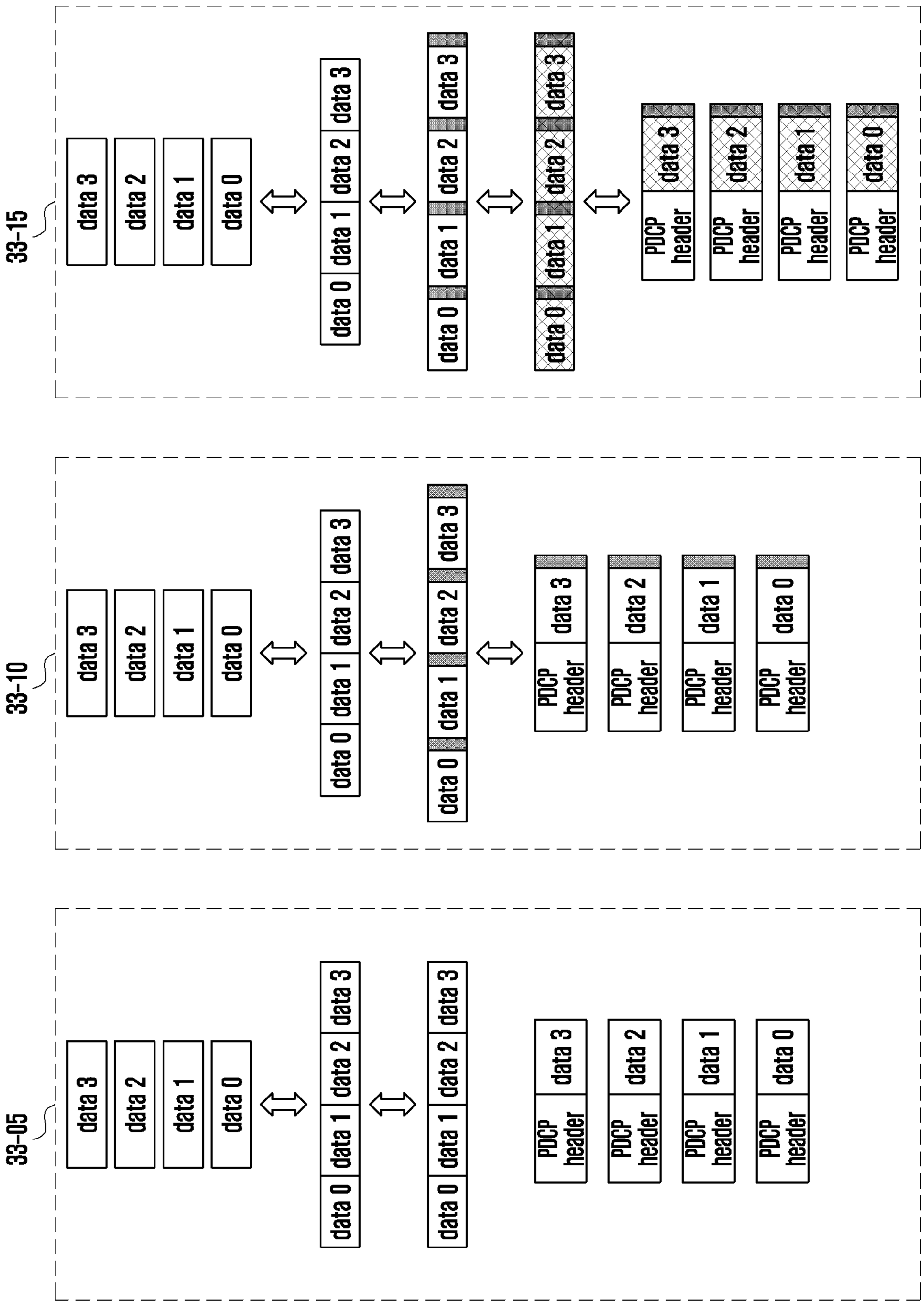
Figure 34:
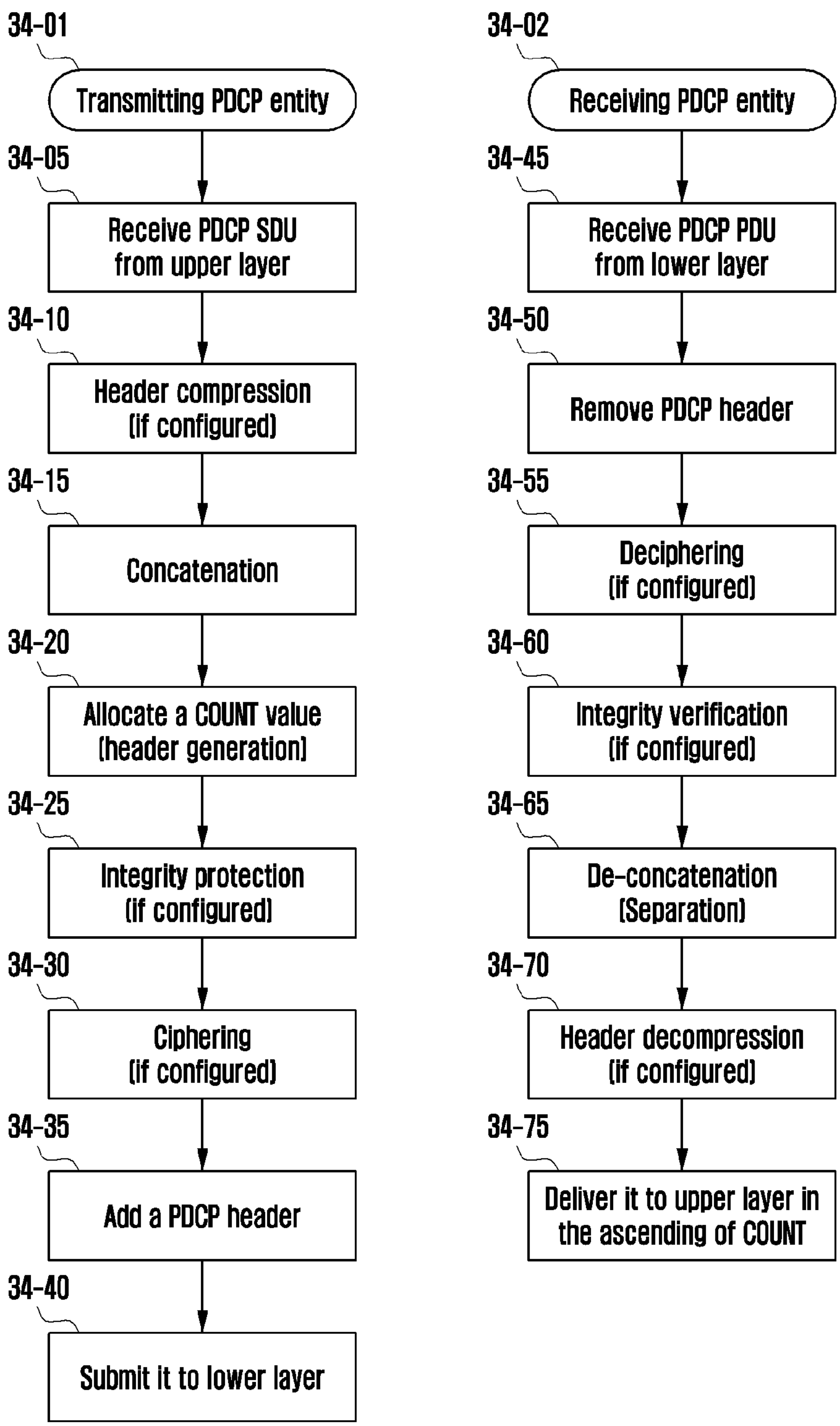
Figure 35:
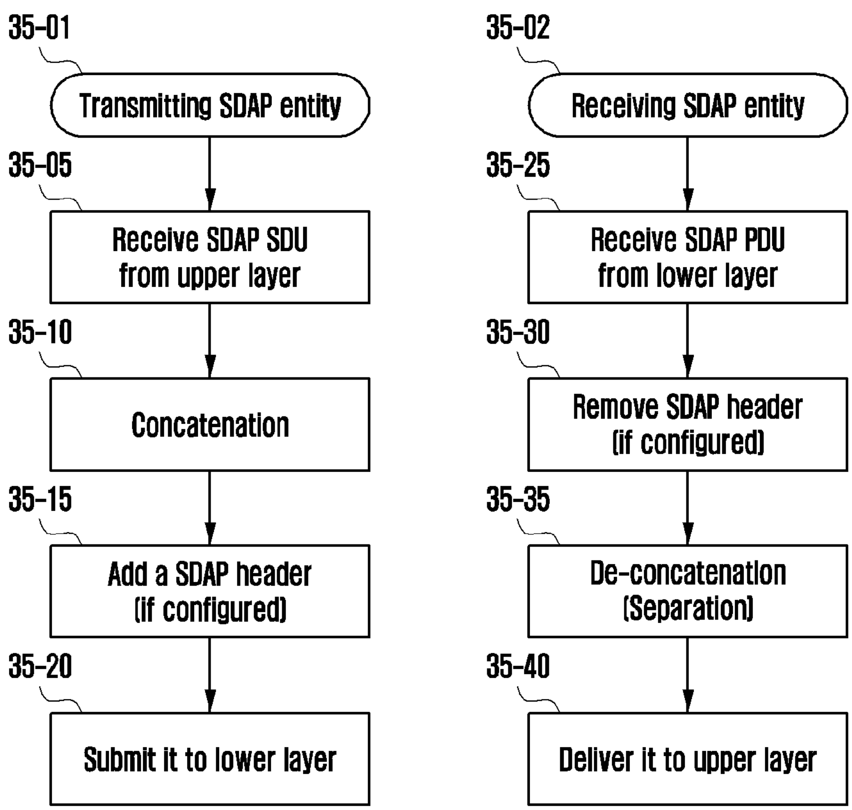
Figure 36:
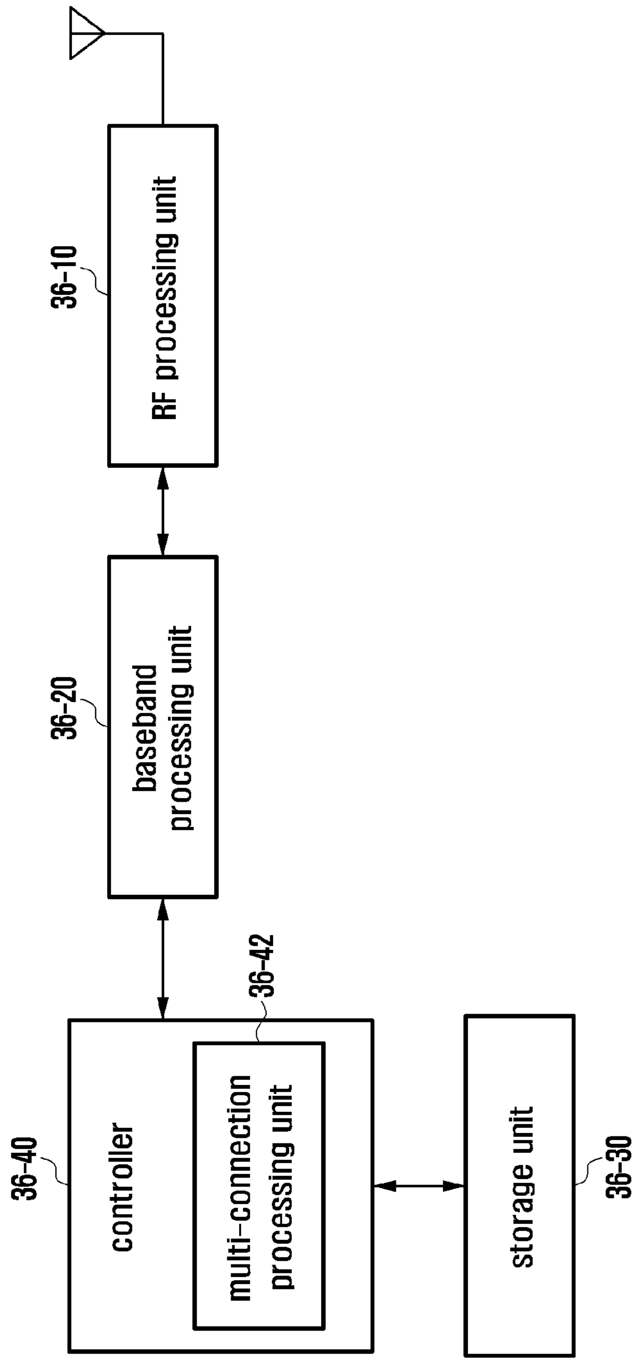
Figure 37:
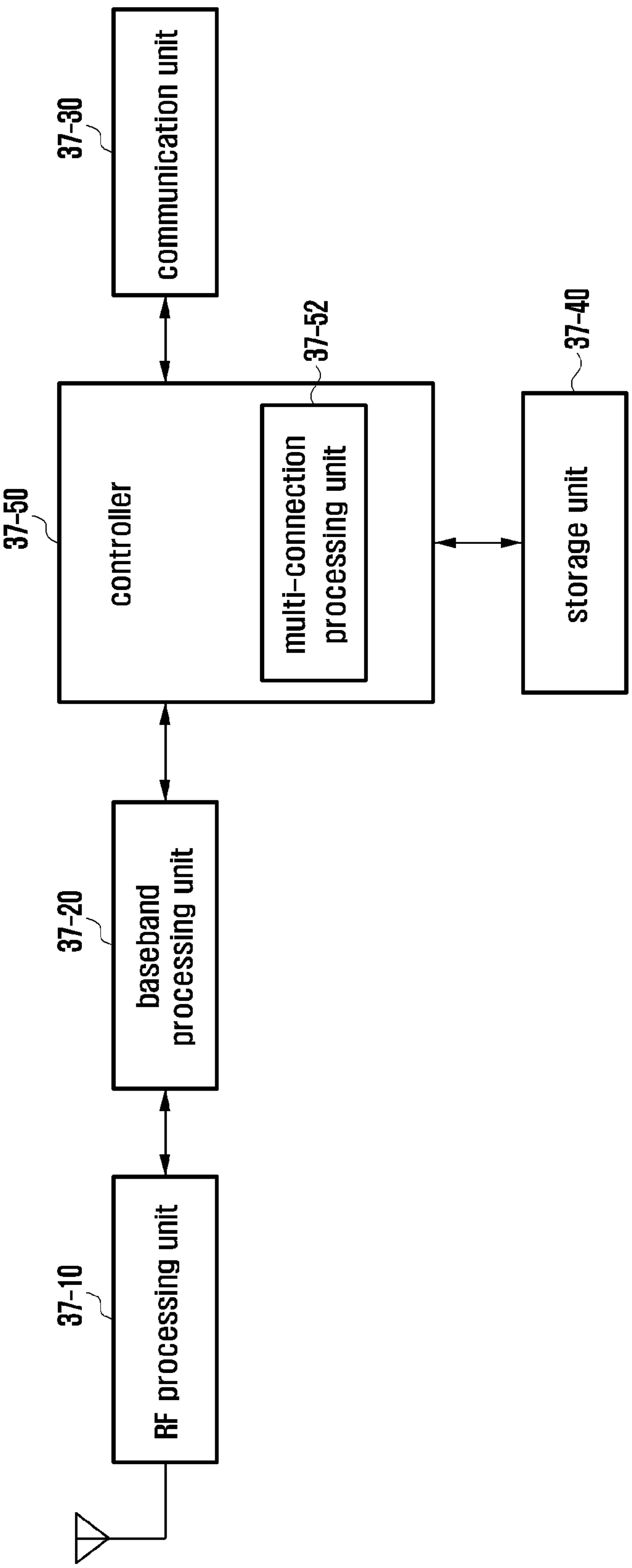

FIG. 29A illustrates a header structure of a higher layer device or a new field structure suitable for embodiment 2-2 of a data concatenation procedure according to an embodiment of the disclosure;

FIG. 29B illustrates a header structure of a higher layer device or a new field structure suitable for embodiment 2-2 of a data concatenation procedure according to an embodiment of the disclosure;

FIG. 29C illustrates a header structure of a higher layer device or a new field structure suitable for embodiment 2-2 of a data concatenation procedure according to an embodiment of the disclosure;

FIG. 29D illustrates a header structure of a higher layer device or a new field structure suitable for embodiment 2-2 of the data concatenation procedure according to an embodiment of the disclosure;

FIG. 30 illustrates comparison between a procedure of processing data in a next-generation mobile communication system and a data processing procedure according to an embodiment of the disclosure;

FIG. 31A illustrates a gain of data concatenation procedure from a viewpoint of an RLC layer device according to an embodiment of the disclosure;

FIG. 31B illustrates a gain of data concatenation procedure from a viewpoint of an RLC layer device according to an embodiment of the disclosure;

FIG. 32 illustrates that a data concatenation procedure of a higher layer device does not influence a basic data processing procedure of a next-generation mobile communication system according to an embodiment of the disclosure;

FIG. 33 illustrates a method of expanding data concatenation function of a higher layer device and succeeding and implementing features of the data concatenation function of the higher layer device proposed above without introducing new fields or an implementation method having a similar advantage to the data concatenation function of the higher layer device without any new field according to an embodiment of the disclosure;

FIG. 34 is a flowchart illustrating an operation of a PDCP layer device of a UE according to an embodiment of the disclosure;

FIG. 35 is a flowchart illustrating an operation of a service data adaptation protocol (SDAP) layer device (or new layer device) of a UE according to an embodiment of the disclosure;

FIG. 36 illustrates a structure of a UE according to an embodiment of the disclosure; and FIG. 37 is a block diagram illustrating a base station (or a Transmission/Reception Point (TRP)) in a wireless communication system according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Embodiment 1

Hereinafter, the operation principle of the disclosure will be described in detail with reference to the accompanying drawings. In the following description of the disclosure, a detailed description of relevant known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of relevant known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB".

Figure 1:
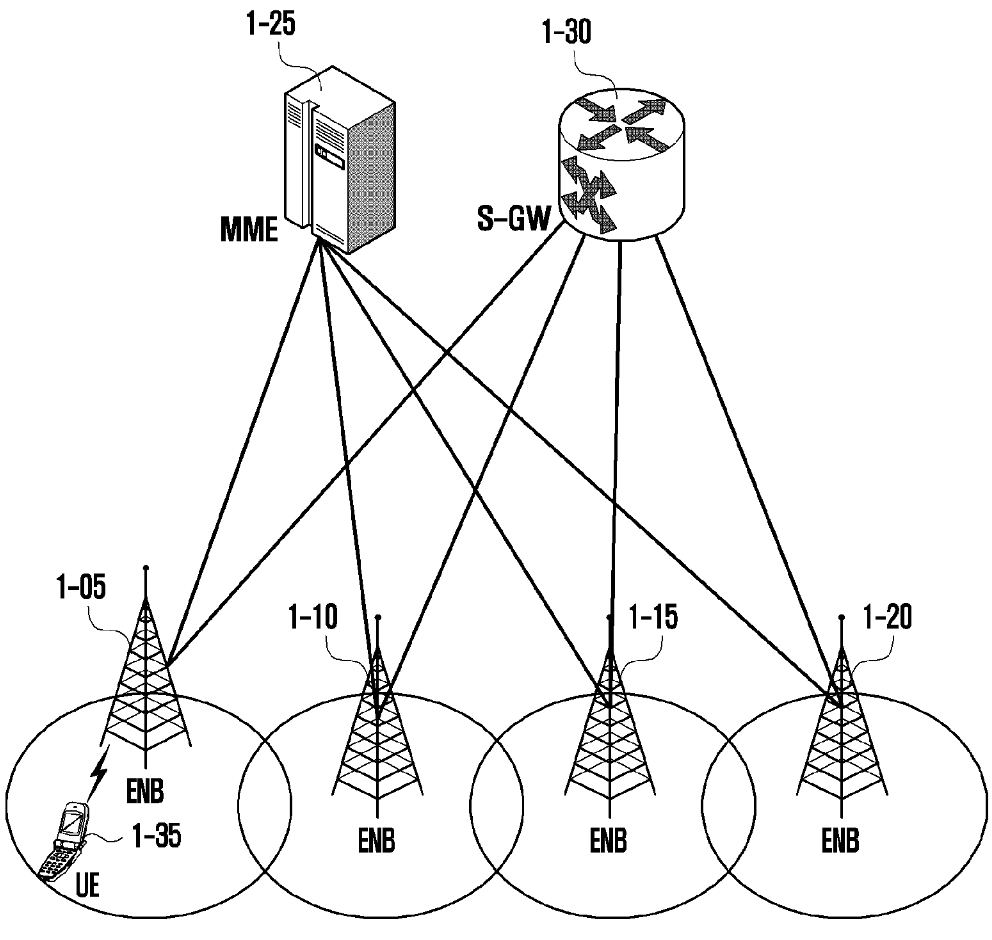
FIG. 1 illustrates a structure of an LTE system according to an embodiment of the disclosure.

FIG. 1 illustrates a structure of an LTE system according to an embodiment of the disclosure.

Referring to FIG. 1, a radio access network of the LTE system includes next-generation base stations (Evolved Node Bs (ENBs), Node Bs, or base stations) 1-05, 1-10, 1-15, and 1-20, a Mobility Management Entity (MME) 1-25, and a Serving Gateway (S-GW) 1-30. A user terminal (user equipment) (hereinafter, referred to as a UE or a terminal) 135 accesses an external network through the ENBs 1-05 to 1-20 and the S-GW 1-30.

Referring to FIG. 1, the ENBs 1-05 to 1-20 correspond to the node Bs of the related art of the universal mobile telecommunications system (UMTS) system. The ENB is connected to the UE 1-35 through a radio channel, and performs a more complicated role than that of the node B the related art. In the LTE system, since all user traffic including a real-time service such as Voice over IP (VoIP) via an Internet protocol are served through a shared channel, an apparatus for collecting and scheduling status information such as buffer statuses of UEs, available transmission power status, and channel statuses is required, and the ENBs 1-05 to 1-20 may serve as this apparatus. One ENB may control a plurality of cells. For example, in order to implement a transmission rate of 100 Mbps, the LTE system may use Orthogonal Frequency Division Multiplexing (OFDM) as a wireless access technology in a bandwidth of 20 MHz. Further, an Adaptive Modulation and Coding (AMC) scheme of determining a modulation scheme and a channel-coding rate is applied depending on the channel status of the new radio (NR) UE. The S-GW 1-30 is a device for providing a data bearer, and generates or removes the data bearer under a control of the MME 1-25. The MME is a device for performing not only a function of managing the mobility of the UE but also various control functions, and may be connected to a plurality of ENBs.

Figure 2:
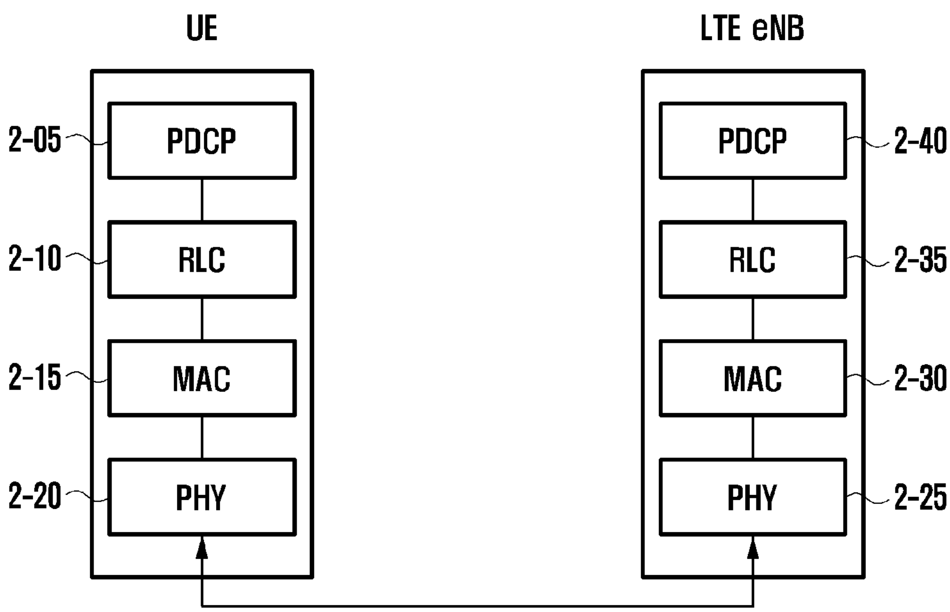
FIG. 2 illustrates a wireless protocol structure in an LTE system according to an embodiment of the disclosure.

FIG. 2 illustrates a wireless protocol structure in the LTE system according to an embodiment of the disclosure.

Referring to FIG. 2, the UE and the ENB include Packet Data Convergence Protocols (PDCPs) 2-05 and 2-40, Radio Link Controls (RLCs) 2-10 and 2-35, Medium Access Controls (MACs) 2-15 and 2-30, respectively, in the wireless protocol of the LTE system. The Packet Data Convergence Protocols (PDCPs) 2-05 and 2-40 performs an operation of compressing/reconstructing an IP header. The main functions of the PDCP are described below.

Header compression and decompression function (Header compression and decompression: robust header compression (ROHC) only)

User data transmission function (transfer of user data)

Sequential delivery function (in-sequence delivery of upper-layer Packet Data Units (PDUs) at PDCP reestablishment procedure for RLC acknowledged mode (AM))

Sequence re-arrangement function (For split bearers in DC (only support for RLC AM): PDCP PDU routing for transmission and PDCP PDU reordering for reception)

Duplicate detection function (duplicate detection of lower-layer service data units (SDUs) at PDCP reestablishment procedure for RLC AM)

Retransmission function (retransmission of PDCP SDUs at handover and, for split bearers in DC, of PDCP PDUs at PDCP data recovery procedure, for RLC AM)

Ciphering and deciphering function (Ciphering and deciphering)

Timer-based SDU removal function (timer-based SDU discard in uplink)

Radio Link Controls (RLCs) **2*b*-10 and 2*b*-35** reconfigure a PDCP Packet Data Unit (PDU) or an RLC Service Data Unit (SDU) to be the appropriate size and perform an ARQ operation. The main functions of the RLC are summarized below.

- Data transmission function (transfer of upper-layer PDUs)
- ARQ function (Error Correction through ARQ (only for AM data transfer))
- Concatenation, segmentation, and reassembly function (Concatenation, segmentation and reassembly of RLC SDUs (only for unacknowledged mode (UM) and AM data transfer))
- Re-segmentation function (re-segmentation of RLC data PDUs (only for AM data transfer))
- Reordering function (reordering of RLC data PDUs (only for UM and AM data transfer))
- Duplication detection function (duplicate detection (only for UM and AM data transfer))
- Error detection function (protocol error detection (only for AM data transfer))
- RLC SDU deletion function (RLC SDU discard (only for UM and AM data transfer))
- RLC reestablishment function (RLC reestablishment)

The MACs 2-15 and 2-30 are connected with various RLC layer devices included in one UE, and perform an operation for multiplexing RLC PDUs to the MAC PDU and demultiplexing the RLC PDUs from the MAC PDU. The main functions of the MAC are summarized below.

- Mapping function (Mapping between logical channels and transport channels)
  - Multiplexing and demultiplexing function (Multiplexing/demultiplexing of MAC SDUs belonging to one or multiple different logical channels into/from Transport Blocks (TBs) delivered to/from the physical layer on transport channels)
- Scheduling information report function (scheduling information reporting)
- HARQ function (error correction through HARQ)
- Logical channel priority control function (priority handling between logical channels of one UE)
- UE priority control function (priority handling between UEs by means of dynamic scheduling)
- Multimedia broadcast multicast service (MBMS) service identification function (MBMS service identification)
- Transport format selection function (transport format selection)
- Padding function (padding)

The physical layers 2-20 and 2-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 3:
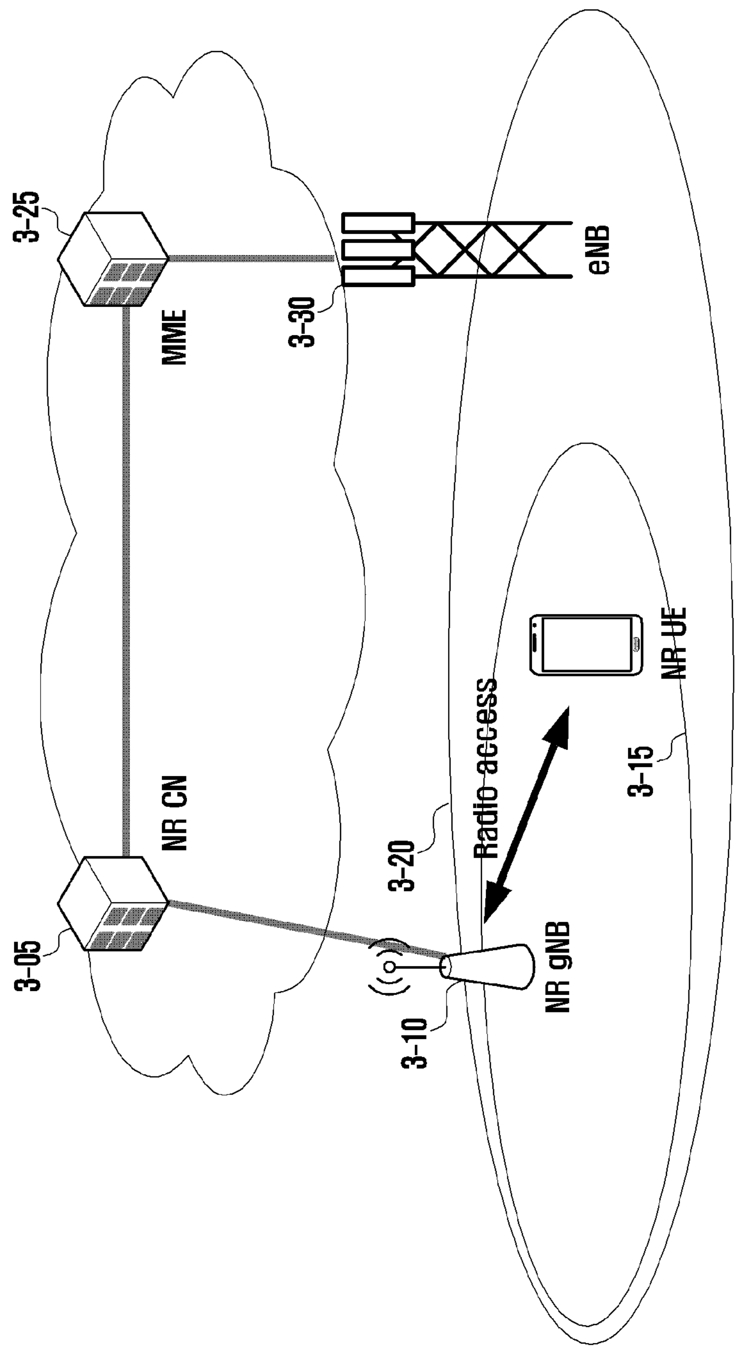
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, a radio access network of the next-generation mobile communication system (hereinafter, referred to as NR or 5G) includes a next-generation base station 3-10 (new radio node B, hereinafter, referred to as an NR gNB or an NR NB) and a new radio core network (NR CN) 3-05. A user terminal 3-15 (hereinafter, referred to as a New Radio User Equipment (NR UE) or a terminal) accesses an external network through the NR gNB 3-10 and the NR CN 3-05.

The NR gNB 3-10 of FIG. 3 corresponds to an evolved Node B (eNB) in a LTE system of the related art. The NR gNB may be connected to the NR UE 3-15 through a radio channel and may provide better service than the node B of the related art. Since all user traffic is served through a shared channel in the next-generation mobile communication system, an apparatus for collecting and scheduling status information of buffer statuses, available transmission power statuses, and channel statuses of UEs is required, and the NR gNB 3-10 serves as this apparatus. One NR gNB generally controls a plurality of cells. The NR gNB may have a bandwidth wider than the maximum bandwidth of the related art in order to implement super-high-speed data transmission compared to LTE of the related art, may apply orthogonal frequency-division multiplexing (OFDM) through radio-access technology, and may further apply beamforming technology. Further, an Adaptive Modulation and Coding (AMC) scheme of determining a modulation scheme and a channel-coding rate is applied depending on the channel status of the NR UE. The NR CN 3-05 performs a function of supporting mobility, configuring a bearer, and configuring quality of service (QoS). The NR CN is a device for performing a function of managing the mobility of the NR UE and various control functions, and is connected to a plurality of NR gNBs. Further, the next-generation mobile communication system may be linked to the LTE system of the related art, and the NR CN is connected to an MME 3-25 through a network interface. The MME is connected to an eNB 3-30, which is a base station of the related art.

Figure 4:
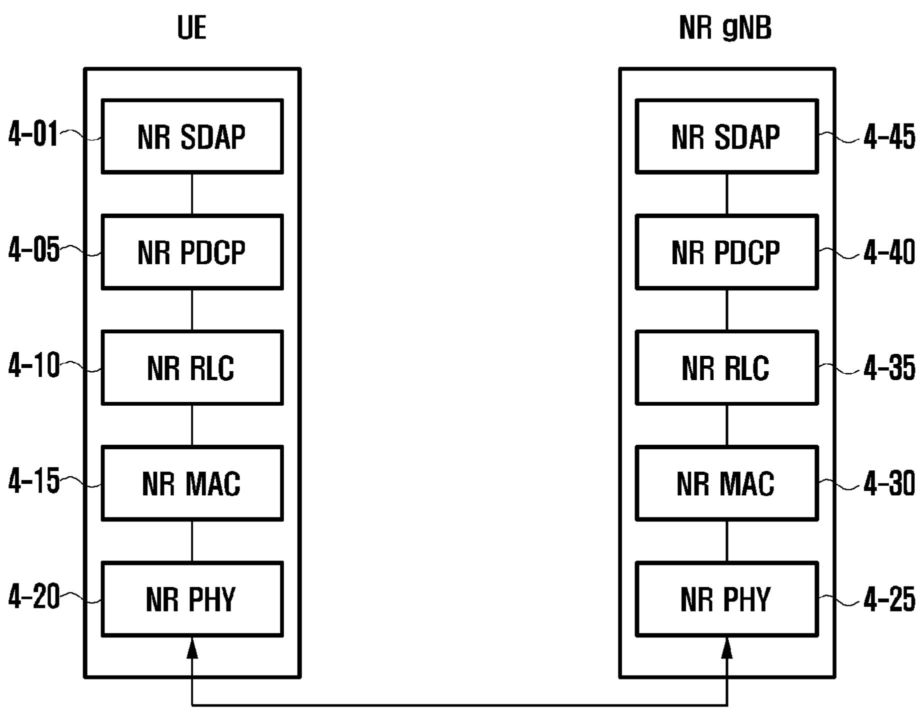
FIG. 4 illustrates a wireless protocol structure of a next-generation mobile communication system according to an embodiment of the disclosure.

FIG. 4 illustrates a wireless protocol structure of the next-generation mobile communication system according to an embodiment of the disclosure.

Referring to FIG. 4, the UE and the NR gNB include NR SDAPs 4-01 and 4-45, NR PDCPs 4-05 and 4-40, NR RLCs 4-10 and 4-35, and NR MACs 4-15 and 4-30 in the wireless protocol of the next-generation mobile communication system.

Main functions of the NR SDAPs 4-01 and 4-45 may include some of the following functions.

- User data transmission function (transfer of user-plane data)
- Function of mapping QoS flow and a data bearer for uplink and downlink (mapping between a QoS flow and a data radio bearer (DRB) for both DL and UL)
- Function of marking a QoS flow ID for uplink and downlink (marking QoS flow ID in both DL and UL packets)
- Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP 4-05 and 4-40 may include some of the following functions.

- Header compression and decompression function (Header compression and decompression: ROHC only)
- User data transmission function (transfer of user data)
- Sequential delivery function (in-sequence delivery of upper-layer PDUs)
- Non-sequential delivery function (out-of-sequence delivery of upper-layer PDUs)

Reordering function (PDCP PDU reordering for reception)

Duplicate detection function (duplicate detection of lower-layer SDUs)

Retransmission function (retransmission of PDCP SDUs)

Ciphering and deciphering function (Ciphering and deciphering)

Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 4-10 and 4-35 may include some of the following functions.

Data transmission function (transfer of upper-layer PDUs)

Sequential delivery function (in-sequence delivery of upper-layer PDUs)

Non-sequential delivery function (out-of-sequence delivery of upper-layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 4-15 and 4-30 may be connected to a plurality of NR RLC layer devices configured in one UE and main functions of the NR MAC may include some of the following functions.

Mapping function (Mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY layers 4-20 and 4-25 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a frequency of a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell (special cell) or Scell) and the UE and the NR gNB may transmit and receive data in one or a plurality of BWPs according to a configuration of the NR gNB.

The disclosure proposes a state transition method or a bandwidth part switching method and a detailed operation considering a state of an Scell and a plurality of bandwidth parts configured in the Scell when a dormant bandwidth part proposed in the disclosure is introduced. Further, the disclosure manages a dormant mode in units of bandwidth parts (BWP-levels) and proposes a state transition method or a bandwidth part switching method, and also proposes a detailed operation in a bandwidth part according to a state of each Scell or a state or a mode (active, inactive, or dormant) of each bandwidth part.

In addition, the disclosure configures a plurality of bandwidth parts for each downlink or uplink in one cell (Spcell, Pcell, Pscell, or Scell) and configures and operates active bandwidth part (active DL or UL BWP,) a dormant BWP (or dormant DL BWP), or an inactive bandwidth part (inactive or deactivated DL/UL BWP) through bandwidth part switching. That is, it is possible to increase a data transmission rate through a method similar to the carrier aggregation by transitioning a downlink or uplink BWP to an activated state for one cell and the UE does not monitor a PDCCH to save a battery by transitioning or switching the downlink BWP to a dormant BWP. Further, the UE may measure a channel for the downlink BWP and report a channel measurement result, thereby supporting rapid activation of a cell or a BWP in the future. Further, it is possible to save the batter of the UE by transitioning the downlink (or uplink) BWP to a deactivated state in one cell. An indication of the state transition between BWPs for each cell or a BWP switching indication may be configured through an RRC message, a MAC CE, or downlink control information (DCI) of a PDCCH. The dormant bandwidth part may be extended and applied to the dual connectivity, for example, a PSCell of a secondary cell group. In another method, cell group suspension or deactivation may be indicated to one cell group (for example, secondary cell group) of the UE in which dual connectivity is configured through expansion to the concept of cell group suspension or cell group deactivation, and thus data transmission or reception is suspended, and PDCCH monitoring is stopped or is performed intermittently on the basis of a very long period in the indicated cell group, and accordingly, UE power may be reduced. Further, when an indication of cell group suspension or deactivation is received, the UE may support rapid activation of the dual connectivity by performing a channel measurement procedure in a cell group of which cell group suspension or deactivation is indicated and reporting the channel measurement result to a network (for example, a master cell group or a secondary cell group). For the cell group of which the cell group suspension or deactivation is indicated, the UE may perform the procedure and may not discard or release cell group configuration information but maintain or store the same, or may reconstruct the cell group configuration information according to a cell group activation or resumption indication from the network. For example, the cell group configuration information (for example, configuration information of each PDCP, RLC, or MAC layer device, bearer configuration information, or cell-specific configuration information) may be stored or maintained. When a cell group resumption or activation indication is received for the cell group of which the cell group suspension or deactivation has been indicated, the UE may resume, reconstruct, or apply again the cell group configuration information, and may resume a bearer, transmit or receive data again, monitor a PDCCH again, perform a channel measurement report, or activate periodically configured transmission resources.

First channel measurement configuration information for rapid cell group activation may be included and configured in the cell group configuration information, previously configured cell group configuration information, or a message indicating cell group activation or resumption (for example, an RRC message or RRCReconfiguration). In order to rapidly activate the cell group, the first channel measurement configuration information may include configuration information such as a period of a signal for frequently measuring a channel measurement signal to often or frequently transmit a frequent channel measurement signal (for example, radios resource) for often or frequent transmission of the channel measurement signal by the base station in order to rapidly perform channel measurement in the cell, transmitted transmission resource information (frequency or time transmission resources through which the frequent channel measurement signal is transmitted), an interval or a number of times (a number of times the frequent channel measurement signal is transmitted), a timer value (a time at which the frequent channel measurement signal is transmitted), a time interval (an interval in which the frequent channel measurement signal is transmitted (for example, a time unit (slot, subframe, symbol, or the like))), or transmission resources of which a measurement result should be transmitted by the UE, a period, an interval, or timing thereof in configuration information of the cell (for example, PCell, PSCell, or SCell) of the cell group. In the first channel measurement configuration information, transmission resources for channel measurement may be configured to allow the base station to often or frequently transmit many channel measurement signals (or transmission resources) in order to support rapid channel measurement or measurement of many signals by the UE as well as configuration of a short report period (or transmission resources) in which the UE reports a channel measurement report.

The cell group configuration information, the previously configured cell group configuration information, or the message indicating cell group activation or resumption (for example, an RRC message or RRCReconfiguration) may include second channel measurement configuration information for measuring a signal of the cell (PSCell, PCell, or SCell) of the cell group. The second channel measurement configuration information may include general channel measurement configuration information such as transmission resources of the channel measurement signal, a period, a time interval, or a number of times thereof, or transmission resources for the channel measurement report, a period, or a time interval thereof.

In the disclosure, the first channel measurement configuration information or the second channel measurement configuration information of the UE may be applied according to the following conditions, a channel may be measured, and a measurement result may be reported to the base station.

1> If the UE receives a message (for example, a PDCCH indicator, MAC control information, or an RRC message) indicating activation of a cell (PCell, PSCell, or SCell) or a cell group, 2> if the first channel measurement configuration information is configured in the UE, 3> the UE may identify that the base station will frequently transmit many channel measurement signals according to the first channel measurement configuration information and may measure many or frequent channel measurement signals temporarily (for example, until a time interval configured in the first channel measurement configuration information (for example, subframe, slot, or symbol), during an appointed (or predetermined) time interval, or during a time (for example, while a timer is run)), or until a first condition is satisfied according to the first channel measurement configuration information. Further, the channel measurement result may be reported until the time interval configured in the first channel measurement configuration information (for example, subframe, slot, or symbol), during the appointed (or predetermined) time interval, or during the time (for example, while the timer is run)), or until the first condition is satisfied according to the period or the transmission resources configured in the first channel measurement configuration information. Accordingly, as the UE rapidly measures and rapidly reports the frequency channel measurement signals, the UE may rapidly activate (or resume) the cell (PCell, SCell, or PSCell) or the cell group and rapidly receive an indication of scheduling information. If the second channel measurement configuration information is configured in the UE after the time interval configured in the first channel measurement configuration information (for example, subframe, slot, or symbol), after the appointed (or predetermined) time interval, after the time (for example, when the timer expires), or after the first condition is satisfied, the application of the first channel measurement configuration information is stopped or released, and the channel measurement signal may be measured according to the second channel measurement configuration information. For example, fallback from the first channel measurement configuration information to the second channel measurement configuration information may be made or second channel information may be applied instead of the first channel measurement configuration information. The channel measurement result may be reported according to the period or the transmission resources configured in the second channel measurement configuration information. If the second channel measurement configuration information is not configured, the channel measurement may not be performed.

2> otherwise (if the first channel measurement configuration information is not configured in the UE), 3> if the second channel measurement configuration information is configured in the UE, the channel measurement signal may be measured according to the second channel measurement configuration information. The channel measurement result may be reported according to the period or the transmission resources configured in the second channel measurement configuration information. If the second channel measurement configuration information is not configured, the channel measurement may not be performed.

The first channel measurement configuration information of the disclosure may be extended, configured, and used when the cell group (for example, PSCell) is activated or resumed, when the SCell is activated, or when the RRC connection is resumed in an RRC inactive mode.

In the disclosure, the first condition may be one of the following conditions. The disclosure proposes, as the first condition, efficient conditions to make the base station not transmit unnecessarily many transmission resources or frequent transmission resources when the cell is activated, when the cell group is activated or resumed, or when the UE in the RRC inactive mode resumes the connection in an RRC connection resumption procedure. For example, the first channel measurement configuration information may be applied and the channel measurement procedure or the channel measurement report result may be performed until one of the following conditions is satisfied.

It may be determined that the first condition is satisfied when the UE successfully completes a random access procedure in the cell (for example, PCell, SCell, or PSCell) or the cell of the cell group (for example, PSCell or SCell), when the UE successfully completes the random access procedure and receives first uplink transmission resources, or when uplink transmission resources are first indicated to the UE.

For example, more specifically, if the UE performs a Contention Free Random Access (CFRA) procedure (for example, if a predetermined preamble or a UE cell identifier (for example, C-RNTI) is allocated), it may be determined that the first condition is satisfied since it may be considered that the random access procedure is successfully completed when the UE transmits the predetermined preamble to the cell and receives a Random Access Response (RAR) message or receives an indication of a PDCCH for the random access response. In another method, when uplink transmission resources are first received after RAR reception, it may be determined that the first condition is satisfied.

If the UE performs a Contention-Based Random Access (CBRA) procedure (for example, if a predetermined preamble or a UE cell identifier (for example, C-RNTI) is not allocated), it may be determined that the first condition is satisfied since the UE considers that the random access procedure to a target base station is successfully completed when the UE transmits a preamble (for example, a random preamble) to the cell, receives a Random Access Response (RAR) message, transmits message 3 (for example, a handover completion message) through uplink transmission resources allocated by, included in, or indicated by the random access response message, and receives a MAC C (contention resolution MAC CE) indicating that contention is resolved from the target base station through message 4 or when the UE receives uplink transmission resources through a PDCCH corresponding to a C-RNTI of the UE. In another method, when the size of the uplink transmission resources allocated by the random access response message is sufficient and thus the UE may additionally transmit uplink data after message 3 is transmitted, the UE may determine that the uplink transmission resources are received and the first condition is satisfied. That is, it may be determined that the uplink transmission resources are first received when the RAR is received and determined that the first condition is satisfied.

1> If the UE receives a configuration or an indication of a 2-step random access procedure and performs the same, 1> Alternatively, even though the 2-step random access procedure is not configured or indicated, if the UE supports the 2-step random access procedure by a UE capability and broadcasts information (for example, random access resources or a threshold value for determining to perform the 2-step random access procedure or not perform the same) for the 2-step random access procedure in system information or the UE receives the system information and performs the 2-step random access procedure for the cell when the strength of a signal is better or larger than the threshold value broadcasted in the system information, 2> the UE may determine that the first condition is satisfied when the 2-step random access procedure is successfully completed.

2> specifically, the 2-step random access procedure may be performed through one of a Contention-Based Random Access (CBRA) method or a Contention-Free Random Access (CFRA) method.

3> If the UE performs the CBRA-based 2-step random access procedure,

4> the UE may transmit a preamble in transmission resources for the 2-step random access procedure (for example, transmission resources configured by a physical random access channel (PRACH) occasion or the base station through an RRC message or transmission resources broadcasted in system information) and transmit data (for example, a MsgA MAC PDU) in transmission resources (for example, physical uplink shared channel (PUSCH) occasion) for data transmission. The data may include MAC control information (C-RNTI MAC CE) including a UE identifier (C-RNTI) or an RRC message (RRCReconfigurationComplete message or a handover completion message).

4> the UE may monitor a PDCCH scrambled by the UE identifier (C-RNTI) or a first identifier (MsgB-RNTI) induced by a time or a frequency in which the preamble is transmitted.

4> if the UE receives a PDCCH scrambled by the UE identifier, allocate downlink transmission resources in the PDCCH, or receives MAC control information (timing advance command MAC CE) for controlling timing in the downlink transmission resources, 5> the UE may determine that the 2-step random access procedure is successfully completed and the first condition is satisfied.

4> if the UE receives a PDCCH scrambled by the first identifier (MsgB-RNTI), allocates downlink transmission resources in the PDCCH, or receives a fallback random access response to a preamble transmitted by the UE in the downlink transmission resources (that is, fallback RAR indicating transmission of a MsgA through other transmission resources when the base station receives the preamble but does not receives the MsgA), 5> the UE may transmit data (MsgA MAC PDU) through transmission resources indicated by the fallback random access response.

5> the UE may monitor the PDCCH scrambled by the UE identifier (C-RNTI).

5> if the UE receives the PDCCH scrambled by the UE identifier or allocates uplink transmission resources in the PDCCH, the UE may determine that the 2-step random access procedure is successfully completed and the first condition is satisfied.

3> If the UE performs the CFRA-based 2-step random access procedure,

4> the UE may transmit a preamble in transmission resources for the 2-step random access procedure (for example, transmission resources designated by a PRACH occasion or the base station through an RRC message) and transmit data (for example, a MsgA MAC PDU) in transmission resources (for example, PUSCH occasion) for data transmission. The data may include MAC control information (C-RNTI MAC CE) including a UE identifier (C-RNTI) or an RRC message (RRCReconfigurationComplete message or a handover completion message).

4> the UE may monitor a PDCCH scrambled by the UE identifier (C-RNTI) or a first identifier (MsgB-RNTI) induced by a time or a frequency in which the preamble is transmitted.

4> if the UE receives a PDCCH scrambled by the UE identifier, allocates downlink transmission resources in the PDCCH, or receives MAC control information (timing advance command MAC CE) for controlling timing in the downlink transmission resources, 5> the UE may determine that the 2-step random access procedure is successfully completed and the first condition is satisfied.

4> if the UE receives a PDCCH scrambled by the first identifier (MsgB-RNTI), allocates downlink transmission resources in the PDCCH, or receives a fallback random access response to a preamble transmitted by the UE in the downlink transmission resources (that is, fallback RAR indicating transmission of a MsgA through other transmission resources when the base station receives the preamble but does not receives the MsgA), 5> the UE may determine that the 2-step random access procedure is successfully completed and the first condition is satisfied.

5> the UE may transmit data (MsgA MAC PDU) through transmission resources indicated by the fallback random access response.

1> It may be determined that the first condition is satisfied when the random access procedure starts or when a preamble for the random access procedure is transmitted.

1> In another method, the UE may determine that the first condition is satisfied when the 2-step random access procedure is configured in or indicated to the UE through the message. For example, in this case, the UE may determine that the first condition is satisfied before the 2-step random access procedure starts.

1> In another method, the UE may determine that the first condition is satisfied when the 2-step random access procedure is configured in or indicated to the UE through the message and transmission resources (PUSCH) configured for data transmission in the 2-step random access procedure is larger than a first threshold value or a configuration value for controlling timing (timing advance value) is included in the RRC message. The first threshold value may be configured by the base station through the RRC message (for example, RRCReconfiguration), may be broadcasted in system information, or may be configured to have the size of data to be transmitted by the UE. For example, in this case, the UE may determine that the first condition is satisfied before the 2-step random access procedure starts. In another method, when a configuration value (timing advance value) for controlling timing is included in the RRC message or the 2-step random access procedure is configured, the UE may directly transmit data in configured transmission resources (for example, transmission resources configured in the RRC message or transmission resources indicated by a PDCCH of the target base station, monitored by the UE) without transmitting a preamble. Accordingly, in this case, the UE may determine that the first condition is satisfied before the 2-step random access procedure starts, when the data is transmitted, or before the data is transmitted. In another method, when a configuration value (timing advance value) for controlling timing is included in the RRC message or the 2-step random access procedure is configured, the UE may directly transmit data in configured transmission resources (PUSCH) (for example, transmission resources configured in the RRC message or transmission resources indicated by a PDCCH of the target base station, monitored by the UE) without transmitting a preamble. In this case, when the configured transmission resources (PUSCH) (for example, transmission resources configured in the RRC message or transmission resources indicated by the PDCCH of the target base station, monitored by the UE) is larger than a first threshold value or when the RRC message includes the configuration value (timing advance value) for controlling timing, the UE may determine that the first condition is satisfied before the 2-step random access procedure starts, when the data is transmitted, or before the data is transmitted.

1> When the UE in an RRC inactive mode transmits an RRCResumeRequest message and then receives an RRCResume message (or RRCSetup message) in response thereto, it may be considered that the first condition is satisfied.

When the first condition is satisfied, a higher layer device (for example, an RRC layer device) may transmit an indication to a higher layer device (for example, a PDCP layer device, an RLC layer device, a MAC layer device, or a PHY layer device) through an indicator, or a lower layer device (for example, a PDCP layer device, an RLC layer device, a MAC layer device, or a PHY layer device) may transmit an indication to a higher layer device (for example, an RRC layer device) through an indicator.

In the disclosure, the BWP may be used without distinction between the uplink and the downlink, and the meaning thereof may be each of an uplink BWP and a downlink BWP according to the context.

In the disclosure, the link may be used without any distinction between the uplink and the downlink, and the meaning thereof may indicate each of the uplink and the downlink.

In the disclosure, the cell may indicate a PCell or an SCell (for example, an SCell configured in a Master Cell Group (MCG)), a PSCell (for example, a PCell of a Secondary Cell Group (SCG)), or an SCell (for example, an SCell configured in a Secondary Cell Group (SCG)). The disclosure configures and introduces a dormant BWP for the SCell or the PSCell of the UE performing carrier aggregation or the dual connectivity and not monitor a PDCCH in the dormant BWP so as to reduce battery consumption of the UE, and performs and reports channel measurement (for example, measures or reports Channel State Information (CSI) or Channel Quality Information (CQI)) or perform beam measurement, beam tracking, or beam operation, thereby performing switching or activation to a normal BWP and thus rapidly starting data transmission in the normal BWP in the case in which data transmission is needed. The dormant BWP may not be configured or applied to the SpCell (the PCell of the MCG or the PCell of the SCG (or the PSCell)) in which a signal should be continuously monitored, a feedback is transmitted or received, or synchronization is identified or maintained or the SCell in which a physical uplink control channel (PUCCH) is configured.

If the UE receives an indication of switching or activation to the dormant BWP for the SCell of the master cell group through the PCell, the UE may perform a channel measurement procedure for the dormant BSP of the SCell and report the measured channel measurement result in transmission resources of the PCell of the master cell group (MCG) (for example, through transmission resources of a Physical Uplink Control Channel (PUCCH of the PCell) or transmission resources of the SCell (for example, through transmission resources of a Physical Uplink Control Channel (PUCCH)) in which the PUCCH of the master cell group is configured. A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

If the UE receives an indication of switching or activation to the dormant BWP for the SCell of the secondary cell group through the PSCell, the UE may perform a channel measurement procedure for the dormant BSP of the SCell and report the measured channel measurement result in transmission resources of the PSCell of the secondary cell group (SCG) (for example, through transmission resources of a Physical Uplink Control Channel (PUCCH of the PSCell) or transmission resources of the SCell (for example, through transmission resources of a Physical Uplink Control Channel (PUCCH)) in which the PUCCH of the secondary cell group is configured. A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

If the UE receives an indication of switching or activation to the dormant BWP for the PSCell or the SCell of the secondary cell group through the PCell or an indication of cell group suspension (or SCG suspension) for the secondary cell group (SCG or PSCell), the UE may perform a channel measurement procedure for a BWP of the PSCell or the SCell (BWP configured in the RRC message or the last activated BWP) or the dormant BWP and report the measured channel measurement result in transmission resources of the PCell of the master cell group (MCG) (for example, through transmission resources of a Physical Uplink Control Channel (PUCCH) of the PCell), transmission resources of the SCell in which the PUCCH of the master cell group is configured (for example, through transmission resources of the PUCCH), or transmission resources of the PSCell of the secondary cell group (SCG) (for example, through transmission resources of the PUCCH of the PSCell). A cell or a BWP of the cell for which the channel measurement result is reported, a cell, and transmission resources of the cell (for example, a PUCCH or a PUSCH) through which the report is transmitted may be configured in the UE for each cell or each BWP through the RRC message.

The disclosure proposes various embodiments implemented on the basis of DCI of the PDCCH, the MAC CE, or the RRC message in order to operate the state of BWP or cell group suspension proposed in the above for the SCell of the UE (the SCell of the master cell group when the carrier aggregation is configured or the SCell of the secondary cell group when the dual connectivity is configured) or the PSCell (the PCell of the secondary cell group when the dual connectivity is configured).

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station). The Pcell and the Pscell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the base station operates a plurality of Scells as well as the Spcell to increase transmission resources and uplink or downlink data transmission resources is referred to as carrier aggregation or dual connectivity.

When the UE receives a configuration of the Spcell and a plurality of Scells through an RRC message, the UE may receive a configuration of a state or mode for each cell (PCell, PSCell, or SCell), each Scell or a BWP or a cell group of each SCell through the RRC message, the MAC CE, or the PDCCH DCI. The state or mode of the cell may be configured as an active mode or activated state and a deactivated mode or deactivated state. The active mode or the activated state of the cell may mean that the UE may exchange uplink or downlink data with the base station in a BWP other than an activated BWP of the Cell, an activated normal BWP, or an activated dormant BWP in the active mode or the activated cell, monitors a PDCCH to identify an indication of the base station, measures a channel for a downlink of the cell in the active mode or the activated state (or a BWP other than an activated BWP, an activated normal BWP, or an activated dormant BWP of the cell), periodically reports measurement information, and periodically transmits a pilot signal (Sounding Reference Signal (SRS)) to the base station so that the base station can measure an uplink channel. Alternatively, the UE may activate or switch the BWP to the dormant BWP for the activated cell according to an indication of the base station (for example, the PDCCH, the MAC CE, or the RRC message) and, when the dormant BWP is activated in the activated cell, may perform a procedure of a channel measurement report and reporting the channel measurement result without performing PDCCH monitoring in the cell.

In another method, if the cell in which the dormant BWP is activated is the SCell, the UE may not monitor the PDCCH, not receive downlink data, perform channel measurement, report the measurement result, suspend configured periodic transmission resources (for example, configured uplink grant type 1), clear or initialize configured periodic transmission resources (for example, configured uplink grant type 2), not transmit a Sounding Reference Signal (SRS), not transmit uplink data, or not transmit a PUCCH (for example, a Scheduling Report (SR) or a preamble for a random access). However, if the cell in which the dormant BWP is activated or the cell of which cell group suspension is indicated is the PSCell, the UE may not monitor the PDCCH, monitor the PDCCH according to a long period, not receive downlink data, perform channel measurement, report the measurement result, suspend configured periodic transmission resources (for example, configured uplink grant type 1), clear or initialize configured periodic transmission resources (for example, configured uplink grant type 2), transmit a Sounding Reference Signal (SRS), not transmit uplink data, transmit a PUCCH (for example, a Scheduling Report (SR) or a preamble for a random access), or perform a random access procedure.

If the cell activated to a BWP other than the BWP is the SCell, the UE may monitor the PDCCH, receive downlink data, perform channel measurement, report the measurement result, resume configured periodic transmission resources (for example, configured uplink grant type 1), configure or activate configured periodic transmission resources (for example, configured uplink grant type 2), transmit a Sounding Reference Signal (SRS), transmit uplink data, transmit a PUCCH (for example, a Scheduling Report (SR) or a preamble for a random access), or perform a random access procedure.

If the cell activated to a BWP other than the BWP or the cell of which cell group resumption (SCG resumption) is indicated is the PSCell, the UE may monitor the PDCCH, receive downlink data, perform channel measurement, report the measurement result, resume configured periodic transmission resources (for example, configured uplink grant type 1), configure or activate configured periodic transmission resources (for example, configured uplink grant type 2), transmit a Sounding Reference Signal (SRS), transmit uplink data, transmit a PUCCH (for example, a Scheduling Report (SR) or a preamble for a random access), or perform a random access procedure.

However, the deactivated mode or the deactivated state of the cell may mean that the UE does not monitor a PDCCH to identify an indication of the base station, does not measure a channel, does not transmit a measurement report, and does not transmit a pilot signal since BWPs configured in the cell are in the deactivated state, the configured BWPs are not activated, or there is no activated BWP among the configured BWPs.

Accordingly, in order to activate cells in the deactivated mode, the base station first configures frequency measurement configuration information in the UE through an RRC message, and the UE measures a cell or a frequency on the basis of the frequency measurement configuration information. Further, the base station may activate the deactivated cells on the basis of frequency/channel measurement information after receiving the cell or frequency measurement report from the UE. Accordingly, activation of the carrier aggregation or dual connectivity in the UE by the base station and starting of data transmission or reception may have much latency.

The disclosure proposes a dormant BWP or a dormant state for a BWP of each activated cell (or active Scell) or proposes configuration or introduction of a dormant bandwidth part (BWP) for each activated cell in order to reduce a battery of the UE and rapidly start data transmission or reception. Alternatively, when dual connectivity is configured in the UE, introduction of or configuration of an activated state, a dormant state, a suspended state, a deactivated state, or a resumed state for the cell group state of each cell group is proposed, and a method of indicating a cell group state transition such as indicating a cell group suspension (or SCG suspension), or a cell group resumption (or SCG resumption) and a UE operation according thereto are proposed.

In a BWP in a dormant mode of the activated cell or a dormant BWP (dormant BWP in the activated SCell) or when the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

The active mode or the activated state of the cell may mean that the UE may exchange uplink or downlink data with the base station in a BWP other than an activated BWP of the cell, an activated normal BWP, or an activated dormant BWP in the active mode or the activated cell, monitors a PDCCH to identify an indication of the base station, measures a channel for a downlink of the cell in the active mode or the activated state (or a BWP other than an activated BWP, an activated normal BWP, or an activated dormant BWP of the cell), periodically reports measurement information, and periodically transmits a pilot signal (Sounding Reference Signal (SRS)) to the base station so that the base station can measure an uplink channel. In the disclosure, the active mode or the activated state of the cell may mean that the UE cannot exchange uplink or downlink data with the base station in an activated dormant BWP of the cell, does not monitor a PDCCH to identify an indication of the base station but measures a channel for the downlink of the activated dormant BWP of the cell in the active mode or the activated state, and periodically reports measurement information to the base station in the active mode or the activated cell.

If the cell in which the dormant BWP is activated or the cell of which cell group suspension is indicated is the PSCell, the UE may not monitor the PDCCH, monitor the PDCCH according to a long period, not receive downlink data, perform channel measurement, report the measurement result, suspend configured periodic transmission resources (for example, configured uplink grant type 1), clear or initialize configured periodic transmission resources (for example, configured uplink grant type 2), transmit a Sounding Reference Signal (SRS), not transmit uplink data, transmit a PUCCH (for example, a Scheduling Report (SR) or a preamble for a random access), or perform a random access procedure.

Further, in the disclosure, the dormant BWP may indicate a state of a BWP or may be used as the logical concept indicating a specific BWP. Accordingly, the dormant BWP may be activated, deactivated, or switched. For example, it may mean an indication of switching a second BWP activated in a first cell to a dormant BWP, an indication of transitioning a first cell to a hibernation or dormant mode, or an indication of activating a BWP of the first cell.

Further, in the disclosure, the normal BWP may indicate a BWP other than a dormant BWP among a BWP configured in each cell of the UE through an RRC message. In the normal BWP, the UE may exchange uplink or downlink data with the base station, monitors a PDCCH to identify an indication of the base station, measures a channel for the downlink, periodically reports measurement information to the base station, and periodically transmits a pilot signal (sounding reference signal (SRS)) to the base station to allow the base station to measure an uplink channel. Further, the normal BWP may indicate a first active BWP, a default BWP, a first active BWP activated from a dormant state, or an initial BWP.

Among the BWPs configured in each cell of the UE, the number of configured dormant BWPs may be only one and it may be configured for the downlink. In another method, among the BWPs configured in each cell of the UE, the number of configured BWPs may be only one for the uplink or the downlink.

In the disclosure, the state of the cell group may be configured in the activated state, the suspended state, or the deactivated state. The state of the cell group may be indicated by a bitmap of PDCCH DCI or an indicator, MAC control information, or an indicator of an RRC message. When the state of the cell group is indicated as the activated state, configuration information of the cell group configured or indicated by the RRC message (for example, RRCReconfiguration message, RRCSetup message, or RRCResume message) may be stored, applied to the UE, reconstructed, or resumed, the UE may perform PDCCH monitoring, receive downlink data, perform channel measurement, perform a measurement result report, resume configured periodic transmission resources (for example, type 1 periodic transmission resources (configured uplink grant type 1)), configure or activate configured periodic transmission resources (for example, type 2 periodic transmission resources (configured uplink grant type 2)), transmit a Sounding Reference Signal (SRS), transmit uplink data, transmit a PUCCH (for example, a Scheduling Request (SR) or a preamble for random access), or perform a random access procedure, according to the configuration of the RRC message in the PCell, PSCell, or the configured SCell of the cell group.

When the state of the cell group is indicated as the suspended state or the deactivated state, configuration information of the cell group configured or indicated by the RRC message (for example, RRCReconfiguration message, RRCSetup message, or RRCResume message) may be stored in the UE or not be discarded but the application thereof may be suspended, the UE may not monitor the PDCCH or perform the PDCCH monitoring according to a long period, not receive downlink data, perform channel measurement, perform a measurement result report, suspend configured periodic transmission resources (for example, type 1 periodic transmission resources (configured uplink grant type 1)), clear or reset configured periodic transmission resources (for example, type 2 periodic transmission resources (configured uplink grant type 2)), transmit a Sounding Reference Signal (SRS), not transmit uplink data may, transmit a PUCCH (for example, a Scheduling Request (SR) or a preamble for random access), or perform a random access procedure, according to the configuration of the RRC message in the PCell, PSCell, or the configured SCell of the cell group.

When the state of the cell group is indicated as the deactivated state or when cell group configuration information release is indicated, configuration information of the cell group configured or indicated by the RRC message (for example, RRCReconfiguration message, RRCSetup message, or RRCResume message) may be released in the UE or may be discarded.

Figure 5:
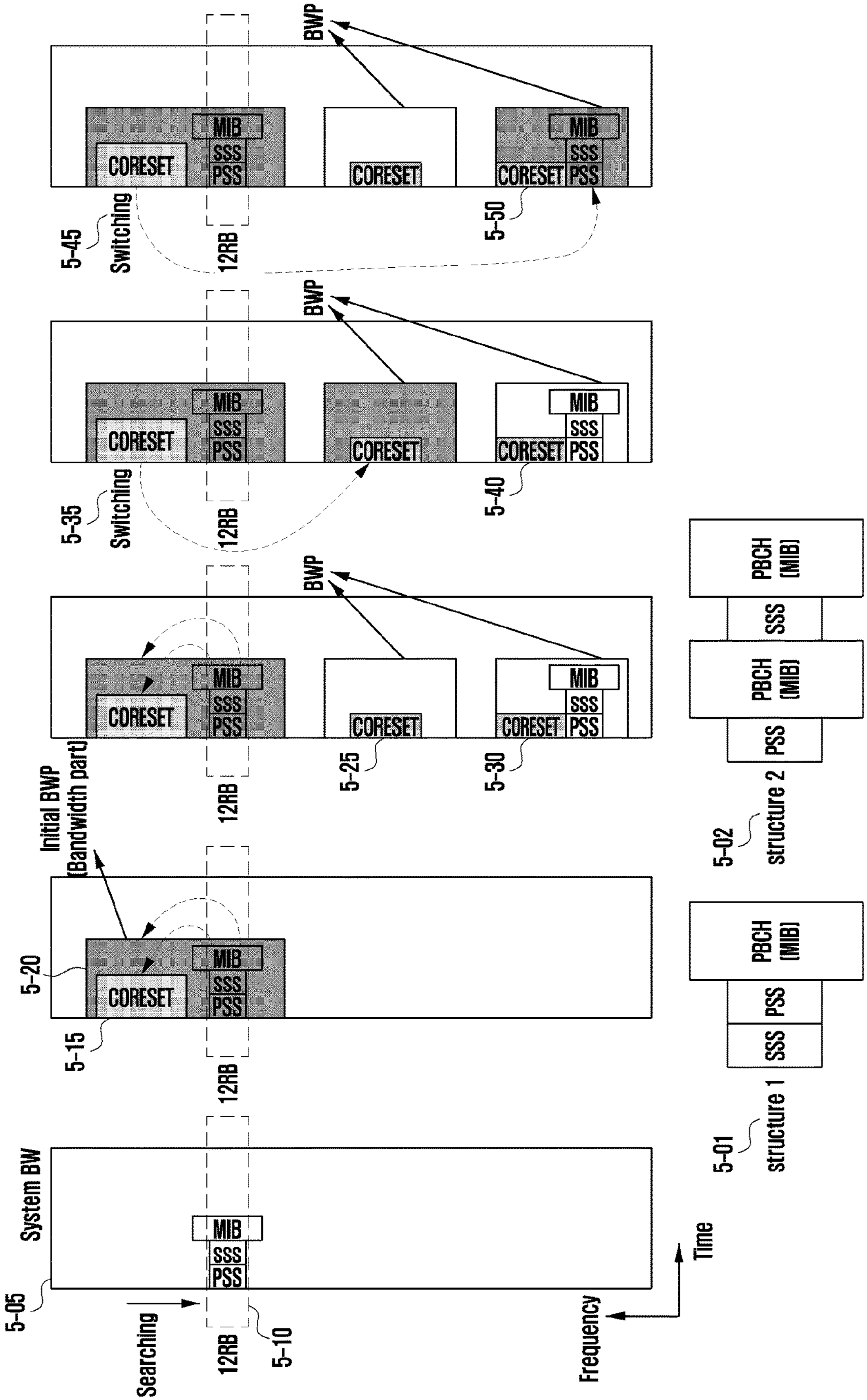
FIG. 5 illustrates a procedure of serving a UE efficiently using a significantly wide frequency bandwidth in a next-generation mobile communication system according to an embodiment of the disclosure.

FIG. 5 illustrates a procedure of serving the UE efficiently using a significantly wide frequency bandwidth in a next-generation mobile communication system according to an embodiment of the disclosure.

Referring to FIG. 5, a method of providing a service to UEs having different capabilities or categories by efficiently using a significantly wide frequency bandwidth and saving a battery in the next-generation mobile communication system is described.

One cell to which the base station provides a service may serve a significantly wide frequency band as indicated by reference numeral 5-05. However, in order to provide a service to UEs having different capabilities, the wide frequency bandwidth may be divided into a plurality of bandwidth parts to manage one cell.

First, the UE, when power thereof is initially turned on, may search the entire frequency band provided by a service provider (PLMN) in units of predetermined resource blocks (for example, in units of 12 resource blocks (RBs)). That is, the UE may start discovering a Primary Synchronization Sequence (PSS)/Secondary Synchronization Sequence (SSS) in the entire system bandwidth in units of resource blocks as indicated by reference numeral 5-10. If the UE searches for the PSS/SSS 5-01 or 5-02 in units of resource blocks and then detects the signals, the UE may read the signals, analyze (decode) the signals, and identify a boundary between a subframe and a radio transmission resource frame (radio frame). Accordingly, the UE may identify subframes in units of 1 ms and synchronize a downlink signal with the base station. The Resource Block (RB) is the size of a predetermined frequency resource and a predetermined time resource, and may be defined as a two-dimensional unit. For example, time resources may be defined in units of 1 ms, and frequency resources may be defined as 12 subcarriers (1 carrier×15 kHz=180 kHz). If the UE completes synchronization, the UE may identify information on a Control Resource Set (CORESET) by checking a Master system Information Block (MIB) or Minimum System Information (MSI) and identify initial access Bandwidth Part (BWP) information as indicated by reference numerals 5-15 and 5-20. CORESET information refers to the location of time/frequency transmission resources through which a control signal is transmitted from the base station, and may be, for example, the location of resources through which a PDCCH channel is transmitted. That is, the CORESET information is information indicating resources through which first system information (system information block 1: SIB 1) is transmitted and indicates frequency/time resources through which a PDCCH is transmitted. The UE may identify information on an initial BWP by reading the first system information. As described above, if the UE completes synchronization of the downlink signal with the base station and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and separately, a plurality of BWPs may be configured for the uplink.

The plurality of bandwidth parts may be indicated and configured by a bandwidth part identifier (BWP identifier) to be used as an initial BWP, a default BWP, a first active BWP, a dormant BWP, or a first active BWP (first active BWP from dormant) that is activated from a dormant state.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a Random Access Response (RAR) message in the initial BWP, which all UEs can read, during the random access procedure.

The first active BWP may be configured to be UE specific and may be designated and indicated by a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of the cell or the BWP in a deactivated state through an RRC message, MAC control information, or DCI, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, the operation may be performed when an indication indicating transition of the cell or the BWP to the dormant state or indicating activation thereof to the dormant BWP is received through an RRC message, MAC control information, or DCI. This is because the base station can effectively use carrier aggregation only by measuring and reporting a frequency/channel for the first active downlink/uplink BWP even when a channel measurement report is transmitted in the dormant state since the current or activated downlink BWP is switched to activate the first active downlink BWP (or the BWP configured or indicated by the RRC message) or the uplink BWP is switched to activate the first active uplink BWP (or the BWP configured or indicated by the RRC message) when the Scell or the BWP is activated. The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

A first active BWP activated after switching from a dormant state or a dormant BWP (or a first active non-dormant BWP or a BWP configured or indicated through an RRC message) may be a BWP which should be activated by switching the current or activated BWP of the activated cell by the UE or a BWP which should be activated from a dormant state configured in the RRC message according to an indication in the case in which the UE receives an indication of switching a BWP of the activated cell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated cell as a dormant BWP or when an activated BWP of the activated cell is a dormant BWP or is switched to a dormant BWP in the cell.

Figure 6:
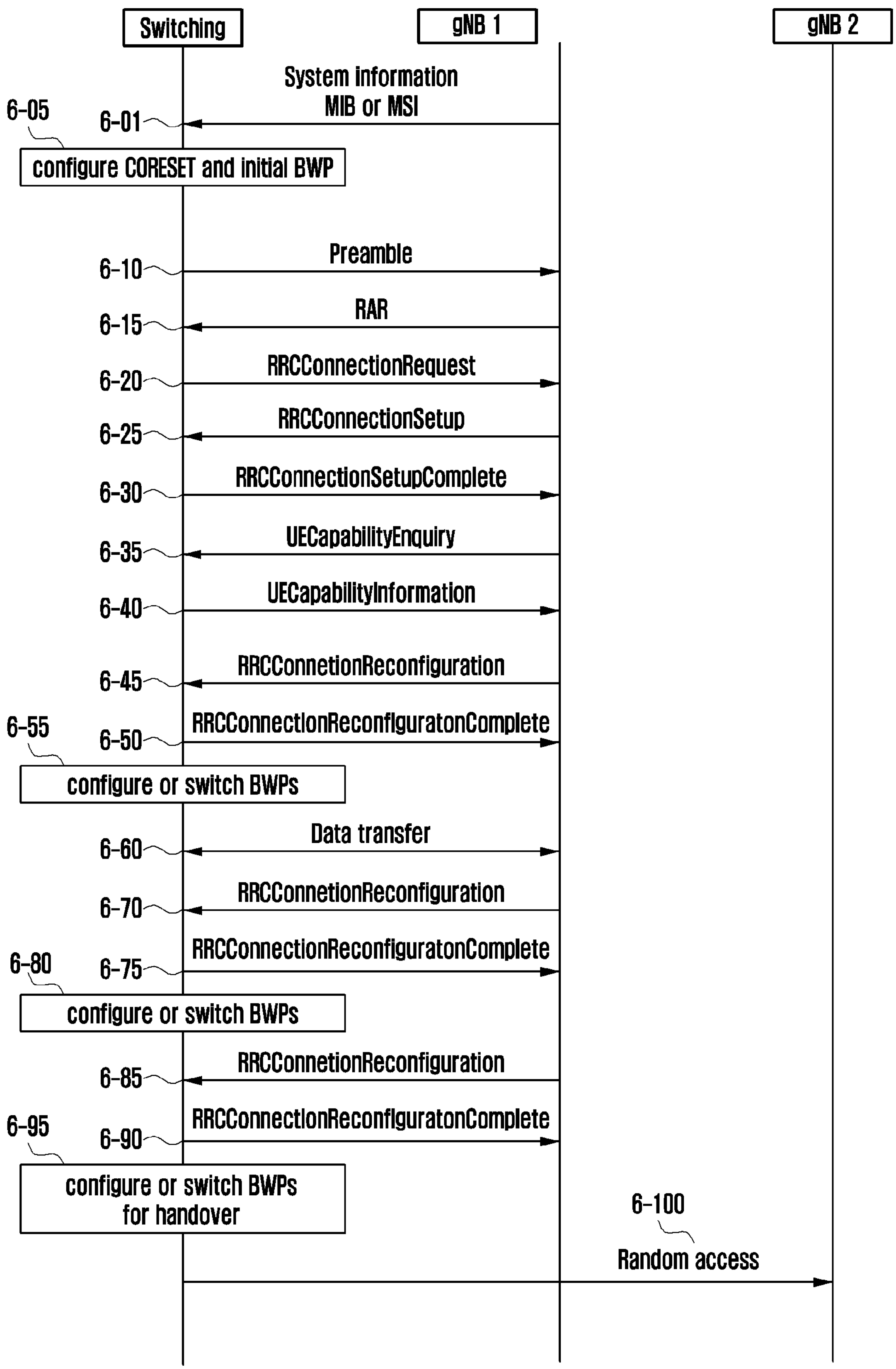
FIG. 6 illustrates a procedure in which a UE switches from an RRC-idle mode to an RRC-connected mode in a next-generation mobile communication system of the disclosure and is a sequence diagram illustrating a method of configuring a plurality of bandwidth parts (BWPs) and configuring a default BWP or a first active BWP according to an embodiment of the disclosure.

FIG. 6 illustrates a procedure in which a UE switches from an RRC-idle mode to an RRC-connected mode in a next-generation mobile communication system of the disclosure and is a sequence diagram illustrating a method of configuring a plurality of Bandwidth Parts (BWPs) and configuring a default BWP, a first active BWP, or a dormant BWP according to an embodiment of the disclosure.

Referring to FIG. 6, one cell to which the base station provides service may serve a very wide frequency band. First, the UE may search the entire frequency band provided by a service provider (PLMN) in units of predetermined resource blocks (for example, in units of 12 Resource Blocks (RBs)). That is, the UE may start discovering a Primary Synchronization Sequence (PSS)/Secondary Synchronization Sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a Master system Information Block (MIB) or Minimum System Information (MSI) and identify initial access Bandwidth Part (BWP) information by reading system information in operations 6-01 and 6-05. CORESET information refers to the location of time/frequency transmission resources through which a control signal is transmitted from the base station, and may be, for example, the location of resources through which a PDCCH channel is transmitted.

As described above, if the UE completes synchronization of the downlink signal with the base station and is able to receive a control signal, the UE may perform a random access procedure in the initial BWP, receive a random access response, make a request for configuring an RRC connection, receive an RRC message, and configure the RRC connection in operations 6-10, 6-15, 6-20, 6-25, and 6-30.

If the basic RRC connection is completely configured, the base station may transmit an RRC message which asks about a UE capability to the UE (UECapabilityEnquire) in order to identify the UE capability in operation 6-35. In another method, the base station may ask the MME or the AMF about the UE capability in order to identify the UE capability. This is because the MME or the AMF may have UE capability information if the UE previously accessed the MME or the AMF. If there is no UE capability required by the base station, the base station may make a request for UE capability to the UE. When reporting the UE capability, the UE may report information indication whether the UE supports a dormant BWP for the SCell of each cell group (master cell group or secondary cell group), supports embodiment 1-1, embodiment 1-2, embodiment 1-3, or embodiment 1-4, supports a dormant BSP for the PSCell of each cell group, supports a cell group suspension or resumption procedure for the PSCell of each cell group, or the number of supported cell groups to the base station as the UE capability. Further, in the RRC connection resumption procedures, the UE may report information indicating whether the UE may store and reconstruct configuration information of the SCell of the master cell group, the SCell of the secondary cell group, or the PSCell of the secondary cell group, discard the same, reconfigure some thereof, or activate the same to the base station through an RRCResume message as the UE capability.

The reason why the base station transmits the RRC message to the UE to identify the UE capability is to identify the UE capability, for example, information indicating a frequency band that the UE can read or an area of the frequency band that the UE can read. After identifying the UE capability, the base station may configure an appropriate BWP in the UE. If the UE receives the RRC message which enquires about the UE capability, the UE may indicate the range of bandwidths that the UE supports, a range of bandwidths supported in the current system bandwidth through an offset from a reference center frequency, directly indicate a start point and an end point of the supported frequency bandwidth, or indicate the same through a center frequency and a bandwidth in operation 6-40 in response to the RRC message.

The BWP may be configured through an RRCSetup message or an RRCResume message of the RRC connection configuration in operation 6-25 or an RRCReconfiguration message in operation 6-45, 6-70, 6-80 the RRC message may include configuration information of a PCell, a Pscell, or a plurality of cells, and a plurality of BWPs may be configured for each cell (PCell, Pscell, or Scell). When a plurality of BWPs is configured for each cell, a plurality of BWPs to be used in the downlink of each cell may be configured. In the case of a frequency division duplex (FDD) system, a plurality of BWPs to be used in the uplink of each cell may be configured to be distinguished from downlink BWPs in operation 6-55, 6-80 and 6-95. The gNB transmits an RRCConnectionReconfigurationComplete in operations 6-50, 6-75 and 6-95. After the BWP switch in operation 6-55, data transfer occurs in operation 6-60. In operation 6-100 random access occurs. In the case of a time division duplex (TDD) system, a plurality of BWPs to be used in common in the downlink and the uplink of each cell may be configured.

The information for configuring the BWP of each cell (PCell, Pscell, or Scell) may include some pieces of the following information.

- Downlink BWP configuration information of the cell
  - Initial downlink BWP configuration information
  - A plurality of pieces of BWP configuration information and BWP IDs corresponding to the respective BWPs
  - Initial state configuration information of the cell or downlink BWP (for example, activated state, dormant state, or deactivated state)
  - A BWP ID indicating a first active downlink BWP
  - A BWP ID indicating a default BWP
  - Configuration information for monitoring a PDCCH for each BWP (For example, the configuration information includes CORESET information, search space resource information, PDCCH transmission resources, periodicity, and subframe number information)
  - A BWP ID indicating a dormant BWP
  - A BWP ID indicating a first active BWP activated from a dormant state
  - BWP inactive timer configuration and a timer value
- Uplink BWP configuration information of the cell
  - Initial uplink BWP configuration information
  - A plurality of pieces of BWP configuration information and BWP IDs corresponding to the respective BWPs
  - Initial state configuration information of the cell or downlink BWP (for example, activated state, dormant state, or deactivated state)
  - A BWP ID indicating a first active uplink BWP
- Configuration information of transmission resources through which channel measurement is performed in a dormant BWP or a BWP other than the dormant BWP and a measurement result is reported (for example, PUCCH transmission resource information of the PCell, PUCCH SCell, or PSCell)

The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a Random Access Response (RAR) message in the initial BWP, which all UEs can read, during the random access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured using respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of any cell or a BWP of any activated cell in a deactivated state or a dormant state or switching or activation from a deactivated or dormant BWP to a normal BWP through an RRC message, MAC control information, or DCI of a PDCCH, the UE may perform an operation of switching the current or activated downlink BWP of the cell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated cell or BWP to the dormant state or an indication indicating switching or activation to the dormant BWP through the RRC message, MAC control information, or the DCI Of the PDCCH, the UE may switch the BWP to the dormant BWP, activate the BWP, or make the BWP be the dormant state. The switching to the dormant state or the dormant BWP or the activation of the dormant BWP may be the performance of an operation proposed in the dormant state in the disclosure. That is, an operation of measuring a channel in a downlink BWP (or a dormant BWP) and transmitting a report to the base station without monitoring a PDCCH may be performed. In another method, when the activated cell or BWP is activated or switched to the normal BWP, a first active downlink BWP may be activated by switching a downlink BWP and a first active uplink BWP may be activated by switching an uplink BWP, and thus the dormant BWP may be configured as the first active downlink or uplink BWP or a default BWP. The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated cell or a dormant BWP (dormant BWP in the activated SCell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated cell and does not transmit the pilot signal, the UE may save a battery compared to a normal BWP (or a BWP other than the dormant BWP) or compared to the case in which a normal BWP (or a BWP other than the dormant BWP) of the activated cell is activated, and the base station may reduce a transmission delay by rapidly activating the normal BWP of the activated cell based on the measurement report or the measurement report of the dormant BWP of the activated cell to promptly use the carrier aggregation since the channel measurement report is transmitted unlike the case in which the cell is deactivated.

The first active BWP activated from a dormant state (or a first active non-dormant BWP) may be a first active BWP activated from a dormant state, that is, BWP which the UE should switch or activate in the activated cell, configured in the RRC message according to an indication in the case in which the UE receives an indication indicating switching of the BWP of the activated cell from a dormant BWP to a normal BWP (or a BWP which is not the dormant BWP) through PDCCH DCI, a MAC CE, or an RRC message from the base station, receives an indication indicating switching or transmission of the active BWP from a dormant BWP to a normal BWP, and receives an information indicating switching, transition, or activation of the active BSP from a dormant BWP to a normal BWP (for example, a first active BWP activated from a dormant state).

In the disclosure, switching a first BWP to a second BWP may mean activating the second BWP or deactivating the activated first BWP and activating the second BWP.

In an RRCSetup message of the RRC connection configuration, an RRCResume message in operation 6-25, or an RRCReconfiguration message in operation 6-45, a state transition timer may be configured to allow the UE to transition the state by itself even though the UE does not receive an indication through an RRC message, MAC control information, or DCI of a PDCCH. For example, if a cell deactivation timer (ScellDeactivationTimer) is configured for each cell and the cell deactivation timer expires, the cell may transition to the deactivated state. Alternatively, a downlink (or uplink) BWP hibernation timer (DLBWPHibernationTimer or ULBWPHibernationTimer) may be configured for each cell or each BWP of the cell and a cell hibernation timer (ScellHibernationTimer) may be configured for each cell. If the cell hibernation timer or the downlink (or uplink) BWP hibernation timer expires, the cell or the downlink (or uplink) BWP may be transitioned to a dormant state or switched to a dormant BWP. For example, when the cell hibernation timer or the downlink (uplink) BWP hibernation timer expires, the cell or downlink (uplink) BWP in an activated state may be transitioned or switched to a dormant BWP, and the cell or downlink (or uplink) BWP in a deactivated state or the dormant state may not be transitioned to a dormant state or a dormant BWP. The BWP hibernation timer may start when an indication indicating switching or activating a BWP is received through an RRC message, a MAC CE, or PDCCH DCI or may stop when an indication indicating switching to a dormant BWP, an indication hibernation of the BWP, or an indication indicating activation of a dormant BWP is received through an RRC message, a MAC CE, or PDCCH DCI. Further, a dormant cell deactivation timer (dormantScellDeactivationTimer) or a dormant or downlink (or uplink) dormant BWP deactivation timer (dormantDLDeactivationTimer or dormantULDeactivationTimer) may be configured for each cell or downlink (uplink) BWP, and a cell or downlink (uplink) dormant BWP in a dormant state may be transitioned to a deactivated state. When the dormant cell deactivation timer or the dormant or downlink (uplink) BWP deactivation timer expires, only the cell or downlink (or uplink) BWP in a dormant state is transitioned to a deactivated state, but the Scell or BWP in an activated state or a deactivated state is not transitioned to the deactivated state. Further, the dormant BWP hibernation timer may start when an indication indicating switching, hibernation, or activation of the dormant BWP is received through an RRC message, a MAC CE, or PDCCH DCI or may stop when an indication indicating deactivation or activation of the BWP or the cell or an indication indicating activation of a normal BWP (for example, a BWP which is not a dormant BWP configured through RRC) is received through an RRC message, a MAC CE, or PDCCH DCI. If the cell deactivation timer (ScellDeactivationTimer) (or the downlink (or uplink) BWP hibernation timer) and the cell hibernation timer (ScellHibernationTimer) (or the downlink (or uplink) dormant BWP deactivation timer) are configured together, the cell hibernation timer (ScellHibernationTimer) (or the downlink (or uplink) dormant BWP hibernation timer) is prioritized. That is, if the cell hibernation timer (ScellHibernationTimer) (or the downlink (or uplink) BWP hibernation timer) is configured, the corresponding cell or downlink (or uplink) BWP is not deactivated even though the cell deactivation timer (ScellDeactivationTimer) (or the downlink (or uplink) dormant BWP deactivation timer) expires. In other words, when the cell hibernation timer (or the downlink (or uplink) BWP hibernation timer) is configured, the cell or downlink (or uplink) BWP may be first transitioned from an activated state to a dormant state or switched to a dormant BWP, and then the cell or BWP which has been transitioned to the dormant state may be transitioned to the deactivated state due to expiration of the dormant cell or BWP deactivation timer. Accordingly, when the cell hibernation timer or the BWP hibernation timer is configured, the cell deactivation timer or the dormant BWP deactivation timer does not influence the state transition of the cell or downlink (or uplink) BWP. The cell or downlink (or uplink) BWP is not directly transitioned to the deactivated state if the cell hibernation timer or the BWP hibernation timer is configured even though the cell deactivation timer or the dormant BWP deactivation timer expires.

If the cell deactivation timer (or the downlink (or uplink) BWP hibernation timer) is not configured in the RRC message, the UE may consider the cell deactivation timer (or the downlink (or uplink) BWP hibernation timer) to be set to an infinite value.

In the RRCSetup message of the RRC connection configuration, the RRCResume message in operation 6-25, or the RRCReconfiguration message in operation 6-45, frequency measurement configuration information (measurement configuration) and frequency measurement gap configuration information (measurement gap information) may be configured, and frequency measurement object information may be included. Further, in the RRCSetup message of the RRC connection configuration, the RRCResume message of operation 6-25, or the RRCReconfiguration message of operation 6-45, a function for reducing power consumption of the UE (power saving mode) may be configured, or configuration information such as a discontinuous reception (DRX) cycle, an offset, an on-duration interval (an interval in which the UE should monitor a PDCCH), or time information, time information indicating when the UE should monitor or search for a PDCCH from the base station before the on-duration interval during the DRX cycle, or short time period information may be configured together with the function for reducing power consumption. If the function for reducing power consumption of the UE is configured, the UE may configure a DRX cycle and search for a Wake-Up Signal (WUS) in an interval configured to monitor the PDCCH by the base station before the on-duration interval, and the base station may indicate whether to skip (or not perform) or perform monitoring of the PDCCH in the on-duration interval to the UE through DCI of the PDCCH of the WUS. The UE should always monitor the PDCCH in the on-duration interval, but the base station may allow the UE to reduce battery consumption by making the UE not monitor the PDCCH in the on-duration interval through the WUS.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the base station may indicate one BWP to be activated. The base station may indicate activation of the BWP through the RRC message, MAC control information (MAC CE), or L1 signaling (PHY layer control signal such as DCI of the PDCCH) to indicate switching from the initial access BWP to a new BWP. In another method, new bitmap information may be defined and activation of the normal BWP (or a BWP other than the dormant BWP), activation of the dormant BWP, or deactivation of the BWP may be indicated in the PDCCH DCI. In another method, whether to activate the normal BWP (for example, the first active BWP that is activated from the dormant state), activate the dormant BWP, switch the dormant BWP, or switch the BWP may be indicated by the bitmap. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information in order to reduce signaling overhead.

The RRC message (RRCSetup message, RRCResume message in operation 6-25, or RRCReconfiguration message in operation 6-70) may be included in configuration information for the cell group. The configuration information for the cell group may include some or a plurality of pieces of information below and may indicate a state, a procedure, or the application or release of configuration information for each cell group.

- A cell group identifier (or index) indicating a cell group
- An indicator indicating a state of a cell group (for example, an activated state, a suspended state, or a deactivated state)
- An indicator indicating a state of a cell group (for example, an indicator indicating suspension (or deactivation) of the cell group (for example, a Cellgroup (SCG) suspension indicator) or an indicator indicating resumption (or activation) of the cell group (for example, Cellgroup (SCG) resumption indicator))
- An indicator triggering a procedure of a protocol layer device (for example, an SDAP layer device, a PDCP layer device, an RLC layer device, or a MAC layer device) corresponding to the indicator indicating the state of the cell group (for example, a PDCP re-establishment indicator, a PDCP data reconstruction indicator, an indicator triggering a new procedure, an RLC re-establishment indicator, a MAC layer device initialization indicator, or a MAC layer device partial initialization indicator)
- When an indicator indicating suspension (or deactivation) of the state of the cell group is included, second DRX configuration information (for example, a monitoring interval, an activation interval (on duration) length, period, offset, or the like) allowing PDCCH monitoring in the PSCell of the cell group to be performed according to a very long period may be configured. For example, upon receiving the indicator indicating suspension of the cell group, the UE may apply the second DRX configuration information to perform PDCCH monitoring based on a very long period, thereby saving UE power. In another method, upon receiving the indicating suspension of the cell group, the UE may apply BWP configuration information for the PSCell of the cell group to activate or switch the downlink BWP of the PSCell of the cell group to the dormant BWP and perform the UE operation in the cell in which the dormant BWP proposed in the disclosure is activated. Further, upon receiving the indicator indicating suspension of the cell group, the UE may deactivate all of the SCells configured in the cell group. In another method, upon receiving the indicating suspension of the cell group, the UE may activate or switch the downlink BWP to the dormant BWP for the SCell in which the dormant BWP is configured among the SCells configured in the cell group, and perform the UE operation in the cell in which the dormant BWP is activated proposed in the disclosure or deactivate the SCell in which no dormant BWP is configured. In another method, upon receiving the indicating suspension of the cell group in the RRC message, the UE may activate, deactivate, or hibernate each SCell or activate the dormant BWP according to configuration information for each SCell of the cell group included in the RRC message or the indicator or activate, deactivate, or hibernate each SCell of the cell group or activate the dormant BWP by an indicator (for example, bitmap) of the PDCCH, MAC control information, or the RRC message before or after receiving the indicating suspension of the cell group.

Configuration information of transmission resources through which channel measurement is performed in a dormant BWP or a BWP other than the dormant BWP and a measurement result is reported (for example, PUCCH transmission resource information of the PCell, PUCCH SCell, or PSCell)

When an indicator indicating resumption (or activation) of the state of the cell group is included, first DRX configuration information (for example, a monitoring interval, an activation interval (on duration) length, period, offset, or the like) allowing PDCCH monitoring in the PSCell of the cell group to be performed again may be configured. Alternatively, first DRX configuration information stored for the cell group may be reconstructed and applied. For example, upon receiving the indicating resuming the cell group, the UE may apply the first DRX configuration information which is stored or received from the RRC message to perform PDCCH monitoring, thereby resuming data transmission or reception. In another method, upon receiving the indicating resumption of the cell group, the UE may apply BWP configuration information for the PSCell of the cell group to activate or switch the downlink BWP of the PSCell of the cell group to a BWP, which is not the dormant BWP (for example, a BWP configured by the RRC message), and perform the UE operation in the cell in which the dormant BWP is activated proposed in the disclosure. Alternatively, upon receiving the indicator indicating resumption of the cell group, the UE may apply random access configuration information which is stored or received from the RRC message (random access transmission resource information for transmitting a preamble (time or frequency transmission resources), designated preamble information, or the like) to trigger a random access procedure in the PSCell of the cell group. In another method, upon receiving the indicator indicating resumption of the cell group, if the random access configuration information (random access transmission resource information for transmitting a preamble (time or frequency transmission resources, designated preamble information, or the like) is included in the RRC message, the UE may apply the random access configuration information to trigger the random access procedure (for example, a contention-free random access procedure) in the PSCell of the cell group. If the random access configuration information (random access transmission resource information for transmitting a preamble (time or frequency transmission resources, designated preamble information, or the like) is not included in the RRC message, the UE may trigger the random access procedure (for example, a contention-based access procedure) in the PSCell of the cell group or trigger the random access procedure (a contention-based random access or 2-step random access procedure) on the basis of system information. If there is random access configuration information (random access transmission resource information (time or frequency transmission resources) for transmitting a preamble, designated preamble information, or the like) stored in the UE before the indicator indicating resumption of the cell group is received, the random access configuration information may be released or discarded. In another method, the UE may perform PDCCH monitoring in the indicated or configured cell group or cell, and trigger and perform the random access procedure according to the indication by the PDCCH.

When the indicator indicating resumption (or activation) of the state of the cell group is included or the indicator indicating resumption of the cell group is received, the UE may activate all of the SCells configured in the cell group. In another method, upon receiving the indicator indicating resumption of the cell group, the UE may activate or switch the downlink BWP to a BWP, which is not the dormant BWP (for example, a BWP configured by the RRC message or a first active BWP), for the SCell in which the dormant BWP is configured among the SCells configured in the cell group, and perform the UE operation in the cell in which the dormant BWP is activated proposed in the disclosure or deactivate the SCell in which no dormant BWP is configured. In another method, upon receiving the indicator indicating resumption of the cell group in the RRC message, the UE may activate, deactivate, or hibernate each SCell or activate the dormant BWP according to configuration information for each SCell of the cell group included in the RRC message or the indicator or activate, deactivate, or hibernate each SCell of the cell group or activate the dormant BWP by an indicator (for example, bitmap) of the PDCCH, MAC control information, or the RRC message before or after receiving the indicator indicating resumption of the cell group.

An indicator adding cell group configuration

An indicator releasing cell group configuration

Security configuration information (security key information for the cell group or additional information (for example, sk-counter))

An indicator indicating a handover, cell group addition, or cell group modification (for example, a ReconfigurationWithSync indicator or a mobilitycontrolInfo indicator).

The disclosure proposes to include the indicator indicating the handover, cell group addition, or cell group modification (for example, the ReconfigurationWithSync indicator or the mobilitycontrolInfo indicator) if the RRC message (for example, RRCReconfiguration message) includes the indicating suspension of the cell group, and include the indicator indicating the handover, cell group addition, or cell group modification (for example, the ReconfigurationWithSync indicator or the mobilitycontrolInfo indicator) if the RRC message includes the indicator indicating resumption of the cell group or configuration information for configuring the same. This is because, when the cell group is resumed, the connection with the corresponding cell group should be made again, and thus synchronization should be performed, system information should be received, or the random access procedure should be performed as necessary.

Hereinafter, the disclosure newly proposes the dormant BWP in the next-generation mobile communication system and proposes in detail the UE operation in each BWP when each BWP is transitioned or switched.

Figure 7:
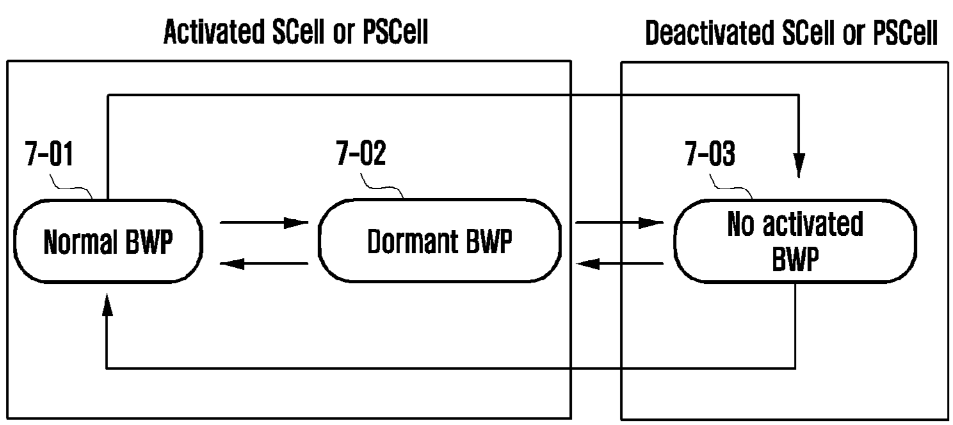
FIG. 7 illustrates a state transition for each BWP or a BWP switching procedure according to an embodiment of the disclosure.

FIG. 7 illustrates state transition for each BWP or a BWP switching procedure according to an embodiment of the disclosure.

Referring to FIG. 7, the BWP of each cell (for example, SCell) of the UE may be activated to a normal BWP as indicated by reference numeral 7-01, activated to a dormant BWP as indicated by reference numeral 7-02, or deactivated as indicated by reference numeral 7-03, and the normal BWP or the dormant BWP may be activated or deactivated through an indication by configuration information of the RRC message, MAC control information, or DCI of the PDCCH.

The state transition operation for each BWP of the cell (activation, deactivation, or hibernation) or the operation of activating the normal BWP, activating the dormant BWP, activating the first active BWP activated from the dormant state, or deactivating the normal BWP or the dormant BWP may be performed by one indication or configuration among the following cases.

- If the state of the BWP of the cell is configured through the RRC message, the BWP of each cell is configured through RRC message, the dormant BWP is configured in the cell, or the first active BWP is configured as the dormant BWP, the cell may start through switching or activation to the dormant BWP and operation in the dormant BWP may be performed
- The case in which cell activation, deactivation, or dormant MAC CE is received,
- The case in which a MAC CE indicating activation or deactivation of the normal BWP or the first active BWP or the dormant BWP from the dormant state is received,
- The case in which DCI of a PDCCH indicating activation, deactivation, or switching of the normal BWP or the first active BWP or the dormant BWP from the dormant state is received,
- The case in which a cell hibernation timer is not configured in an activated state cell and a configured cell deactivation timer expires,
- The case in which a BWP hibernation timer is not configured in the active BWP and a configured BWP deactivation timer (for example, a bwpDeactivatedTimer) expires, Further, the state transition operation or the dormant BWP operation method proposed in the disclosure have the following features.

- No dormant BWP may be configured in the Spcell (Pcell or Pscell) (or downlink BWP or uplink BWP of the cell) but only a normal BWP is configured therein and is always in an activated state. The Spcell performs synchronization and transmits/receives a primary control signal, and thus if the BWP of the Spcell is dormant or inactive or operated as the dormant BWP, the connection with the NR base station is released, so that the Spcell should be always maintained in the activated state.
- If a PUCCH is configured in spite of the Scell or the BWP of the SCell, a dormant state or a dormant BWP cannot be configured. The Scell should be in the activated state or use a normal BWP after activating the same since there may be another cell which should transmit a feedback of HARQ ACK/NACK through the PUCCH.
- Due to such a characteristic, the cell deactivation timer (ScellDeactivationTimer) or the BWP hibernation timer may not be applied to the Spcell or the BWP of the Spcell and the Scell or the BWP of the SCell in which the PUCCH is configured, and may be driven only for the other Scells.
- The cell or BWP hibernation timer (ScellHibernationTimer) is prioritized than the cell or BWP deactivation timer (ScellDeactivationTimer). If one value is set as a timer value through the RRC message, the same value may be applied to all cells. In another method, the NR gNB may configure different timer values for Scells or BWPs in consideration of the characteristics of each Scell or BWP.
- If the cell or BWP is not indicated as being active or dormant through the RRC message, the Scell or BWP may fundamentally operate in the deactivated state initially.

In the disclosure, the uplink may indicate an uplink BWP and the downlink may indicate a downlink BWP. This is because only one active or dormant BWP can be operated for each uplink or downlink.

Hereinafter, the disclosure proposes in detail a method of operating the state transition or switching in units of BWPs (bandwidth part-level) proposed in the disclosure to rapidly activate the carrier aggregation or dual connectivity and save the battery of the UE.

In the disclosure, the BWP may be configured for each cell in the RRCSetup message, the RRCReconfiguration message, or the RRCResume message as described with reference to FIG. 6. The RRC message may include configuration information for a PCell, a Pscell, or a plurality of Scells and configure a plurality of BWPs for each cell (PCell, Pscell, or Scell). When the plurality of BWPs are configured for each cell, a plurality of BWPs to be used in the downlink of each cell may be configured in the RRC message. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

In a first method of the information configuration method for configuring the BWP of each cell (PCell, Pscell, or Scell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, whether the BWP is a dormant BWP or not may be indicated through a BWP identifier.

- Downlink BWP configuration information of each cell
  - Initial downlink BWP configuration information
  - A plurality of pieces of BWP configuration information and BWP IDs corresponding to the respective BWPs
  - Downlink initial state configuration information of the cell (for example, activated state, dormant state, or deactivated state)
  - A BWP ID indicating a first active downlink BWP
  - A BWP ID indicating a default BWP
  - A BWP indicator indicating a dormant BWP or a 1-bit indicator indicating a dormant BWP for each BWP in the BWP configuration information

- If the first active downlink BWP is configured as the dormant BWP, the first active uplink BWP also should be configured as the dormant BWP.
- BWP inactive timer configuration and a timer value
- A BWP ID first activated from a dormant BWP Uplink BWP configuration information of each cell

- Initial uplink BWP configuration information
- A plurality of pieces of BWP configuration information and BWP IDs corresponding to the respective BWPs
- Uplink initial state configuration information of the cell (for example, activated state, dormant state, or deactivated state)
- A BWP ID indicating a first active uplink BWP
- A BWP indicator indicating a dormant BWP or a 1-bit indicator indicating a dormant BWP for each BWP in the BWP configuration information
- If the first active downlink BWP is configured as the dormant BWP, the first active uplink BWP also should be configured as the dormant BWP.
- A BWP ID first activated from a dormant BWP
- SRS-related configuration information may be configured through the following method
- Embodiment 1-1 for configuring an SRS
  - First SRS configuration information (SRS configuration information for a normal BWP, a BWP, which is not a dormant BWP, a PSCell (or SCell) of a cell group, which is not suspended, or a PSCell (or SCell) or a BWP of a cell group, which is resumed or activated (for example, SRS transmission resources, period, or offset, or an indicator indicating whether the SRS configuration information is for a dormant BWP or not)).
  - Second SRS configuration information (SRS configuration information for a dormant BWP, a PSCell (or SCell) of a cell group, which is not suspended or deactivated, or a PSCell (or SCell) or a BWP of a cell group, which is not resumed (for example, SRS transmission resources, period, or offset, or an indicator indicating whether the SRS configuration information is for a dormant BWP or not)).
  - The first SRS configuration information and the second SRS configuration information may be divided on the basis of an indicator indicating whether the SRS configuration information is for a PSCell (or SCell) of a suspended or deactivated BWP or cell group. For example, the SRS configuration information may be divided according to an indicator value, according to whether the indicator value is configured or not, or whether the indicator value exists or not. In another method, a name of the first SRS configuration information and a name of the second SRS configuration information may be differently defined and divided.
  - In embodiment 1-1, if the dormant BWP (for example, the dormant BWP ID in downlink BWP configuration information) is configured in a serving cell (PSCell or SCell) or if cell group suspension is indicated, supported, or configured, the second SRS configuration information may be always configured. Alternatively, if the dormant BWP (for example, the dormant BWP ID in downlink BWP configuration information) is configured in the serving cell (PSCell or SCell) or if cell group suspension is indicated, supported, or configured, the indicator indicating the first SRS configuration information or the second SRS configuration information may be configured. For example, if the dormant BWP ID is configured in the downlink BWP configuration information or if cell group suspension is indicated, supported, or configured, the second SRS configuration information should be configured in each piece of the uplink BWP configuration information. For example, if the dormant BWP ID is configured in the downlink BWP configuration information or if cell group suspension is indicated, supported, or configured, the second SRS configuration information should be configured in the uplink BWP configuration information for the uplink BWP having a BWP ID which is the same as the downlink dormant BWP. In another method, if the dormant BWP ID is configured in the downlink BWP configuration information in the case of TDD or unpaired spectrum, the second SRS configuration information should be configured in the uplink BWP configuration information for the uplink BWP having a BWP ID which is the same as the downlink dormant BWP.

For example, in embodiment 1-1, when the UE switches or activate the downlink BWP to a BWP (or a normal BWP), which is not the dormant BWP, for an activated cell, when cell group suspension is not indicated, when a cell group is in an activated state, or when cell group resumption is indicated, the UE may apply the first SRS configuration information in the uplink BWP of the activated cell (Scell or PSCell) and transmit an SRS on the basis of SRS transmission resources, period, or offset corresponding to the first SRS configuration information. However, when the downlink BWP is switched or activated to the dormant BWP for the activated cell, when cell group suspension is indicated, or when the cell group is not in the activated state (or is in the deactivated or suspended state), the UE may apply the second SRS configuration information in the uplink BWP of the cell (PSCell or SCell) of the suspended or deactivated cell group and transmit an SRS on the basis of SRS transmission resources, period, or offset corresponding to the second SRS configuration information. For example, it is possible to improve a power saving effect of the UE in the dormant BWP or the suspended cell group by configuring the SRS transmission resources configured in the second SRS configuration information for the dormant BWP to be significantly smaller than the SRS transmission resources configured in the first SRS configuration information for the normal BWP or configuring the SRS transmission resource period configured in the second SRS configuration information to be significantly longer than the SRS transmission resource period configured in the first SRS configuration information. For example, the SRS transmission period may be configured to be greater than or equal to 100 ms in the second SRS configuration information. In another method, when the downlink BWP is activated to the dormant BWP, when cell group suspension is indicated, or when the cell group is not in the activated state (or is in the deactivated or suspended state), if the second SRS configuration information is not configured, the UE may apply the first SRS configuration information for the uplink BWP and transmit an SRS on the basis of SRS transmission resources, period, or offset corresponding to the first SRS configuration information. In another method, when the downlink BWP is activated to the dormant BWP, when cell group suspension is indicated, or when the cell group is not in the activated state (or is in the deactivated or suspended state), if the second SRS configuration information is not configured, the UE may not transmit an SRS.

Embodiment 1-2 for configuring an SRS

In embodiment 1-2, the first SRS configuration information and the second SRS configuration information may be configured as SRS configuration information for a normal BWP, a BWP, which is not a dormant BWP, a PSCell (or an SCell) of a cell group, which is not suspended, or a PSCell (or SCell) of a resumed or activated cell group (for example, SRS transmission resources, period, or offset) and SRS configuration information for a dormant BWP, a PSCell (or SCell) of a suspended or deactivated cell group, a PSCell (or SCell) or a BWP of a cell group, which is not resumed (for example, SRS transmission resources, period, or offset), included in one piece of SRS configuration information.

First SRS configuration information (SRS configuration for a normal BWP, a BWP, which is not a dormant BWP, a PSCell (or SCell) of a cell group, which is not suspended, or a PSCell (or SCell) or a BWP of a cell group, which is resumed or activated (for example, SRS transmission resources, period, or offset, or an indicator indicating whether the SRS configuration information is for a dormant BWP or not)).

Second SRS configuration information (SRS configuration information for a dormant BWP, a PSCell (or SCell) of a cell group, which is not suspended or deactivated, or a PSCell (or SCell) or a BWP of a cell group, which is not resumed (for example, SRS transmission resources, period, or offset, or an indicator indicating whether the SRS configuration information is for a dormant BWP or not)).

In embodiment 1-2, if the dormant BWP (for example, the dormant BWP ID in downlink BWP configuration information) is configured in a serving cell or if cell group suspension is indicated, supported, or configured, the second SRS configuration information may be always configured. Alternatively, if the dormant BWP (for example, the dormant BWP ID in downlink BWP configuration information) is configured in the serving cell (PSCell or SCell) or if cell group suspension is indicated, supported, or configured, the indicator indicating the first SRS configuration information or the second SRS configuration information may be configured. For example, when the dormant BWP ID is configured in the downlink BWP configuration information, the second SRS configuration information should be configured in each piece of the uplink BWP configuration information. For example, if the dormant BWP ID is configured in the downlink BWP configuration information or if cell group suspension is indicated, supported, or configured, the second SRS configuration information should be configured in the uplink BWP configuration information for the uplink BWP having a BWP ID which is the same as the downlink BWP. In another method, if the dormant BWP ID is configured in the downlink BWP configuration information or if cell group suspension is indicated, supported, or configured in the case of TDD or unpaired spectrum, the second SRS configuration information should be configured in the uplink BWP configuration information for the uplink BWP having a BWP ID which is the same as the uplink BWP or the downlink dormant BWP.

For example, in embodiment 1-2, when the UE switches or activate the downlink BWP to a BWP (or a normal BWP), which is not the dormant BWP, for an activated cell, when cell group suspension is not indicated, when a cell group is in an activated state, or when cell group resumption is indicated, the UE may apply the first SRS configuration information in the uplink BWP of the activated cell and transmit an SRS on the basis of SRS transmission resources, period, or offset corresponding to the first SRS configuration information. However, when the downlink BWP is switched or activated to the dormant BWP for the activated cell, when cell group suspension is indicated, or when the cell group is not in the activated state (or is in the deactivated or suspended state), the UE may apply the second SRS configuration information in the uplink BWP of the activated cell and transmit an SRS on the basis of SRS transmission resources, period, or offset corresponding to the second SRS configuration information. For example, it is possible to improve a power saving effect of the UE in the dormant BWP by configuring the SRS transmission resources configured in the second SRS configuration information to be significantly smaller than the SRS transmission resources configured in the first SRS configuration information or configuring the SRS transmission resource period configured in the second SRS configuration information to be significantly longer than the SRS transmission resource period configured in the first SRS configuration information. For example, the SRS transmission period may be configured to be greater than or equal to 100 ms in the second SRS configuration information. In another method, when the downlink BWP is activated to the dormant BWP, when cell group suspension is indicated, or when the cell group is not in the activated state (or in the deactivated or suspended state), if the second SRS configuration information is not configured, the UE may apply the first SRS configuration information for the uplink BWP and transmit an SRS on the basis of SRS transmission resources, period, or offset corresponding to the first SRS configuration information. In another method, when the downlink BWP is activated to the dormant BWP, when cell group suspension is indicated, or when the cell group is not in the activated state (or is in the deactivated or suspended state), if the second SRS configuration information is not configured, the UE may not transmit an SRS.

Embodiment 1-3 for configuring an SRS

In embodiment 1-3, the second SRS configuration information, that is, SRS configuration information (for example, SRS transmission resources, period, or offset) for indicating or configuring BWP or cell group suspension may be configured only for an uplink dormant BWP (a BWP indicated by a dormant BWP identifier) in uplink BWP configuration information or for a BWP. Alternatively, the first SRS configuration information, that is, SRS configuration information for a BWP, which is not a dormant BWP, or a normal BWP (for example, SRS transmission resources, period, or offset) may be configured only for a BWP configured as a BWP (a BWP which is not indicated by a dormant BWP ID), which is not an uplink dormant BWP in the uplink BWP configuration information. In another method, if the dormant BWP ID is configured in the downlink BWP configuration information in the case of TDD or unpaired spectrum, the second SRS configuration information should be configured in the uplink BWP configuration information for the uplink BWP having a BWP ID which is the same as the uplink dormant BWP (BWP indicated by the dormant BWP ID) or the downlink dormant BWP.

For example, in embodiment 1-3, when the downlink BWP is switched or activated to a BWP (or a normal BWP), which is not the dormant BWP, for the activated cell, the UE may apply the first SRS configuration information in the uplink BWP of the activated cell and transmit an SRS on the basis of SRS transmission resources, period, or offset corresponding to the first SRS configuration information. However, when the downlink BWP is switched or activated to the dormant BWP for the activated cell, the UE may apply the second SRS configuration information in the uplink BWP of the activated cell and transmit an SRS on the basis of SRS transmission resources, period, or offset corresponding to the second SRS configuration information. For example, it is possible to improve a power saving effect of the UE in the dormant BWP by configuring the SRS transmission resources configured in the second SRS configuration information for the dormant BWP to be significantly smaller than the SRS transmission resources configured in the first SRS configuration information for the normal BWP or configuring the SRS transmission resource period configured in the second SRS configuration information to be significantly longer than the SRS transmission resource period configured in the first SRS configuration information. For example, the SRS transmission period may be configured to be greater than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

As another method of the information configuration method of configuring the BWP of each cell (PCell, Pscell, or Scell), a second method may separate configuration information by not configuring configuration information (for example, a search space, PDCCH transmission resources, and periodicity) required to read a PDCCH for a BWP corresponding to a dormant BWP may not be configured (in another method, periodicity may be configured to be very long along with other configuration information) and configuring configuration information (for example, a search space, PDCCH transmission resources, and periodicity) required to read a PDCCH for a normal BWP. This is because the dormant BWP is a BWP to reduce battery consumption of the UE by not reading a PDCCH and may measure a channel and reporting a channel measurement result to the PCell so as to rapidly activate the BWP or the cell, thereby promptly allocating uplink or downlink transmission resources. Accordingly, in the disclosure, the dormant BWP may be a BWP in which configuration information (for example, a search space, PDCCH transmission resources, and periodicity) for PDCCH monitoring is not configured or indicate a BWP indicated by a dormant BWP identifier or a BWP configured to be monitored with very long periodicity even though configuration information for PDCCH monitoring is configured therein. In another method, in the disclosure, the dormant BWP may a BWP in which PDCCH transmission resources and periodicity are not configured in configuration information for PDCCH monitoring and thus the PDCCH monitoring is not performed in the cell in which the dormant BWP is configured but search space information or cross-carrier scheduling configuration information is configured and thus switching or an indication for the dormant BWP is received in another cell through cross-carrier scheduling. Since data transmission/reception is not possible in the dormant BWP, only PDCCH configuration information (PDCCH-config) is configured for the dormant BWP (or a first BWP) (for example, only search space information is configured). On the other hand, PDCCH monitoring should be performed in a normal BWP (or a second BWP) which is not the dormant BWP and also data transmission/reception should be possible, and thus PDCCH configuration information (for example, CORESET configuration information, search space configuration information, PDCCH transmission resources, or periodicity) and physical download shared channel (PDSCH) configuration information, PUSCH configuration information, or random access-related configuration information may be further configured.

Accordingly, as described above, the uplink or downlink normal BWP should be configured for each cell, but the dormant BWP may be or may not be configured for each cell, and the configuration thereof may be handled by NR gNB implementation according to the purpose thereof. Further, a first active BWP, a default BWP, or an initial BWP may be configured as the dormant BWP according to NR gNB implementation.

In the dormant BWP, the UE cannot exchange data with the NR gNB, does not monitor a PDCCH to identify an indication of the NR gNB, does not a pilot signal, but measures a channel, and reports a measurement result for the measured frequency/cell/channel periodically or when an event is generated according to a configuration of the NR gNB. Accordingly, the UE does not monitor the PDCCH and not transmit the pilot signal in the dormant BWP, thereby reducing a battery compared to the active mode. Unlike the deactivated mode, the UE transmits a channel measurement report, so that the NR gNB may rapidly activate the cell in which the dormant BWP is configured on the basis of the measurement report of the dormant BWP to use carrier aggregation. In the disclosure, the dormant BWP may be configured in the downlink BWP configuration information and used only for the downlink BWP.

In the disclosure, the UE operation for the dormant bandwidth part (dormant BWP) or the UE operation for the activated SCell or PSCell when the dormant BWP is activated is described below.

When the UE receives an indication indicating operation as or activation to a dormant BWP for a serving cell (PCell or SCell) from the SpCell, receives an indication indicating hibernating a BWP (for example, a downlink BWP) of a serving cell (for example, SCell) or the serving cell (for example, SCell) or an indication indicating activation of a dormant BWP through PDCCH DCI (L1 control signal), a MAC CE, or an RRC message, receives an indication indicating switching of a BWP (for example, a downlink BWP) to a dormant BWP through PDCCH DCI (L1 control signal), a MAC CE, or an RRC message (when the indication is received through PDCCH L1 control signal, the indication may be received by the PDCCH of its own cell through self-scheduling or received by the PDCCH of the PCell through cross-carrier scheduling), a BWP hibernation timer is configured and expires, an activated BWP of the activated cell is a dormant BWP, or the activated BWP of the activated cell is not a normal BWP, one or a plurality of operations among the following operations may be performed.

The uplink BWP or the downlink BWP is switched to the BWP (for example, the dormant BWP) configured in RRC and the BWP is activated or hibernated.

A cell deactivation timer configured or run in the cell or BWP is stopped.

A BWP hibernation timer is stopped when the BWP hibernation timer is configured in the BWP of the cell.

A dormant BWP deactivation timer starts or restarts in the BWP of the cell.

A BWP deactivation timer configured for the BWP of the cell is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BWP of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the activated state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

HARQ buffers configured in the uplink or downlink BWP are all emptied.

The UE does not transmit an SRS for the uplink BWP of the cell.

In another method, the first SRS configuration information (SRS configuration information (for example, SRS transmission resources, period, or offset) for a normal BWP (a BWP which is not a dormant BWP)) or the second SRS configuration information (SRS configuration information (for example, SRS transmission resources, period, or offset) for a dormant BWP) is configured in the uplink BWP configuration information, the UE may transmit an SRS in order to facilitate power control or scheduling of the network or rapidly re-activate the uplink BWP of the UE. For example, when the downlink BWP is switched or activated to a BWP (or a normal BWP), which is not the dormant BWP, for the activated cell, the UE may apply the first SRS configuration information in the uplink BWP of the activated cell and transmit an SRS on the basis of SRS transmission resources, period, or offset corresponding to the first SRS configuration information. However, when the downlink BWP is switched or activated to the dormant BWP for the activated cell (when the activated BWP is the dormant BWP), the UE may apply the second SRS configuration information in the uplink BWP of the activated cell and transmit an SRS on the basis of SRS transmission resources, period, or offset corresponding to the second SRS configuration information. For example, it is possible to improve a power saving effect of the UE in the dormant BWP by configuring the SRS transmission resources configured in the second SRS configuration information for the dormant BWP to be significantly smaller than the SRS transmission resources configured in the first SRS configuration information for the normal BWP or configuring the SRS transmission resource period configured in the second SRS configuration information to be significantly longer than the SRS transmission resource period configured in the first SRS configuration information. For example, the SRS transmission period may be configured to be greater than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

In another method, when the downlink BWP is switched or activated to the downlink dormant BWP for the activated cell (when the activated BWP is the dormant BWP), the UE may switch or activate the uplink BWP to the uplink dormant BWP. The uplink dormant BWP may be indicated by a BWP ID in the uplink BWP configuration information configured in the RRC message (for example, in the case of FDD, unpaired spectrum, or TDD), or an uplink BWP having the same BWP ID as the downlink dormant BWP may be the dormant BWP (for example, in the case of unpaired spectrum or TDD) in another method. The UE may apply the second SRS configuration information configured in the uplink dormant BWP and transmit an SRS on the basis of SRS transmission resources, period, or offset corresponding to the second SRS configuration information.

In another method, the current uplink BWP or the last activated uplink BWP may be activated.

The UE measures a channel (CSI, CQI, PMI, RI, PTI, or CRI) for the downlink in the BWP of the cell according to the configuration of the base station and reports the measurement. For example, the UE may periodically report the channel or frequency measurement.

Uplink data is not transmitted through a UL-SCH in the BWP of the cell.

A random access procedure is not performed for the BWP of the cell.

The UE does not monitor a PDCCH in the BWP of the cell.

The UE does not monitor a PDCCH for the BWP of the cell. However, in the case of cross-scheduling, an indication may be received by monitoring a PDCCH for the cell (for example, SCell) in the scheduled cell (for example, PCell).

The PUCCH or SPUCCH is not transmitted in the BWP of the cell.

The downlink BWP may be hibernated, and channel measurement may be performed and reported. Further, the uplink BWP of the cell may be deactivated and not be used. This is because the channel is measured only for the downlink BWP in the dormant state Scell and the measurement result is reported to the uplink BWP of the Spcell (Pcell or Pscell) or the Scell in which there is a PUCCH.

If an indication indicating activation or switching to the dormant BWP for the downlink is made or an indication indicating hibernation of the BWP is made, a random access procedure is performed without cancelling the same. This is because a preamble is transmitted through the uplink and a random access response is received through the downlink of the Pcell when the random access procedure is performed in the cell. Accordingly, even though the downlink BWP is hibernated or switched to the dormant BWP, a problem does not occur.

In the disclosure, the UE operation when the normal BWP (active bandwidth part (BWP)) of the activated cell is activated or when a BWP which is not the dormant BWP is activated is described below.

If an indication indicating activation of a normal BWP (for example, a downlink BWP) of the current cell (PCell, PSCell, or SCell) or a normal BWP which is not a dormant BWP or an indication indicating activation of the cell is received through DCI (L1 control signal) of a PDCCH, a MAC CE, or an RRC message, if an indication indicating switching of a BWP (for example, a downlink BWP) to an active BWP (or a BWP which is not the dormant BWP) is received through DCI (L1 control signal) of a PDCCH, a MAC CE, or an RRC message, if the activated BWP of the current activated cell is a normal BWP, or if the activated BW of the current activated cell is not a dormant BWP (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed. One or a plurality of the following operations may be performed.

Switching and activation to the indicated uplink or downlink BWP is performed. Alternatively, the uplink or downlink BWP is switched to a predetermined BWP (for example, an uplink or uplink first active BWP), and the BWP is activated.

A sounding reference signal (SRS) is transmitted to allow the base station to measure a channel for the uplink in the activated BWP. For example, the SRS may be periodically transmitted.

In another method, the first SRS configuration information (SRS configuration information (for example, SRS transmission resources, period, or offset) for a normal BWP (a BWP which is not a dormant BWP)) or the second SRS configuration information (SRS configuration information (for example, SRS transmission resources, period, or offset) for a dormant BWP) is configured in the uplink BWP configuration information, the UE may transmit an SRS in order to facilitate power control or scheduling of the network or rapidly re-activate the uplink BWP of the UE. For example, when the downlink BWP is switched or activated to a BWP (or a normal BWP), which is not the dormant BWP, for the activated cell, the UE may apply the first SRS configuration information in the uplink BWP of the activated cell and transmit an SRS on the basis of SRS transmission resources, period, or offset corresponding to the first SRS configuration information. However, when the downlink BWP is switched or activated to the dormant BWP for the activated cell (when the first active BWP is the dormant BWP), the UE may apply the second SRS configuration information in the uplink BWP of the activated cell and transmit an SRS on the basis of SRS transmission resources, period, or offset corresponding to the second SRS configuration information. For example, it is possible to improve a power saving effect of the UE in the dormant BWP by configuring the SRS transmission resources configured in the second SRS configuration information for the dormant BWP to be significantly smaller than the SRS transmission resources configured in the first SRS configuration information for the normal BWP or configuring the SRS transmission resource period configured in the second SRS configuration information to be significantly longer than the SRS transmission resource period configured in the first SRS configuration information. For example, the SRS transmission period may be configured to be greater than or equal to 100 ms in the second SRS configuration information. In another method, when the downlink BWP is activated to the dormant BWP, if the second SRS configuration information is not configured, the UE may apply the first SRS configuration information to the uplink BWP and transmit an SRS on the basis of SRS transmission resources, period, or offset corresponding to the first SRS configuration information. In another method, when the downlink BWP is activated to the dormant BWP, if the second SRS configuration information is not configured, the UE may not transmit the SRS.

In another method, when the downlink BWP is switched or activated to a BWP, which is not the downlink dormant BWP, or the normal BWP for the activated cell (when the first active BWP is the dormant BWP), the UE may switch or activate the uplink BWP to the BWP first activated from the dormant state configured in RRC. The BWP first activated from uplink hibernation may be indicated by a BWP ID in the uplink BWP configuration information configured in the RRC message (for example, in the case of FDD, unpaired spectrum, or TDD), or an uplink BWP having the same BWP ID as the downlink dormant BWP may be the dormant BWP (for example, in the case of unpaired spectrum or TDD) in another method. The UE may apply the first SRS configuration information configured in the BWP first activated from the dormant state and transmit an SRS on the basis of SRS transmission resources, period, or offset corresponding to the first SRS configuration information.

In another method, the current uplink BWP or the last activated uplink BWP may be activated.

In another method, if the first active downlink BWP is not the dormant BWP, when the cell is in the deactivated state before MAC control information indicating cell activation or deactivation is received, the cell is configured in the RRC message, or the cell is configured as the activated state in configuration information, the uplink BWP or the downlink BWP may be activated to a BWP indicated by a first active uplink BWP ID or a first active downlink BWP ID in RRC configuration information.

In another method, if the first active downlink BWP is the dormant BWP, a BWP deactivation timer may be stopped.

when the cell is in the deactivated state before MAC control information indicating cell activation or deactivation is received, the cell is configured in the RRC message, or the cell is configured as the activated state in configuration information, the uplink BWP or the downlink BWP may be activated to a BWP indicated by a first active uplink BWP ID (or dormant BWP ID) or a first active downlink BWP ID (or dormant BWP ID) in RRC configuration information. For example, when the first active downlink BWP is configured as the dormant BWP, the first active uplink BWP also should be configured as the dormant BWP.

In another method, the downlink BWP may be activated to the BWP indicated by the first active downlink BWP ID (or dormant BWP ID) in RRC configuration information. The uplink BWP may be activated to the BWP indicated by the dormant BWP ID (or first active uplink BWP ID) in RRC configuration information.

If a PUCCH is configured in the activated BWP, the PUCCH is transmitted.

A BWP or cell deactivation timer starts or restarts. In another method, the BWP or cell deactivation timer may start or restart only when a BWP or cell hibernation timer is not configured. If the BWP or cell hibernation timer can be configured through the RRC message, the BWP or the cell may be hibernated when the timer expires. For example, the BWP or cell deactivation timer may start or restart only in the hibernated BWP or cell.

When there are suspended type 1 configuration transmission resources, stored type 1 configuration transmission resources may be initialized as original and used. The type 1 configuration transmission resources are periodic (uplink or downlink) transmission resources pre-allocated through an RRC message, which can be used after being activated through the RRC message.

A power headroom report (PHR) is triggered for the BWP.

The UE may report a channel measurement result (CSI, CQI, PMI, RI, PTI, or CRI) for the downlink in the activated BWP according to the configuration of the base station.

A PDCCH may be monitored to read an indication of the base station in the activated BWP.

A PDCCH may be monitored to read cross scheduling in the activated BWP.

The BWP deactivation timer starts or restarts. In another method, the BWP deactivation timer may start or restart only when a BWP hibernation timer is not configured. If the BWP hibernation timer can be configured through the RRC message, the BWP may be switched to a dormant state or a dormant BWP when the timer expires. For example, the BWP deactivation timer may start or restart only in the dormant BWP.

If a link BWP hibernation timer is configured for the BWP, a BWP hibernation timer may start or restart for the BWP.

In the disclosure, the UE operation when an active bandwidth part (BWP), a BWP, or a cell is deactivated is described below.

If an indication indicating deactivation of a BWP (for example, a downlink BWP) of the current cell (PCell, PSCell or SCell) is received through DCI (L1 control signal) of a PDCCH, a MAC CE, or an RRC message, if an indication indicating deactivation of a BWP (for example, a downlink BWP) or an indication indicating switching to a deactivated BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), if the BWP or cell deactivation timer expires in the cell, if the activated cell is deactivated, or if the BWP of the cell is deactivated, one or a plurality of the following operations may be performed.

The cell or the indicated uplink or downlink BWP is deactivated.

The UE stops the BWP deactivation timer (for example, deactivation timer for the downlink BWP) configured and run in the cell or BWP.

Periodic downlink transmission resources (DL SPS or configured downlink assignment) or periodic uplink transmission resources (UL SPS or configured uplink grant type 2) configured in the cell or BWP may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. The operation of clearing the periodic transmission resources may be performed only when the cell is transitioned from the activated state to the deactivated state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

The periodic uplink transmission resources (configured uplink grant type 1 configured through RRC) configured in the cell or BWP may be suspended. The term "suspend" means that transmission resource configuration information configured through the RRC message is stored in the UE but is not used anymore. The periodic transmission resources may be called type 1 configuration transmission resources. The operation of clearing the periodic transmission resources may be performed only when the cell is transitioned from the activated state to the deactivated state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The UE does not transmit an SRS for the cell or BWP.

The UE neither measures a channel (CSI, CQI, PMI, RI, PTI, or CRI) for the downlink nor reports the channel measurement for the cell or BWP.

Uplink data is not transmitted through a UL-SCH in the cell or BWP.

A random access procedure is not performed for the cell or BWP.

The UE does not monitor a PDCCH in the cell or BWP.

The UE does not monitor a PDCCH for the cell or BWP. Further, in the case of cross-scheduling, a PDCCH for the cell is not monitored in the scheduled cell.

A PUCCH or SPUCCH is not transmitted in the cell or BWP.

In the disclosure, the activated state, the deactivated state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an activated state to a dormant state or switched to a dormant BWP (or activated), the BWP may be transitioned to the dormant state or switched to the dormant BWP (or activated).

In the disclosure, BWP switching means that, if BWP switching is indicated by a BWP ID through PDCCH DCI while downlink assignment is allocated, the downlink BWP is switched to a BWP indicated by the BWP ID, and if BWP switching is indicated with a BWP identifier through PDCCH DCI while a UL grant is allocated, the uplink BWP is switched to a BWP indicated by the BWP ID. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, the disclosure describes detailed embodiments for expanding and applying the content proposed in the disclosure.

Figure 8:
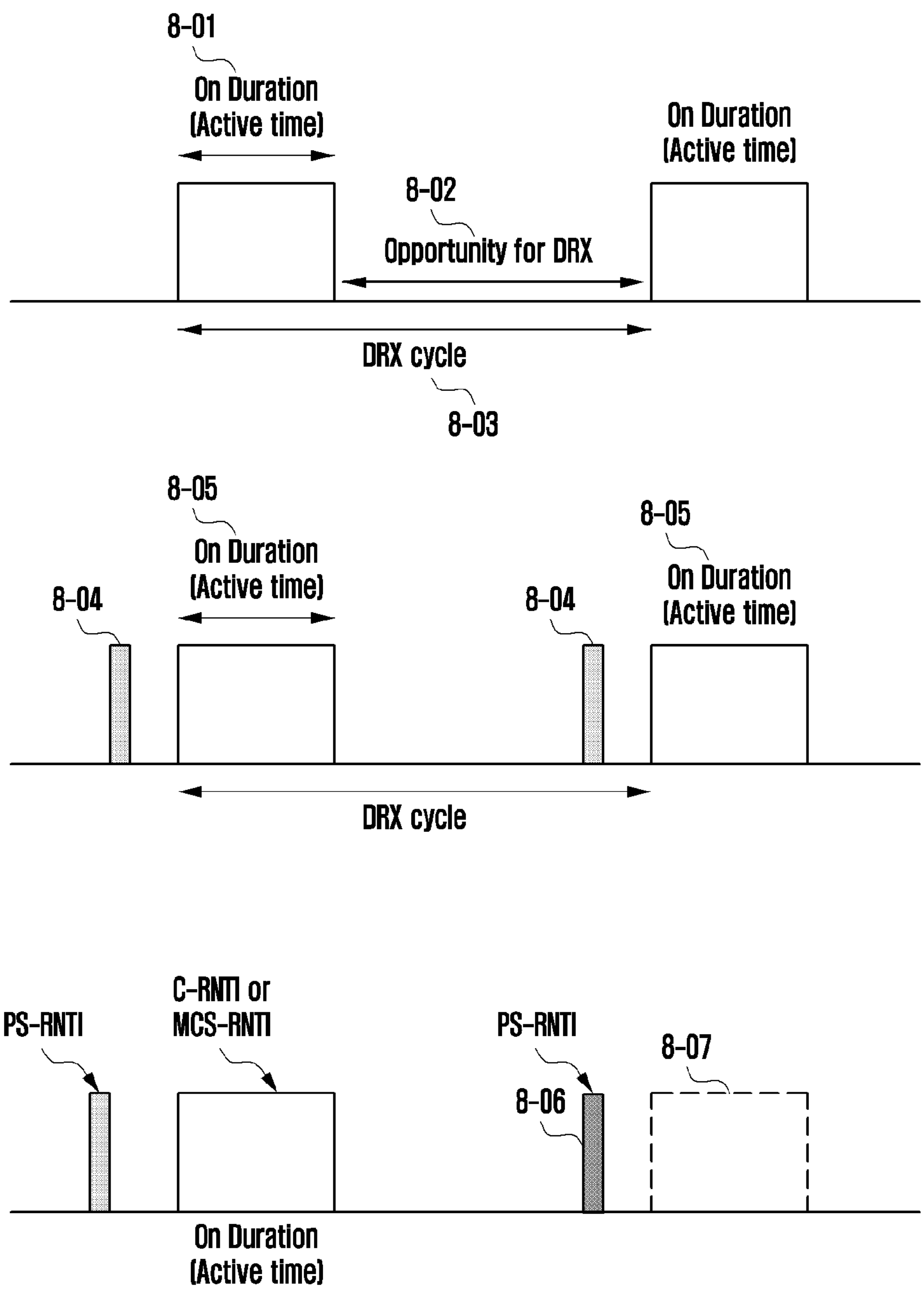
FIG. 8 illustrates a method of configuring or operating discontinuous reception (DRX) to save a UE battery according to an embodiment of the disclosure.

FIG. 8 illustrates a method of configuring or operating DRX to save a UE battery according to an embodiment of the disclosure.

Referring to FIG. 8, the base station may configure a DRX function such as a DRX cycle, a start point, an offset, or on-duration (active time) in the PCell, the SCell, or the PSCell for the UE through the RRC message as illustrated in FIG. 6. The disclosure considers configuration of the DRX function in the PCell, SpCell, or the PSCell.

As described above, if the DRX function is configured in the PCell (SpCell or PSCell), the UE may consider a DRX cycle 8-03, a DRX start time, or an offset to apply the DRX function. When the DRX function is applied, the UE may monitor a PDCCH or DCI of the PDCCH which can be received from the base station in the PCell only within the active time (or on-duration) 8-01 of the DRX. Further, the UE does not need to monitor the PDCCH or the DCI of the PDCCH outside the active time 8-02 of the DRX function, thereby reducing UE battery consumption.

Referring to FIG. 6, the base station may configure a power saving function (power saving mode) in the UE through the RRC message in order to further reduce battery consumption of the UE. When the power saving function is configured along with the DRX function, the PDCCH is monitored outside the active time during a short time interval 8-04 configured through RRC before the active time 8-01 in which the UE should monitor the PDCCH, and a Wake Up Signal (WUS) is monitored and received outside the active time. The base station may indicate whether the UE should monitor the PDCCH or not in the next active time 8-05 or 8-07 through a bit of the DCI of the PDCCH of the WUS.

That is, the UE in which the power saving function or the DRX function is configured may monitor the WUS during the short time interval 8-04 configured in the RRC message before the active time 8-05. If a bit value of the DCI of the PDCCH for the next active time 8-05 or 8-07 is 0 (or 1) in the WUS, it may indicate that the UE does not monitor the PDCCH within the next active time 8-07 or indicate that the UE does not monitor the PDCCH by not driving a timer corresponding to the next active time in the MAC layer device. If the bit value of the DCI of the PDCCH for the next active time 8-05 or 8-07 is 1 (or 0) in the received WUS, it may indicate that the UE monitors the PDCCH within the next active time 8-05 or may indicate that the UE monitors the PDCCH by driving a timer corresponding to the next active time in the MAC layer device.

Further, the UE may not monitor the WUS or the PDCCH for searching for the WUS within the active time.

When the UE in which the power-saving function or the DRX function is configured monitors the WUS during a short time interval 8-04 configured in the RRC message before the active time 8-05, the UE may identify the PDCCH by a first RNTI (for example, PS-RNTI) to detect a signal. The first RNTI (for example, the PS-RNTI) 8-06 may be configured in a plurality of UEs, and the base station may indicate simultaneously whether to monitor the PDCCH within the next active time to the plurality of UEs through the first RNTI (for example, PS-RNTI).

When monitoring and detecting the PDCCH in the active time 8-05, the UE in which the power-saving function or the DRX function is configured may detect a signal on the basis of a second RNTI (for example, a C-RNTI), a third RNTI (for example, an MCS-C-RNTI), or a fourth RNTI (SPS-C-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI) may be used to indicate periodic transmission resources of the UE.

Figure 9:
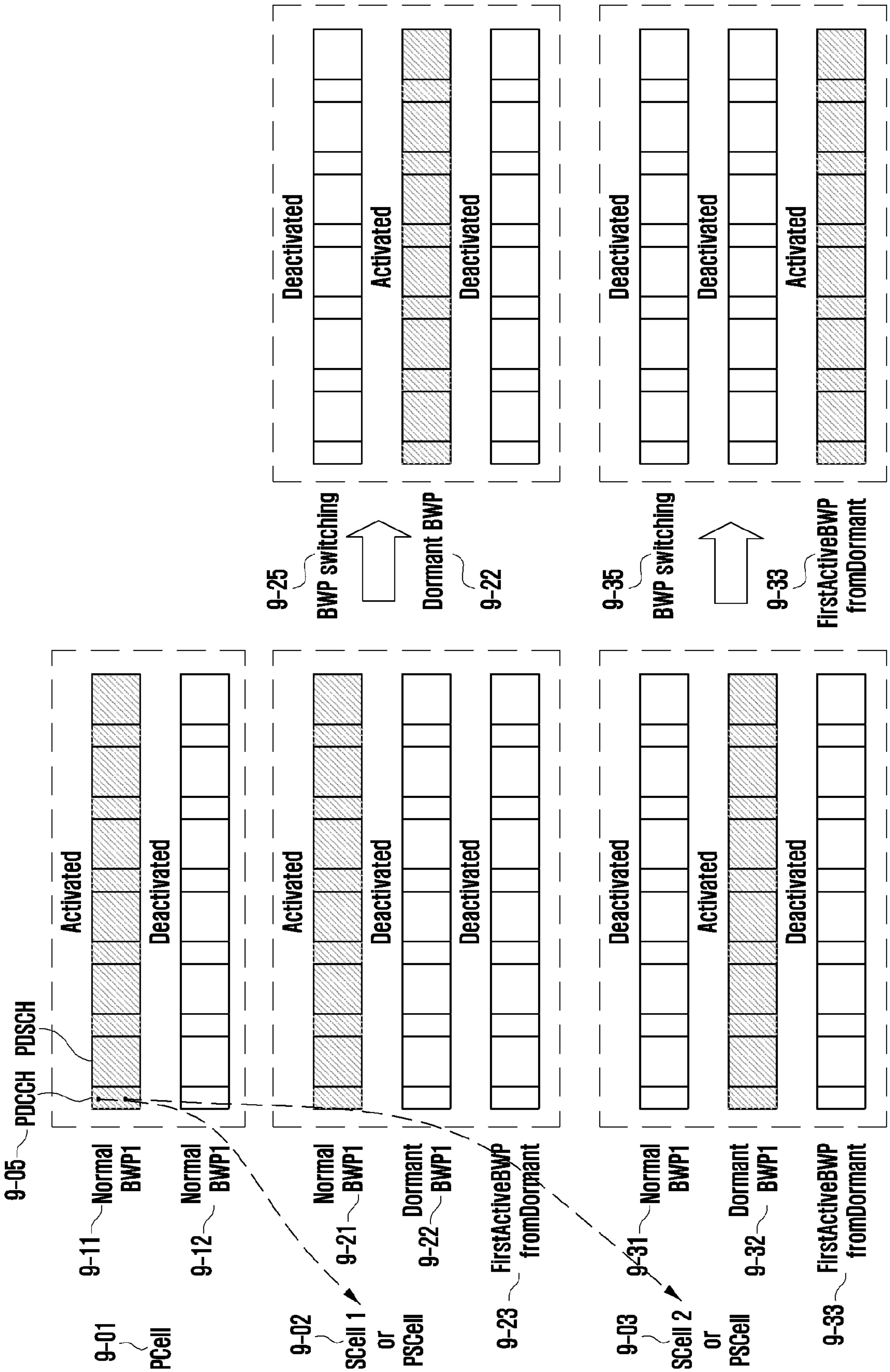
FIG. 9 illustrates a concept of a method of operating a dormant BWP in an activated SCell according to an embodiment of the disclosure.

FIG. 9 illustrates a concept of a method of operating a dormant BWP in an activated SCell or PSCell according to an embodiment of the disclosure.

Referring to FIG. 6, the base station may configure a plurality of SCells in the UE through the RRC message for carrier aggregation, allocate respective SCell identifiers, configure a dormant BWP for each SCell, configure a plurality of cell groups for dual connectivity, allocate a cell group identifier, configure or indicate a cell group suspension indicator for each cell group or a PSCell of each cell group, or configure a dormant BWP. Further, the plurality of SCells may be included in each SCell, and one SCell group may include a plurality of SCells. An SCell group identifier may be allocated to each SCell group, and a plurality of SCell identifier may be included in or mapped to each SCell group identifier. An SCell identifier value or an SCell group identifier value may be allocated as a predetermined bit value and have an integer value (or a natural number value). Alternatively, the PSCell of each cell may be indicated by a cell group identifier.

Referring to FIG. 9, the base station may define a new bitmap in DCI of the PDCCH 9-05 transmitted in the PCell, perform mapping such that each bit value of the bitmap indicates each SCell identifier value, each SCell group identifier value, a cell group (or secondary cell group) identifier, or a PSCell (or SCell) of a cell group, define each bit value, and indicate whether to switch an SCell corresponding to the bit, SCells belonging to an SCell group, a cell group (or secondary cell group), a PSCell (or SCell) of the cell group (or secondary cell group) to a dormant BWP, activate the dormant BWP, or whether to suspend or resume the cell group. Further, the base station may indicate whether to switch the SCell corresponding to the bit, SCells belonging to the SCell group, a cell group (or secondary cell group) identifier, or a PSCell (or SCell) of the cell group (or secondary cell group) from the dormant BWP to the normal BWP 9-11, 9-12 or 9-31 (for example, a first active BWP activated from the dormant state) or activate the normal BWP (for example, a first active BWP activated from the dormant state).

Referring to FIG. 9, after receiving DCI of the PDCCH in the PCell 9-01, while reading the DCI, the UE may identify whether there is a bitmap including an indication for an SCell or a BWP of SCell groups (for example, switching or activation to a dormant BWP or switching or activation to a normal BWP) or an indication indicating suspension or resumption of a cell group (or secondary cell group) or a PSCell (or SCell) of the cell group (or secondary cell group) and, when there is the bitmap, switch or activate the BWP or suspend or resume the cell group according to the bit value for an SCell corresponding to each bit of the bitmap, SCells 9-02 and 9-03 belonging to an SCell group, a cell group (or secondary cell group), or a PSCell (or SCell) of the cell group (or secondary cell group). For example, when the bit of the bitmap indicates a first SCell 9-02 (or a first SCell identifier), a cell group (or secondary cell group), or a PSCell (or SCell) of the cell group (or secondary cell group), indicates an SCell group including the first SCell (or an SCell group identifier), and the bit value is 0 (or 1), the UE may activate a BWP 9-21 to a dormant BWP 9-22 for the first SCell 9-02, the cell group (or secondary cell group), or the PSCell (or SCell) of the cell group (or secondary cell group), switch the current BWP to the dormant BWP 9-22, or switch the current BWP to the dormant BWP 9-22 and, when the current BWP is not the dormant BWP, switch or activate the currently activated BWP 9-21 to the dormant BWP 9-22 as indicated by reference numeral 9-25 or suspend or deactivate the cell group in BWP 9-23. In another method, it is possible to reducing UE power consumption by maintaining the cell group (or secondary cell group) or the BWP of the PSCell (or SCell) of the cell group (or secondary cell group), applying the second DRX configuration information or second SRS configuration information proposed in the disclosure, and performing PDCCH monitoring according to a long period or performing SRS transmission according to a long period.

Referring to FIG. 9, after receiving DCI of the PDCCH in the PCell 9-01, while reading the DCI, the UE may identify whether there is a bitmap including an indication for an SCell or a BWP of SCell groups (for example, switching or activation to a dormant BWP or switching or activation to a normal BWP) or an indication indicating suspension or resumption of a cell group (or secondary cell group) or a BWP of a PSCell (or SCell) of the cell group (or secondary cell group) and, when there is the bitmap, switch or activate the BWP or suspend or resume the cell group according to the bit value for an SCell indicated by each bit of the bitmap, SCells 9-02 and 9-03 belonging to an SCell group, a cell group (or secondary cell group), or a PSCell (or SCell) of the cell group (or secondary cell group). For example, when the bit of the bitmap indicates a second SCell 9-03 (or a second SCell identifier), indicates an SCell group (or an SCell group identifier) including the second SCell, and the bit value is 1 (or 0), if the currently activated BWP for the second SCell 9-03 is a dormant BWP 9-32, the currently activated BWP is not a normal BWP, the current BWP (or cell) is activated, and the current BWP is activated to the dormant BWP 9-32 (or activated to a BWP which is not the normal BWP), the UE may switch or activate the BWP of the second SCell 9-03 to a BWP 9-33 (for example, a first active BWP activated from the dormant state) configured through the RRC message as indicated by reference numeral 9-35 or suspend or activate the cell group. When the bit value is 1 (or 0) and thus an SCell indicated by the bit, SCells belonging to an SCell group, a cell group (or secondary cell group), or a PSCell (or SCell) of the cell group (or secondary cell group) should be switched or activated to a BWP which is not a dormant BWP or when the cell group should be resumed, if the state of the SCell is the deactivated state or if the state of the SCell is the activated state among the SCell or the SCells belonging to the Scell group and the activated BWP is not the dormant BWP (or is the normal BWP), the bit value may not be applied, may be ignored, or may not be read and, if the cell group (or secondary cell group) or the PSCell (or SCell) of the cell group (or secondary cell group) is already in the activated state or the resumed state, the bit value may be applied, may be ignored, or may not be read. When the bit value is 0 (or 1) and thus an SCell indicated by the bit, SCells belonging to an SCell group, a cell group (or secondary cell group), or a PSCell (or SCell) of the cell group (or secondary cell group) should be switched or activated to a dormant BWP or when the cell group should be suspended, if the state of the SCell is the activated state among the SCell or the SCells belonging to the Scell group and the activated BWP is the dormant BWP, the bit value may not be applied, may be ignored, or may not be read and, if the cell group (or secondary cell group) or the PSCell (or SCell) of the cell group (or secondary cell group) is already in the suspended state or the deactivated state, the bit value may be applied, may be ignored, or may not be read.

Figure 10:
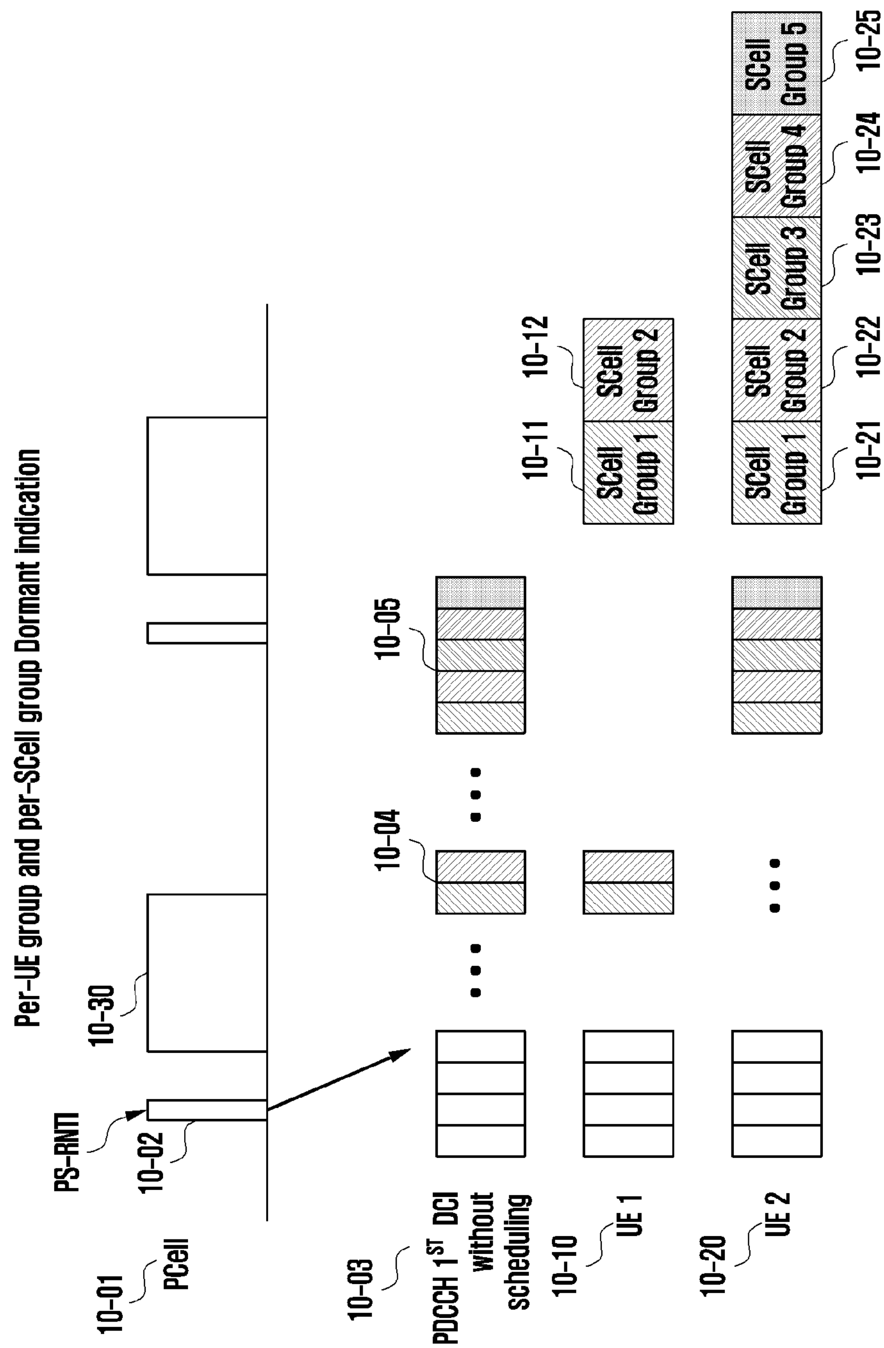
FIG. 10 illustrates embodiment 1-1 of describing in detail a concept of a method of operating a dormant BWP in an activated SCell described in FIG. 9 according to an embodiment of the disclosure.

FIG. 10 illustrates embodiment 1-1 of describing in detail a concept of a method of operating a dormant BWP in an activated SCell described in FIG. 9 according to an embodiment of the disclosure.

In embodiment 1-1, as illustrated in FIG. 6, the base station may configure a plurality of SCells in the UE through the RRC message for carrier aggregation and allocate SCell identifiers, configure a dormant BWP for each SCell, not configure a dormant BWP for any SCell, configure one or a plurality of cell groups for dual connectivity, configure each cell group identifier or each cell group state, configure a dormant BWP for a PSCell (or SCell) of each cell group, or not configure a dormant BWP for any cell. Further, the plurality of SCells may be included in each SCell, and one SCell group may include a plurality of SCells. An SCell group identifier may be allocated to each SCell group, and a plurality of SCell identifier may be included in or mapped to each SCell group identifier. An Scell identifier value, an SCell group identifier value, or a cell group (or secondary cell group) identifier may be allocated as a predetermined bit value and have an integer value (or a natural number value). SCell groups or SCell group identifiers configured for embodiment 1-1 of the disclosure or to apply the same, may be referred to as first SCell groups. The first SCell groups may indicate group identifiers to which the operation indicated by a DCI bitmap value received after monitoring of PDCCH DCI by the UE within a short time (out of active time) or a time outside an active time is applied in embodiment 1-1.

Referring to FIG. 10, the base station may configure a power saving function or a DRX function in each of a plurality of UEs through the RRC message as described in FIG. 6. The base station may configure time information of a short time 10-02 within which a first DCI format or a WUS should be found before an active time 10-30 of a DRX cycle in the PCell 10-01 or SpCell or configuration information of the first DCI format in each UE through the RRC message, and may configure the location of a bitmap including an indication for first SCell groups of each UE in the first DCI format through the RRC message when the UE found the first DCI format within the short time 10-02 in the PCell or SpCell. Further, the base station may configure a search space of PDCCH monitoring or a UE identifier (for example, PS-RNTI) for searching for the first DCI format in the UE within the short time 10-02 through the RRC message. When the SCell or PSCell is switched or activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the base station may configure the power-saving function or the DRX function in a plurality of UEs and transmit the first DCI format through PDCCH transmission resources in the short time 10-02 configured before the next active time 10-30 of the DRX cycle configured in the UEs as indicated by reference numeral 10-03, and the first DCI format may include bitmaps 10-04 and 10-05 including indication information for dormant BWPs of the first SCell groups configured in each of the plurality of UEs or an indication of suspension or resumption of the cell group (or secondary cell group) or the PSCell (or SCell) of the cell group (or secondary cell group).

A first UE 10-10 applying information configured through the RRC message may monitor the PDCCH on the basis of the PS-RNTI which is an identifier within the short time 10-02 configured before the next active time 10-30 of the DRX cycle and search for the first DCI format from the base station in the search space as indicated by reference numeral 10-03. If the first DCI format 10-03 is detected, the first UE may read the bitmap 10-04 including indication information for the dormant BWP for first SCell groups of the first UE, the cell group (or secondary cell group), or the PSCell (or SCell) of the cell group (or secondary cell group) or information indicating suspension or resumption of the cell group (or secondary cell group) or the PSCell (or SCell) of the cell group (or secondary cell group) through time information or location information configured through the RRC message in the first DCI format 10-03. The length of the bitmap may be configured to be the same as the number of first SCell groups configured in the first UE, cell groups (or secondary cell groups), or PSCells (or SCells) of the cell group (or secondary cell group), and a maximum thereof may be configured as a predetermined number (for example, 5). Further, each bit value of the bitmap may be mapped to or indicated by each first SCell group in an ascending order of SCell group identifier values of the first SCell groups configured in the first UE from the right bit (for example, from the Least Significant Bit (LSB)) of the bitmap. In another method, each bit value of the bitmap may be mapped to or indicated by each first SCell group in a descending order of SCell group identifier values of the first SCell groups configured in the first UE from the right bit (for example, from the Least Significant Bit (LSB)) of the bitmap. In another method, each bit value of the bitmap may be mapped to or indicated by each first SCell group in an ascending order of SCell group identifier values of the first SCell groups configured in the first UE from the left bit (for example, from the Most Significant Bit (MSB)) of the bitmap. In another method, each bit value of the bitmap may be mapped to or indicated by each first SCell group in a descending order of SCell group identifier values of the first SCell groups configured in the first UE from the left bit (for example, from the Most Significant Bit (MSB)) of the bitmap. In the first DCI format of the PDCCH, a new bit may be defined and used as information indicating suspension or resumption of the cell group (or secondary cell group) or the PSCell (or SCell) of the cell group (or secondary cell group).

When bit values of the bitmaps 10-11 and 10-12 are 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The UE may identify whether there is a bitmap including an indication for a cell group (or secondary cell group) or a BWP of a PSCell (or SCell) or the cell group (or secondary cell group) or an indication of suspension or resumption of the cell group and, when there is the bitmap, may switch or activate the BWP or suspend or resume the cell group according to the bit value for a cell group (or secondary cell group) indicated by each bit of the bitmap or a PSCell (or SCell) of the cell group (or secondary cell group). For example, when the bit of the bitmap indicates the cell group (or secondary cell group) or the PSCell (or SCell) of the cell group (or secondary cell group) and the bit value is 1 (or 0), the UE may resume or activate the cell group. When the bit value is 1 (or 0) and thus the cell group (or secondary cell group_ or the PSCell (or SCell) of the cell group (or secondary cell group) should be switched or activated to a BWP which is not a dormant BWP or when the cell group should be resumed, if the cell group (or secondary cell group) or the PSCell (or SCell) of the cell group (or secondary cell group) is already in the activated state or the resumed state, the UE may not apply the bit value, may ignore the same, or may not read the same. For example, when the bit of the bitmap indicates the cell group (or secondary cell group) or the PSCell (or SCell) of the cell group (or secondary cell group) and the bit value is 0 (or 1), the UE may switch or activate the BWP of the cell group (or secondary cell group) or the PSCell (or SCell) of the cell group (or secondary cell group) to the dormant BWP or suspend or deactivate the cell group. When the bit value is 0 (or 1) and thus the cell group indicated by the bit or the PSCell (or SCell) of the cell group (or secondary cell group) should be switched or activated to the dormant BWP or when the cell group should be suspended, if the state of the SCell is the activated state among the SCell or the SCells belonging to the Scell group and the activated BWP is the dormant BWP, the bit value may not be applied, may be ignored, or may not be read and, if the cell group (or secondary cell group) or the PSCell (or SCell) of the cell group (or secondary cell group) is already in the suspended state or the deactivated state, the bit value may be applied, may be ignored, or may not be read.

The embodiment 1-1 is realized as described above, and the first DCI format of the PDCCH proposed in embodiment 1-1 may be used within the short time and is not accompanied by downlink transmission resources (for example, PDSCH) or uplink transmission resources (for example, PUSCH) for the UE. Accordingly, in embodiment 1-1, the UE may receive the first DCI format of the PDCCH and may not transmit ACK or NACK information (for example, HARQ ACK or NACK) therefor.

Figure 11:
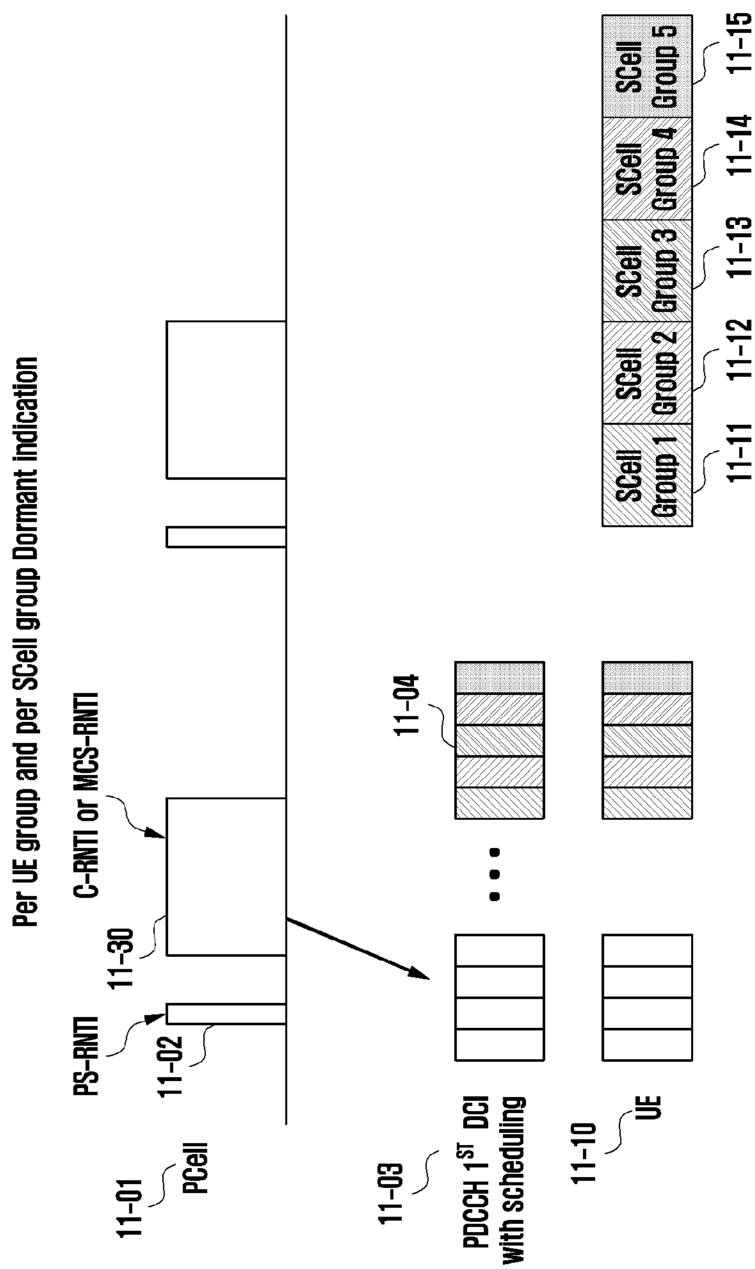
FIG. 11 illustrates embodiment 1-2 of describing in detail a concept of a method of operating a dormant BWP in an activated SCell described in FIG. 9 according to an embodiment of the disclosure.

FIG. 11 illustrates embodiment 1-2 of describing in detail a concept of a method of operating a dormant BWP in an activated SCell described in FIG. 9 according to an embodiment of the disclosure.

In embodiment 1-2, as illustrated in FIG. 6, the base station may configure a plurality of SCells in the UE through the RRC message for carrier aggregation, allocate respective SCell identifiers, configure a dormant BWP for each SCell, configure one or a plurality of cell groups for dual connectivity, configure each cell group identifier, configure each cell group state, configure a dormant BWP for a PSCell (or SCell) of each cell group, and may not configure a dormant BWP for any cell. The dormant BWP may be configured for each cell, and may not be configured for any cell. Further, the plurality of SCells may be included in each SCell, and one SCell group may include a plurality of SCells. An SCell group identifier may be allocated to each SCell group, and a plurality of SCell identifier may be included in or mapped to each SCell group identifier. An Scell identifier value, an SCell group identifier value, or a cell group (or secondary cell group) identifier may be allocated as a predetermined bit value and have an integer value (or a natural number value). SCell groups or SCell group identifiers configured for embodiment 1-2 of the disclosure or to apply the same, may be referred to as first SCell groups. The second SCell groups may indicate group identifiers to which the operation indicated by a DCI bitmap value received after monitoring of PDCCH DCI by the UE within the active time is applied in embodiment 1-2.

Referring to FIG. 11, the base station may configure a power saving function or a DRX function in the UE through the RRC message as illustrated in FIG. 6. Further, in the RRC message, configuration information of a second DCI format (for example, DCI format 0_1 or DCI format 1_1) for which the UE should search within an active time 11-30 of the DRX cycle for the PCell or SpCell 11-01 may be configured. When the UE detects the second DCI format in the PCell or SpCell 11-01, the UE may identify whether a bitmap including an indicator for second SCell groups for the UE in the second DCI format. Further, the base station may configure a search space of PDCCH monitoring or a UE identifier (for example, C-RNTI, MCS-C-RNTI, or SPS-C-RNTI (or CS-RNTI)) for searching for the second DCI format within the active time 11-30 in the UE through the RRC message. When the SCell or PSCell is switched or activated to the dormant BWP, the UE does not monitor PDCCH DCI, and thus it is very inefficient for the UE to receive the PDCCH DCI or bitmap proposed in the disclosure in the SCell instead of the PCell or SpCell. Accordingly, the disclosure proposes monitoring of the PDCCH DCI proposed in the disclosure in the PCell or SpCell.

For example, as described above, the base station may transmit the second DCI format through PDCCH transmission resources of the active time 11-30 in the PCell or SpCell as indicated by reference numeral 11-03, and the second DCI format may include a bitmap 11-04 indicating indication information for the dormant BWP of the second SCell groups configured in the UE or an indication of suspension or resumption of the cell group (or secondary cell group) or the PSCell (or SCell) of the cell group (or secondary cell group). The short time 11-02 (i.e., PS-RNTI) is similar to the short time 10-02 in FIG. 10.

As described above, the first UE 11-10 applying information configured through the RRC message may monitor the PDCCH on the basis of the UE identifier (for example, C-RNTI, MCS-C-RNTI, or SPS-C-RNTI (or CS-RNTI)) which is an identifier configured within the active time 11-30 of the DRX cycle and search for the second DCI format from the base station in the search space as indicated by reference numeral 11-03. If the second DCI format 11-03 is detected, the first UE may read the bitmap 11-04 including indication information for the dormant BWP for first SCell groups of the first UE or the dormant BWP of the cell group (or secondary cell group) or the PSCell (or SCell) of the cell group (or secondary cell group), or information indicating suspension or resumption of the cell group (or secondary cell group) or the PSCell (or SCell) of the cell group (or secondary cell group) through in the second DCI format 11-03. The length of the bitmap may be configured to be the same as the number of second SCell groups configured in the first UE 11-10, cell groups (or secondary cell groups), or PSCells (or SCells) of the cell group (or secondary cell group), and a maximum thereof may be configured as a predetermined number (for example, 5). Further, each bit value of the bitmap may be mapped to or indicated by each second SCell group in an ascending order of SCell group identifier values of the second SCell groups configured in the first UE from the right bit (for example, from the Least Significant Bit (LSB)) of the bitmap. In another method, each bit value of the bitmap may be mapped to or indicated by each second SCell group in a descending order of SCell group identifier values of the second SCell groups configured in the first UE from the right bit (for example, from the Least Significant Bit (LSB)) of the bitmap. In another method, each bit value of the bitmap may be mapped to or indicated by each second SCell group in an ascending order of SCell group identifier values of the second SCell groups configured in the first UE 11-10 from the left bit (for example, from the Most Significant Bit (MSB)) of the bitmap. In another method, each bit value of the bitmap may be mapped to or indicated by each second SCell group in a descending order of SCell group identifier values of the second SCell groups configured in the first UE from the left bit (for example, from the Most Significant Bit (MSB)) of the bitmap. In the second DCI format of the PDCCH, a new bit may be defined and used as information indicating suspension or resumption of the cell group (or secondary cell group) or the PSCell (or SCell) of the cell group (or secondary cell group).

When bit values of the bitmaps 11-11, 11-12, 11-13, 11-14 and 11-15 are 0, the bit value of 0 may indicate switching to a dormant BWP or activation of a dormant BWP for each activated SCell among SCells included in the second SCell group corresponding to the bit (if a dormant BWP is configured). In another method, when the bit values of the bitmaps are 0, the bit value of 0 may indicate switching to a dormant BWP or activation of a dormant BWP if a BWP activated for each activated SCell among SCells included in the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The UE may identify whether there is a bitmap including an indication for a cell group (or secondary cell group) or a BWP of a PSCell (or SCell) or the cell group (or secondary cell group) or an indication of suspension or resumption of the cell group and, when there is the bitmap, may switch or activate the BWP or suspend or resume the cell group according to the bit value for a cell group (or secondary cell group) indicated by each bit of the bitmap or a PSCell (or SCell) of the cell group (or secondary cell group). For example, when the bit of the bitmap indicates the cell group (or secondary cell group) or the PSCell (or SCell) of the cell group (or secondary cell group) and the bit value is 1 (or 0), the UE may resume or activate the cell group. When the bit value is 1 (or 0) and thus the cell group (or secondary cell group_ or the PSCell (or SCell) of the cell group (or secondary cell group) should be switched or activated to a BWP which is not a dormant BWP or when the cell group should be resumed, if the cell group (or secondary cell group) or the PSCell (or SCell) of the cell group (or secondary cell group) is already in the activated state or the resumed state, the UE may not apply the bit value, may ignore the same, or may not read the same. For example, when the bit of the bitmap indicates the cell group (or secondary cell group) or the PSCell (or SCell) of the cell group (or secondary cell group) and the bit value is 0 (or 1), the UE may switch or activate the BWP of the cell group (or secondary cell group) or the PSCell (or SCell) of the cell group (or secondary cell group) to the dormant BWP or suspend or deactivate the cell group. When the bit value is 0 (or 1) and thus the cell group indicated by the bit or the PSCell (or SCell) of the cell group (or secondary cell group) should be switched or activated to the dormant BWP or when the cell group should be suspended, if the state of the SCell is the activated state among the SCell or the SCells belonging to the Scell group and the activated BWP is the dormant BWP, the bit value may not be applied, may be ignored, or may not be read and, if the cell group (or secondary cell group) or the PSCell (or SCell) of the cell group (or secondary cell group) is already in the suspended state or the deactivated state, the bit value may be applied, may be ignored, or may not be read.

Embodiment 1-2 is realized as described above, and the second DCI format of the PDCCH proposed in embodiment 1-2 may be used within the active time and accompanied by downlink transmission resources (for example, PDSCH) or uplink transmission resources (for example, PUSCH) for the PCell or SpCell of the UE. Accordingly, in embodiment 1-2, the UE may receive the second DCI format of the PDCCH and transmit ACK or NACK information (for example, HARQ ACK or NACK) for scheduling information (downlink transmission resources or uplink transmission resources) of the PCell or SpCell indicated by the second DCI format, and accordingly the base station may identify whether the UE successfully receives an indication of the second DCI format in embodiment 1-2.

Referring to FIG. 6 of the disclosure, through an RRCSetup message, an RRCResume message in operation 6-25, or an RRCReconfiguration message in operation 6-45 of the RRC connection configuration, the base station may configure first SCell group configuration information which can be applied to embodiment 1-1 and second SCell group configuration information which can be applied to embodiment 1-2, proposed in the disclosure, in the UE. In the RRC message, the base station may allocate a SCell identifier to each SCell of the UE, and may allocate a first SCell group identifier to each of the first SCell groups and a second SCell group identifier to each of the second SCell groups. Further, the base station may allocate a first SCell group set identifier indicating the first SCell groups and indicate a second SCell group set identifier indicating the second SCell groups. Each SCell identifier may be included in or mapped to each first SCell group or each second SCell group. The base station may include the SCell or the SCell identifier in the first SCell group or the second SCell group or map the SCell or the SCell identifier to the first SCell group or the second SCell group to configure the SCell or the SCell identifier only when a dormant BWP (for example, a downlink dormant BWP) is configured for the SCell.

Figure 12:
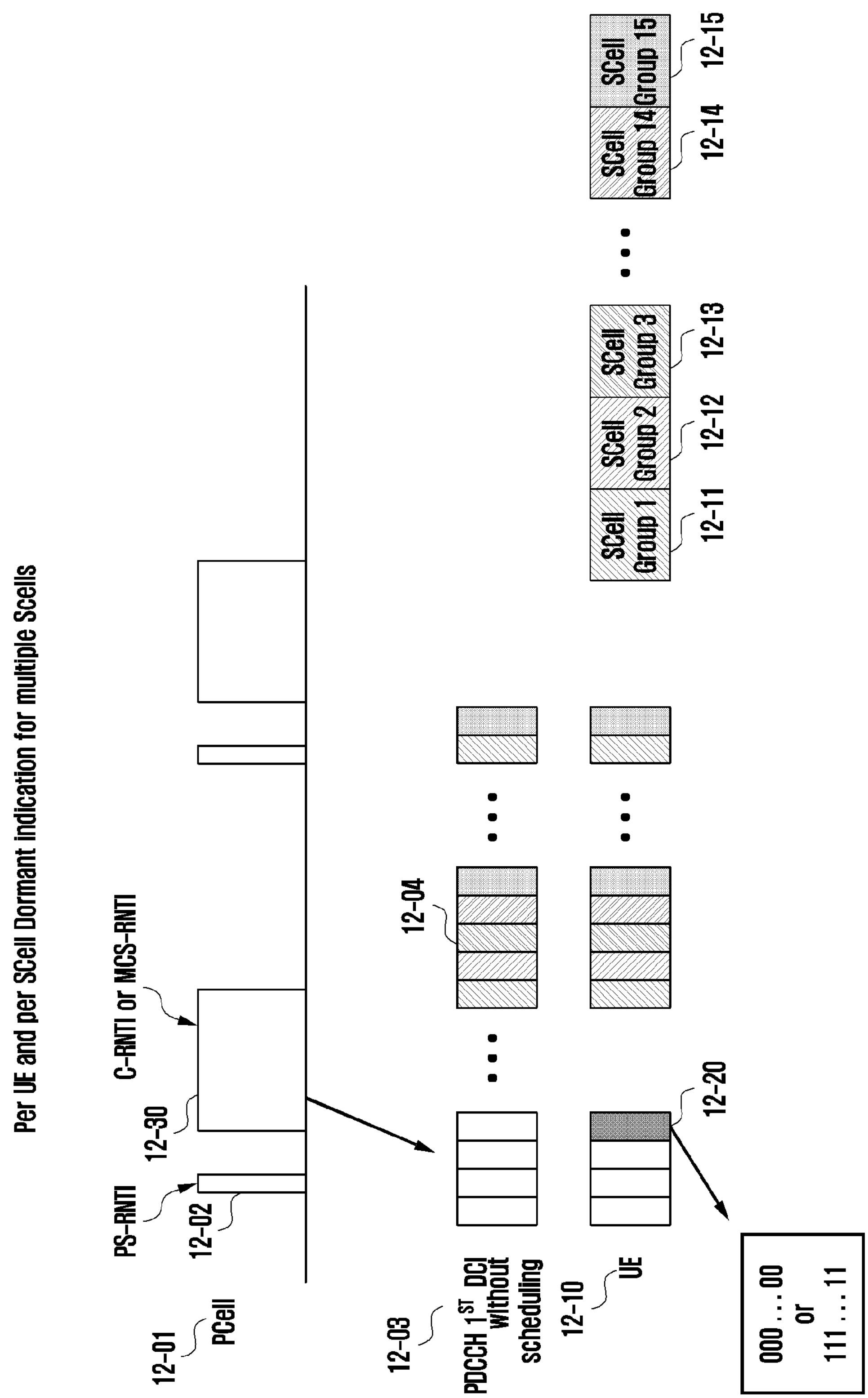
FIG. 12 illustrates embodiment 1-3 of describing in detail a concept of a method of operating a dormant BWP in an activated SCell described in FIG. 9 according to an embodiment of the disclosure.

FIG. 12 illustrates embodiment 1-3 of describing in detail a concept of a method of operating a dormant BWP in an activated SCell described in FIG. 9 according to an embodiment of the disclosure.

In embodiment 1-3, the base station may configure a plurality of SCells and allocate SCell identifiers in the UE through the RRC message for carrier aggregation as illustrated in FIG. 6, configure a dormant BWP for each SCell, not configure a dormant BWP for any SCell, configure one or a plurality of cell groups for dual connectivity, configure each cell group identifier or each cell group state, configure a dormant BWP for a PSCell (or SCell) of each cell group, or not configure a dormant BWP for any cell. An SCell identifier value may be allocated as a predetermined bit value and have an integer value (or a natural number value). In order to realize or apply embodiment 1-3, SCell identifiers or a cell group (or secondary cell group) identifier configured in the RRC message may be used. The SCell identifiers or the cell group (or secondary cell group) identifier may indicate SCells, SCell identifiers, or a cell group (or secondary cell group) identifier to which the operation indicated by a DCI bitmap value received after monitoring of PDCCH DCI by the UE within the active time is applied in embodiment 1-3.

Referring to FIG. 12, the base station may configure a power saving function or a DRX function in the UE through the RRC message as illustrated in FIG. 6. Further, in the RRC message, configuration information of a third DCI format (for example, DCI format 1_1) for which the UE should search within an active time 12-30 of the DRX cycle for the PCell or SpCell may be configured. When detecting the third DCI format in the PCell or SpCell, the UE may identify whether a bitmap including an indicator for each SCell, PSCell, or SCell identifier of the UE is included in the third DCI format. The short time 12-02 (i.e., PS-RNTI) is similar to the short time 10-02 in FIG. 10.

The third DCI format may include a transmission resource type (resourceAllocation) field, a frequency transmission resource allocation (frequency domain resource assignment) field, a modulation and coding scheme (MCS) field, a new data indicator (NDI) field, a redundancy version (RV) field, an HARQ process number field, an antenna port field, or a demodulation reference signal (DMRS) sequence initialization (DMRS SI) field.

If the type indicated by the transmission resource type field (for example, resourceAllocation) is a first type (for example, resourceAllocationType0) and all bits of the frequency transmission resource allocation field are 0 or a specific value or if the type indicated by the transmission resource type field (for example, resourceAllocation) is a second type (for example, resourceAllocationType1) and all bits of the frequency transmission resource allocation field are 1 or a specific value in the found third DCI format, the UE may not analyze bits or fields located thereafter by the Modulation and Coding Scheme (MCS) field, the New Data Indicator (NDI) field, the Redundancy Version (RV) field, the HARQ process number field, the antenna port field, or the DMRS Sequence Initialization (DMRS SI) field, but may consider and read the same as a bitmap field indicating switching or activation to the dormant BWP for each SCell or PSCell configured in the UE or indicating activation or switching from the dormant BWP to the normal BWP or bits indicating suspension or resumption of the cell group (or secondary cell group or the PSCell (or SCell) of the cell group (or secondary cell group) and apply information indicated by the bitmap. However, if the type indicated by the transmission resource type field (for example, resourceAllocation) is the first type (for example, resourceAllocationType0) and all bits of the frequency transmission resource allocation field are not 0 or not a specific value if the type indicated by the transmission resource type field (for example, resourceAllocation) is a second type (for example, resourceAllocationType1) and all bits of the frequency transmission resource allocation field are not 1 or not a specific value in the detected third DCI format, the UE may analyze bits or fields located thereafter by the Modulation and Coding Scheme (MCS) field, the New Data Indicator (NDI) field, the Redundancy Version (RV) field, the HARQ process number field, the antenna port field, or the DMRS Sequence Initialization (DMRS SI) field, and read and apply the same.

When the UE detects the third DCI field of the PDCCH, if the third DCI field is scrambled by a second UE identifier (for example, SPS-C-RNTI (or CS-RNTI)) or detected thereby, a special instruction indicating activation or release of periodic transmission resources configured in the UE may be transmitted when the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format.

Accordingly, if the type indicated by the transmission resource type field (for example, resourceAllocation) is a first type (for example, resourceAllocationType0) and all bits of the frequency transmission resource allocation field are 0 or a specific value or if the type indicated by the transmission resource type field (for example, resourceAllocation) is a second type (for example, resourceAllocationType1) and all bits of the frequency transmission resource allocation field are 1 or a specific value in the third DCI format only when the third DCI field of the PDCCH is detected through scrambling by the first UE identifier (for example, C-RNTI or MCS-C-RNTI), embodiment 1-3 proposes analysis of the fields thereafter by the bitmap indicating the dormant BWP operation for each SCell of the UE or bits indicating suspension or resumption of the cell group (or secondary cell group) or the PSCell (or SCell) of the cell group (or secondary cell group).

Further, the base station may configure a search space of PDCCH monitoring or a UE identifier (for example, C-RNTI or MCS-C-RNTI) for searching for the third DCI format within the active time 12-30 in the UE through the RRC message.

For example, as described above, the base station may transmit the third DCI format through PDCCH transmission resources of the active time 12-30 in the PCell or SpCell 12-01 as indicated by reference numeral 12-03, and the third DCI format may include a bitmap 12-04 indicating indication information for the dormant BWP of the third SCell groups configured in the UE or an indication of suspension or resumption of the cell group (or secondary cell group) or the PSCell (or SCell) of the cell group (or secondary cell group).

As described above, the first UE 12-10 applying information configured through the RRC message may monitor the PDCCH on the basis of (or through scrambling by) the first UE identifier (for example, C-RNTI or MCS-C-RNTI) which is an identifier configured within the active time 12-30 of the DRX cycle to search for the third DCI format from the base station in the search space as indicated by reference numeral 12-03. If the third DCI format 12-03 is detected and the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format 12-03 as indicated by reference numeral 12-20, the first UE may analyze fields thereafter by the bitmap indicating the dormant BWP operation for each SCell of the UE and read the bitmap 12-04 including indication information for the dormant BWP for a plurality of SCells (or SCell identifiers) configured in the first UE and a bit indicating suspension or resumption of the cell group (or secondary cell group) or the PSCell (or SCell) of the cell group (or secondary cell group).

When the proposed condition is met, the bitmap may have a fixed length, for example, 15 bits or 16 bits since the bitmap is analyzed to replace the MCS field, NDI field, RV field, HARQ process number field, antenna port field, or DMRS SI field of the related art.

In the bitmap mapping method according to embodiment 1-3, for example, a first bitmap method, each bit value of the bitmap may be mapped to and indicated by each SCell in an ascending order or a descending order of SCell identifier values of SCells configured in the first UE from a right bit (for example, from the Least Significant Bit (LSB)) of the bitmap or from a left bit (for example, from the Most Significant Bit (MSB)). In another method, in the first bitmap mapping method, each bit value of the bitmap may be mapped to and indicated by each SCell in an ascending order of SCell identifier values of SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a Master Cell Group (MCG) or a Secondary Cell Group (SCG)) configured in the first UE from a right bit (for example, from the Least Significant Bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in an ascending order of SCell identifier values of SCells of a cell group (a Master Cell Group (MCG) or a Secondary Cell Group (SCG)) configured in the first UE from a left bit (for example, from the Most Significant Bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells belonging to one cell group are mapped to the bitmap is that the number of SCells which can be configured in one UE is 32 and the bitmap is 15 bits or 16 bits.

In another method, in the first bitmap mapping method, each bit value of the bitmap may be mapped to and indicated by each SCell in a descending order of SCell identifier values of SCells of a cell group (a Master Cell Group (MCG) or a Secondary Cell Group (SCG)) configured in the first UE from a left bit (for example, from the Most Significant Bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells belonging to one cell group are mapped to the bitmap is that the number of SCells which can be configured in one UE is 32 and the bitmap is 15 bits or 16 bits. In the first DCI format of the PDCCH, a new bit may be defined and used as information indicating suspension or resumption of the cell group (or secondary cell group) or the PSCell (or SCell) of the cell group (or secondary cell group).

When the mapping rule from the left bit or the right bit of the bitmap is applied, it is possible to reduce the number of bitmaps which the UE should read, thereby enabling more rapid UE processing.

When bit values of the bitmaps 12-11, 12-12, 12-13, 12-14 and 12-15 are 0, the bit value of 0 may indicate switching to a dormant BWP or activation of a dormant BWP for each activated SCell corresponding to the bit (if a dormant BWP is configured or is included in a first SCell group or a second SCell group). In another method, when the bit values of the bitmaps are 0, the bit value of 0 may indicate switching to a dormant BWP or activation of a dormant BWP if a BWP activated for each activated SCell corresponding to the bit is not a dormant BWP (or is a normal BWP). If the dormant BWP is not configured in the activated SCell corresponding to the bit of the bitmap, the UE may ignore or may not read or apply the bit value.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP that is activated from the dormant state) or activation of the normal BWP (for example, the first active BWP that is activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. If the dormant BWP is not configured in the activated SCell corresponding to the bit of the bitmap, the UE may ignore or may not read or apply the bit value.

The UE may identify whether there is a bitmap including an indication for a cell group (or secondary cell group) or a BWP of a PSCell (or SCell) or the cell group (or secondary cell group) or an indication of suspension or resumption of the cell group and, when there is the bitmap, may switch or activate the BWP or suspend or resume the cell group according to the bit value for a cell group (or secondary cell group) indicated by each bit of the bitmap or a PSCell (or SCell) of the cell group (or secondary cell group). For example, when the bit of the bitmap indicates the cell group (or secondary cell group) or the PSCell (or SCell) of the cell group (or secondary cell group) and the bit value is 1 (or 0), the UE may resume or activate the cell group. When the bit value is 1 (or 0) and thus the cell group (or secondary cell group) or the PSCell (or SCell) of the cell group (or secondary cell group) should be switched or activated to a BWP which is not a dormant BWP or when the cell group should be resumed, if the cell group (or secondary cell group) or the PSCell (or SCell) of the cell group (or secondary cell group) is already in the activated state or the resumed state, the UE may not apply the bit value, may ignore the same, or may not read the same. For example, when the bit of the bitmap indicates the cell group (or secondary cell group) or the PSCell (or SCell) of the cell group (or secondary cell group) and the bit value is 0 (or 1), the UE may switch or activate the BWP of the cell group (or secondary cell group) or the PSCell (or SCell) of the cell group (or secondary cell group) to the dormant BWP or suspend or deactivate the cell group. When the bit value is 0 (or 1) and thus the cell group indicated by the bit or the PSCell (or SCell) of the cell group (or secondary cell group) should be switched or activated to the dormant BWP or when the cell group should be suspended, if the state of the SCell is the activated state among the SCell or the SCells belonging to the Scell group and the activated BWP is the dormant BWP, the bit value may not be applied, may be ignored, or may not be read and, if the cell group (or secondary cell group) or the PSCell (or SCell) of the cell group (or secondary cell group) is already in the suspended state or the deactivated state, the bit value may be applied, may be ignored, or may not be read.

Embodiment 1-3 is realized as described above, and the third DCI format of the PDCCH proposed in embodiment 1-3 may be used within the active time and is not accompanied by downlink transmission resources (for example, PDSCH) or uplink transmission resources (for example, PUSCH) for the PCell or SpCell of the UE. Accordingly, in embodiment 1-3, the UE may receive the third DCI format of the PDCCH and may not transmit ACK or NACK information (for example, HARQ ACK or NACK) for an indication in the third DCI format.

When embodiment 1-1, embodiment 1-2, or embodiment 1-3 is applied, if the downlink dormant BWP configured in the SCell or PSCell of the UE is not configured as a downlink default BWP (default DL BWP), a BWP deactivation timer for switching or transitioning the dormant BWP to the default BWP may not be used. This is because, when the default BWP is configured as a normal BWP which is not a dormant BWP, the dormant BWP is automatically switched to the normal BWP when the timer expires, and thus battery consumption due to PDCCH monitoring may be generated.

Figure 13:
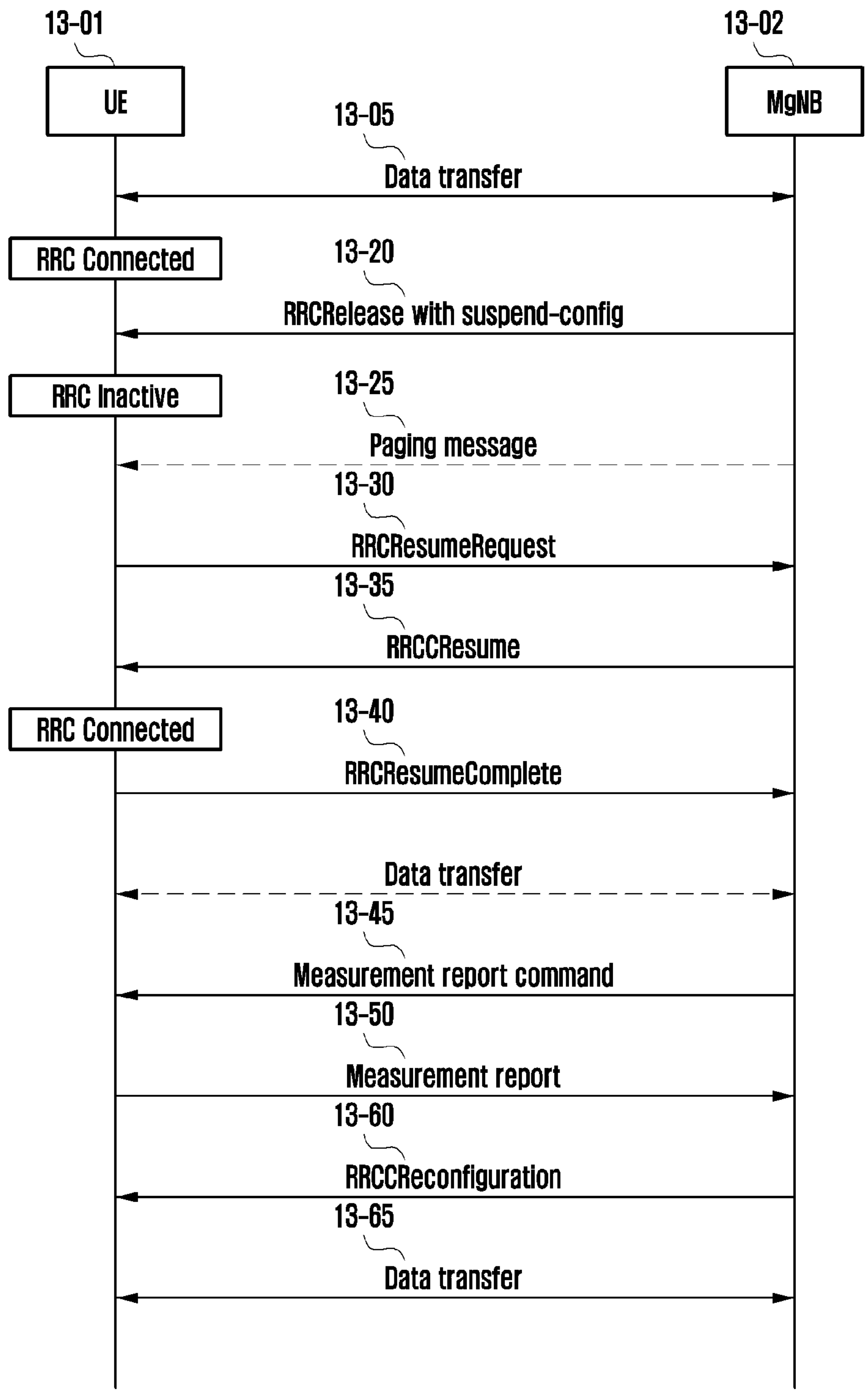
FIG. 13 is a sequence diagram illustrating Embodiment 1-4 for extending embodiment 1-1, embodiment 1-2, or embodiment 1-3 and applying the same to a UE in an RRC-inactive mode according to an embodiment of the disclosure.

FIG. 13 is a sequence diagram illustrating embodiment 1-4 for extending embodiment 1-1, embodiment 1-2, or embodiment 1-3 proposed in the disclosure and applying the same to a UE in an RRC-inactive mode according to an embodiment of the disclosure.

The embodiment 1-4 proposes continuous storage of SCell configuration information (for example, the configuration information described or proposed in FIG. 6) configured or stored for embodiment 1-1, embodiment 1-2, or embodiment 1-3 in the RRC-connected mode or PSCell (or SCell) configuration information of the cell group (for example, secondary cell group) as illustrated in FIG. 6 without releasing or discarding the configuration information even though the UE transitions to the RRC-inactive mode. Further, when performing an RRC connection resumption procedure, the UE in the RRC-inactive mode proposes determining whether to discard, release, maintain and apply, or reconfigure the stored SCell configuration information (for example, the configuration information described or proposed in FIG. 6) or PSCell (or SCell) configuration information of the cell group (for example, secondary cell group) through an indicator of an RRCResume message or an RRCReconfiguration message transmitted by the base station or through a reconfiguration procedure. When transmitting an RRCRelease message including a configuration or an indicator indicating transition to the RRC-inactive mode to the UE, the base station may also transmit an indicator or configuration information indicating whether to discard, release, maintain and apply, or reconfigure the SCell configuration information (for example, the configuration information described or proposed in FIG. 6) or PSCell (or SCell) configuration information of the cell group (for example, secondary cell group) stored in the RRCRelease message to the UE. When updating an RAN Notification Area (RNA) while moving in the RRC-inactive mode, the UE may receive and apply an indicator or configuration information indicating whether to discard, release, maintain and apply, or reconfigure the SCell configuration information (for example, the configuration information described or proposed in FIG. 6) or PSCell (or SCell) configuration information of the cell group (for example, secondary cell group) stored in the RRCRelease message transmitted from the base station to the UE.

In embodiment 1-4 proposed in the disclosure, the base station may allow the configuration of a first active BWP of downlink or uplink BWP configuration information of each cell as a dormant BWP in the SCell configuration information (for example, the configuration information described or proposed in FIG. 6) or PSCell (or SCell) configuration information of the cell group (for example, secondary cell group) of the RRC message and thus, when the UE activates each SCell, each cell group, or the PSCell of each cell group, the UE may directly operate each SCell, each cell group, or the downlink BWP or the uplink BWP of the PSCell of each cell group as the dormant BWP, thereby suspending or resuming the cell group and reducing UE battery consumption.

In embodiment 1-4 proposed in the disclosure according to another method, the base station may not configure a first active BWP of downlink or uplink BWP configuration information of each cell as a dormant BWP in the SCell configuration information (for example, the configuration information described or proposed in FIG. 6) or PSCell (or SCell) configuration information of the cell group (for example, secondary cell group) of the RRC message and thus, when the UE activates or resumes each SCell, each cell group, or the PSCell of each cell group, the UE may always activate each SCell, each cell group, or the downlink BWP or the uplink BWP of the PSCell of each cell group as the first active BWP and activate or switch to the dormant BWP by embodiment 1-1, embodiment 1-2, or embodiment 1-3 proposed in the disclosure or suspend or resume the cell group, thereby reducing UE battery consumption.

Further, embodiment 1-4 proposed above may be extended to configuration information of each SCell of a Master Cell Group (MCG) or a Secondary Cell Group (SCG) of the UE in which the dual connectivity is configured and then applied. That is, SCell configuration information or PSCell configuration information of the SCG may be stored when the UE transitions to the RRC-inactive mode, and an indicator or configuration information indicating whether to discard, release, maintain and apply, or reconfigure the SCell configuration information of the MCG or the SCG (for example, the configuration information described or proposed in FIG. 6) or the PSCell configuration information stored in the RRC message (for example, RRCResume, RRCReconfiguration, or RRCRelease) may be included and transmitted to the UE when the RRC connection resumption procedure is performed or the UE transitions to the RRC-inactive mode.

Referring to FIG. 13, a UE 13-01 makes a network connection with an MgNB 13-02 and transmit and receive data in operation 13-05. If the MgNB needs to transition the UE to the RRC-inactive mode for a predetermined reason, the MgNB may transmit an RRCRelease message 13-20 to transition the UE to the RRC-inactive mode. The MgNB may transmit the indicator or configuration information indicating whether to discard, release, maintain and apply, or reconfigure the SCell configuration information of the MCG or the SCG (for example, the configuration information described or proposed in FIG. 6) or PSCell (or SCell) configuration information of the cell group (for example, secondary cell group) stored in the RRC message (for example, RRCRelease) to the UE. In the case of the UE applying the dual connectivity, the MgNB may determine whether to stop or resume master cell group bearer configuration, RRC configuration information, or SCell configuration information of the MCG or the SCG, ask the secondary cell MgNB about whether to stop or resume the secondary cell group bearer configuration and the RRC configuration information, receive a response, and make a decision in operation. Further, the MgNB may configure a list of frequencies which the UE measures in the RRC-idle mode or the RRC-inactive mode, frequency measurement configuration information, or a period during which the frequency is measured in the RRCRelease message.

When the UE in the RRC-inactive mode receives a paging message during movement in operation 13-25, has a need to transmit uplink data, or has a need to update a RAN notification area, the UE may perform the RRC connection resumption procedure.

When the UE needs to configure the connection, the UE performs a random access procedure, and when an RRCResumeRequest message is transmitted to the MgNB, a proposed UE operation related to transmission of the message is described below in operation 13-30.

1. The UE identifies system information and, when the system information indicates transmission of a complete UE connection resume identifier (I-RNTI or a full resume ID), prepares transmission by inserting the stored complete UE connection resume identifier (I-RNTI) into the message. If the system information indicates transmission of a truncated UE connection resume identifier (truncated I-RNTI or a truncated resume ID), the UE configures the stored complete UE connection resume identifier (I-RNTI) as the truncated UE connection resume identifier (truncated resume ID) through a predetermined method and prepares transmission by inserting the configured truncated UE connection resume identifier into the message.
2. The UE restores RRC connection configuration information and security context information from stored UE context.
3. The UE updates a new KgNB security key corresponding to a master cell group on the basis of a current KgNB security key, a NextHop (NH) value, and an NCC value received and stored in the RRCRelease message.
4. Upon receiving an SCG-counter value (or sk-counter) in the RRCRelease message, the UE updates a new SKgNB security key corresponding to a secondary cell group on the basis of the KgNB security key and the SCG-counter value (or sk-counter).
5. The UE induces new security keys (K_RRCenc, K_RRC_int, K_UPint, and K_UPenc) to be used in an integrity protection and verification procedure and an encryption and decryption procedure using the newly updated KgNB security key.
6. Upon receiving the SCG-counter value (or sk-counter) in the RRCRelease message, the UE induces new security keys (K_RRCenc, K_RRC_int, K_UPint, and K_UPenc) to be used in an integrity protection and verification procedure and an encryption and decryption procedure using the newly updated SKgNB security key corresponding to the secondary cell group.
7. The UE prepares transmission by calculating a MAC-I and inserting the same into the message.
8. The UE resumes SRB1 (The UE should resume in advance since the UE will receive an RRCResume message through SRB1 in response to an RRCResumeRequest message to be transmitted).
9. The UE configures the RRCResumeRequest message and transmits the same to a lower layer device.
10. The UE resumes the integrity protection and verification procedure by applying the updated security keys and a previously configured algorithm to all bearers except for SRB0 and then apply integrity verification and protection to transmitted and received data (This is to increase reliability and security of data transmitted and received from SRB1 or DRBs in the future).
11. The UE resumes the integrity protection and verification procedure by applying the updated security keys and a previously configured algorithm to all bearers except for SRB0 and then apply integrity verification and protection to transmitted and received data (This is to increase reliability and security of data transmitted and received from SRB1 or DRBs in the future).
12. Upon receiving the SCG-counter value (or sk-counter) in the RRCRelease message, the UE resumes the integrity protection and verification procedure by applying the updated security keys and a previously configured algorithm to all bearers corresponding to the secondary cell group and then apply integrity verification and protection to transmitted and received data (This is to increase reliability and security of data transmitted and received from or DRBs in the future).
13. Upon receiving the SCG-counter value (or sk-counter) in the RRCRelease message, the UE resumes the encryption and decryption procedure by applying the updated security keys and a previously configured algorithm to all bearers (SCG terminated RBs) corresponding to the secondary cell group and then apply encryption and decryption to transmitted and received data (This is to increase reliability and security of data transmitted and received from DRBs in the future).

The UE operation proposed when the UE has a need to configure the connection, performs a random access procedure, transmits an RRCResumeRequest message to the MgNB, and receives an RRCResume message in response thereto is described below in operation 13-35. If the RRCResume message includes an indicator indicating a report on an effective frequency measurement result measured in the RRC-inactive mode to the UE, the UE may configure the frequency measurement result in an RRCResumeComplete message and report the same. Further, the MgNB may insert an indicator or configuration information indicating whether to discard, release, maintain and apply, or reconfigure SCell configuration information of the MCG or SCG} (for example, the configuration information described or proposed in FIG. 6) stored in the UE into the RRC message (for example, RRCResume) and transmit the same to the UE.

1. Upon receiving the message, the UE restores a PDCP state corresponding to the master cell group, resets a count value, and reestablishes PDCP layer devices of SRB2 corresponding to the master cell group and all DRBs (MCG terminated RBs).
2. Upon receiving the SCG-counter value (or sk-counter) in the message, the UE updates a new SKgNB security key corresponding to the secondary cell group on the basis of the KgNB security key and the SCG-counter value (or sk-counter). Further, the UE induces new security keys (K_RRCenc, K_RRC_int, K_UPint, and K_UPenc) to be used in an integrity protection and verification procedure and an encryption and decryption procedure using the newly updated KgNB security key corresponding to the second cell group.
3. If the message includes master cell group (masterCellgroup) configuration information,
   A. the UE executes and applies the master cell group configuration information included in the message. The master cell group information may contain configuration information of RLC layer devices belonging to the master cell group, a logical channel identifier, and a bearer identifier.
4. If the message includes bearer configuration information (radioBearerConfig),
   A. the UE executes and applies the bearer configuration information (radioBearerConfig) included in the message. The bearer configuration information (radioBearerConfig) may contain configuration information of PDCP layer devices for respective bearers, configuration information of SDAP layer devices, a logical channel identifier, and a bearer identifier.

5. If the message includes secondary cell group (secondaryCellgroup) configuration information,
   A. the UE executes and applies the secondary cell group configuration information included in the message. The secondary cell group information may contain configuration information of RLC layer devices belonging to the second cell group, a logical channel identifier, a bearer identifier, and the like.
6. If the message includes secondary bearer configuration information (radioBearerConfig),
   A. the UE executes and applies secondary bearer configuration information (radioBearerConfig) included in the message. The secondary bearer configuration information (radioBearerConfig) may contain configuration information of PDCP layer devices for respective bearers, configuration information of SDAP layer devices, a logical channel identifier, a bearer identifier, and the like.
7. The UE resumes SRB2 corresponding to the master cell group and all DRBs (MCG terminated RBs).
8. If the message includes frequency measurement configuration information (measConfig),
   A. the UE executes and applies the frequency measurement configuration information included in the message. That is, the frequency measurement may be performed according to the configuration.
9. The UE transitions to the RRC-connected mode.
10. The UE indicates that the RRC connection, which had been suspended, has been resumed to a higher layer device.
11. The UE configures an RRCResumeComplete message and transmits the same to a lower layer device in operation 13-40.

When the UE has bearer configuration information and UE text information for the suspended secondary cell group, the UE may perform frequency measurement on the basis of frequency configuration information configured in system information, the RRCRelease message, or the RRCResume message and, when there is an effective result, insert an indicator indicating the result into the RRCResumeComplete message, and transmit the same. Upon receiving the indicator, the MgNB instructs the UE to report the frequency measurement result in operation 13-45 when resumption of the carrier aggregation or the dual connectivity is needed and may receive a report on the frequency measurement result or receive the report on the frequency measurement result through the RRCResumeComplete message in operation 13-50. Upon receiving the frequency measurement result, the MgNB may ask the secondary cell MgNB about whether to resume bearer information for the suspended secondary cell group, receive a response thereto, make a decision, transmit an RRCReconfiguation message to the UE in operation 13-60, and indicate whether to resume or release bearers for the second cell group. Further, the MgNB may insert an indicator or configuration information indicating whether to discard, release, maintain and apply, or reconfigure SCell configuration information of the MCG or SCG (for example, the configuration information described or proposed in FIG. 6) stored in the UE into the RRC message (for example, RRCReconfiguration) and transmit the same to the UE. Data transfer begins in operation 13-65.

In embodiment 1-4 proposed in FIG. 13, the MgNB may allow the configuration of a first active BWP of downlink or uplink BWP configuration information of each cell as a dormant BWP in the SCell configuration information (for example, the configuration information described or proposed in FIG. 6) or PSCell (or SCell) configuration information of the cell group (for example, secondary cell group) of the RRC message and thus, when the UE activates each SCell or the PSCell of the cell group (for example, secondary cell group), the UE may directly operate the downlink BWP or the uplink BWP of the PSCell of each SCell or PSCell as the dormant BWP, thereby suspending or resuming the cell group and reducing UE battery consumption. For example, when the state of the SCell is configured as the activated state, the state of the cell group is configured as the activated state, the suspended state, or the deactivated state, or an indication indicating suspension or resumption of the cell group is configured in SCell configuration information or cell group configuration information of the RRC message (for example, RRCRelease, RRCResume, or RRCReconfiguration), a method of saving a UE battery may be used by activating, resuming, or suspending the SCell or PSCell if an indication indicating activation of the SCell is received in MAC control information proposed in the disclosure and directly activating a downlink BWP or an uplink BWP of the SCell or PSCell to a dormant BWP.

When the UE in the RRC-inactive mode transitions to the RRC-connected mode and the SCell configuration information or the PSCell (or SCell) configuration information of the cell group (for example, secondary cell group) proposed in the disclosure is reconstructed, applied, or reconfigured, switching or activation between BWPs may be performed or the BWP may be activated or applied for each activated SCell or the PSCell (or SCell) of the cell group according to embodiment 1-1, embodiment 1-2, embodiment 1-3, or embodiment 1-4 proposed in the disclosure. Further, embodiment 1-4 may be extended and applied when the handover is performed.

Figure 14:
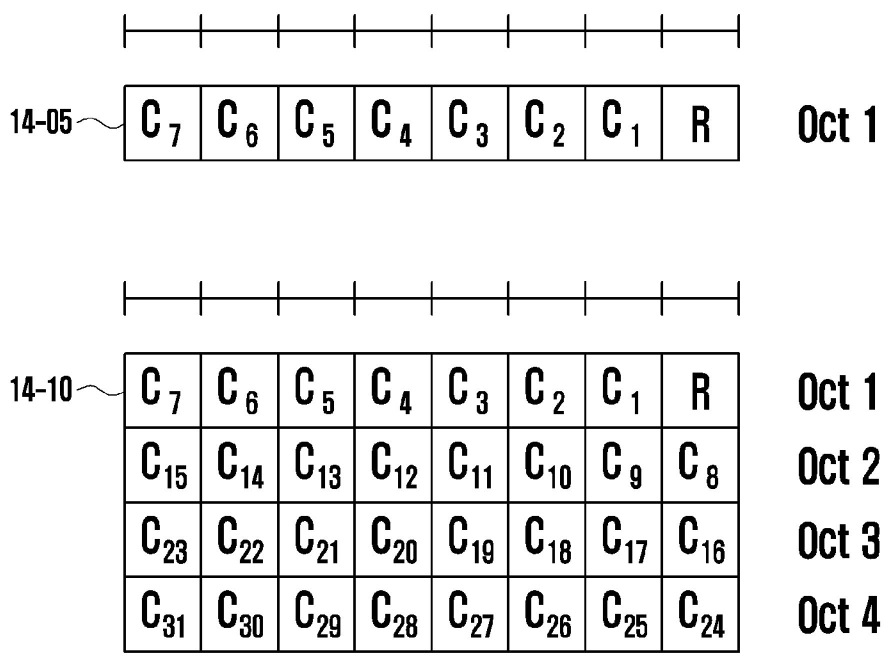
FIG. 14 illustrates MAC control information indicating state transition to an activated state (or resumed state), a dormant state (or suspended state), or a deactivated state for a cell, a cell of a cell group, or a cell group according to an embodiment of the disclosure.

When the UE receives an indication indicating suspension, resumption, activation, or deactivation of the cell group or the PSCell of the cell group by MAC control information proposed in embodiment 1-1, embodiment 1-2, embodiment 1-3, embodiment 1-4, or FIG. 14, a PHY layer device or a MAC layer device receiving the indication may transmit the indication to a higher layer device (for example, a MAC layer device, an RLC layer device, a PDCP layer device, or an RRC layer device). When receiving the indication (for example, cell group suspension, resumption, activation, or deactivation) from the lower layer device, the higher layer device may perform a procedure of a protocol layer device for cell group suspension, resumption, activation, or deactivation corresponding thereto. Alternatively, when the UE receives the indication of suspension, resumption, activation, or deactivation for the cell group or the PSCell of the cell group through the RRC message as in embodiment 1-4, the RRC layer device receiving the indication may transmit the indication to the lower layer device (for example, the PHY layer device, the MAC layer device, the RLC layer device, or the PDCP layer device). When receiving the indication (for example, cell group suspension, resumption, activation, or deactivation) from the higher layer device (for example, the RRC layer device), the lower layer device may perform a procedure of a protocol layer device for cell group suspension, resumption, activation, or deactivation corresponding thereto.

Various embodiments may be configured and implemented through combination or expansion of embodiment 1-1, embodiment 1-2, embodiment 1-3, or embodiment 1-4 proposed in the disclosure.

FIG. 14 illustrates MAC control information indicating state transition to an activated state (or resumed state), a dormant state (or suspended state), or a deactivated state for a cell, a cell of a cell group, or a cell group according to an embodiment of the disclosure.

Activated and deactivated MAC CEs proposed in the disclosure are merely an embodiment, may have the format illustrated in FIG. 14, and may be divided into a MAC CE format 14-05 having the size of 1 byte supporting 7 Scells and a MAC CE format 14-10 having the size of 4 bytes supporting 31 Scells. Further, the MAC CEs may have the following characteristics.

In the case in which a dormant MAC CE is not received and only activated and deactivated MAC CEs are received, the UE operates as described below.

Each field of the activated and deactivated MAC CEs indicates each Scell identifier, and a value corresponding to each field indicates whether the Scell is activated or deactivated. If a value of the indicator for the Scell indicated by the Scell identifier is 1, the Scell is activated only when the state of the Scell is the deactivated state. However, if the state of the Scell is a state other than the deactivated state, the indicator value may be ignored. If a value of an indicator for the Scell indicated by the Scell identifier is 0, the Scell may be deactivated. That is, if the value of the indicator for the Scell is 0, the Scell is deactivated regardless of the state of the Scell.

Further, it is possible to design a new MAC CE for supporting embodiments and extending to various embodiments or extend the MAC CE function of the related art.

For example, the MAC CEs proposed and described in FIG. 14 of the disclosure may be applied, or the function described in FIG. 14 of the disclosure may be extended and applied through expansion of a reserved bit (R bit) in the format 14-05 or 14-10 of FIG. 14.

For example, if the reserved bit (for example, R field) is configured as 0 (or 1), a 1-bit indicator (for example, C field) indicating an identifier of each cell (SCell) may be defined and used as described below. In another method, the reserved bit (for example, R field) configured as 0 (or 1) may indicate deactivation or suspension of the cell group (for example, secondary cell group). For example, a cell, a BWP, or a cell group in the deactivated state or the suspended state may be transitioned to the deactivated state or maintained, and a cell, a BWP, or a cell group in the activated state (or resumed state) may be transitioned to the deactivated state. The indicator may be transmitted to the higher layer device.

If the 1-bit indicator is configured as 0 (or 1), state transition of each cell (for example, SCell or SCell of the master or secondary cell group) or a BWP may be performed as described below.

A cell or BWP in the deactivated state is transitioned to the deactivated state or is maintained.

A cell or BWP in the activated state is transitioned to the deactivated state

If the 1-bit indicator is configured as 1, state transition of each cell (for example, SCell or SCell of the master or secondary cell group) or a BWP may be performed as described below.

A cell or BWP in the activated state is transitioned to the activated state or is maintained.

A cell or BWP in the deactivated state is transitioned to the activated state

If the reserved bit (R bit) is configured as 1 (or 0), the 1-bit indicator indicating the identifier of each cell (SCell) may be defined and used as described below. In another method, a logical identifier may be newly defined and a new MAC CE may be defined and used as described below. In another method, the reserved bit (for example, R field) configured as 1 (or 0) may indicate activation or resumption of the cell group (for example, secondary cell group). For example, a cell, a BWP, or a cell group in the activated state or the resumed state may be transitioned to the activated state or maintained, and a cell, a BWP, or a cell group in the deactivated state (or suspended state) may be transitioned to the activated state. The indicator may be transmitted to the higher layer device.

If the 1-bit indicator is configured as 0 (or 1), state transmission of each cell (for example, SCell or SCell of the master or secondary cell group) or a BWP may be performed as described below.

A cell or BWP in the deactivated state is transitioned to the deactivated state or is maintained.

A cell or BWP in the activated state is transitioned to the deactivated state

If the 1-bit indicator is configured as 1, state transition of each cell (for example, SCell or SCell of the master or secondary cell group) or a BWP may be performed as described below.

A cell or BWP in the activated state is transitioned to the activated state or is maintained.

A cell or BWP in the deactivated state is transitioned to the activated state

The MAC CE function described above by way of example may be variously expanded and designed to indicate state transition or switching of the cell or BWP and may be applied to the embodiments. For example, it is possible to design new MAC control information and the MAC control information may include a cell group identifier, a cell identifier, a BWP identifier, or bitmap information to indicate activation (resumption), hibernation (or suspension), or deactivation (or suspension) of a cell group, a cell, or a BWP.

Hereinafter, the disclosure proposes a procedure of reporting a power headroom.

In the disclosure, embodiment 1-1 of reporting a power headroom is described below.

In embodiment 1-1, a power headroom report procedure is used to provide the following information to a base station (serving gNB) serving the UE. The power headroom may indicate difference between a maximum transmission power (or a calculated or nominal maximum transmission power (nominal UE maximum transmit power)) which the UE can transmit in each activated serving cell (PCell, SCell, PSCell, or SpCell) and a power measured for uplink data transmission (UL-SCH) or Sounding Reference Signal (SRS) transmission or difference between a maximum transmission power which the UE can transmit and a power measured for PUCCH transmission and uplink data transmission in an SpCell (PCell or PSCell) of another MAC layer device (for example, LTE MAC or E-UTRA MAC). The power headroom may configure a power headroom value in MAC control information according to a power headroom report procedure and transmit the MAC control information through uplink transmission resources to report the same to the base station.

A first type power headroom is the difference between a maximum transmission power (or a calculated or nominal maximum transmission power (nominal UE maximum transmit power)) which the UE can transmit for the serving cell (PCell, SCell, PSCell, or SpCell) and a power measured for uplink data transmission (UL-SCH), and may be reported.

A second type power headroom is the difference between a maximum transmission power (or a calculated or nominal maximum transmission power (nominal UE maximum transmit power)) which the UE can transmit and a power measured for PUCCH transmission or uplink data transmission (UL-SCH) in the SpCell (PCell or PSCell) of another MAC layer device (for example, LTE MAC or E-UTRA MAC when dual connectivity is configured), and may be reported.

A third type power headroom is the difference between a maximum transmission power (or a calculated or nominal maximum transmission power (nominal UE maximum transmit power)) which the UE can transmit for each activated serving cell (PCell, SCell, PSCell, or SpCell) and a power measured for Sounding Reference Signal (SRS) transmission, and may be reported.

The UE may receive a configuration of configuration information for reporting the power headroom by the RRC message (for example, RRCReconfiguration) and the RRC layer device may control the power headroom report procedure by the following parameters.

A timer value (phr-PeriodicTimer) for periodically reporting a power headroom; the headroom report procedure may be triggered when, for example, a periodic power headroom report timer expires.

A timer value (phr-ProhibitTimer) for liming a power headroom report, for example, the headroom report procedure is not triggered when the power headroom report limit timer is running A threshold value (phr-Tx-PowerFactorChange) for triggering a power headroom report;

An indicator (phr-Type2OtherCell) indicating a second type power headroom report considering another cell or MAC layer device;

An indicator (phr-ModeOtherCG) indicating a power headroom report considering another cell group;

An indicator (multiplePHR) indicating a plurality of power headroom reports.

The parameters may be configured through the RRC message (for example, RRCReconfiguration) as illustrated in FIG. 6 of the disclosure.

The power headroom report procedure may be triggered when one event is generated or one condition is satisfied among the following conditions.

The power headroom report procedure is triggered when a power headroom limit timer (phr-ProhibitTimer) expires or has expired and a path loss for at least one activated serving cell of a MAC layer device is changed by a threshold value (phr-Tx-PowerFactorChange) dB configured in the RRC message. The path loss may be used as a path loss reference value when the MAC layer device has (or receives) uplink transmission resources for new transmission after the power headroom last transmitted by the MAC layer device.

The power headroom report procedure may be triggered when a periodic power headroom report timer expires.

The power headroom report procedure may be triggered when a power headroom report function is configured or reconfigured by a higher layer device (for example, the RRC layer device). The configuration or the reconfiguration may not be used to deactivate the power headroom report function.

The power headroom report procedure may be triggered when a cell in which an uplink of a MAC layer device is configured is activated.

The power headroom report procedure may be triggered when a PSCell is added, newly added, or modified (or when dual connectivity is configured, or a PSCell is newly added or modified).

The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.

The power headroom report procedure may be trigger when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives the uplink allocated for new transmission, the MAC layer device operates as follows.

1> If the uplink transmission resources are first uplink transmission resources allocated for new transmission after the last MAC reset procedure, 2> a periodic power headroom report timer for periodically reporting a power headroom starts.

1> If it is determined (or decided) that the power headroom report procedure has been triggered and has not canceled, and 1> if the allocated uplink transmission resources include MAC control information (MAC C or MAC Control Element) for reporting a power headroom configured to be transmitted by the MAC layer device and a sub header thereof (for example, MAC sub header) as the result of a Logical Channel Prioritization (LCP) procedure (for example, a procedure of allocating uplink transmission resources to data or MAC control information) or transmit the same, 2> if an indication (multiplePHR) indicating a plurality of power headroom reports is configured as (or configured to report) TRUE, 3> for each activated serving cell connected to a MAC layer device or configured in a MAC layer device and an uplink is configured therein, 4> a value of the first type power headroom or the third type power headroom for an uplink carrier (or frequency) corresponding to the cell is acquired (or calculated).

4> if the MAC layer device or the serving cell has or receives uplink transmission resources allocated for transmission for the serving cell, 4> alternatively, if another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device), 5> a maximum transmission power value (or a power value required for calculating a power headroom) corresponding to the serving cell is acquired from a physical layer device.

3> if an indicator (phr-Type2OtherCell) indicating a second type power headroom report considering another cell or MAC layer device is configured as (or configured to report) TRUE, 4> if another MAC layer device is an E-TURA MAC layer device, 5> a value for reporting the second type power headroom for the SpCell of another MAC layer device is acquired (or calculated).

5> if an indicator (phr-ModeOtherCG) indicating a power headroom report considering another cell group is configured as Real (or configured to report a real value) by a higher layer device (RRC layer device), 6> a maximum transmission power value (or a power value required for calculating a power headroom) for the SpCell of another MAC layer device (E-UTRA MAC layer device) is acquired from a physical layer device.

3> a multiplexing and assembly procedure (Multiplexing and Assembly procedure of the MAC layer device) is indicated to generate and transmit MAC control information reporting a plurality of power headrooms on the basis of the values reported from the physical layer device.

2> if an indicator (multiplePHR) indicating a plurality of power headroom reports is not configured as (or not configured to report) TRUE, one power headroom report is indicated, or one power headroom report format is used, 3> a first type power headroom value for an uplink carrier (or frequency) of the serving cell (or Pcell) is acquired (or calculated) from the physical layer device.

3> a maximum transmission power value (or a power value required for calculating a power headroom) corresponding to the serving cell is acquired from the physical layer device.

3> a multiplexing and assembly procedure (Multiplexing and Assembly procedure of the MAC layer device) is indicated to generate and transmit MAC control information reporting one power headroom on the basis of the values reported from the physical layer device.

2> a timer for periodically reporting a power headroom starts or restarts.

2> a timer for limiting a power headroom report starts or restarts.

2> all triggered power headrooms or power headroom report procedures are canceled.

The power headroom report procedure proposed in the disclosure is reported for each cell from the UE to the base station, and thus the base station may control or manage uplink transmission power of the UE. However, in the case of the cell (SCell), the serving cell, or the suspended (or deactivated) cell group or cell in which the dormant BWP proposed in the disclosure is configured, if the current or activated BWP (or downlink BWP) of the activated serving cell is the dormant BWP or is activated to a BWP indicated by a dormant BWP identifier, uplink data transmission or PUCCH transmission is not possible in the dormant BWP, or the suspended (or deactivated) cell group or cell even though a power headroom is reported for the cell (for example, PSCell or SCell) of the suspended (or deactivated) cell group, and thus an unnecessary power headroom report is performed.

Accordingly, in order to reduce an unnecessary processing load of the UE and prevent transmission resource waste due to the unnecessary power headroom report, the disclosure proposes a procedure in which the UE first identifies whether the cell is activated or deactivated and then identifies whether an activated BWP (for example, downlink BWP) of the activated cell is the dormant BWP (or a BWP having a dormant BWP identifier configured by the RRC message) or is not the dormant BWP (or is not a BWP having a dormant BWP identifier configured by the RRC message) or whether the cell group or the cell (for example, PSCell) is suspended (or deactivated) or activated (or resumed) with respect to the activated cell. In another method, the UE may perform a procedure of first identifying whether the cell is activated or deactivated and then identifying whether, an activated BWP (for example, downlink BWP) of the activated cell is a dormant BWP (or a BWP having a dormant BWP identifier configured by the RRC message) or it not the dormant BWP (or is not a BWP having a dormant BWP identifier configured by the RRC message) with respect to the activated cell in which a dormant BWP is configured (for example, if a dormant BWP identifier is configured for the cell by the RRC message), and may omit the procedure of identifying the activated BWP with respect to the activated cell in which the dormant BWP is not configured.

In the case of the cell (SCell) or the serving cell in which the dormant BWP is configured in the proposed procedure, if the current or activated BWP (or downlink BWP) of the activated serving cell is the dormant BWP or is activated to a BWP indicated by a dormant BWP identifier or if the cell group of cell (for example, PSCell or SCell) is suspended (or deactivated), the power headroom report procedure is not triggered and the power headroom is not reported even through the power headroom report procedure is triggered by another cell. In another method, in the case of the cell (SCell) or the serving cell in which the dormant BWP is configured, only when the current or activated BWP (or downlink BWP) of the activated serving is not the dormant BWP or is not activated to the BWP indicated by the dormant BWP identifier or if the cell group or the cell (for example, PSCell or SCell) is not suspended (or is not deactivated, is activated, or is resumed), the power headroom report procedure is triggered. Even through the power headroom report procedure is triggered by another cell, the power headroom may be reported only when the current or activated BWP (or downlink BWP) of the activated serving cell is not the dormant BWP or is not activated to the BWP indicated by the dormant BWP identifier or when the cell group or the cell (for example, PSCell or SCell) is not suspended (or is not deactivated, is activated, or is resumed). Accordingly, the procedure proposed in the disclosure may allow the UE to reduce the unnecessary processing load and prevent transmission resource waste due to the unnecessary power headroom report. A detailed embodiment of the proposed procedure is described in embodiment 1-2 considering the dormant BWP below.

In embodiment 1-2 considering the dormant BWP, the power headroom report procedure is used to provide the following information to a base station (serving gNB) serving the UE in the disclosure. The power headroom may indicate difference between a maximum transmission power (or a calculated or nominal maximum transmission power (nominal UE maximum transmit power)) which the UE can transmit in each activated serving cell (PCell, SCell, PSCell, or SpCell) and a power measured for uplink data transmission (UL-SCH) or Sounding Reference Signal (SRS) transmission or difference between a maximum transmission power which the UE can transmit and a power measured for PUCCH transmission and uplink data transmission in an SpCell (PCell or PSCell) of another MAC layer device (for example, LTE MAC or E-UTRA MAC). The power headroom may configure a power headroom value in MAC control information according to a power headroom report procedure and transmit the MAC control information through uplink transmission resources to report the same to the base station.

- A first type power headroom is the difference between a maximum transmission power (or a calculated or nominal maximum transmission power (nominal UE maximum transmit power)) which the UE can transmit for the serving cell (PCell, SCell, PSCell, or SpCell) and a power measured for uplink data transmission (UL-SCH), and may be reported.
- A second type power headroom is the difference between a maximum transmission power (or a calculated or nominal maximum transmission power (nominal UE maximum transmit power)) which the UE can transmit and a power measured for PUCCH transmission or uplink data transmission (UL-SCH) in the SpCell (PCell or PSCell) of another MAC layer device (for example, LTE MAC or E-UTRA MAC when dual connectivity is configured), and may be reported.
- A third type power headroom is the difference between a maximum transmission power (or a calculated or nominal maximum transmission power (nominal UE maximum transmit power)) which the UE can transmit for each activated serving cell (PCell, SCell, PSCell, or SpCell) and a power measured for Sounding Reference Signal (SRS) transmission, and may be reported.

Embodiment 1-2 of the power headroom report procedure considering the dormant BWP proposed in the disclosure is described below.

The UE may receive a configuration of configuration information for reporting the power headroom by the RRC message (for example, RRCReconfiguration) and the RRC layer device may control the power headroom report procedure by the following parameters in embodiment 1-2.

- When a timer value (phr-PeriodicTimer) for periodically reporting a power headroom, for example, a periodic power headroom report timer expires, the headroom report procedure may be triggered.
- A timer value (phr-ProhibitTimer) for liming a power headroom report; for example, the headroom report procedure is not triggered when the power headroom report limit timer is running;
- A threshold value (phr-Tx-PowerFactorChange) for triggering a power headroom report;
- An indicator (phr-Type2OtherCell) indicating a second type power headroom report considering another cell or MAC layer device;
- An indicator (phr-ModeOtherCG) indicating a power headroom report considering another cell group;
- An indicator (multiplePHR) indicating a plurality of power headroom reports.

The parameters may be configured through the RRC message (for example, RRCReconfiguration) as illustrated in FIG. 6 of the disclosure.

In embodiment 1-2 of the power headroom report procedure considering the dormant BWP proposed in the disclosure, the power headroom report procedure may be triggered when one event is generated or one condition is satisfied among the following conditions.

- The power headroom report procedure is triggered when the power headroom limit timer (phr-ProhibitTimer) expires or had expired, a BWP (or downlink BWP) of an activated serving cell of a MAC layer device is activated, or a path loss is changed by a configured threshold value (phr-Tx-PowerFactorChange) dB configured by the RRC message for at least one activated serving cell in which the activated BWP (or downlink BWP) is not the dormant BWP or an activated BWP (or downlink BWP) of the activated serving cell or the current BWP (or activated current downlink BWP) is not the dormant BWP. The path loss may be used as a path loss reference value when the MAC layer device has (or receives) uplink transmission resources for new transmission after the power headroom last transmitted by the MAC layer device.
- The power headroom report procedure may be triggered when a periodic power headroom report timer expires.
- The power headroom report procedure may be triggered when a power headroom report function is configured or reconfigured by a higher layer device (for example, the RRC layer device). The configuration or the reconfiguration may not be used to deactivate the power headroom report function.
- The power headroom report procedure may be triggered when a cell in which an uplink of a MAC layer device is configured is activated and a first active downlink BWP (or first active downlink BWP identifier (firstActiveDownlinkBWP-Id)) configured in the cell is not configured as the dormant BWP.
- The power headroom report procedure may be triggered when a PSCell, a cell group, or a cell is added, newly added, or modified (or when dual connectivity is configured and a PSCell of an SCG is newly added or modified), or the PSCell, the cell group, or the cell is activated or resumed.
- In another method, the power headroom report procedure may be triggered when the PSCell is added, newly added, or modified (or when dual connectivity is configured and a PSCell of an SCG is newly added or modified), the PSCell, the cell group, or the cell is activated or resumed, and the first active downlink BWP (or first active downlink BWP identifier (firstActiveDownlinkBWP-Id)) configured in the cell is not configured as the dormant BWP.
- The power headroom report procedure may be triggered when a power headroom limit timer (phr-ProhibitTimer) expires or has expired, the MAC layer device has (or receives) uplink transmission resources for new transmission, and the following condition is achieved or satisfied for an activated serving cell in which an uplink of a MAC layer device is configured.
  - The power headroom report procedure may be trigger when the condition is satisfied, that is, when required power backoff due to power management (for example, in order to reduce interference of another frequency or in order to prevent a harmful influence to human body) for the cell is changed by a configured threshold value (phr-Tx-PowerFactorChange) dB configured by the RRC message after the last transmitted power headroom when there are PUCCH transmission or uplink transmission resources allocated for transmission in the cell, the MAC layer device has PUCCH transmission or uplink resources for transmission.

The power headroom report procedure may be triggered when an uplink BWP (UL BWP) is activated (or activation to first active uplink BWP is performed) or a MAC layer device switches or activate a downlink BWP (or an activated BWP or a current BWP (or downlink BWP)) of an activated SCell in which an uplink is configured from the dormant BWP to a normal BWP (or a BWP which is not the dormant BWP (non-dormant BWP)) or to a BWP (firstActiveNonDormantDownlinkBWP-Id or a BWP indicated by an identifier of the BWP which is not the dormant BWP) which is not the dormant BWP first activated from the dormant state configured by the RRC message.

The power headroom report procedure may be triggered when a MAC layer device activates a downlink BWP (or an activated BWP or a current BWP (or downlink BWP)) of an activated SCell in which an uplink is configured to a BWP indicated by an identifier (firstOutsideActiveTimeBWP-Id or firstWithinActiveTimeBWP-Id) of a BWP first activated from the dormant state configured by the RRC message. As described above, activating the BWP may be indicated by the PDCCH DCI.

The power headroom report procedure may be triggered when an uplink BWP (UL BWP) is activated (or activation to a first active uplink BWP is performed), a MAC layer device switches or activates a downlink BWP (or an activated BWP or a current BWP (or downlink BWP)) of an activated SCell in which an uplink is configured from a dormant BWP to a normal BWP (or a BWP which is not the dormant BWP (non-dormant BWP)) or to a BWP (a BWP indicated by firstActiveNonDormantDownlinkBWP-Id, firstOutsideActiveTimeBWP-Id, firstWithinActiveTimeBWP-Id, or an identifier of the BWP which is not the dormant BWP) which is not the dormant BWP first activated from the dormant state configured by the RRC message, or first SRS configuration information or second SRS configuration information is configured (or if the activated BWP (or downlink BWP) or the current BWP (or activated current downlink BWP) of the activated serving cell is the dormant BWP and the first SRS configuration information or the second SRS configuration information is configured).

The power headroom report procedure is triggered when the power headroom limit timer (phr-ProhibitTimer) expires or has expired, a BWP (or downlink BWP) of an activated serving cell of a MAC layer device is activated, an activated BWP (or downlink BWP) is not the dormant BWP, an activated BWP (or downlink BWP) of an activated serving cell or a current BWP (or activated current downlink BWP) is not the dormant BWP, the first SRS configuration information or the second SRS configuration information is configured (or if the activated BWP (or downlink BWP) of the activated serving cell or the current BWP (or the activated current downlink BWP) is the dormant BWP and the first SRS configuration information or the second SRS configuration information is configured), or a path loss is changed by a configured threshold value (phr-Tx-PowerFactorChange) dB configured by the RRC message for at least one activated serving cell. The path loss may be used as a path loss reference value when the MAC layer device has (or receives) uplink transmission resources for new transmission after the power headroom last transmitted by the MAC layer device.

Hereinafter, the disclosure proposes an operation of the MAC layer device when one or a plurality of events are generated or one or a plurality of conditions are satisfied among the proposed conditions and the power headroom report procedure is triggered.

If the MAC layer device has or receives an uplink allocated for new transmission, the MAC layer device operates as follows.

1> If the uplink transmission resources are first uplink transmission resources allocated for new transmission after the last MAC reset procedure, 2> a periodic power headroom report timer for periodically reporting a power headroom starts.

1> If it is determined (or decided) that the power headroom report procedure has been triggered and has not canceled, and 1> if the allocated uplink transmission resources include MAC control information (MAC C or MAC Control Element) for reporting a power headroom configured to be transmitted by the MAC layer device and a sub header thereof (for example, MAC sub header) as the result of a Logical Channel Prioritization (LCP) procedure (for example, a procedure of allocating uplink transmission resources to data or MAC control information) or transmit the same, 2> if an indication (multiplePHR) indicating a plurality of power headroom reports is configured as (or configured to report) TRUE, 3> for each activated serving cell connected to a MAC layer device or configured in a MAC layer device and an uplink is configured therein, 3> if the BWP (or downlink BWP) of the activated serving cell is activated, the activated BWP (or downlink BWP) is not the dormant BWP, the activated BWP (or downlink BWP) of the activated serving cell or the current BWP (or activated current downlink BWP) is not the dormant BWP, or the cell group or the cell (for example, PSCell) is not suspended or deactivated, 3> alternatively, if the BWP (or downlink BWP) of the activated serving cell is activated, the activated BWP (or downlink BWP) is not the dormant BWP, the activated BWP (or downlink BWP) of the activated serving cell or the current BWP (or activated current downlink BWP) is not the dormant BWP, the cell group or the cell (for example, PSCell) is not suspended or deactivated, or the first SRS configuration information or the second SRS configuration information is configured (or if the activated BWP (or downlink BWP) of the activated serving cell or the current BWP (or activated current downlink BWP) is the dormant BWP and the first SRS configuration information or the second SRS configuration is configured), 4> a value of the first type power headroom or the third type power headroom for an uplink carrier (or frequency) corresponding to the cell is acquired (or calculated).

4> if the MAC layer device or the serving cell has or receives uplink transmission resources allocated for transmission for the serving cell, 4> alternatively, when another MAC layer device is configured or another MAC layer device has or receives uplink transmission resources allocated for transmission for the serving cell and an indicator (phr-ModeOtherCG) indicating a power headroom report considering another cell group is configured as Real (or configured to report a real value) by a higher layer device (RRC layer device), 5> a maximum transmission power value (or a power value required for calculating a power headroom) corresponding to the serving cell is acquired from a physical layer device.

3> if an indicator (phr-Type2OtherCell) indicating a second type power headroom report considering another cell or MAC layer device is configured as (or configured to report) TRUE;

4> if another MAC layer device is an E-TURA MAC layer device,

5> a value for reporting the second type power headroom for the SpCell of another MAC layer device is acquired (or calculated).

5> if an indicator (phr-ModeOtherCG) indicating a power headroom report considering another cell group is configured as Real (or configured to report a real value) by a higher layer device (RRC layer device), 6> a maximum transmission power value (or a power value required for calculating a power headroom) for the SpCell of another MAC layer device (E-UTRA MAC layer device) is acquired from a physical layer device.

3> a multiplexing and assembly procedure (Multiplexing and Assembly procedure of the MAC layer device) is indicated to generate and transmit MAC control information reporting a plurality of power headrooms on the basis of the values reported from the physical layer device.

2> if an indicator (multiplePHR) indicating a plurality of power headroom reports is not configured as (or not configured to report) TRUE, one power headroom report is indicated, or one power headroom report format is used, 3> a first type power headroom value for an uplink carrier (or frequency) of the serving cell (or Pcell) is acquired (or calculated) from the physical layer device.

3> a maximum transmission power value (or a power value required for calculating a power headroom) corresponding to the serving cell is acquired from the physical layer device.

3> a multiplexing and assembly procedure (Multiplexing and Assembly procedure of the MAC layer device) is indicated to generate and transmit MAC control information reporting one power headroom on the basis of the values reported from the physical layer device.

2> a timer for periodically reporting a power headroom starts or restarts.

2> a timer for limiting a power headroom report starts or restarts.

2> all triggered power headrooms or power headroom report procedures are canceled.

Figure 15:
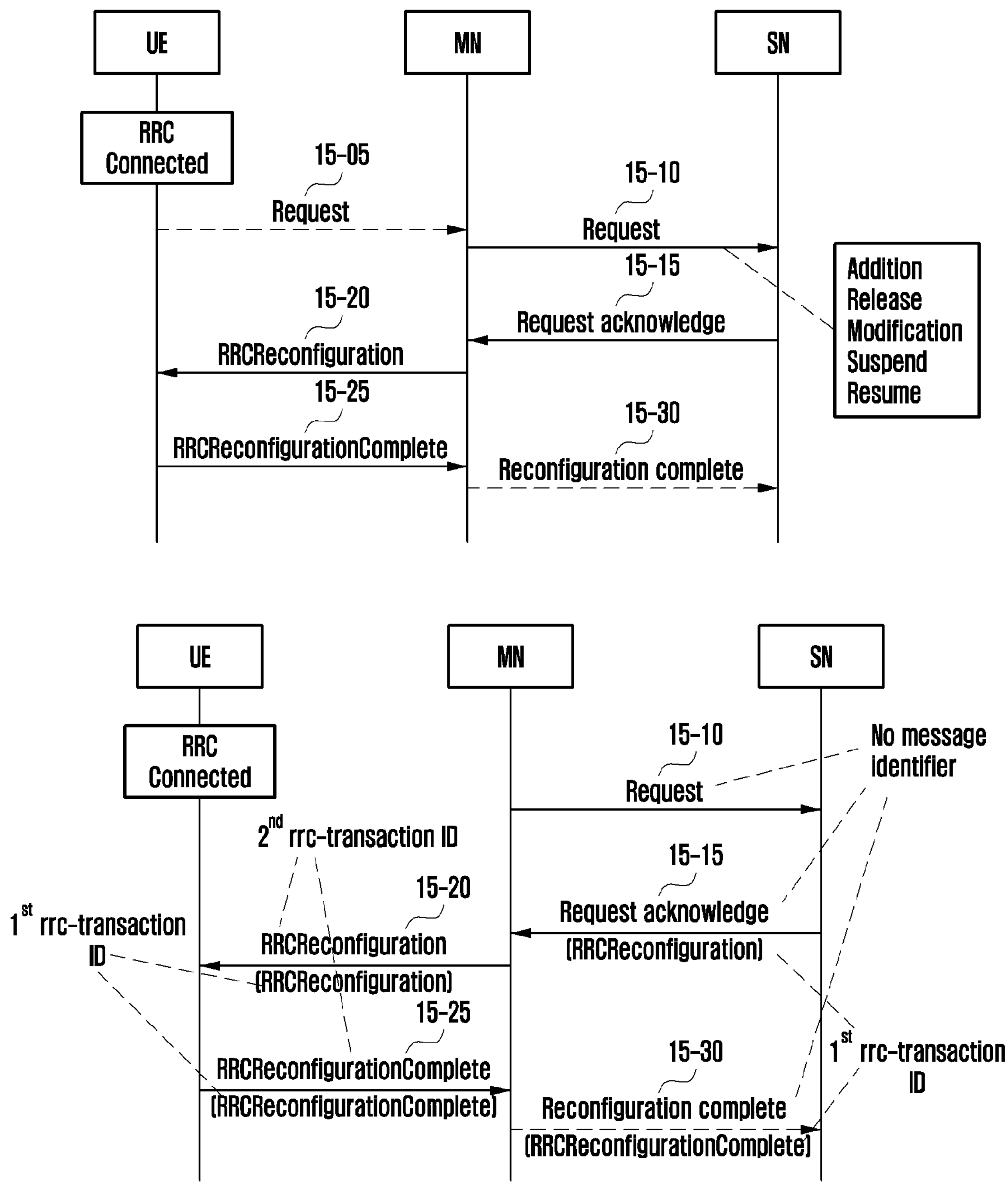
FIG. 15 is a sequence diagram illustrating a first signaling procedure of configuring or releasing dual connectivity or activating, resuming, suspending, or deactivating a secondary cell group through the dual connectivity according to an embodiment of the disclosure.
Figure 16:
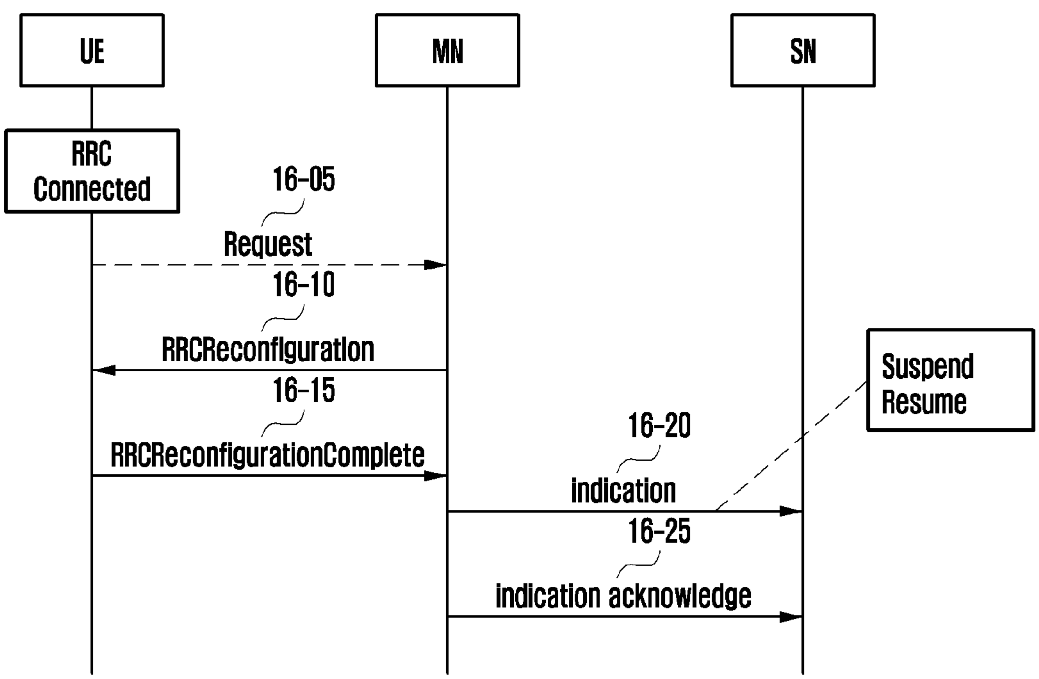
FIG. 16 is a sequence diagram illustrating a second signaling procedure of configuring or releasing dual connectivity or configuring, releasing, activating, resuming, suspending, or deactivating a secondary cell group configured by the dual connectivity according to an embodiment of the disclosure.
Figure 17:
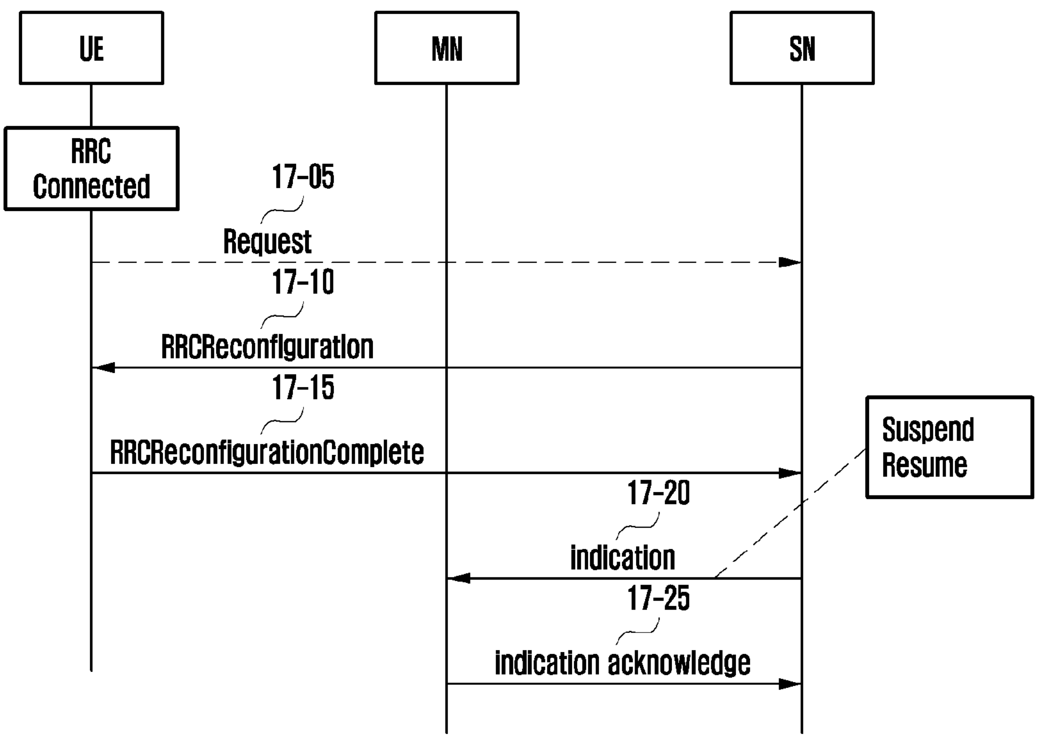
FIG. 17 is a sequence diagram illustrating a third signaling procedure of configuring or releasing dual connectivity or configuring, releasing, activating, resuming, suspending, or deactivating a secondary cell group configured by the dual connectivity according to an embodiment of the disclosure.

FIGS. 15 to 17 propose a signaling procedure of configuring or releasing dual connectivity or activating, resuming, suspending, or deactivating a secondary cell group through the dual connectivity in the next-generation mobile communication system of the disclosure.

FIG. 15 is a sequence diagram illustrating a first signaling procedure of configuring or releasing dual connectivity or activating, resuming, suspending, or deactivating a secondary cell group through the dual connectivity according to an embodiment of the disclosure.

Referring to FIG. 15, as illustrated in FIG. 6 of the disclosure, the UE may establish an RRC connection with the network or the base station and transmit or receive data to or from the base station (for example, a master cell group, a Master Node (MN), or an MCG, or cells (PCell or SCell) of the master cell group).

The base station may configure dual connectivity in the UE for a predetermined reason (for example, when a high data transmission rate is required, by a request from the UE in operation 15-05, or when a high QoS requirement should be satisfied). For example, the UE may make a request for configuring, releasing, activating, deactivating, resuming, or suspending the dual connectivity, the cell group (for example, secondary cell group), or the cell to the base station, and the request message may include a frequency (or channel) measurement result report, a cell group identifier, cell identifiers, or measurement results in operation 15-05. In another method, the base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The master base station (Master Node (MN) or Master Cell Group (MCG)) may receive a frequency or channel measurement report for each frequency or channel received from the UE and determine a secondary base station (Secondary Node (SN) or Secondary Cell Group (SCG)) to configure dual connectivity therein on the basis of the measurement report. Alternatively, the master base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers. In order to configure, release, add, deactivate, activate, resume, modify, reconfigure, or suspend the dual connectivity, the cell group (for example, secondary cell group), or the cell, the master base station may transmit a message to request for configuring or adding a secondary cell group of the UE to the determined secondary base station through an Xn interface (for example, interface between base stations) or an Sn interface (interface between the base station and an AMF or UMF or interface between base stations) in operation 15-10. For the request message, each separate new request message may be defined and used to configure, release, add, deactivate, activate, resume, modify, reconfigure, or suspend the dual connectivity, the cell group (for example, secondary cell group), or the cell, or, in another method, a new indicator may be defined in the existing message (for example, SN addition request message, SN modification request message, SN release request message, or the like) to indicate (make a request for) configuring, releasing, adding, deactivating, activating, resuming, modifying, reconfiguring, or suspending the dual connectivity, the cell group (for example, secondary cell group), or the cell to the secondary base station. The request message may include information such as cell group configuration information (for example, master cell group configuration information), bearer configuration information, UE capability information, or UE frequency (or channel) measurement result information, currently configured in the UE, and when configuring the secondary cell group in the UE with reference to the information, the secondary base station may configure secondary cell group configuration information or bearer configuration information suitable for the UE capability, not to exceed the UE capability, or suitable for bearer configuration information of the master cell group.

When the secondary base station receiving the request message in operation 15-10 rejects the request message of operation 15-10, the secondary base station may configure a rejection message and transmit the same to the master base station through the Xn interface (for example, interface between base stations) or the Sn interface (interface between the base station and the AMF or UMF or between base stations) in operation 15-15. When the secondary base station accepts the request message, the secondary base station may transmit a request acceptance (or request acknowledgement) message including configuration information or an indicator for configuring, releasing, adding, deactivating, activating, resuming, modifying, reconfiguring, or suspending the dual connectivity, the cell group (for example, secondary cell group), or the cell to the master base station through the Xn interface (for example, interface between base stations) or the Sn interface (interface between the base station and the AMF or UMF or interface between base stations) in operation 15-15. The request acceptance message may include some pieces of the following information.

An identifier which is the same as a message identifier included in the request message or an indicator indicating acceptance of the request contained in the request message Configuration information or an indicator (for example, configuration information or an indicator for a master cell group) for configuring, releasing, adding, deactivating, activating, resuming, modifying, reconfiguring, or suspending the dual connectivity, the cell group (for example, secondary cell group), or the cell A first RRC message (for example, RRCReconfiguration message) including configuration information or an indicator for configuring, releasing, adding, deactivating, activating, resuming, modifying, reconfiguring, or suspending the dual connectivity, the cell group (for example, secondary cell group), or the cell The first RRC message may include some pieces of the following information.

A first RRC message identifier (for example, rrc-Transaction identifier) for identifying the first RRC message. Since the UE and the base station (for example, secondary base station) transmit or receive a plurality of RRC messages, an identifier for identifying each RRC message may be inserted into the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same first RRC message identifier.

Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell An indicator indicating a state of the cell group (for example, activation, deactivation, suspension, or resumption)

A cell group identifier for identifying a cell group (The cell group identifier may be allocated by the master base station, or one of the pre-appointed identifiers may be allocated by the secondary base station)

Cell group or cell configuration information

Bearer configuration information (for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device))

A first indicator (for example, mobilityControllnfor or ReconfigurationWithSync) also may be included if the configuration information or the indicator for configuring, adding, activating, resuming, modifying, or reconfiguring the dual connectivity, the cell group (for example, secondary cell group), or the cell is included. However, the first indicator (for example, mobilityControllnfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification.

Random access configuration information also may be included if the configuration information or the indicator for configuring, adding, activating, resuming, modifying, or reconfiguring the dual connectivity, the cell group (or secondary cell group), or the cell is included. However, the random access configuration information may not be included if the configuration information or the indicator for releasing, deactivating, reconfiguring, or suspending the dual connectivity, the cell group (or secondary cell group), or the cell is included. The random access configuration information may include random access transmission resource information (time or frequency transmission resources) for transmitting a preamble for the cell group or the cell or predetermined preamble information.

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an $n^{th}$ time unit, activate, resume, deactivate, or suspend the cell in an $(n+X)^{th}$ time unit)

When the master base station receives the request acceptance message of operation 15-15, the master base station may identify the request acceptance message and transmit a second RRC message (for example, RRCReconfiguration) including information included in the request acceptance message (for example, the first RRC message included in the request acceptance message of operation 15-15) to the UE in operation 15-20. The second RRC message may include some pieces of the following information.

A second RRC message identifier (for example, rrc-Transaction identifier) for identifying the second RRC message. Since the UE and the base station transmit or receive a plurality of RRC messages, an identifier for identifying each RRC message may be included in the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same second RRC message identifier.

The first RRC message included in the request acceptance (or request acknowledgement) message of operation 15-15

Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell An indicator indicating a state of the cell group (for example, activation, deactivation, suspension, or resumption)

A cell group identifier for identifying a cell group. The cell group identifier may be allocated by the master base station, or one of the pre-appointed identifiers may be allocated by the secondary base station.

Cell group or cell configuration information

Bearer configuration information, for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device)

A first indicator (for example, mobilityControllnfor or ReconfigurationWithSync) also may be included if the configuration information or the indicator for configuring, releasing, adding, deactivating, activating, resuming, modifying, reconfiguring, or suspending the dual connectivity, the cell group (for example, secondary cell group), or the cell is included. However, the first indicator (for example, mobilityControllnfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

Random access configuration information also may be included if the configuration information of the indicator for configuring, adding, activating, resuming, modifying, or reconfiguring the dual connectivity, the cell group (for example, secondary cell group), or the cell. However, the random access configuration information may not be included if the configuration information or the indicator for releasing, deactivating, reconfiguring, or suspending the dual connectivity, the cell group (or secondary cell group), or the cell. The random access configuration information may include random access transmission resource information (time or frequency transmission resources) for transmitting a preamble for the cell group or the cell or predetermined preamble information.

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an $n^{th}$ time unit, activate, resume, deactivate, or suspend the cell in an $(n+X)^{th}$ time unit)

When receiving the second RRC message of operation 15-20, the UE may read and identify the second RRC message or read information (for example, the first RRC message included in the second RRC message) included in the second RRC message and configure, add, modify, resume, suspend, or deactivate the dual connectivity or the cell group (for example, secondary cell group). When the first indicator triggering the random access procedure is included in the second RRC message or the first RRC message, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information. If there is no random access information in the RRC message, the random access procedure (for example, contention-based random access procedure (for example, 4-step random access or 2-step random access)) may be performed. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

The UE may receive the second RRC message in operation 15-20 or apply the received configuration information, generate a third RRC message in operation 15-25 or a fourth RRC message, and transmit the same to the base station in operation 15-25. The third RRC message may include some pieces of the following information.

A second RRC message identifier having a value which is the same as the second RRC message identifier included in the second RRC message An indicator or an identifier indicating successful reception of the second RRC message A fourth RRC message including a response indicating successful reception of the first message generated and transmitted by the secondary base station. The fourth RRC message may include some pieces of the following information.

A first RRC message identifier having a value which is the same as the first RRC message identifier included in the first RRC message An indicator or an identifier indicating successful reception of the first RRC message A response indicator indicating successful application of the first RRC message When receiving the third RRC message, the base station (for example, master base station) may identify whether the third RRC message is a response message of the second RRC message through the second identifier. The base station may identify the fourth RRC message included in the third RRC message, insert the fourth RRC message into a setup completion message including an indication of configuration completion to the secondary cell group base station, and transmit the configuration completion message to the secondary base station through the Xn interface (for example, interface between base stations) or the Sn interface (interface between the base station and the AMF or UMF or between base stations) in operation 15-30. The configuration completion message may include some pieces of the following information.

The fourth RRC message included in the third RRC message

An indicator or an identifier indicating completion of the configuration (cell group addition, modification, or release) or indication (cell group activation, deactivation, suspension, or resumption) indicated by the request acceptance message or the first RRC message When receiving the configuration completion message, the base station (for example, secondary base station) may read or identify the fourth RRC message included in the configuration completion message and identify whether the fourth RRC message is a response message of the first RRC message through the first identifier. Further, it may be identified whether the configuration or indication indicated by the base station is completed. When receiving the configuration completion message or the fourth RRC message, the secondary base station may transmit a response message indicating reception of the configuration completion message or the fourth RRC message to the master base station.

FIG. 16 is a sequence diagram illustrating a second signaling procedure of configuring or releasing a dual connectivity or configuring, releasing, activating, resuming, suspending, or deactivating a secondary cell group configured by the dual connectivity according to an embodiment of the disclosure.

Referring to FIG. 16, as illustrated in FIG. 6 of the disclosure, the UE may establish an RRC connection with the network or the base station and transmit or receive data to or from the base station (for example, a master cell group, a Master Node (MN), or an MCG, or cells (PCell or SCell) of the master cell group).

The base station may configure dual connectivity in the UE for a predetermined reason (for example, when a high data transmission rate is required, by a request from the UE in operation 16-05, or when a high QoS requirement should be satisfied). For example, the UE may make a request for configuring, releasing, releasing, activating, deactivating, resuming, or suspending the dual connectivity, the cell group (for example, secondary cell group), or the cell to the base station, and the request message may include a frequency (or channel) measurement result report, a cell group identifier, cell identifiers, or measurement results in operation 16-05.

In another method, the base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The master base station (Master Node (MN) or Master Cell Group (MCG)) may receive a frequency or channel measurement report for each frequency or channel received from the UE and determine a secondary base station (Secondary Node (SN) or Secondary Cell Group (SCG)) to configure dual connectivity therein on the basis of the measurement report. Alternatively, the master base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers. The master base station may transmit the first RRC message to the UE in order to configure, release, add, deactivate, activate, resume, modify, reconfigure, or suspend the dual connectivity for the determined secondary cell base station, the cell group (for example, secondary cell group), or the cell in operation 16-10. For the first RRC message, each separate new request message may be defined and used to indicate, to the UE, configuration, release, addition, deactivation, activation, resumption, modification, reconfiguration, or suspension of the dual connectivity, the cell group (for example, secondary cell group), or the cell, or, in another method, a new indicator may be defined in the existing message (for example, RRCReconfiguration message, RRCResume message, or the like) to indicate (make a request for) configuration, release, addition, deactivation, activation, resumption, modification, reconfiguration, or suspension of the dual connectivity, the cell group (for example, secondary cell group), or the cell. The first RRC message may include some pieces of the following information.

A first RRC message identifier (for example, rrc-Transaction identifier) for identifying the first RRC message. Since the UE and the base station transmit or receive a plurality of RRC messages, an identifier for identifying each RRC message may be included in the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same first RRC message identifier.

Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell An indicator indicating a state of the cell group (for example, activation, deactivation, suspension, or resumption)

A cell group identifier for identifying a cell group. The cell group identifier may be allocated by the master base station, or one of the pre-appointed identifier may be allocated by the secondary base station.

Cell group or cell configuration information

Bearer configuration information, for example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device)

A first indicator (for example, mobilityControllnfor or ReconfigurationWithSync) also may be included if the configuration information or the indicator for configuring, adding, activating, resuming, modifying, or reconfiguring the dual connectivity, the cell group (for example, secondary cell group), or the cell is included. However, the first indicator (for example, mobilityControllnfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

Random access configuration information also may be included if the configuration information of the indicator for configuring, adding, activating, resuming, modifying, or reconfiguring the dual connectivity, the cell group (for example, secondary cell group), or the cell. However, the random access configuration information may not be included if the configuration information or the indicator for releasing, deactivating, reconfiguring, or suspending the dual connectivity, the cell group (or secondary cell group), or the cell. The random access configuration information may include random access transmission resource information (time or frequency transmission resources) for transmitting a preamble for the cell group or the cell or predetermined preamble information.

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an $n^{th}$ time unit, activate, resume, deactivate, or suspend the cell in an $(n+X)^{th}$ time unit)

When receiving the first RRC message of operation 16-15, the UE may read and identify the first RRC message and configure, add, modify, resume, suspend, or deactivate the dual connectivity or the cell group (for example, secondary cell group). Further, when the first RRC message includes a first indicator triggering the random access procedure, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information. If there is no random access information in the RRC message, the random access procedure (for example, contention-based random access procedure (for example, 4-step random access or 2-step random access)) may be performed. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

The UE may receive the first RRC message in operation 16-10 or apply the received configuration information, generate a second RRC message, and transmit the same to the base station in operation 16-15. The second RRC message may include some pieces of the following information.

A first RRC message identifier having a value which is the same as the first RRC message identifier included in the first RRC message An indicator or an identifier indicating successful reception of the first RRC message When receiving the second RRC message, the base station (for example, master base station) may identify whether the second RRC message is a response message of the first RRC message through the first identifier. Further, the base station may identify the first RRC message and transmit an indication message including an indication indicating configuration, addition, release, activation, resumption, suspension, or deactivation of the cell group to the secondary base station through the Xn interface (for example, interface between base stations) or the Sn interface (interface between the base station and the AMF or UMF or between base stations) in operation 16-20. The indication message may include some pieces of the following information.

An identifier for identifying the indication message

Configuration information or an indicator (for example, configuration information or an indicator for the secondary cell group) for configuring, releasing, adding, deactivating, activating, resuming, modifying, reconfiguring, or suspending the dual connectivity, the cell group (for example, secondary cell group), or the cell When receiving the indication message, the base station (for example, secondary base station) may read or identify configuration information included in the indication message or the message, generate an indication acknowledgement message as a response message of the indication message, and transmit the same to the master base station in operation 16-25.

An identifier having a value which is the same as the identifier included in the indication message An indicator or an identifier indicating successful reception of the indication message A response indicator indicating successful application of the indication message FIG. 17 is a sequence diagram illustrating a third signaling procedure of configuring or releasing the dual connectivity or configuring, releasing, activating, resuming, suspending, or deactivating a secondary cell group configured by the dual connectivity according to an embodiment of the disclosure.

Referring to FIG. 17, as illustrated in FIG. 6 of the disclosure, the UE may establish an RRC connection with the network or the base station and transmit or receive data to or from the base station (for example, a master cell group, a Master Node (MN), or an MCG, or cells (PCell or SCell) of the master cell group).

Referring to FIG. 17, the base station may configure, in the UE, a signaling radio bearer (SRB) (for example, SRB3) through which a control message or an RRC message can be directly transmitted or received between the UE and the secondary base station according to the configuration procedure of FIG. 6.

The base station (for example, secondary base station or master base station) may configure the dual connectivity in the UE for a predetermined reason (for example, when a high data transmission rate is required, by a request from the UE in operation 17-05, or when a high QoS requirement should be satisfied). For example, the UE may transmit a request for configuring, releasing, activating, deactivating, resuming, or suspending the dual connectivity, the cell group (for example, secondary cell group), or the cell to the base station or transmit the request to the secondary base station through SRB3, and the request message may include a frequency (or channel) measurement result report, a cell group identifier, cell identifiers, or measurement results in operation 17-05. In another method, the secondary base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The secondary base station (Master Node (MN) or Master Cell Group (MCG)) may receive a frequency or channel measurement report for each frequency or channel received from the UE and determine whether to configure, release, add, deactivate, activate, resume, modify, reconfigure, or suspend the dual connectivity, the cell group (for example, secondary cell group), or the cell on the basis of the measurement report. Alternatively, the secondary base station may determine whether to configure, release, add, deactivate, activate, resume, modify, reconfigure, or suspend the dual connectivity, the cell group (for example, secondary cell group), or the cell in consideration of an amount of downlink (or uplink) data or an amount of buffers.

The secondary base station may transmit a first RRC message to the UE through SRB3 in order to configure, release, add, deactivate, activate, resume, modify, reconfigure, or suspend the dual connectivity, the cell group (for example, secondary cell group), or the cell in operation 17-10. For the first RRC message, each separate new request message may be defined and used to indicate, to the UE, configuration, release, addition, deactivation, activation, resumption, modification, reconfiguration, or suspension of the dual connectivity, the cell group (for example, secondary cell group), or the cell, or, in another method, a new indicator may be defined in the existing message (for example, RRCReconfiguration message, RRCResume message, or the like) to indicate (make a request for) configuration, release, addition, deactivation, activation, resumption, modification, reconfiguration, or suspension of the dual connectivity, the cell group (for example, secondary cell group), or the cell. The first RRC message may include some pieces of the following information.

- A first RRC message identifier (for example, rrc-Transaction identifier) for identifying the first RRC message. Since the UE and the base station (for example, secondary base station) transmit or receive a plurality of RRC messages, an identifier for identifying each RRC message may be inserted into the RRC message. For example, an RRC message (for example, RRCReconfigurationComplete) corresponding to the RRC message (for example, RRCReconfiguration) transmitted by a transmission side or the RRC message (for example, RRCReconfiguration) transmitted by a reception side or an RRC message corresponding to the RRC message transmitted by the transmission side may include the same first RRC message identifier.
- Configuration information or an indicator (for example, configuration information or an indicator for the UE) for configuring, releasing, adding, deactivating, activating, resuming, modifying, reconfiguring, or suspending the dual connectivity, the cell group (for example, secondary cell group), or the cell
- An indicator indicating a state of the cell group (for example, activation, deactivation, suspension, or resumption)
- A cell group identifier for identifying a cell group. The cell group identifier may be allocated by the master base station, or one of the pre-appointed identifiers may be allocated by the secondary base station.
- Cell group or cell configuration information
- Bearer configuration information. For example, indicator information (for example, a PDCP suspension indicator, a PDCP reestablishment indicator, a PDCP data reconstruction indicator, an RLC reestablishment indicator, a MAC partial reset indicator, a MAC reset indicator, or an indicator triggering a new operation) indicating an operation of a protocol layer device of each bearer (for example, SDAP layer device, PDCP layer device, RLC layer device, or MAC layer device)
- A first indicator (for example, mobilityControlInfor or ReconfigurationWithSync) also may be included if the configuration information or the indicator for configuring, releasing, adding, deactivating, activating, resuming, modifying, reconfiguring, or suspending the dual connectivity, the cell group (for example, secondary cell group), or the cell is included. However, the first indicator (for example, mobilityControlInfor or ReconfigurationWithSync) may not be included if the configuration information or the indicator for releasing, deactivating, reconfiguring, or suspending the dual connectivity, the cell group (for example, secondary cell group), or the cell is included. The first indicator may be an indicator triggering the random access procedure to the cell group or the cell, an indicator making signal synchronization with a new cell, an indicator indicating frequency movement of the UE, or an indicator indicating the cell group (or cell) modification. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).
- Random access configuration information also may be included if the configuration information of the indicator for configuring, adding, activating, resuming, modifying, or reconfiguring the dual connectivity, the cell group (for example, secondary cell group), or the cell is included. However, the random access configuration information may not be included if the configuration information or the indicator for releasing, deactivating, reconfiguring, or suspending the dual connectivity, the cell group (or secondary cell group), or the cell is included. The random access configuration information may include random access transmission resource information (time or frequency transmission resources) for transmitting a preamble for the cell group or the cell or predetermined preamble information.

Time information indicating when the dual connectivity, the cell group (for example, secondary cell group), or the cell (PSCell or SCG SCell) is activated, resumed, deactivated, or suspended (for example, information indicating timing (for example, X), a time unit, a subframe, a time slot, or a symbol unit), for example, time information indicating whether to, if the message is received in an $n^{th}$ time unit, activate, resume, deactivate, or suspend the cell in an $(n+X)^{th}$ time unit)

When receiving the first RRC message through SRB3 in operation 17-15, the UE may read and identify the first RRC message and configure, add, modify, resume, suspend, or deactivate the dual connectivity or the cell group (for example, secondary cell group). Further, when the first RRC message includes a first indicator triggering the random access procedure, the random access procedure may be triggered for the configured or indicated cell group or cell. If there is the random access information in the RRC message or there is the stored random access information when the random access procedure is performed, the random access procedure (for example, contention free-based random access procedure (for example, 4-step random access or 2-step random access)) may be performed on the basis of the random access information that has been stored or received in the RRC message or on the basis of system information. If there is no random access information in the RRC message, the random access procedure (for example, contention-based random access procedure (for example, 4-step random access or 2-step random access)) may be performed. In another method, the UE may perform PDCCH monitoring in the indicated or configured cell group or cell, and trigger and perform the random access procedure according to the indication by the PDCCH. For example, the higher layer device (for example, RRC layer device) may transmit an indicator for triggering the random access procedure to the lower layer device (for example, MAC layer device).

The UE may receive the first RRC message in operation 17-10 or apply the received configuration information, generate a second RRC message, and transmit the same to the secondary base station through SRB3 in operation 17-15. The second RRC message may include some pieces of the following information.

A first RRC message identifier having a value which is the same as the first RRC message identifier included in the first RRC message An indicator or an identifier indicating successful reception of the first RRC message When receiving the second RRC message, the base station (for example, secondary base station) may identify whether the second RRC message is a response message of the first RRC message through a first identifier. Further, the base station may identify the first RRC message and transmit, to the master base station, an indication message including an indication indicating configuration, addition, release, activation, resumption, suspension, or deactivation of the cell group in the master base station or the master cell group through the Xn interface (for example, interface between base stations) or the Sn interface (interface between the base station and the AMF or UMF or between base stations) in operation 17-20. The indication message may include some pieces of the following information.

An identifier for identifying the indication message

Configuration information or an indicator (for example, configuration information or an indicator for the secondary cell group) for configuring, releasing, adding, deactivating, activating, resuming, modifying, reconfiguring, or suspending the dual connectivity, the cell group (for example, secondary cell group), or the cell When receiving the indication message, the base station (for example, master base station) may read or identify configuration information included in the indication message or the message, generate an indication acknowledgement message as a response message of the indication message, and transmit the same to the secondary base station in operation 17-25.

An identifier having a value which is the same as the identifier included in the indication message An indicator or an identifier indicating successful reception of the indication message A response indicator indicating successful application of the indication message When the message is transmitted to the UE in order to configure or indicate cell group or cell configuration information proposed in the disclosure to the UE, for example, when the message includes configuration information or an indicator for configuring, adding, activating, resuming, modifying, or reconfiguring the dual connectivity, the cell group (for example, secondary cell group), or the cell, SDAP configuration information may be included or reconfigured, or mapping configuration information between a bearer of SDAP layer device and QoS flow may be included, configured, or reconfigured. However, when the configuration information or the indicator for releasing, deactivating, reconfiguring, or suspending the dual connectivity, the cell group (for example, secondary cell group), or the cell is included, the SDAP configuration information may not be included, not reconfigured, or the mapping configuration information between the bearer of the SDAP layer device and QoS flow may not be included, not configured, or not reconfigured, or the application thereof may be stopped.

The signaling procedures proposed in the disclosure may be combined and modified, and extended to new signaling procedures.

The signaling procedures proposed in the disclosure may be extended to a multi-access technology. For example, configuration information of a plurality of cell groups may be configured in the UE through the RRC message, and one or a plurality of cell groups (or cells) among the plurality of configured cell groups may be activated or resumed through an indicator of the PDCCH, MAC control information, or the RRC message or one or a plurality of cell groups may be suspended or deactivated.

Hereinafter, the disclosure proposes a UE operation for each cell (PSCell or SCG SCell) or a UE operation for each protocol layer device (for example, SDAP layer device, PDCP layer device, RLC layer device, MAC layer device, or PHY layer device) when the dual connectivity, the cell group (for example, secondary cell group), or the cell (PSCell or SCG SCell) is activated, resumed, added, deactivated, released, or suspended.

1> If the UE receives configuration information or an indicator (for example, through PDCCH DCI, MAC control information, or the RRC message) for configuring, adding, activating, resuming, modifying, or reconfiguring the dual connectivity, the cell group (for example, secondary cell group), or the cell, the UE may perform some of the following procedures.

2> The higher layer device (for example, RRC layer device) may indicate the configuration information or the indicator to the lower layer device (for example, PDCP layer device, RLC layer device, MAC layer device, or PHY layer device).

2> UE operation for the PSCell: when the UE receives the configuration information or the indicator, the UE may maintain the PSCell in the activated state, activate a downlink BWP of the PSCell to the normal BWP (for example, a BWP which is not the first active BWP or not the dormant BWP) configured in the RRC message or to the last activated BWP, and perform a UE operation in the activated BWP. In another method, when the UE receives the configuration information or the indicator, the UE may maintain the PSCell in the activated state, reconfigure or switch a PDCCH monitoring period of the PSCell or a DRX configuration period to a short period on the basis of first DRX configuration information, perform PDCCH monitoring, and perform a UE operation of the activated cell. Through the above method, the UE operation for the PSCell may be performed, a scheduling indication may be rapidly received form a cell group or a cell, and data transmission or reception may be started. Further, the UE may measure many or frequent channel signals on the basis of first channel measurement configuration information configured in the RRC message and rapidly transmit a measurement result through a channel measurement report to the base station in order to more rapidly receive the scheduling indication from the cell group or the cell and start data transmission or reception. When a predetermined condition is satisfied, the UE may measure a channel signal on the basis of second channel measurement configuration information and transmit a measurement result to the base station.

2> UE operation for the SCell of the secondary cell group: when the UE receives the configuration information or the indicator, the UE may activate the SCell of the secondary cell group, activate the downlink BWP or the uplink BWP to a BWP (for example, a first active BWP) configured in the RRC message, and perform a UE operation of the activated SCell or BWP. In another method, when the UE receives the configuration information or the indicator, if a dormant BWP is configured in the SCell of the secondary cell group, the UE may maintain the SCell in the activated state, activate the downlink BWP of the SCell to the BWP (for example, first active BWP) configured in the RRC message, perform the UE operation in the activated BWP. Alternatively, if the dormant BWP is not configured in the SCell of the secondary cell group, the UE may switch the SCell to the activated state, activate the downlink BWP or the uplink BWP to the BWP (for example, first active BWP) configured in the RRC message, and perform the UP operation in the activated SCell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation.

2> UE operation of the MAC layer device for the secondary cell group: when the UE receives the configuration information or the indicator, the UE may perform an initialization procedure (MAC reset) for the MAC layer device (for example, reset or release configuration information configured in the MAC layer device, stop or reset configured timers, or stop or reset the HARQ procedure). For example, it may be considered that a Timing Advance Timer (TAT) indicating validity of signal synchronization between the UE and the base station has stopped or expired. In another method, when the UE receives the configuration information or the indicator, the UE may perform the MAC partial reset procedure (or when an indicator indicating the MAC partial reset procedure is included in the message including the configuration information or the indicator, the MAC partial reset procedure may be performed). For example, the UE may continuously maintain the Timing Advance Timer (TAT) indicating validity of signal synchronization between the UE and the base station and continuously perform HARQ retransmission being performed. In another method, the UE may maintain the current configuration without performing any procedure for the MAC layer device. Further, an indication indicating triggering of the random access procedure is received from the higher layer device (for example, RRC layer device) or the TAT has stopped or expired, the UE may trigger the random access procedure. In another method, when the TAT has not stopped or expired, the UE may not trigger or perform the random access procedure. This is because, when the TAT is running, the signal synchronization with the secondary cell group is achieved or maintained, and thus in this case an unnecessary random access procedure may be performed. In another method, when the base station triggers the random access procedure by an indication of the PDCCH, the UE may trigger the random access procedure and configure or adjust a Timing Advance (TA) value or start the TAT. After completing the random access procedure, the UE may resume or activate the secondary cell group and restart data transmission or reception. The random access procedure may include a Contention-Based Random Access (CBRA) procedure. In another method, when the random access procedure is performed, if dedicated random access configuration information (dedicated RACH config or dedicated preamble) is configured (or included) in a message indicating activation or resumption of the cell group (or a previously received message), a Contention Free Random Access (CFRA) procedure may be performed. If the dedicated random access configuration information (dedicated RACH config or dedicated preamble) is not configured (or included) in the message indicating activation or resumption of the cell group (or a previously received message), a Contention-Based Random Access (CBRA) procedure may be performed or the random access procedure may not be performed.

2> Operation for a Data Radio Bearer (DRB) configured in the secondary cell group: when the UE receives the configuration information or the indicator, the UE may resume DRBs (or SN (SCG) terminated DRBs or DRBs in which the PDCP layer device is configured in the SCG) included in the secondary cell group. For example, for a slit bearer (one RLC layer device is configured in the master cell group and another RLC layer device is configured in the secondary cell group) in which the PDCP layer device is configured in the master cell group, the RRC message including the configuration information or the indicator may also include an indicator (reestablishRLC) triggering a reestablishment procedure of the RLC layer device configured in the secondary cell group or the UE may perform the reestablishment procedure for the RLC layer device configured in the secondary cell group. For example, for a slit bearer (one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP resumption procedure (PDCP resume) of the PDCP layer device configured in the secondary cell group, or the UE may perform the reestablishment procedure for the RLC layer device configured in the mater cell group or the PDCP reestablishment procedure or the PDCP resumption procedure (PDCP resume) for the PDCP layer device configured in the secondary cell group. For example, for bearers configured in the secondary cell group, the bearers may be resumed, or the RRC layer device may instruct the PDCP layer device to trigger the PDCP reestablishment procedure or the PDCP resumption procedure or the PDCP layer device may perform the PDCP reestablishment procedure o the PDCP resumption procedure (PDCP resume). For the bearers configured in the secondary cell group, the UE may trigger a first PDCP resumption procedure or the PDCP layer device may perform the first PDCP resumption procedure. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device resumption procedure, the first PDCP resumption procedure may be triggered and performed. When the higher layer device triggers the PDCP layer device resumption procedure or indicates an indicator indicating activation or resumption of the cell group (or cell), the second PDCP resumption procedure may be triggered and performed. In another method, when the base station indicates the indicator indicating activation or resumption of the cell group (or cell) in order to solve the surety issue problem which may occur by transmission of different pieces of data through the same security key, the base station may configure a new security key by inserting security key configuration information (for example, sk-counter) into the RRC message including the indicator indicating activation or resumption of the cell group (or cell), change or update the security key, or insert a PDCP reestablishment procedure indicator into the RRC message to change or update the security key of bearers configured in the secondary cell group, or the UE may perform the PDCP reestablishment procedure for the bearers. In another method, if the message including the indicator indicating resumption or activation of the cell group further includes security configuration information, a change in (or update of) the security configuration information is indicated thereby, or the indicator indicating the first PDCP resumption procedure is included therein, the UE may trigger the first PDCP resumption procedure or the PDCP layer device may perform the first PDCP resumption procedure for the bearers configured in the secondary cell group. However, when the message including the indicator indicating resumption or activation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The proposed methods may be performed when the message including the indicating suspension or deactivation of the cell group is received. Further, the proposed methods may be applied to SCG bearers (bearers or a SCG terminated bearer having the PDCP layer device in the SCG).

2> Operation for a Signaling Radio Bearer (SRB) configured in the secondary cell group: when the UE receives the configuration information or the indicator and activates the PSCell, the activated downlink BWP of the PSCell is the normal BWP which is not the dormant BWP, or the activated PSCell monitors the PDCCH according to a long period on the basis of first DRX configuration information, SRBs (or SN (SCG) terminated SRBs or SRBs or SRB3 in which the PDCP layer device is configured in the SCG) included in the secondary cell group may be continuously maintained (for example, the UE may continuously transmit or receive a control message to or from the secondary base station). Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. In another method, when the UE receives the configuration information or the indicator, the UE may resume SRBs (or SN (SCG) terminated SRBs or SRBs or SRB3 in which the PDCP layer device is configured in the SCG) included in the secondary cell group. Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. For example, for a slit bearer (one RLC layer device is configured in the master cell group and another RLC layer device is configured in the secondary cell group) in which the PDCP layer device is configured in the master cell group, the RRC message including the configuration information or the indicator may also include an indicator (reestablishRLC) triggering a reestablishment procedure of the RLC layer device configured in the secondary cell group or the UE may perform the reestablishment procedure for the RLC layer device configured in the secondary cell group. For example, for a slit bearer (one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP resumption procedure (PDCP resume) of the PDCP layer device configured in the secondary cell group, or the UE may perform the reestablishment procedure for the RLC layer device configured in the mater cell group or the PDCP reestablishment procedure or the PDCP resumption procedure (PDCP resume) for the PDCP layer device configured in the secondary cell group. For example, for bearers configured in the secondary cell group, the bearers may be resumed, or the RRC layer device may instruct the PDCP layer device to trigger the PDCP reestablishment procedure or the PDCP resumption procedure or the PDCP layer device may perform the PDCP reestablishment procedure o the PDCP resumption procedure (PDCP resume). For the bearers configured in the secondary cell group, the UE may trigger a first PDCP resumption procedure or the PDCP layer device may perform the first PDCP resumption procedure. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device resumption procedure, the first PDCP resumption procedure may be triggered and performed. When the higher layer device triggers the PDCP layer device resumption procedure or indicates an indicator indicating activation or resumption of the cell group (or cell), the second PDCP resumption procedure may be triggered and performed. In another method, when the base station indicates the indicator indicating activation or resumption of the cell group (or cell) in order to solve the surety issue problem which may occur by transmission of different pieces of data through the same security key, the base station may configure a new security key by inserting security key configuration information (for example, sk-counter) into the RRC message including the indicator indicating activation or resumption of the cell group (or cell), change or update the security key, or insert a PDCP reestablishment procedure indicator into the RRC message to change or update the security key of bearers configured in the secondary cell group, or the UE may perform the PDCP reestablishment procedure for the bearers. In another method, if the message including the indicator indicating resumption or activation of the cell group further includes security configuration information, a change (or update) in the security configuration information is indicated thereby, or the indicator indicating the first PDCP resumption procedure is included therein, the UE may trigger the first PDCP resumption procedure or the PDCP layer device may perform the first PDCP resumption procedure for the bearers configured in the secondary cell group. However, when the message including the indicator indicating resumption or activation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The proposed methods may be performed when the message including the indicator indicating suspension or deactivation of the cell group is received. Further, the proposed methods may be applied to SCG bearers (bearers or a SCG terminated bearer having the PDCP layer device in the SCG).

2> UE operation for the PUCCH SCell of the secondary cell group: when the UE receives the configuration information or the indicator, the UE may activate the PUCCH SCell of the secondary cell group, activate the downlink BWP or the uplink BWP to a BWP (for example, a first active BWP) configured in the RRC message, and perform a UE operation of the activated SCell or BWP. In another method, when the UE receives the configuration information or the indicator, if a dormant BWP is configured in the PUCCH SCell of the secondary cell group, the UE may maintain the SCell in the activated state, activate the downlink BWP of the SCell to the BWP (for example, first active BWP) configured in the RRC message, perform the UE operation in the activated BWP. Alternatively, if the dormant BWP is not configured in the SCell of the secondary cell group, the UE may switch the SCell to the activated state, activate the downlink BWP or the uplink BWP to the BWP (for example, first active BWP) configured in the RRC message, and perform the UP operation in the activated SCell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation. In another method, when the UE receives the configuration information or the indicator, the UE may apply first DRX configuration information (for example, suspend second DRX configuration information and reconfigure the same as first DRX configuration information) configured in the RRC message for the PUCCH SCell and, if the PDCCH can be monitored, perform a UE operation in the activated SCell.

2> The UE may transmit an indicator indicating that the cell group (for example, secondary cell group) or the cell is configured, added, activated, resumed, modified, or reconfigured to the master cell group or the secondary cell group, and the indicator may be transmitted from the UE to the secondary cell group (or base station) or the master cell group (or base station) through a physical signal (for example, HARQ ACK or NACK or new transmission resources), MAC control information, or the RRC message.

2> When the UE receives an indicator indicating resumption, activation, or addition of the cell group (for example, secondary cell group) or the cell, the UE may trigger the PDCP layer device to transmit a PDCP state report for bearers connected to the SCG RLC layer device, SCG split bearers, MCG bearers, or MCG slit bearers to the base station. This is because to synchronize a transmission window and a reception window by identifying lost data or states of window parameters lost between the UE and the base station through transmission of the PDCP state report.

1> If the UE receives configuration information or an indicator (for example, through PDCCH DCI, MAC control information, or the RRC message) for releasing, deactivating, reconfiguring, or suspending the dual connectivity, the cell group (for example, secondary cell group), or the cell, the UE may perform some of the following procedures.

2> The higher layer device (for example, RRC layer device) may indicate the configuration information or the indicator to the lower layer device (for example, PDCP layer device, RLC layer device, MAC layer device, or PHY layer device).

2> UE operation for the PSCell: when the UE receives the configuration information or the indicator, the UE may maintain the PSCell in the activated state, activate the downlink BWP of the PSCell to the dormant BWP configured in the RRC message, and perform UE operation in the dormant BWP. In another method, when the UE receives the configuration information or the indicator, the UE may maintain the PSCell in the activated state, reconfigure or switch a PDCCH monitoring period of the PSCell or a DRX configuration period to a short period on the basis of second DRX configuration information, perform PDCCH monitoring, and perform a UE operation of the activated cell. In another method, when the UE receives the configuration information or the indicator, the UE may deactivate the PSCell and perform a UE operation of the deactivated cell. Through the above method, the UE operation for the PSCell may be performed and thus UE power consumption may be reduced.

2> UE operation for the SCell of the secondary cell group, when the UE receives the configuration information or the indicator, the UE may deactivate the SCell of the secondary cell group and perform the UE operation of the deactivated SCell. In another method, when the UE receives the configuration information or the indicator, if the dormant BWP is configured in the SCell of the secondary cell group, the UE may maintain the SCell in the activated state, activate the downlink BWP of the SCell to the dormant BWP, perform the UE operation in the dormant BWP or, if the dormant BWP is not configured in the SCell of the secondary cell group, may switch the SCell to the deactivated state and perform the UE operation in the deactivated cell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation.

2> UE operation of the MAC layer device for the secondary cell group: when the UE receives the configuration information or the indicator, the UE may perform an initialization procedure (MAC reset) for the MAC layer device (for example, reset or release configuration information configured in the MAC layer device, stop or reset configured timers, or stop or reset the HARQ procedure). For example, it may be considered that a Timing Advance Timer (TAT) indicating validity of signal synchronization between the UE and the base station has stopped or expired. In another method, when the UE receives the configuration information or the indicator, the UE may perform the MAC partial reset procedure in order to prevent data loss due to the reset procedure of the MAC layer device (or perform the MAC partial reset procedure when the message including the configuration information or the indicator includes the indicator indicating the MAC partial reset procedure). For example, the UE may continuously maintain the Timing Advance Timer (TAT) indicating validity of signal synchronization between the UE and the base station and continuously perform HARQ retransmission being performed. In another method, the UE may maintain the current configuration without performing any procedure for the MAC layer device. In a case where the TAT is continuously maintained, if the TAT expires, the UE may perform the random access procedure to control or configure again the Timing Advance (TA) even though the secondary cell group is suspended or deactivated. When performing the random access procedure, the UE may indicate that the random access procedure is a random access procedure for controlling the TA to the base station (for example, the UE may include a buffer state report (MAC control information), indicate that there is no data to be transmitted, or a new indicator may be introduced) through an indicator, the base station may transmit a message including an indication suspension or deactivation of the cell group again to the UE after completing the random access procedure, or the UE may maintain the cell group in the suspended or deactivated state after completing the random access procedure (in another method, the UE may maintain the cell group in the suspended or deactivated state by itself without any indication from the base station). In another method, in a case where the TAT is continuously maintained, if the TAT expires, the base station may trigger the random access procedure (to control or reconfigure TA) to the UE through the cell (PCell or SCell, or PSCell) of the master cell group or the secondary cell group or transmit a message including an indicator resumption or activation of the cell group to the UE since the base station is running the same TAT.

2> Operation for a Data Radio Bearer (DRB) configured in the secondary cell group: when the UE receives the configuration information or the indicator, the UE may suspend DRBs (or SN (SCG) terminated DRBs or DRBs through which the PDCP layer device is configured in the SCG) included in the secondary cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the secondary cell group or also include an indicator triggering a PDCP data recovery procedure ((PDCP data recovery) of the PDCP layer device configured in the master cell group, or the UE may perform the reestablishment procedure for the RLC layer device configured in the secondary cell group or the PDCP data recovery procedure) for the PDCP layer device configured in the master cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP suspension procedure (PDCP suspend) of the PDCP layer device configured in the secondary cell group, or the UE may perform the reestablishment procedure for the RLC layer device configured in the mater cell group or the PDCP reestablishment procedure or the PDCP suspension procedure (PDCP suspend) for the PDCP layer device configured in the secondary cell group. For example, for bearers configured in the secondary cell group, the bearers may be suspended, or the RRC layer device may instruct the PDCP layer device to trigger the PDCP reestablishment procedure or the PDCP suspension procedure or the PDCP layer device may perform the PDCP reestablishment procedure o the PDCP suspension procedure (PDCP suspend). The UE may trigger a first PDCP suspension procedure or the PDCP layer device may perform the first PDCP suspension procedure for the bearers configured in the secondary cell group. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device suspension procedure, the first PDCP suspension procedure may be triggered and performed. When the higher layer device triggers the PDCP layer device suspension procedure or indicates an indicator indicating deactivation or suspension of the cell group (or cell), the second PDCP suspension procedure may be triggered and performed. In another method, if the message including the indicator indicating suspension or deactivation of the cell group further includes security configuration information, a change in (or update of) the security configuration information is indicated thereby, or the indicator indicating the first PDCP suspension procedure is included therein, the UE may trigger the first PDCP suspension procedure for the bearers configured in the secondary cell group or the PDCP layer device may perform the first PDCP suspension procedure for the bearers configured in the secondary cell group. However, when the message including the indicator indicating suspension or deactivation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The proposed methods may be performed when the message including the indication resuming or activating the cell group is received. Further, the proposed methods may be applied to SCG bearers (bearers or a SCG terminated bearer having the PDCP layer device in the SCG).

2> Operation for a Signaling Radio Bearer (SRB) configured in the secondary cell group: when the UE receives the configuration information or the indicator and activates the PSCell, the activated downlink BWP of the PSCell is the normal BWP which is not the dormant BWP, or the activated PSCell monitors the PDCCH according to a long period on the basis of second DRX configuration information, SRBs (or SN (SCG) terminated SRBs or SRBs or SRB3 in which the PDCP layer device is configured in the SCG) included in the secondary cell group may be continuously maintained (for example, the UE may continuously transmit or receive a control message to or from the secondary base station). Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. In another method, when the UE receives the configuration information or the indicator, the UE may suspend SRBs (or SN (SCG) terminated SRBs or SRBs or SRB3 in which the PDCP layer device is configured in the SCG) included in the secondary cell group. Alternatively, in order to discard old data (for example, PDCP SDU or PDCP PDU) stored in the SRBs configured in the secondary cell group, a data discarding procedure (for example, a discarding indication to the PDCP layer device or an RLC reestablishment procedure) may be performed. For example, for a split bearer in which the PDCP layer device is configured in the master cell group (bearer in which one RLC layer device is configured in the master cell group and another RLC layer device is configured in the secondary cell group), the RRC message including the configuration information or the indicator may also include an indicator (reestablishRLC) triggering a reestablishment procedure of the RLC layer device configured in the secondary cell group or an indicator triggering a PDCP data recovery procedure (PDCP data recovery) of the PDCP layer device configured in the master cell group, or the UE may perform the reestablishment procedure for the RLC layer device configured in the secondary cell group or perform the PDCP data recovery procedure (PDCP data recovery) for the PDCP layer device configured in the master cell group. For example, for a slit bearer (bearer in which one RLC layer device is configured in the master cell group and another RLC layer device is configured in the secondary cell group) in which the PDCP layer device is configured in the secondary cell group, the RRC message including the configuration information or the indicator may also include an indicator (reestablishRLC) triggering a reestablishment procedure of the RLC layer device configured in the master cell group or also include an indicator triggering a PDCP reestablishment procedure (reestablishPDCP) or a PDCP suspension procedure (PDCP suspend) of the PDCP layer device configured in the secondary cell group, or the UE may perform the reestablishment procedure for the RLC layer device configured in the mater cell group or the PDCP reestablishment procedure or the PDCP suspension procedure (PDCP suspend) for the PDCP layer device configured in the secondary cell group. For example, for bearers configured in the secondary cell group, the bearers may be suspended, or the RRC layer device may instruct the PDCP layer device to trigger the PDCP reestablishment procedure or the PDCP suspension procedure or the PDCP layer device may perform the PDCP reestablishment procedure o the PDCP suspension procedure (PDCP suspend). The UE may trigger a first PDCP suspension procedure or the PDCP layer device may perform the first PDCP suspension procedure for the bearers configured in the secondary cell group. In another method, in order to solve a security issue problem which may occur by transmission of different pieces of data through the same security key when the secondary cell group is activated or resumed, the UE may trigger a second PDCP resumption procedure or the PDCP layer device may perform the second PDCP resumption procedure for the bearers configured in the secondary cell group. In another method, when the higher layer device triggers the PDCP layer device suspension procedure, the first PDCP suspension procedure may be triggered and performed. When the higher layer device triggers the PDCP layer device suspension procedure or indicates an indicator indicating deactivation or suspension of the cell group (or cell), the second PDCP suspension procedure may be triggered and performed. In another method, if the message including the indicator indicating suspension or deactivation of the cell group includes security configuration information, a change in (or update of) the security configuration information is indicated thereby, or the indicator indicating the first PDCP suspension procedure is included therein, the UE may trigger the first PDCP suspension procedure or the PDCP layer device may perform the first PDCP suspension procedure for the bearers configured in the secondary cell group. However, when the message including the indicator indicating suspension or deactivation of the cell group does not include security configuration information, the change in (update of) the security configuration information is not indicated thereby, or the indicator indicating the second PDCP resumption procedure is included therein, the UE may trigger the second PDCP resumption procedure or the PDCP layer device may perform the second PDCP resumption procedure for the bearers configured in the secondary cell group in order to solve the security issue problem which may occur by transmission of different pieces of data through the same security key when the secondary cell group is activated or resumed. The proposed methods may be performed when the message including the indication resuming or activating the cell group is received. Further, the proposed methods may be applied to SCG bearers (bearers or a SCG terminated bearer having the PDCP layer device in the SCG).

2> UE operation for the PUCCH SCell of the secondary cell group: when the UE receives the configuration information or the indicator, the UE may deactivate the PUCCH SCell of the secondary cell group and perform the UE operation of the deactivated SCell. In another method, when the UE receives the configuration information or the indicator, if the dormant BWP is configured in the PUCCH SCell of the secondary cell group, the UE may maintain the SCell in the activated state, activate the downlink BWP of the SCell to the dormant BWP, perform the UE operation in the dormant BWP or, if the dormant BWP is not configured in the PUCCH SCell of the secondary cell group, may switch the SCell to the deactivated state and perform the UE operation in the deactivated cell or BWP. In another method, when the UE receives the configuration information or the indicator, the UE may determine the state of the SCell or switching, activation, or deactivation of the BWP according to SCell configuration information or an indicator configured in the message including the configuration information or the indicator and perform the UE operation. In another method, when the UE receives the configuration information or the indicator, the UE may apply second DRX configuration information configured in the RRC message for the PUCCH SCell and, if the PDCCH can be monitored, perform the UE operation in the activated SCell.

2> The UE may transmit an indicator indicating that the cell group (for example, secondary cell group) or the cell has been suspended, deactivated, released, or modified to the master cell group or the secondary cell group, and the indicator may be transmitted from the UE to the secondary cell group (or base station) or the master cell group (or base station) through a physical signal (for example, HARQ ACK or NACK or new transmission resources), MAC control information, or the RRC message.

2> When the UE receives an indicator indicating suspension, deactivation, or release of the cell group (for example, secondary cell group) or the cell, the UE may trigger the PDCP layer device to transmit a PDCP state report for configured SCG bearers, bearers connected to the SCG RLC layer device, SCG split bearers, MCG bearers, or MCG slit bearers to the base station. This is because to synchronize a transmission window and a reception window by identifying lost data or states of window parameters lost between the UE and the base station through transmission of the PDCP state report.

The partial reset of the MAC layer device proposed in the disclosure may include one or a plurality of UE operations among the following procedures.

The UE may perform an operation of flushing the remaining HARQ processes (that is, normal HARQ process, HARQ process for system information, or the like) except for an HARQ process for MBS among HARQ processes configured in the serving cell, and the HARQ process for MBS may perform an operation of flushing, releasing, resetting, or omitting flushing after completing a handover or after RRC state mode transition (to the RRC-inactive mode or the RRC-idle mode).

In the flushing operation, data of the HARQ process related to MAB may be flushed at a time point at which a target base station can receive an MBS service or starts G-RNTI monitoring after the handover or after RRC state mode transition (to the RRC-inactive mode or the RRC-idle mode). Alternatively, data reception can be continuously performed through the G-RNTI until the handover is completed or RRC state mode transition (to the RRC-inactive mode or the RRC-idle mode) is completed, and in the case of handover, the target base station may perform an operation of monitoring the C-RNTI at a target allocated through the RRC message. In another method, data reception through the G-RNTI can be continuously performed before random access from the target base station is completed.

If there is a random access procedure being performed, the random access procedure may be suspended.

Specifically, if there is a configured or indicated preamble identifier, preamble configuration information, or PRACH (random access configuration-related information) configuration information, the same may be discarded.

If there is a temporary identifier (temporary C-RNTI), the identifier may be released.

A buffer for message 3 transmission may be flushed.

New data indicators for uplink HARQ processes may be all configured as 0.

If an uplink DRX retransmission timer running for the uplink is running, the timer may be suspended.

If all uplink HARQ-related timers are running, the timers may be suspended.

When the reset procedure of the MAC layer device is performed or the partial reset procedure indicator of the MAC layer device is not included, indicated, or not performed, the UE may perform the reset procedure of the MAC layer device and accordingly may flush all of the configured normal HARQ process, the HARQ process for MBS, or the HARQ process for system information.

The first PDCP suspension (or resumption) procedure proposed in the disclosure may include one or a plurality of UE operations among the following procedures.

A transmitting PDCP layer device of the UE may reset a transmission window parameter or configure the same as an initial value, or discard stored data (or PDCP PDU or PDCP SDU). In another method, only the PDCP PDU may be discarded to prevent data loss. This is a procedure for preventing old data to be transmitted ore retransmitted when the secondary cell group is activated or resumed in the future.

A receiving PDCP layer device of the UE may stop or reset a reordering timer when the reordering timer (t-reordering)(timer for arranging data in an ascending order from a PDCP sequence number or a COUNT value) is running. Alternatively, the receiving PDCP layer device may perform a header decompression procedure for stored data (for example, PDCP SDU) and transfer the data to the higher layer device in an ascending order of COUNT values. The receiving PDCP layer device of the UE may reset a reception window parameter or configure the same as an initial value.

The second PDCP suspension (or resumption) procedure proposed in the disclosure may include one or a plurality of UE operations among the following procedures.

The transmitting PDCP layer device of the UE may maintain the parameter value without resetting the transmission window parameter or without configuring the same as an initial value. The reason why the parameter value (for example, COUNT value) is maintained is to solve the security issue problem which may occur by transmission of different pieces of data through the same security key when the secondary cell group is activated or resumed. The transmitting PDCP layer device of the UE may discard the stored data (for example, PDCP PDU or PDCP SDU). In another method, only the PDCP PDU may be discarded to prevent data loss. This is a procedure for preventing old data to be transmitted ore retransmitted when the secondary cell group is activated or resumed in the future. In another method, the transmitting PDCP layer device may store values of the transmission window parameters and reset the window parameters (for example, configure the window parameters as 0). If the security configuration information is changed when the cell group is resumed or activated, if the security configuration information is included in the message indicating resumption or activation of the cell group, or if a security key change is indicated, the window parameters being reset may be used. If the security configuration information is not changed when the cell group is resumed or activated, if the security configuration information is not included in the message indicating resumption or activation of the cell group, or if a security key change is not indicated, the values of the stored transmission window parameters may be recovered or the values of the transmission window parameters may be configured, reconfigured, or reset to the values of the stored transmission window parameters and then used.

A receiving PDCP layer device of the UE may stop or reset a reordering timer when the reordering timer (t-reordering)(timer for arranging data in an ascending order from a PDCP sequence number or a COUNT value) is running. Alternatively, the receiving PDCP layer device may perform a header decompression procedure for stored data (for example, PDCP SDU) and transfer the data to the higher layer device in an ascending order of COUNT values. The receiving PDCP layer device of the UE may maintain the parameter value without resetting the reception window parameter or without configuring the same as an initial value. The reason why the parameter value (for example, COUNT value) is maintained is to solve the security issue problem which may occur by transmission of different pieces of data through the same security key when the secondary cell group is activated or resumed. In another method, the UE may configure or update an RX_NEXT window parameter (a parameter indicating a COUNT value of data expected to be received next) to a value of an RX_DELIV window parameter (a parameter indicating a COUNT value corresponding the next data of the data transmitted to the higher layer device) or a COUNT value of data which the UE first receives in order to prevent the reordering timer to be directly triggered in the case in which there is no COUNT value or PDCP sequence number gap when the secondary cell group is activated or resumed or data is received. In another method, when the reordering timer value is configured in the message or an indicator is received from the higher layer device, an RX_REORD window parameter (parameter indicating a COUNT value of next data of the data triggering the reordering timer) may be configured or updated to an RX_NEXT window parameter, or the reordering timer may be suspended or restarted. In another method, the receiving PDCP layer device may store values of the reception window parameters and reset the window parameters (for example, configure the window parameters as 0). If the security configuration information is changed when the cell group is resumed or activated, if the security configuration information is included in the message indicating resumption or activation of the cell group, or if a security key change is indicated, the window parameters being reset may be used. If the security configuration information is not changed when the cell group is resumed or activated, if the security configuration information is not included in the message indicating resumption or activation of the cell group, if a security key change is not indicated, or the values of the stored reception window parameters may be recovered or the values of the reception window parameters may be configured, reconfigured, or reset to the values of the stored reception window parameters and then used.

If data to be transmitted by the UE through the uplink is made or generated when the UE receives the configuration information or the indicator for releasing, deactivating, reconfiguring, or suspending the dual connectivity, the cell group (for example, secondary cell group), or the cell (for example, through PDCCH DCI, MAC control information, or the RRC message) and the UE performs the UE operation proposed in the above, the UE may make a request for uplink transmission resources by transmitting a Scheduling Request (SR) or MAC control information (or an indicator, an amount of buffers, or a buffer state report) to the master base station or the secondary base station in PUCCH transmission resources configured in the RRC message or make a request for configuring, adding, activating, resuming, modifying, or reconfiguring the dual connectivity, the cell group (for example, secondary cell group), or the cell. If data to be transmitted by the UE through the uplink is made or generated when the UE receives the configuration information or the indicator for releasing, deactivating, reconfiguring, or suspending the dual connectivity, the cell group (for example, secondary cell group), or the cell (for example, through PDCCH DCI, MAC control information, or the RRC message) and the UE performs the UE operation proposed in the above, the UE may generate an RRC message and transmit the RRC message to the master base station or the secondary base station to make a request for uplink transmission resources or make a request for configuring, adding, activating, resuming, modifying, or reconfiguring the dual connectivity, the cell group (for example, secondary cell group), or the cell.

The procedures proposed in the disclosure may be expanded to the multi-access technology. For example, configuration information of a plurality of cell groups may be configured in the UE through the RRC message, one or a plurality of cell groups (or cells) among the plurality of configured cell groups may be activated or resumed through the PDCCH indicator, MAC control information, or the RRC message, and one or a plurality of cell groups may be suspended or deactivated.

Hereinafter, the disclosure proposes a UE operation in which the cell group or the cell is activated or resumed again when uplink data to be transmitted by the UE to the secondary cell group (or in bearers belonging to the secondary cell group) is made or generated in the case in which the secondary cell group or the PSCell of the secondary cell group is in the deactivated state or the suspended state by the deactivated or suspended procedure of the cell group or the cell proposed in the disclosure.

As proposed in the disclosure, when the cell group or the cell is deactivated or suspended, the UE cannot transmit or receive data and thus, if uplink data is generated in the secondary cell group of the UE (or in bearers belonging to the secondary cell group), the cell group or the cell may need to be activated or resumed again. The procedure in which the UE makes a request for activating or resuming again the cell group or the cell to the base station (master base station or secondary base station) may be performed by the one of the following methods, a combination of the following methods, or a method expanded through the application thereof.

First method: the UE configures a message (for example, RRC message) making a request for re-activating or resuming again the secondary cell group or the cell and transmits the message to the master base station. When receiving the message, the master base station may make a request for a resumption procedure to the secondary base station, receive a response, configure a message (for example, RRC message) indicating re-activation or resumption of the secondary cell group, and transmit the message to the UE like in the first signaling procedure of FIG. 15. In another method, after the master base station configures the message (for example, RRC message) indicating activation or resumption of the secondary cell group and transmits the message to the UE, the UE may indicate re-activation or resumption to the secondary base station like in the second signaling procedure of FIG. 16. In another method, the UE may configure a message (for example, RRC message) making a request for re-activating or resuming the secondary cell group and transmit the message to the secondary base station through SRB3, and the secondary base station may configure a message (for example, RRC message) indicating re-activation or resumption of the secondary cell group, transmit the message to the UE, and then indicate activation or resumption to the master base station like in the third signaling procedure of FIG. 17.

Second method: the UE may configure a message (for example, MAC control information) making a request for re-activating or resuming the secondary cell group or the cell and transmit the message to the master base station. When receiving the message, the master base station may make a request for a resumption procedure to the secondary base station, receives a response, configure a message (for example, RRC message or MAC control information) indicating re-activation or resumption of the secondary cell group, and transmit the message to the UE like in the first signaling procedure of FIG. 15 proposed in the disclosure. In another method, after the master base station configures the message (for example, RRC message) indicating re-activation or resumption of the secondary cell group and transmits the message to the UE, the UE may indicate activation or resumption to the secondary base station like in the second signaling procedure of FIG. 16. In another method, the UE may configure a message (for example, MAC control information) making a request for re-activating or resuming the secondary cell group and transmit the message to the secondary base station through SRB3, and the secondary base station may configure a message (for example, RRC message or MAC control information)) indicating re-activation or resumption of the secondary cell group, transmit the message to the UE, and then indicate activation or resumption to the master base station like in the third signaling procedure of FIG. 17. When the cell group activation or resumption is requested or indicated through the MAC control information, the MAC control information may be newly defined and designed. In another method, a new field (or indicator) may be defined or a new value (field value or identifier value) may be defined to indicate the cell group activation or resumption in the existing MAC control information (for example, buffer state report).

Third method: the UE may configure a message (for example, a physical signal of the PHY layer device) making a request for re-activating or resuming the secondary cell group or the cell and transmit the message to the master base station. When receiving the message, the master base station may make a request for a resumption procedure to the secondary base station, receive a response, configure a message (for example, the RRC message or the physical signal of the PHY layer device) indicating re-activation or resumption of the secondary cell group, and transmit the message to the UE like in the first signaling procedure of FIG. 15. In another method, after the master base station configures the message (for example, the RRC message or the physical signal of the PHY layer device) indicating re-activation or resumption of the secondary cell group and transmits the message to the UE, the UE may indicate activation or resumption to the secondary base station like in the second signaling procedure of FIG. 16. In another method, the UE may configure a message (for example, the physical signal of the PHY layer device) making a request for re-activating or resuming the secondary cell group and transmit the message to the secondary base station through SRB3, and the secondary base station may configure a message (for example, RRC message or the physical signal of the PHY layer device) indicating re-activation or resumption of the secondary cell group, transmit the message to the UE, and then indicate activation or resumption to the master base station like in the third signaling procedure of FIG. 17. When the cell group activation or resumption is requested or indicated by the physical signal of the PHY layer device, the physical signal of the PHY layer device may be defined and designed as new transmission resources (for example, new Scheduling Request (SR) transmission resources (for example, PUCCH transmission resources of the PCell or PSCell) for the secondary cell group or a new field of PDCCH DCI (PDCCH transmission resources transmitted from the PSCell or from the PCell)). In another method, a new field (or indicator) may be defined or a new value (field value or identifier value) may be defined to indicate the cell group activation or resumption in the existing physical signal of the PHY layer device (for example, Scheduling Request (SR) transmission resources (for example, PUCCH transmission resources of the PCell or PSCell) or a field of PDCCH DCI (PDCCH transmission resources transmitted from the PSCell or from the PCell)). In another method, if the PSCell triggers the random access procedure is triggered in the UE through PDCCH DCI when the UE applies second DDRX configuration information to perform PDCCH monitoring for the PSCell of the secondary cell group according to a long period or the secondary cell group of the UE is in the deactivated state or the suspended state, the UE may interpret the indication as activation or resumption of the secondary cell group. The physical transmission resources may be transmission resources for random access, and the UE may perform the random access procedure when uplink data for the secondary cell group is generated in the suspended or deactivated state of the secondary cell group as described above. In another method, in the suspended or deactivated state of the secondary cell group as described above, when uplink data for the secondary cell group is generated in the suspended or deactivated state of the secondary cell group, SR transmission resources may be transmitted to the master cell group or the secondary cell group if the SR transmission resources are configured (or the TAT is running) and the random access procedure may be performed if the SRS transmission is not configured (or the TAT has expired). The random access procedure may include a Contention-Based Random Access (CBRA) procedure. In another method, the Contention Free Random Access (CFRA) procedure may be performed when dedicated random access configuration information (dedicated RACH config or dedicated preamble) is configured (or included) in a message indicating suspension or deactivation of the cell group (or a previously received message), or a Contention-Based Random Access (CBRA) procedure may be performed when dedicated random access configuration information (dedicated RACH config or dedicated preamble) is not configured (or included) in a message indicating suspension or deactivation of the cell group (or a previously received message). The UE may indicate to the base station that uplink data is generated through an indicator (for example, a buffer state report (MAC control information (MAC control element))) during the random access procedure or after the random access procedure is completed, and when the indicator is received or the random access procedure is completed, the base station (for example, secondary base station or the master base station) may transmit a message indicating resumption or activation of the secondary cell group to the UE, resume or activate the secondary cell group, and perform data transmission or reception again.

As proposed in the disclosure, by the PDCCH, MAC control information, or the indicator of the RRC message, activation or resumption of the cell group or the cell may be completed at a first time point when the UE activates or resumes the cell group (for example, secondary cell group) or the cell (for example, PSCell). The first time point may be configured by the RRC message as proposed in the disclosure. For example, the RRC message may include time information (for example, information indicating timing (for example, X), a time unit, a subframe, a time slot, or a symbol unit) indicating when the dual connectivity, the cell group (or secondary cell group), or the cell (PSCell or SCG SCell) is activated, resumed, deactivated, or suspended. For example, when the PDCCH, MAC control information, or RRC message indicating activation, resumption, deactivation, or suspension of the cell group (for example, secondary cell group) or the cell (for example, PSCell) is received in an $n^{th}$ time unit, time information indicating completion of activation, resumption, deactivation, or suspension of the cell group or the cell may be configured in an $(n+X)^{th}$ time unit. In another method, the time information (for example, X) may be pre-appointed and defined, and a fixed value may be used therefor rather than being configured by the base station. In another example, when random access is started (preamble is transmitted) in the $n^{th}$ time unit or random access is successfully completed after the PDCCH, MAC control information, or RRC message indicating activation, resumption, deactivation, or suspension of the cell group (for example, secondary cell group) or the cell (for example, PSCell) is received, time information indicating completion of activation, resumption, deactivation, or suspension of the cell group or the cell may be configured in an $(n+X)^{th}$ time unit. In another method, the time information (for example, X) may be pre-appointed and defined, and a fixed value may be used therefor rather than being configured by the base station. When activation, suspension, deactivation, or resumption of the cell group or the cell is completed, the UE may perform the proposed UE operation according to a state of each cell or BWP (for example, activation, hibernation, or deactivation). Further, the UE DRX operation may be started or restarted when activation or resumption of the cell group or the cell is completed, and the UE DRX operation may be suspended or deactivation when deactivation or suspension of the cell group or the cell is completed.

As proposed in the disclosure, activation of the cell may be completed at a second time point when the UE activates the cell (for example, PSCell or SCell) of the cell group (for example, master cell group or secondary cell group) by the indication of the MAC control information. The second time point may be configured by the RRC message as proposed in the disclosure. For example, the RRC message may include time information (for example, information indicating timing (for example, X), a time unit, a subframe, a time slot, or a symbol unit) indicating when the carrier aggregation, the dual connectivity, the cell group (for example, master cell group or secondary cell group), or the cell (MCG SCell or SCG SCell) is activated or deactivated. For example, when MAC control information indicating activation or deactivation of the cell (for example, SCell) is received in the $n^{th}$ time unit, time information indicating completion of activation or deactivation of the cell may be configured in the $(n+X)^{th}$ time unit. In another method, the time information (for example, X) may be pre-appointed and defined, and a fixed value may be used therefor rather than being configured by the base station. In another example, when random access is started (preamble is transmitted) or random access is successfully completed in the $n^{th}$ time unit after MAC control information indicating activation or deactivation of the cell (for example, SCell or PSCell) is received, time information indicating completion of activation or deactivation of the cell may be configured in the $(n+X)^{th}$ time unit. In another method, the time information (for example, X) may be pre-appointed and defined, and a fixed value may be used therefor rather than being configured by the base station. When activation, suspension, deactivation, or resumption of the cell group or the cell is completed, the UE may perform the proposed UE operation according to a state of each cell or BWP (for example, activation, hibernation, or deactivation). Further, the UE DRX operation may be started or restarted when cell group or cell activation or resumption is completed, and the UE DRX operation may be suspended or deactivated when cell group or cell deactivation or suspension is completed.

As proposed in the disclosure, activation of the cell may be completed at a third time point when the UE activates the cell (for example, PSCell or SCell) of the cell group (for example, master cell group or secondary cell group) by the indication of the RRC message. The third time point may be configured by the RRC message as proposed in the disclosure. For example, the RRC message may include time information (for example, information indicating timing (for example, X), a time unit, a subframe, a time slot, or a symbol unit) indicating when the carrier aggregation, the dual connectivity, the cell group (for example, master cell group or secondary cell group), or the cell (MCG SCell, SCG SCell, or PSCell) is activated or deactivated. For example, when the RRC message indicating activation or deactivation of the cell (for example, SCell) is received in the $n^{th}$ time unit, time information indicating completion of activation or deactivation of the cell may be configured in the $(n+X)^{th}$ time unit. In another method, the time information (for example, X) may be pre-appointed and defined, and a fixed value may be used therefor rather than being configured by the base station. In another example, when random access is started (preamble is transmitted) or random access is successfully completed in the $n^{th}$ time unit after the RRC message indicating activation or deactivation of the cell (for example, SCell or PSCell) is received, time information indicating completion of activation or deactivation of the cell may be configured in the $(n+X)^{th}$ time unit. In another method, the time information (for example, X) may be pre-appointed and defined, and a fixed value may be used therefor rather than being configured by the base station. X may be configured or appointed on the basis of a slot number or configured or appointed on the basis of the shortest slot length among the configured PCell, PSCell, or SCell. When activation, suspension, deactivation, or resumption of the cell group or the cell is completed, the UE may perform the proposed UE operation according to a state of each cell or BWP (for example, activation, hibernation, or deactivation). Further, the UE DRX operation may be started or restarted when activation or resumption of the cell group or the cell is completed, and the UE DRX operation may be suspended or deactivation when deactivation or suspension of the cell group or the cell is completed.

The concept of the cell group proposed in the disclosure may expand to a sub cell group. For example, in the disclosure, a first cell group and a second cell group may be configured to configure the dual connectivity in the UE and may be applied to a master cell group and a secondary cell group to configure the dual connectivity, and thus the UE performs data transmission or reception with two base stations. However, if the concept of the cell group expands to the sub cell group, a plurality of sub cell groups of the cell group may be configured in the UE connected to one base station and sub cell group identifiers may be configured in the respective sub cell groups. The UE performs data transmission or reception with one base station but may expand and apply the activation, suspension, resumption, or deactivation procedure by the PDCCH, MAC control information, or RRC message proposed in the disclosure to different frequencies or cells for each sub cell group. For example, when the UE communicates with one base station and a plurality of frequencies or cells, the base station may configure a plurality of sub cell groups for a plurality of frequencies or cells of the base station corresponding to the cell group (master cell group) in the UE, allow the UE to apply the carrier aggregation, define fields indicating the sub cell groups in the PDCCH, MAC control information, or the RRC message, and allow the fields to indicate activation, deactivation, suspension, or resumption of the sub cell groups. The UE may apply the activation, suspension, resumption, or deactivation procedure by the PDCCH, MAC control information, or the RRC message proposed in the disclosure for different frequencies or cells for each sub cell group. In another method, the proposed sub cell group may be implemented through introduction of downlink or uplink logical channel restriction for each cell. For example, the RRC message including configuration information for restricting logical channels belonging to one cell group to perform data transmission or reception only for a specific frequency or cell. By mapping and configuring logical channels (for example, logical channel identifiers) to and in each cell or frequency to group the logical channels and considering the logical channels as the proposed sub cell group, and fields indicating the cells may be defined in the PDCCH, MAC control information, or the RRC message to indicate activation, deactivation, suspension, or resumption of the cells.

Further, if the master cell groups detects radio link failure when the UE in which the dual connectivity is configured transmits or receives data to or from the master cell group or the secondary cell group or when the secondary cell group is suspended or deactivated, the UE may report the radio link failure to the secondary cell group or to the master cell group via the secondary cell group. For example, the RRC message for reporting the radio link failure may be configured, and transmitted and reported through split SRB1 or SRB3. When split SRB1 is configured, the radio link failure may be always reported through split SRB1. In another method, if the master cell group detects the wireless connection failure when the UE in which the dual connectivity is configured transmits or receives data to or from the master cell group or the secondary cell group or when the secondary cell group is suspended or deactivated, the UE may declare the radio link failure and perform an RRC connection reestablishment procedure.

Further, if the secondary cell group detects the wireless connection failure when the UE in which the dual connectivity is configured transmits or receives data to or from the master cell group or the secondary cell group or when the secondary cell group is suspended or deactivated, the UE may report the radio link failure to the master cell group or to the secondary cell group via the master cell group. For example, the RRC message for reporting the radio link failure may be configured, and transmitted and reported through SRB1, split SRB1, or SRB3. When SRB1 or split SRB1 is configured, the radio link failure may be always reported through split SRB1.

In the disclosure, releasing the secondary cell group when the dual connectivity is configured in the UE may mean releasing the connection (data transmission or reception) with the secondary cell group or discarding or releasing configuration information of the secondary cell group (or bearer configuration information or protocol layer device (PHY, MAC, RLC, PDCP, or SDAP layer device) configuration information), and suspending or deactivating the secondary cell group may mean releasing or suspending the connection (data transmission or reception) with the secondary cell group but maintaining, suspending, or storing configuration information of the secondary cell group (or bearer configuration information or protocol layer device (PHY, MAC, RLC, PDCP, or SDAP layer device) configuration information) or rapidly resuming or activating the connection with the secondary cell group on the basis of the stored configuration information of the secondary cell group in the future.

Figure 18:
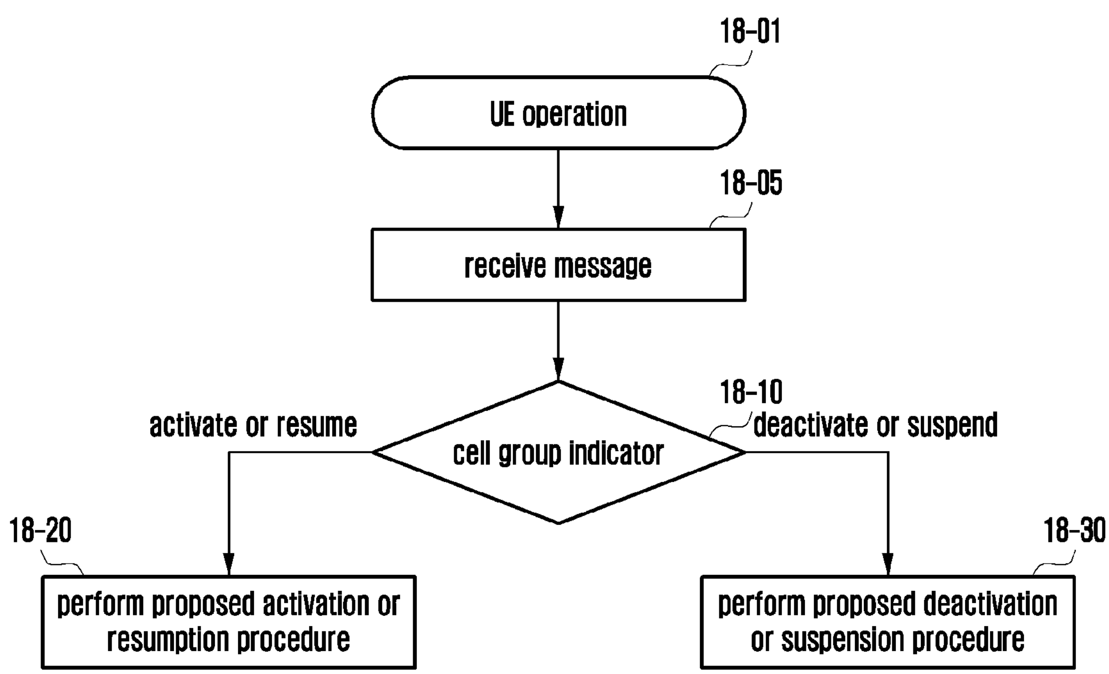
FIG. 18 is a flowchart illustrating a UE operation according to an embodiment of the disclosure.

FIG. 18 is a flowchart illustrating a UE operation according to an embodiment of the disclosure.

Referring to FIG. 18, a UE 18-01 may receive a message (for example, DCI of a PDCCH, MAC control information, or an RRC message) from a base station in operation 18-05. When the message includes cell group configuration information, a cell state, or a cell group indicator, the UE may identify whether configuration, addition, activation, resumption, release, deactivation, or suspension of the cell group is indicated in operation 18-10. If configuration, addition, activation, or resumption of the cell group is indicated, the cell group configuration, addition, activation, or resumption procedure proposed in the disclosure may be performed in operation 18-20. If release, deactivation, or suspension of the cell group is indicated, the cell group release, deactivation, or suspension procedure proposed in the disclosure may be performed in operation 18-30.

Embodiment 2

The bearer may be a meaning including an SRB and a DRB, the SRB refers to a signaling radio bearer, and the DRB refers to a data radio bearer. The SRB is mainly used to transmit and receive an RRC message of the RRC layer device, and the DRB is mainly used to transmit and receive user layer data. An Unacknowledged Mode (UM) DRB is a DRB using the RLC layer device operating in an UM, and an Acknowledged Mode (AM) DRB is a DRB using the RLC layer device operating in an AM.

The disclosure proposes various data processing methods to improve a data processing rate to a higher data transmission rate when the base station performs data processing with the UE in a next-generation mobile communication system.

Among data processing procedures performed when the UE or the base station transmits or receives data, a procedure having the largest processing loads or time is a ciphering or deciphering procedure of the PDCP layer device, an integrity protection procedure, an integrity verification procedure, or an Automatic Repeat Request (ARQ) procedure in the RLC layer device.

The procedures may be procedures performed by the RLC layer device or the PDCP layer device configured for each bearer, and the base station may configure, through an indicator, whether to use or not use the ciphering procedure (or deciphering procedure), integrity protection procedure (or integrity verification procedure), or the ARQ procedure (for example, configured in the RLC AM mode) for each bearer (for example, SRB or DRB) by transmitting an RRC message (for example, RRCReconfiguration message, RRC- Setup message, or RRCResume message) to the UE when the UE configures the connection with the network.

Accordingly, when the ciphering procedure (or deciphering procedure) is configured and the integrity protection procedure (or integrity verification procedure) is not configured for a bearer, the UE or the base station may not perform the integrity protection procedure (or integrity verification procedure) and may perform the ciphering procedure (or deciphering procedure) for the bearer.

Further, when the ciphering procedure (or deciphering procedure) is not configured and the integrity protection procedure (or integrity verification procedure) is configured for a bearer, the UE or the base station may perform the integrity protection procedure (or integrity verification procedure) and may not perform the ciphering procedure (or deciphering procedure) for the bearer.

In addition, when both the ciphering procedure (or deciphering procedure) and the integrity protection procedure (or integrity verification procedure) are configured, the UE or the base station may perform integrity protection procedure (or integrity verification procedure) and then perform the ciphering procedure (or deciphering procedure) for the bearer.

Since the PDCP layer device perform the ciphering procedure (or deciphering procedure) or the integrity protection procedure (or integrity verification procedure) on each piece of data received from the higher layer device only once, the ciphering procedure (or deciphering procedure) or the integrity protection procedure (or integrity verification procedure) should be performed more as the larger number of data is received, and thus data processing complexity increases and a data processing time becomes longer. Further, since the RLC layer device allocates an RLC serial number to each piece of data received from the higher layer device (for example, PDCP layer device), more RLC serial numbers should be allocated and used as more pieces of data are received, and accordingly, the ARQ procedure executed on the basis of the RLC serial number may be very complex and a longer data processing time is needed.

Accordingly, the disclosure proposes a method of reducing a number of times the PDCP layer device performs the ciphering procedure (or deciphering procedure) or the integrity protection procedure (or integrity verification procedure) or the number of RLC serial numbers allocated and used by the RLC layer device. The ciphering procedure (or deciphering procedure) or the integrity protection procedure (or integrity verification procedure) is a procedure having large data processing loads and thus can be used using a hardware accelerator (or a hardware engine) and, if the number of calls of the hardware accelerator is reduced to perform the ciphering procedure (or deciphering procedure) or the integrity protection procedure (or integrity verification procedure), more hardware accelerator calls may be performed in parallel to process other data (for example, other bearer data), and thus it is possible to reduce a data processing time and improve a data processing rate. If the number of RLC serial numbers allocated to the data is reduced, a time spent for searching for a list with the RLC serial numbers, data, or ACK or NACK indicators can be reduced in the ARQ procedure of the RLC layer device and thus the data processing time may be reduced.

The disclosure proposes a data concatenation procedure for data (for example, SDAP SDU or PDCP SDU) received from the higher layer device by the higher layer device (for example, PDCP layer device or SDAP layer device). The data concatenation procedure of the higher layer device (upper layer concatenation) proposed in the disclosure may have one or a plurality of the following functions. When the data concatenation procedure of the higher layer device is configured in the transmission side, the reception side should perform a data de-concatenation (or separation) procedure.

- The data concatenation procedure proposed in the disclosure may be configured or performed by the SDAP layer device, the PDCP layer device, or a new layer device, and whether to apply the data concatenation procedure for each bearer or for the downlink or the uplink may be configured in the RRC message (for example, RRCReconfiguration message, RRCSetup message, or RRCResume message) through an indicator. When the data concatenation procedure is configured in the RRC message, the number of pieces of data or the maximum size of pieces of data which can be concatenated may be configured. In another method, the number of pieces of data to be concatenated or the size of pieces of data to be concatenated may be freely determined and performed in UE implementation or base station implementation.
- The UE supporting the data concatenation procedure proposed in the disclosure may report whether the maximum size in which concatenation is possible through the data concatenation procedure (for example, the maximum size of concatenated data or the maximum size to which the ciphering procedure (or deciphering procedure) or the integrity protection procedure (or integrity verification procedure) can be applied simultaneously) or the data concatenation procedure is supported through a UE capability reporting message. The maximum size of which the data which can be concatenated by the UE or the base station through the data concatenation, the maximum size of the concatenated data, or the maximum size to which the ciphering procedure (or deciphering procedure) or the integrity protection procedure (or integrity verification procedure) can be applied simultaneously may be preappointed or defined and used by the PDCP layer device. For example, the maximum size (for example, 8192 bytes or 9000 bytes) may be defined in the PDCP layer device-related standard.
- Introduction of new fields are proposed to perform the data concatenation procedure or the data separation procedure proposed in the disclosure. Some of the proposed new fields may be introduced or defined by the SDAP header or the PDCP header, or some of the new fields may be added to or introduced in the front part of each piece of data or may be added to or introduced in the first part of the entire concatenated data. In the disclosure, the UE or the base station may apply or perform the proposed data concatenation procedure or data separation procedure on the basis of the new fields. The new fields may include one or a plurality of the following fields. New fields proposed in the disclosure may be generated or introduced by the PDCP layer device or the SDAP layer device, and may be added and used in the data concatenation procedure or may be read, analyzed, or used to separate the concatenated data by the PDCP layer device or the SDAP layer device in the data separation procedure.
  - C field: indicates whether a data concatenation function is performed or not. In another method, the C field may indicate whether there is data directly after the data, there are new fields, or there is concatenated data. In another method, the C field may indicate whether the data is the last data.

- E field: indicates whether there is data directly after the data, there are new fields, or there is concatenated data. In another method, the E field may indicate whether the data is the last data.
- LI field: indicates the size of each of the concatenated data in units of bytes or indicates, for the concatenated data, the size of data received from the higher layer device or to be transmitted to the higher layer device in units of bytes. For example, a first L1 field may indicate the size of first data among the concatenated data in units of bytes or indicate the size of second (or next) data among the concatenated data in units of bytes. For example, the LI field may be introduced for each piece of data and may be used for the data concatenation procedure or the data separation procedure. For example, each LI field may be located before each piece of data, and the data may be concatenated in the structure of {[LI field+data] [LI field+data] . . . [LI field+data] }. Such a structure is useful for a data processing rate since data can be rapidly processed sequentially using new fields and the processed data can be directly transmitted to the higher layer. In another method, the data may be concatenated in the structure of [E field LI field][E field LI field] . . . [E field LI field][data+ data+ . . . + data]. Such a structure has an advantage of processing the front new fields at once in implementation. In another method, the LI field indicating the size of the last data may be omitted. This is because, when n pieces of data are concatenated and $(n-1)^{th}$ data is separated by the LI field, the remaining data is $n^{th}$ data even though the size of the remaining data is unknown. In another method, the LI field may indicate the size of concatenated data in units of bytes and, if a header compression procedure is configured, the header compression procedure may be applied and thus the size of compressed data which has been reduced may be indicated in units of bytes. In another method, the LI field may indicate the size of concatenated data in units of bytes and, if the integrity protection procedure is configured, indicate the size of data before the application of the integrity protection procedure and an MAC-I field may be added to the last part of the concatenated data. If the integrity protection procedure is configured when the data separation procedure is applied, the reception side may perform the data separation procedure in consideration of the presence of the MAC-I field having a predetermined length (for example, 4 bytes) in the last part. For example, the LI field of the last data may indicate the length of the last data except for the MAC-I field. In another method, the LI field may indicate the size of concatenated data in units of bytes and, if the header compression procedure or the integrity protection procedure is configured, indicate the size of compressed data to which the header compression procedure is applied before the application of the integrity protection procedure and an MAC-I field may be added to the last part of the concatenated data. If the header compression procedure or the integrity protection procedure is configured when the data separation procedure is applied, the reception side may perform the data separation procedure in consideration of the presence of the MAC-I field having a predetermined length (for example, 4 bytes) in the last part. For example, the LI field of the last data may indicate the length of the compressed last data to which the header compression procedure is applied except for the MAC-I field.
- F field: is a field indicating a length of the LI field introduced or added for data concatenation or data separation and indicates whether the LI field is short a field (for example, 6 bytes) or a long field (or 14 bytes). Through the introduction of the F field, overhead for the LI field may be reduced.
- SN field: is a field indicating the sequence of data in the concatenated data and indicates the sequence of data through, for example, a sequence number.

For convenience of implementation (for example, the same processing may be performed like data) of the new fields proposed in the disclosure, when the integrity protection is configured in the PDCP layer device, the integrity protection procedure may be applied to the new fields or, when the ciphering procedure is applied to the PDCP layer device, the ciphering procedure may be applied thereto. In another method, in the new fields proposed in the disclosure, the integrity protection procedure may be applied to the new fields when integrity protection is configured in the PDCP layer device or the ciphering procedure may not be applied when the ciphering procedure is applied to the PDCP layer device in order to allow the reception side to read new fields before the deciphering procedure. That is, when the ciphering procedure is not applied even though the integrity protection procedure is applied, the reception side may read in advance the new fields before the deciphering procedure.

Based on characteristics of the data concatenation procedure proposed in the disclosure, the transmission side (UE or base station) applies or performs the data concatenation procedure to or for data to which or for which the integrity protection procedure or the ciphering produce is not applied or is not performed. Based on characteristics of the data concatenation procedure proposed in the disclosure, the transmission side (UE or base station) applies or performs the data concatenation procedure to or for data before the integrity protection procedure or the ciphering produce is applied or performed. For example, when the integrity protection procedure or the ciphering produce is configured, the data concatenation procedure may be performed or applied and then the integrity protection procedure or the ciphering produce may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is simultaneously performed for the plurality of pieces of concatenated data using one COUNT value and thus single processing is possible through one set of security key values (COUNT value, bearer identifier, security key, or the like) and a data processing time can be reduced. For example, when the plurality of pieces of data are not concatenated, the integrity protection procedure or the ciphering procedure should be performed several times on the basis of a set of different security key values using different COUNT values each of which is used for each piece of data, so a long data processing time is needed. When the integrity protection procedure is applied, one MAC-I field is added after the concatenated data. However, when the concatenation procedure is not applied, each MAC-I field should be added after each piece of data, and thus processing becomes complex and overheads increase. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

Based on the data separation procedure proposed in the disclosure, the reception side (UE or base station) applies or performs the data separation procedure for concatenated data to which or for which the deciphering procedure or the integrity verification procedure is applied or performed. In another method, based on characteristics of the data separation procedure proposed in the disclosure, the reception side (UE or base station) applies or performs the data separation procedure for concatenated data after the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is simultaneously performed for the plurality of pieces of concatenated data using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

Figure 27:
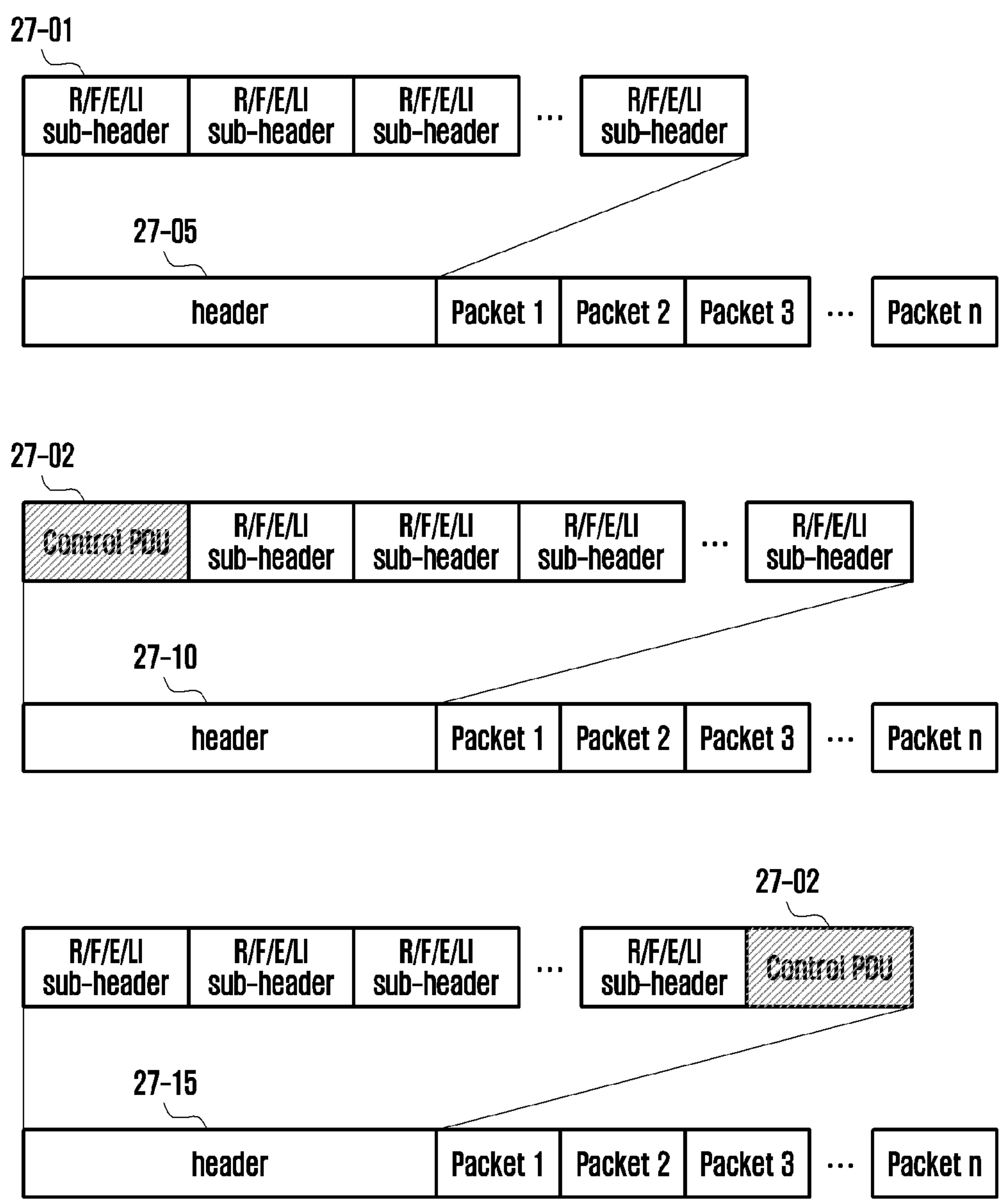
FIG. 27 illustrates embodiment 2-3 of data concatenation procedure to reduce a number of times data is processed through an integrity protection procedure, a integrity verification procedure, a ciphering procedure, or a deciphering procedure and reduce a number of allocated RLC serial numbers to shorten a data processing time according to an embodiment of the disclosure.

When the SDAP layer device configures or performs the proposed data concatenation procedure, the SDAP layer device may not apply the data concatenation procedure to SDAP control data (SDAP control PDU). This is because the ciphering procedure or the deciphering procedure is not applied to the SDAP control data and thus, if the SDAP control data is concatenated with other data, implementation complexity may be increased when the concatenated data is ciphered or deciphered. When the SDAP layer device performs the data concatenation function, the data concatenation procedure may be performed only for data of the higher layer device corresponding to QoS flow IDs (QoS identifiers) mapped to bearers and the concatenated data may be transmitted to the PDCP layer device of the bearer. In another method, when the SDAP layer device performs the data concatenation function and performs the data concatenation procedure for data of the higher layer device corresponding to QoS flow IDs (QoS identifiers) mapped to the bearers, specifically, the data concatenation procedure may be applied only to data corresponding to the same QoS flow ID (QoS identifier) and the concatenated data may be transmitted to the PDCP layer device of the bearer. The integrity protection procedure may be applied to the SDAP control data when the integrity protection procedure is configured, and the ciphering procedure may not be applied thereto when the ciphering procedure is configured. In another method, if there is a data concatenation format 27-10 or 27-15 when the SDAP layer device performs the data concatenation procedure as illustrated in FIG. 27, the SDAP control data may be put on the first part of a header of new fields for data concatenation in order to allow the reception side to rapidly process the SDAP control data. In another method, if there is a data concatenation format 27-10 or 27-15 when the SDAP layer device performs the data concatenation procedure as illustrated in FIG. 27, the SDAP control data may be put on the last part of a header of new fields for data concatenation in order to easily add the dynamically generated SDAP control data.

When the SDAP layer device configures or performs the proposed data concatenation procedure, based on characteristics of the data concatenation procedure proposed in the disclosure, the transmission side (UE or base station) applies or performs the data concatenation procedure to or for data to which or for which a header compression procedure, the integrity protection procedure, or the ciphering procedure not is applied or performed. In another method, based on characteristics of the data concatenation procedure proposed in the disclosure, the transmission side (UE or base station) applies or performs the data concatenation procedure to or for data before the header compression procedure, the integrity protection procedure, or the ciphering produce is applied or performed. Accordingly, a length field (for example, LI field) among new fields generated during the data concatenation procedure may configure the length of data of which the header is not compressed as a byte unit value. For example, when the header compression procedure, the integrity protection procedure, or the ciphering procedure is configured, the header compression procedure, the integrity protection procedure, or the ciphering procedure may be performed for the concatenated data after the data concatenation procedures may be performed or applied. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the SDAP layer device configures or performs the proposed data concatenation procedure, based on characteristics of the data separation procedure proposed in the disclosure, the reception side (UE or base station) applies or performs the data separation procedure for concatenated data to which or for which the deciphering procedure, the integrity verification procedure, or a header decompression procedure is applied or performed. In another method, based on characteristics of the data separation procedure proposed in the disclosure, the reception side (UE or base station) applies or performs the data separation procedure for concatenated data after the deciphering procedure, the integrity verification procedure, or the header decompression procedure is applied or performed. For example, when the header compression procedure, the ciphering procedure, or the integrity verification procedure is configured, the data separation procedure may be performed for the concatenated data after the deciphering procedure, the integrity verification procedure, or the header decompression procedure is performed for the received concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

If the proposed data concatenation procedure is configured or performed by the SDAP layer device, data processing loads due to the header compression procedure may increase and implementation complexity may increase. Accordingly, if the data concatenation procedure or separation procedure is configured for a bearer or if the bearer in which the data concatenation procedure is configured or a higher layer device is configured to use or add the header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should perform the header compression procedure for each piece of data or the reception side should perform the header decompression procedure for each piece of data. Accordingly, the data concatenation procedure, the header compression procedure (for example, Robust Header Compression (ROHC) or Ethernet Header Compression (EHC)), or the data compression procedure (Uplink Data Compression (UDC)) may be prevented from being configured together for each bearer or higher layer device (PDCP layer device, SDAP layer device, or new layer device). For example, when the data concatenation procedure is configured, the configuration of the header compression procedure (for example, Robust Header Compression (ROHC) or Ethernet Header Compression (EHC)) or the data compression procedure (Uplink Data Compression (UDC)) may be prevented. In another method, when the header compression procedure (for example, Robust Header Compression (ROHC) or Ethernet Header Compression (EHC)) or the data compression procedure (Uplink Data Compression (UDC)) is configured, the configuration of the data concatenation procedure may be prevented. In another method, in order to more accelerate the data rate, the ciphering procedure or the integrity protection procedure may not be configured.

When the header compression procedure or the data compression procedure is not configured to accelerate the data processing or when the SDAP layer device configures or performs the proposed data concatenation procedure, based on characteristics of the data concatenation procedure proposed in the disclosure, the transmission side (UE or base station) may apply or perform the data concatenation procedure to or for data to which or for which the integrity protection procedure or the ciphering procedure is not applied or performed. In another method, based on characteristics of the data concatenation procedure proposed in the disclosure, the transmission side (UE or base station) applies or performs the data concatenation procedure to or for data before the integrity protection procedure or the ciphering produce is applied or performed. Accordingly, a length field (for example, LI field) among new fields generated during the data concatenation procedure may configure the length of data as a byte unit value. For example, when the integrity protection procedure or the ciphering produce is configured, the data concatenation procedure may be performed or applied and then the integrity protection procedure or the ciphering produce may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the header compression procedure or the data compression procedure is not configured to accelerate the data processing or when the SDAP layer device configures or performs the proposed data concatenation procedure, based on characteristics of the data separation procedure proposed in the disclosure, the reception side (UE or base station) may apply or perform the data separation procedure to or for data to which or for which the deciphering procedure or the integrity verification procedure is applied or performed. In another method, based on characteristics of the data separation procedure proposed in the disclosure, the reception side (UE or base station) applies or performs the data separation procedure for concatenated data after which the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the SDAP layer device configures or performs the proposed data concatenation procedure, the SDAP layer device may not apply the data concatenation procedure to SDAP control data (SDAP control PDU) or PDCP control data (PDCP control PDU). This is because the ciphering procedure or the deciphering procedure is not applied to the SDAP control data and thus, if the SDAP control data is concatenated with other data, implementation complexity may be increased when the concatenated data is ciphered or deciphered. Since the ciphering procedure, the deciphering procedure, the integrity protection procedure, or the integrity verification procedure is not applied to the PDCP control data, if the PDCP control data is concatenated with other data, implementation complexity may increase when the ciphering procedure, the deciphering procedure, the integrity protection procedure, or the integrity verification procedure is performed for the concatenated data. The integrity protection procedure may be applied to the SDAP control data when the integrity protection procedure is configured, and the ciphering procedure may not be applied thereto when the ciphering procedure is configured. However, the integrity protection procedure may not be applied to the PDCP control data when the integrity protection procedure is configured, and the ciphering procedure may not be applied thereto when the ciphering procedure is configured. In another method, the integrity protection procedure may not be applied to the SDAP control data when the integrity protection procedure is configured, and the ciphering procedure may not be applied thereto when the ciphering procedure is configured.

If the proposed data concatenation procedure is configured or performed by the PDCP layer device, data processing loads due to the header compression procedure may increase and implementation complexity may increase. Accordingly, if the data concatenation procedure or separation procedure is configured for a bearer or if the bearer in which the data concatenation procedure is configured or a higher layer device is configured to use or add the header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should perform the header compression procedure for each piece of data or the reception side should perform the header decompression procedure for each piece of data. Accordingly, the data concatenation procedure, the header compression procedure (for example, Robust Header Compression (ROHC) or Ethernet Header Compression (EHC)), or the data compression procedure (Uplink Data Compression (UDC)) may be prevented from being configured together for each bearer or higher layer device (PDCP layer device, SDAP layer device, or new layer device). For example, when the data concatenation procedure is configured, the configuration of the header compression procedure (for example, Robust Header Compression (ROHC) or Ethernet Header Compression (EHC)) or the data compression procedure (Uplink Data Compression (UDC)) may be prevented. In another method, when the header compression procedure (for example, Robust Header Compression (ROHC) or Ethernet Header Compression (EHC)) or the data compression procedure (Uplink Data Compression (UDC)) is configured, the configuration of the data concatenation procedure may be prevented. In another method, in order to more accelerate the data rate, the ciphering procedure or the integrity protection procedure may not be configured.

When the SDAP layer device configures or performs the proposed data concatenation procedure, on characteristics of the data concatenation procedure proposed in the disclosure, the transmission side (UE or base station) applies or performs the data concatenation procedure to or for data to which or for which the header compression procedure is applied or performed but the integrity protection procedure or the ciphering procedure is not applied or performed. In another method, on characteristics of the data concatenation procedure proposed in the disclosure, the transmission side (UE or base station) applies or performs the data concatenation procedure to or for data to which or for which the header compression procedure has been applied or performed but the header compression procedure is applied before the integrity protection procedure or the ciphering produce is applied or performed. Accordingly, a length field (for example, LI field) among new fields generated during the data concatenation procedure may configure the length of data to which the header compression procedure is applied as a byte unit value. For example, when the header compression procedure, the integrity protection procedure, or the ciphering procedure is configured, the header compression procedure may be applied or performed to each piece of data, the data concatenation procedure may be performed or applied to a plurality of pieces of data, and then the integrity protection procedure or the ciphering procedure may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. On the other hand, since the application or performance of the header compression procedure for each piece of the concatenated data has high complexity, the concatenation may be easily implemented after the advance performance of the header compression procedure and overheads may be reduced through a reduction in the length field indicating the length of each piece of concatenated data. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the SDAP layer device configures or performs the proposed data concatenation procedure, based on characteristics of the data separation procedure proposed in the disclosure, the reception side (UE or base station) applies or performs the data separation procedure for concatenated data to which or for which the deciphering procedure or the integrity verification procedure is applied or performed, and may apply the header decompression procedure to each piece of the separated data. In another method, based on characteristics of the data separation procedure proposed in the disclosure, the reception side (UE or base station) applies or performs the data separation procedure the data separation procedure for concatenated data after the deciphering procedure or the integrity verification procedure is applied or performed, and may apply the header decompression procedure to each piece of the separated data. For example, if the header compression procedure, the ciphering procedure, or the integrity verification procedure is configured, the data separation procedure may be performed for the concatenated data after the deciphering procedure or the integrity verification procedure is performed for the received concatenated data, and the header decompression procedure may be applied to each piece of the separated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. On the other hand, since the application or performance of the header decompression procedure for each piece of the concatenated data has high complexity, the performance of the header decompression procedure after data separation may be easily implemented and overheads may be reduced through a reduction in the length field indicating the length of each piece of concatenated data. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the header compression procedure or the data compression procedure is not configured to accelerate the data processing or when the PDCP layer device configures or performs the proposed data concatenation procedure, based on characteristics of the data concatenation procedure proposed in the disclosure, the transmission side (UE or base station) may apply or perform the data concatenation procedure to or for data to which or for which the integrity protection procedure or the ciphering procedure is not applied or performed. In another method, based on characteristics of the data concatenation procedure proposed in the disclosure, the transmission side (UE or base station) applies or performs the data concatenation procedure to or for data before the integrity protection procedure or the ciphering produce is applied or performed. Accordingly, a length field (for example, LI field) among new fields generated during the data concatenation procedure may configure the length of data to which the header compression procedure is applied as a byte unit value. For example, when the integrity protection procedure or the ciphering procedure is configured, the integrity protection procedure or the ciphering procedure may be performed for the concatenated data after the data concatenation procedure is performed or applied to a plurality of pieces of data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the header compression procedure or the data compression procedure is not configured to accelerate the data processing or when the PDCP layer device configures or performs the proposed data concatenation procedure, based on characteristics of the data separation procedure proposed in the disclosure, the reception side (UE or base station) applies and performs the data separation procedure to or for data to which or for which the deciphering procedure or the integrity verification procedure is applied or performed. In another method, based on characteristics of the data separation procedure proposed in the disclosure, the reception side (UE or base station) applies or performs the data separation procedure for concatenated data after the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

The data concatenation procedure or separation procedure may be configured for a bearer or a higher layer device. A transmitting PDCP layer device in which no data concatenation procedure is configured may allocate one PDCP serial number (or COUNT value) to one piece of data (for example, PDCP SDU or PDCP PDU) received from a higher layer device, allocate one PDCP serial number (for example, a value obtained by performing modulo on a parameter value storing the COUNT value by the entire size of the PDCP serial number or a transmission parameter (COUNT value) modulo 2^(length of the PDCP serial number for the uplink)), increase the parameter for serial number allocation by 1, and allocate the serial number increased by 1 to the parameter for next data. However, when the data concatenation procedure is configured, the transmitting PDCP layer device may allocate one PDCP serial number (or COUNT value) to a plurality of pieces of concatenated data if the data concatenation procedure is applied to data received from the higher layer device, and may allocate one PDCP serial number, increase the parameter for serial number allocation by 1, and allocate the serial number increased by 1 to the parameter for next data (concatenated data or non-concatenated data), but may allocate one PDCP serial number of one piece of non-concatenated data if the data concatenation procedure is not applied to data received from the higher layer device, and may allocate one PDCP serial number, increase the parameter for serial number allocation by 1, and allocate the serial number increased by 1 to the parameter for next data (concatenated data or non-concatenated data). When the SDAP layer device performs the data concatenation procedure, PDCP data processing (for example, the header compression procedure, the integrity protection procedure, or the ciphering procedure) may be performed for one PDCP SDU (or SDAP data PDU) obtained by concatenating a plurality of SDAP SDUs, a PDCP header may be generated, and one PDCP serial number may be generated and allocated to the PDCP data PDU. When the PDCP layer device performs the data concatenation procedure, if a plurality of PDCP SDUs (for example, the header compression procedure) is configured, PDCP data processing (for example, the integrity protection procedure or the ciphering procedure) may be performed for one concatenated PDCP SDU obtained by concatenating a plurality of PDCP SDUs, a PDCP header may be generated, and one PDCP serial number may be generated and allocated to the PDCP data PDU.

If the data concatenation procedure or separation procedure is configured for a bearer or if the bearer in which the data concatenation procedure is configured or a higher layer device is configured to use or add the SDAP header or header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should add the SDAP header to each piece of data or perform header compression for each piece of data and the reception side should remove the SDAP header for each piece of data or perform header decompression for each piece of data. Accordingly, the data concatenation procedure, the SAP header or header compression procedure, or the data compression procedure may be prevented from being configured together for each bearer or higher layer device (PDCP layer device, SDAP layer device, or new layer device). For example, when the data concatenation procedure is configured, the configuration of the SDAP header or header compression procedure or the data compression procedure may be prevented. In another example, when the SDAP header or header compression procedure, or the data compression procedure is configured, the configuration of the data compression procedure may be prevented.

The data concatenation procedure proposed in the disclosure may be activated, deactivated, suspended, or resumed according to an indication of the RRC message, MAC control information, or the PDCCH.

When the data concatenation procedure or the data separation procedure is configured for the PDCP layer device, the UE may perform the data concatenation function in the higher layer device and, if the UE receives the RRC message (RRCReconfiguration) indicating a handover from the base station, the RRC message includes ReconfigurationWithSynch (handover indicator), the RRC message includes an indicator (reestablishPDCP) indicating reestablishment of the PDCP layer device (PDCP re-establishment), or the RRC message includes security configuration information (security config) for changing a security key, the UE may induce a new security key in the RRC layer device on the basis of the security configuration information and apply the security key to each PDCP layer device. The UE may perform a PDCP reestablishment procedure in the PDCP layer device. When performing the PDCP reestablishment procedure, the UE may newly apply and transmit a data processing procedure of the PDCP layer device to data to be retransmitted or transmitted for the AM DRB on the basis of the new security key. For example, specifically, the UE may apply the data processing procedure of the PDCP layer device to retransmitted data and newly transmitted data as follows during the PDCP reestablishment procedure.

When the data processing procedure (header compression procedure, integrity protection procedure, or ciphering procedure) of the PDCP layer device is applied again to data to be retransmitted in the PDCP reestablishment procedure on the basis of a new security key, if the data concatenation procedure is configured, the data concatenation procedure is performed for previously transmitted data, the header compression procedure is configured when data to be retransmitted is newly configured, the header compression procedure may be newly performed again. For example, the transmitting PDCP layer device has configured and transmitted first data and second data as PDCP serial number 1 and has configured and transmitted third data as PDCP serial number 2 but, if successful transmission of PDCP serial numbers 1 and 2 is not acknowledged from a lower layer device, performs a retransmission procedure (transmits the same to the lower layer device) in the PDCP reestablishment procedure. It may be assumed that the reception side has received data corresponding to PDCP serial number 1 but has not received data corresponding to PDCP serial number 2. However, if the transmitting PDCP layer device concatenates the first data, the second data, and the third data and configures and transmits the concatenated data as PDCP serial number 1, the reception side detects the data corresponding to PDCP serial number 1 as overlappingly received data and discard the same since the data has been already received. That is, the data retransmitted in the PDCP reestablishment procedure is newly concatenated through the concatenation function differently from the previous case, that is, the third data is concatenated with PDCP serial number 1, and thus data loss may occur. Accordingly, when the procedure of the PDCP layer device is newly applied to retransmitted data in the PDCP reestablishment procedure by a new security key, the data should be concatenated to be the same as the previous transmission through the data concatenation function and the procedure of the PDCP layer device should be newly applied on the basis of the new security key.

When the data processing procedure (header compression procedure, integrity protection procedure, or ciphering procedure) of the PDCP layer device is applied to data to be newly transmitted in the PDCP reestablishment procedure on the basis of a new security key, if the header compression procedure is configured when data to be transmitted is configured, the header compression procedure may be performed and the data concatenation procedure (data may or may not be concatenated) may be performed. If the integrity protection procedure is configured for concatenated data or non-concatenated data, the integrity protection procedure may be newly performed for the concatenated data or the non-concatenated on the basis of the new security key. If the ciphering procedure is configured, the ciphering procedure may be performed for the concatenated data or the non-concatenated on the basis of the new security key and a transmission procedure (transmission to a lower layer device) may be performed.

Figure 19:
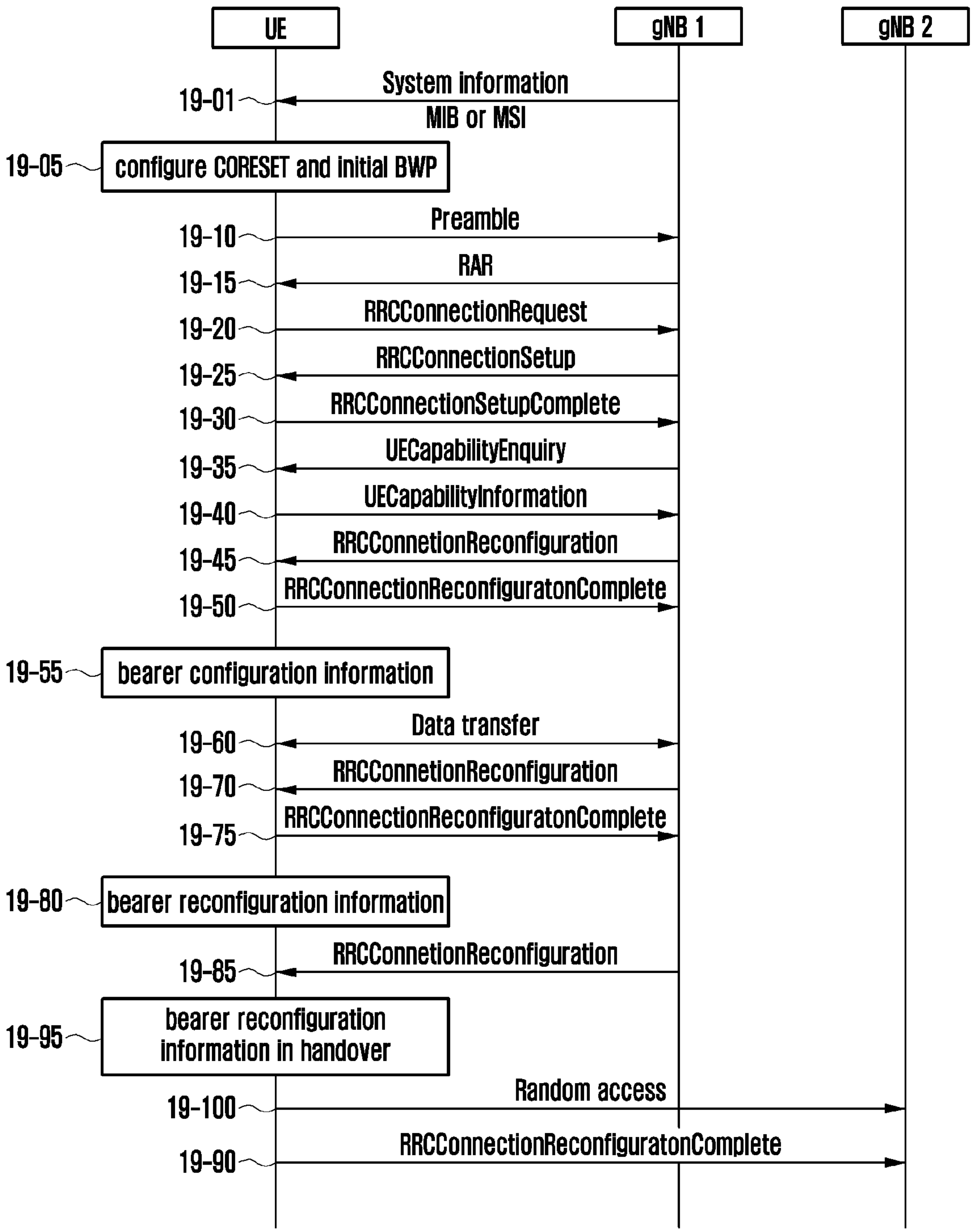
FIG. 19 shows a procedure in which a UE switches from an RRC-idle mode to an RRC-connected mode in a next-generation mobile communication system and is a sequence diagram illustrating a method of configuring a protocol layer device or functions of the UE according to an embodiment of the disclosure.

FIG. 19 shows a procedure in which a UE switches from an RRC-idle mode to an RRC-connected mode in a next-generation mobile communication system and is a sequence diagram illustrating a method of configuring a protocol layer device or functions of the UE according to an embodiment of the disclosure.

Referring to FIG. 19, one cell to which the base station provides service may serve a very wide frequency band. First, the UE may search the entire frequency band provided by a service provider (PLMN) in units of predetermined resource blocks (for example, in units of 12 Resource Blocks (RBs)). That is, the UE may start discovering a Primary Synchronization Sequence (PSS)/Secondary Synchronization Sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a Master system Information Block (MIB) or Minimum System Information (MSI) and identify initial access Bandwidth Part (BWP) information by reading system information in operations 19-01 and 19-05. CORESET information refers to the location of time/frequency transmission resources through which a control signal is transmitted from the base station, and may be, for example, the location of resources through which a PDCCH channel is transmitted.

As described above, if the UE completes synchronization of the downlink signal with the base station and is able to receive a control signal, the UE may perform a random access procedure in the initial BWP, receive a random access response, make a request for configuring an RRC connection, receive an RRC message, and configure the RRC connection in operations 19-10, 19-15, 19-20, 19-25, and 19-30.

If the basic RRC connection is completely configured, the base station may transmit an RRC message which asks about a UE capability to the UE (UECapabilityEnquire) in order to identify the UE capability in operation 19-35. In another method, the base station may ask the MME or the AMF about the UE capability in order to identify the UE capability. This is because the MME or the AMF may have UE capability information if the UE previously accessed the MME or the AMF.

When performing a UE capability report procedure, the UE may include some or a plurality of pieces of following information in an RRC message (for example, a Non Access Stratum (NAS) message or an Access Stratum (AS) message) for reporting the UE capability.

Information indicating whether the UE supports a data concatenation function or a data separation function of the higher layer device The maximum size in which the UE supports a data concatenation function or a data separation function of the higher layer device (for example, the maximum size of data which can be concatenated or the maximum size of all of the data obtained by concatenating a plurality of pieces of data)

The maximum number of pieces of data which can be concatenated when the UE supports the data concatenation function or the data separation function of the higher layer device Information indicating whether the integrity protection procedure (or function) is supported for each bearer Information indicating whether the integrity protection procedure is supported to a DRB A maximum data rate DRB (for example, 64 kbps or full rate) supported when the integrity protection procedure is applied when the integrity protection procedure is supported for a or information indicating whether the integrity protection procedure is supported for any data rate regardless of a data rate Information on functions supported by the UE Release information supported by the UE, for example, Rel-15, Rel-16, Rel-17, or the like. For example, if the UE supports only Rel-15, the base station or the network may consider that the integrity protection procedure is supported only at a data rate of 64 kbps when the integrity protection procedure is supported for the DRB or the integrity protection procedure function for the DRB may be identified through a UE capability report message (for example, a Non Access Stratum (NAS) message or an Access Stratum (AS) message). In another method, if the UE supports only Rel-15 or Rel-16, the base station or the network may consider that the integrity protection procedure is always supported regardless of a transmission rate when the integrity protection procedure is supported for the DRB or the integrity protection procedure function for the DRB may be identified through a UE capability report message (for example, a Non Access Stratum (NAS) message or an Access Stratum (AS) message).

When the UE capability report message is received from the UE, the base station or the network may configure the data concatenation function or the integrity protection function for each bearer or each layer device in the UE through the RRC message (for example, RRCReconfiguration message, RRCSetup message, or RRCResume message).

If there is no UE capability required by the base station, the base station may make a request for UE capability to the UE.

The reason why the base station transmits the RRC message to the UE to identify the UE capability is to check the UE capability, for example, information indicating a frequency band that the UE can read, an area of the frequency band that the UE can read, a function supported by the UE, or how the function is supported by the UE. After checking the UE capability, the base station may configure a suitable BWP or suitable functions in the UE. When receiving the RRC message asking about the UE capability, the UE may transmit a response including UE capability information for the supported functions to the base station in operation 19-40.

The UE may configure bearer configuration information, cell group configuration information, cell configuration information, or each layer device information (for example, SDAP layer device, PDCP layer device, RLC layer device, MAC layer device, or PHY layer device) through an RRCSetup message or an RRCResume message of operation 19-25 or RRCreconfiguration messages of operations 19-45 and 19-70 of the RRC connection configuration, and the RRC message may include configuration information for a PCell, a Pscell, or a plurality of cells, and a plurality of BWPs may be configured for each cell. When receiving the RRCReconfiguration message through which the configuration information of the UE is received, the UE may apply the configuration information to a bearer or a layer device of the UE, configure an RRCReconfigurationComplete message of operation 19-50 or 19-75 and 19-55 indicating completion of reconfiguration, and transmit the same to the base station.

When indicating a handover to the UE through another cell or frequency, the base station or the network may configure a handover message (RRCReconfiguration message of operation 19-85 and 19-95) including configuration information of a target base station for the handover and transmit the same to the UE, and the UE may perform a handover procedure (for example, a random access procedure to the target base station, a synchronization procedure, or the like) according to the configuration of the handover and, if the handover is successfully performed, configure an RRCReconfigurationComplete message of operation 19-90 and transmit the same to the target base station. The configuration information of the target base station may include bearer configuration information, cell group configuration information, cell configuration information, or each layer device information (for example, SDAP layer device, PDCP layer device, RLC layer device, MAC layer device, or PHY layer device). Data transfer occurs in operation 19-60. Random access occurs in operation 19-100.

Bearer configuration information of the UE, cell group configuration information, cell configuration information, or each layer device information (for example, SDAP layer device, PDCP layer device, RLC layer device, MAC layer device, or PHY layer device) may be configured in the RRC message (RRCSetup message, RRCResume message of operation 19-25, or RRCReconfiguration message of operation 19-70 or 19-80), and the following information may be included therein.

Figure 20:
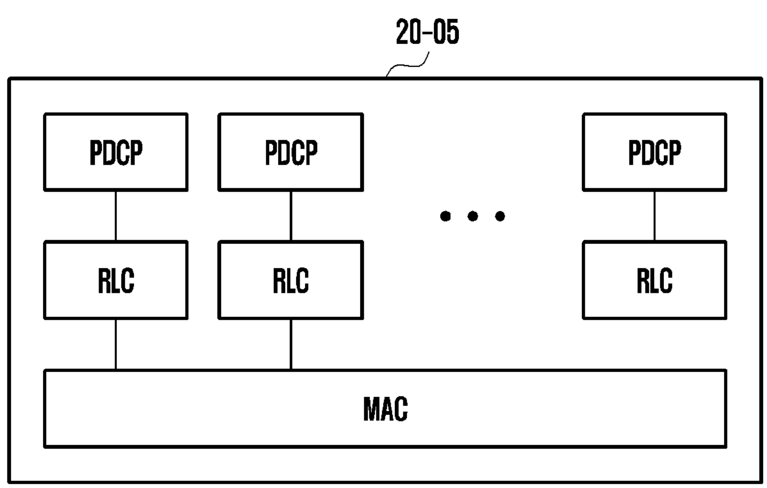
FIG. 20 illustrates a structure of a protocol layer device according to an embodiment of the disclosure.

- An indicator indicating whether the data concatenation function or the data separation function of the higher layer device (for example, PDCP layer device or SDAP layer device) is configured for each bearer or layer device for the uplink or the downlink
- A maximum size or a threshold value of data which should be concatenated when the data concatenation function or the data separation function of the higher layer device is configured for the downlink or the uplink (for example, a maximum size of data which can concatenated or a maximum size of all of a plurality of pieces of concatenated data)
- The maximum number of pieces of data which can be concatenated when the data concatenation function or the data separation function of the higher layer device is configured for the downlink or the uplink
- An indicator indicating whether the integrity protection procedure (or function) is configured for each bearer or layer device for the downlink or the uplink
- An indicator indicating whether the integrity protection is configured for the DRB for each bearer or layer device for the downlink or the uplink FIG. 20 illustrates a structure of a protocol layer device according to an embodiment of the disclosure.

Referring to FIG. 20, when the UE receives an RRC message from the base station as illustrated in FIG. 19, connection configuration information of the UE, bearer configuration information, or protocol layer device information is received and protocol layer devices may be established and configured as indicated by reference numeral 20-05. For example, for example, one PHY layer device and one MAC layer device may be established, and a plurality of bearers may be established in the MAC layer device and make connections with the MAC layer. The bearers may be configured by RLC layer devices or PDCP layer devices.

Figure 21A:
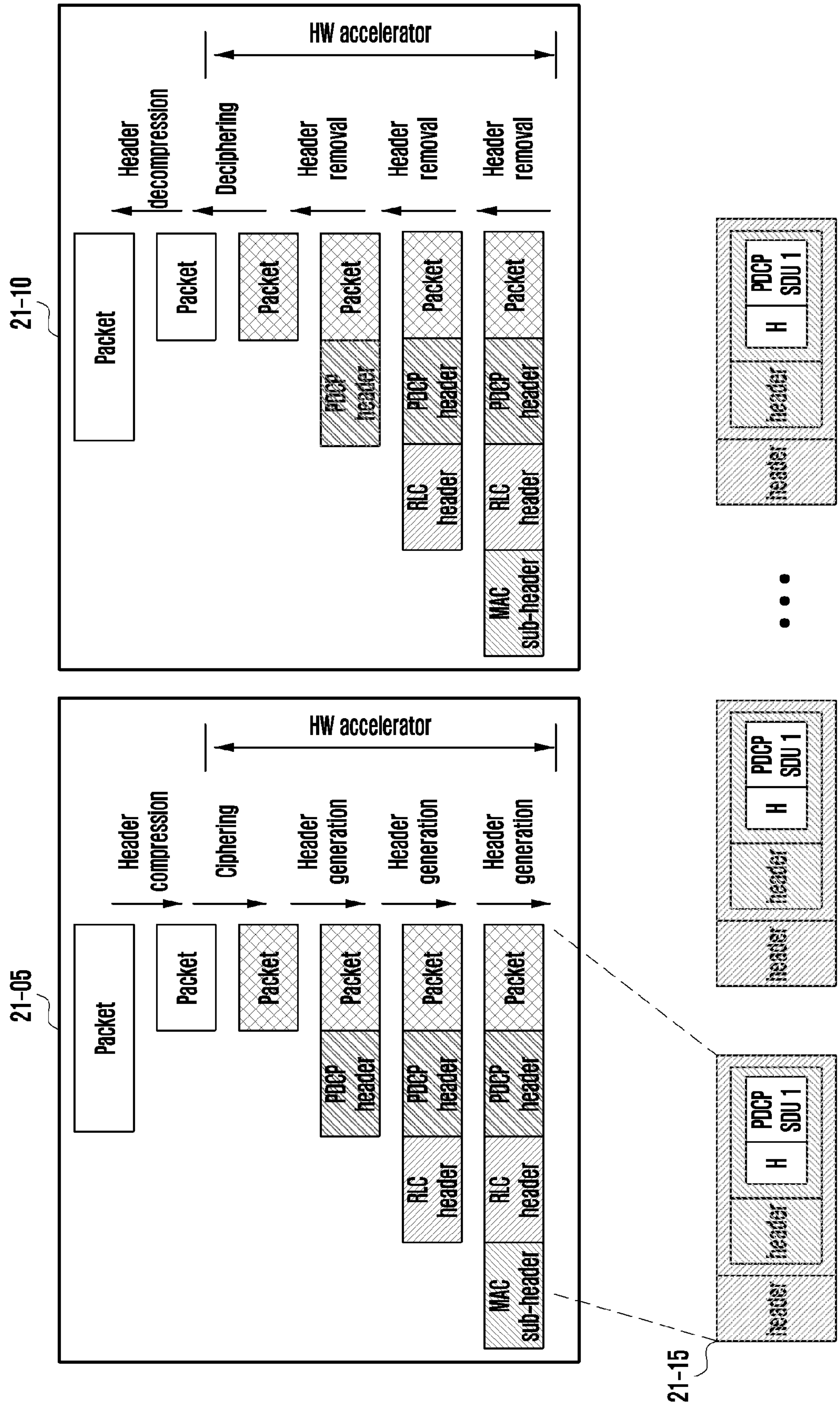
FIG. 21A illustrates a procedure of processing data received from a higher layer device in each protocol layer device of a bearer and transmitting data and a procedure of receiving data from a lower layer device, processing the data in each protocol layer device of the bearer, and transmitting the data to a higher layer device in a next-generation mobile communication system according to an embodiment of the disclosure.
Figure 21B:
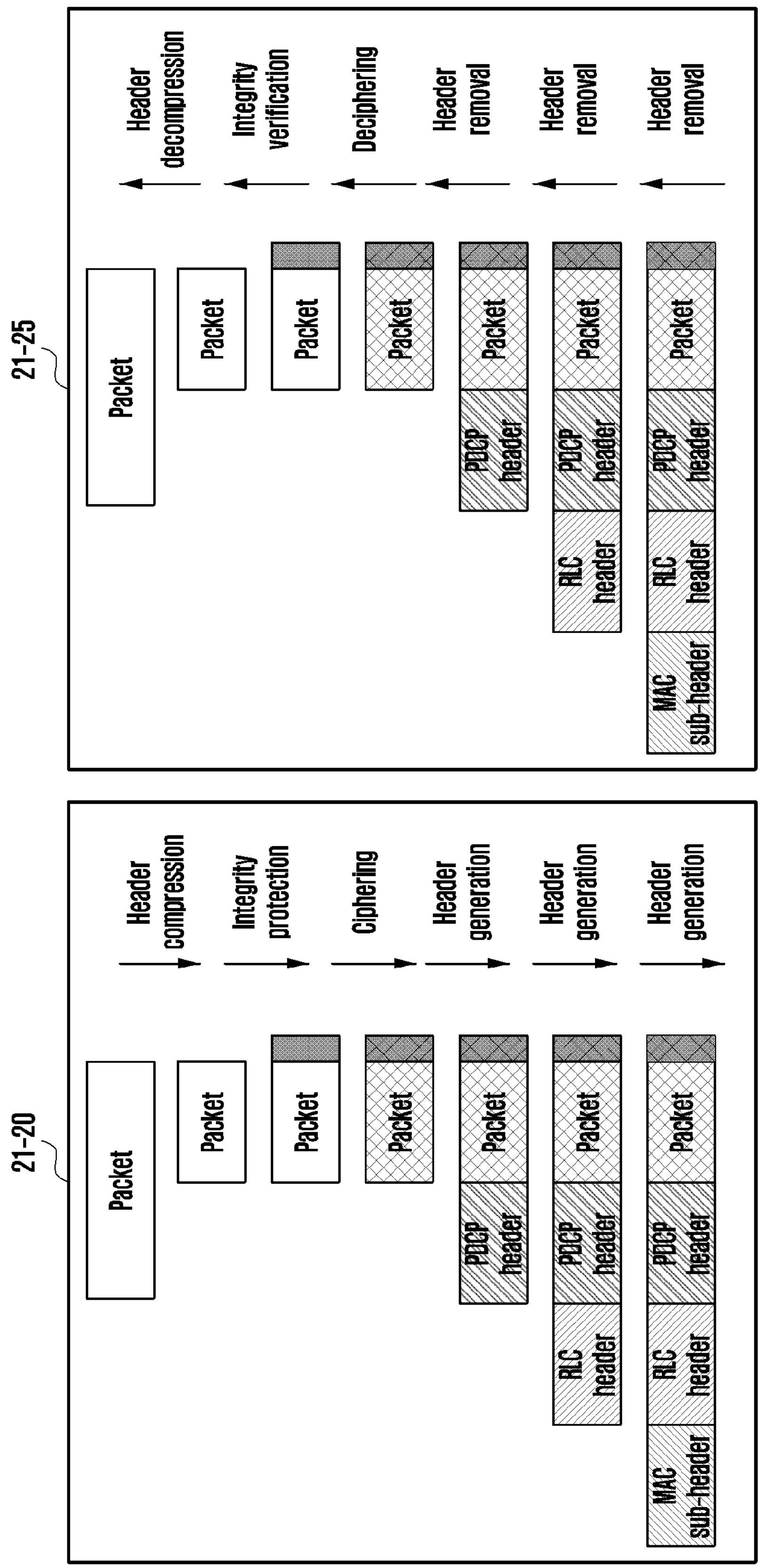
FIG. 21B illustrates a procedure of processing data received from a higher layer device in each protocol layer device of the bearer and transmitting the data and a procedure of receiving data from a lower layer device, processing the data in each protocol layer device of the bearer, and transmitting the data to a higher layer device in a next-generation mobile communication system according to an embodiment of the disclosure.
Figure 21C:
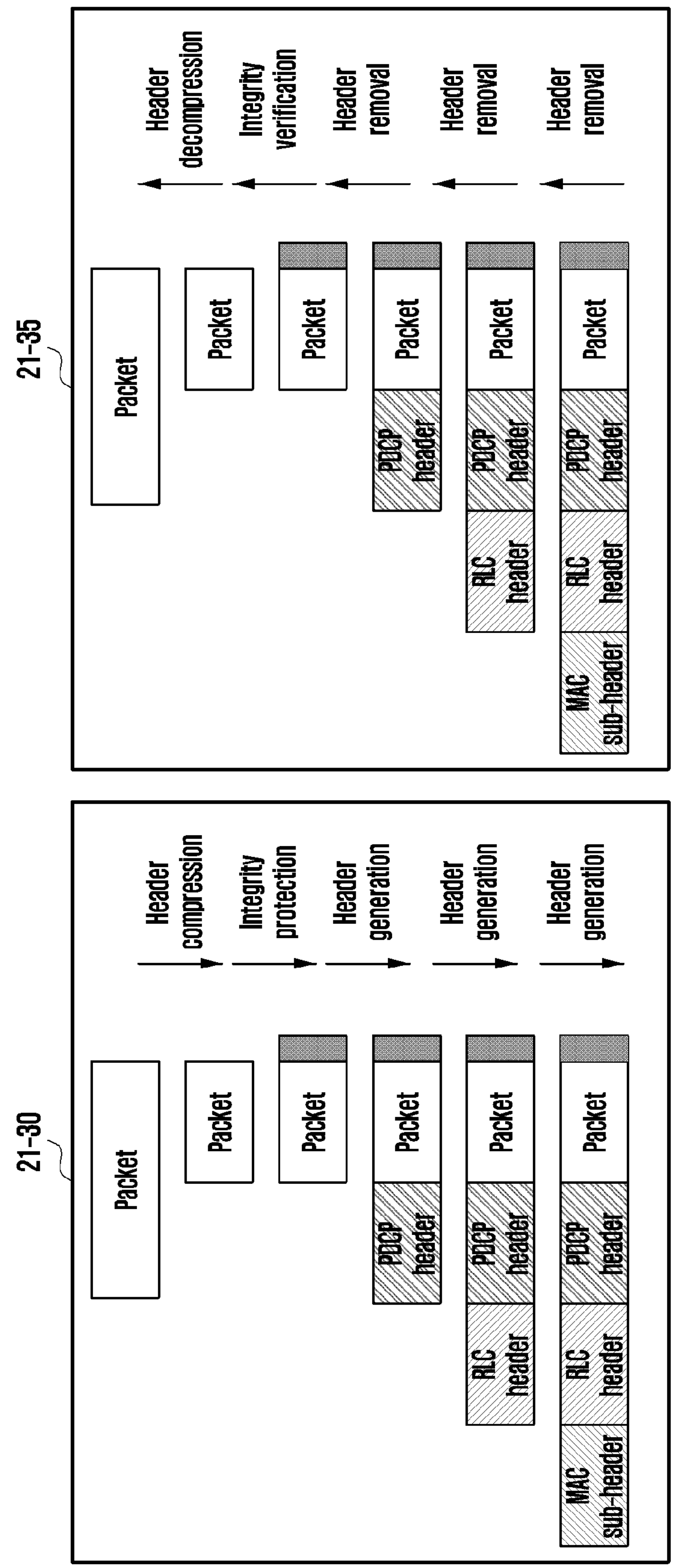
FIG. 21C illustrates a procedure of processing data received from a higher layer device in each protocol layer device of a bearer and transmitting data and a procedure of receiving data from a lower layer device, processing the data in each protocol layer device of the bearer, and transmitting the data to a higher layer device in a next-generation mobile communication system according to an embodiment of the disclosure.

FIGS. 21A to 21C illustrate a procedure of processing data received from a higher layer device in each protocol layer device of the bearer and transmitting the data and a procedure of receiving data from a lower layer device, processing the data in each protocol layer device of the bearer, and transmitting the data to a higher layer device in a next-generation mobile communication system according to various embodiments of the disclosure.

Referring to FIGS. 21A to C, if a ciphering procedure or security key configuration information is configured in the PDCP layer device, the UE may induce security keys in the RRC layer device and, when establishing or reestablishing the PDCP layer device, may apply the security key and perform the ciphering procedure. When the PDCP layer device receives data (for example, PDCP SDU) from the higher layer device as indicated by reference numeral 21-05, if the header compression procedure is configured through the RRC message or the ciphering procedure is configured as illustrated in FIG. 19, the PDCP layer device may perform the header compression procedure for the data, perform the ciphering procedure for the data, allocate a PDCP serial number, configure a PDCP header, configure the data as a PDCP PDU, and transmit the data to the lower layer device. The RLC layer device may configure an RLC serial number and header fields values in the data (PDCP PDU), add an RLC header, and transmit the data to the MAC layer device, and the MAC layer device may configure a length of the data, configure a length field and an MAC header field value such as a logical channel identifier corresponding to the data, add an MAC header, and transmit the data to the lower layer device. The RLC layer device may perform a data separation procedure as necessary or when uplink transmission resources lack, and update field values of the RLC header or configure separation information.

When the UE receives data from the lower layer device as indicated by reference numeral 21-10, the UE may read the MAC header, identify the length field, separate data, identify the logical channel identifier, and de-multiplex the data to transmit the same to the corresponding RLC layer device. When the RLC layer device receives the data, the RLC layer device may read the RLC header, identify whether the data is separated, remove the RLC header from the data which has not been separated, transmit the data to the PDCP layer device, and store the separated data in a buffer and, if all pieces of separated data for the RLC serial number corresponding to the separated data are received, reassemble the data to configure complete data and transmit the reassembled data to the PDCP layer device. When the ciphering procedure is configured, the PDCP layer device may perform the deciphering procedure. When pieces of the deciphered data are arranged in an order of PDCP serial numbers or COUNT values or the header compression procedure is configured, the header decompression procedure may be applied to the data and the data may be transmitted to the higher layer device in an ascending order of the COUNT value. If the header compression procedure is not configured, the header compression procedure or the header decompression procedure may be omitted.

When the header compression procedure, the integrity protection procedure, or the ciphering procedure is configured in the PDCP layer device as indicated by reference numeral 21-20, the PDCP layer device may apply the header compression procedure to higher layer device data, perform the integrity protection procedure to the header-compressed data or the PDCP header, add a 4-byte MAC-I field thereafter, and apply the ciphering procedure to the data to which the integrity protection procedure is applied and the MAC-I field as indicated by reference numeral 21-20. On the reception side, the receiving PDCP layer device may apply the deciphering procedure to data received from the lower layer device, apply the integrity verification procedure on the basis of the 4-byte MAC-I field added after the deciphered data to identify whether integrity fails, discard data failing in the integrity verification procedure and, if pieces of data passing through the integrity verification procedure are arranged in an order of PDCP serial numbers or COUNT values or the header compression procedure is configured, apply the header decompression procedure to the data and transmit the data to the higher layer device in an ascending order of the COUNT value as indicated by reference numeral 21-25. If the header compression procedure is not configured, the header compression procedure or the header decompression procedure may be omitted.

When the header compression procedure or the integrity protection procedure is configured or the ciphering procedure is not configured in the PDCP layer device as indicated by reference numeral 21-30, the transmitting PDCP layer device may apply the header compression procedure to higher layer device data, perform the integrity protection procedure to the header-compressed data or the PDCP header, add a 4-byte MAC-I field thereafter, add a PDCP header before the data to which the integrity protection procedure is applied and the MAC-I field, and transmit the same to the lower layer device. On the reception side, as indicated by reference numeral 21-35, the receiving PDCP layer device may apply the integrity verification procedure to data received from the lower layer device on the basis of the 4-byte MAC-I field added thereafter, identify whether integrity fails, discard data failing in the integrity verification procedure and, if pieces of data passing through the integrity verification procedure are arranged in an order of PDCP serial numbers or COUNT values or the header compression procedure is configured, apply the header decompression procedure to the data and transmit the data to the higher layer device in an ascending order of the COUNT value. If the header compression procedure is not configured, the header compression procedure or the header decompression procedure may be omitted.

The transmitted data may be generated and transmitted in a structure in which a header and data are repeated as indicated by reference numeral 21-15. For example, the structure has repeated structure data such as a header (MAC header, RLC header, PDCP header, or SDAP header) and data and a header (MAC header, RLC header, PDCP header, or SDAP header) and data. Accordingly, in order to perform more rapid data processing when data having the repeated structure with a header in the fixed size is generated, a hardware accelerator (or hardware engine) may be applied to reduce a data processing time. The hardware accelerator may be applied, called, and used when the header (MAC header, RLC header, PDCP header, or SDAP header) is added or removed or when the ciphering procedure, the deciphering procedure, the integrity protection procedure, or the integrity verification procedure is performed.

Figure 22:
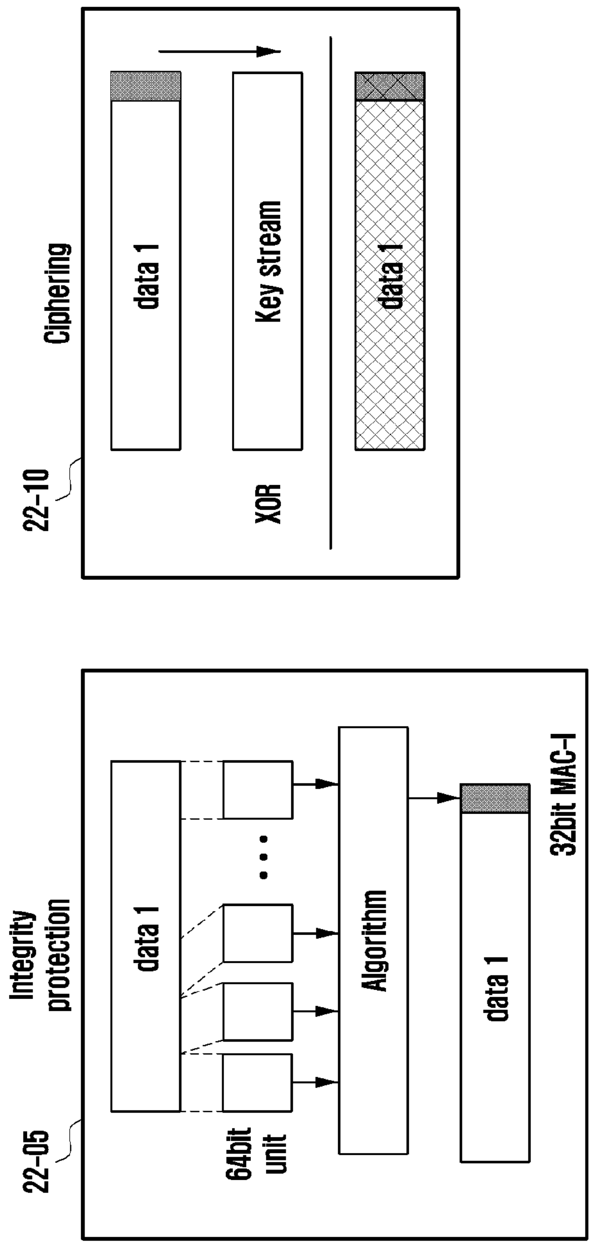
FIG. 22 illustrates an integrity protection or verification procedure or a ciphering or deciphering procedure in a next-generation mobile communication system according to an embodiment of the disclosure.

FIG. 22 illustrates an integrity protection or verification procedure, or a ciphering or deciphering procedure in a next-generation mobile communication system according to an embodiment of the disclosure.

Referring to 22, when the integrity protection procedure is configured as indicated by reference numeral 22-05 of FIG. 22, the integrity protection procedure may be performed on the basis of a COUNT value corresponding to data to which security keys induced or applied from the higher layer device (for example, RRC layer device or NAS layer device) and the integrity protection procedure are applied or bearer identifiers corresponding to the data. For example, the data to which the integrity protection procedure is applied may be calculated in units of 8 bytes (64 bits) according to an integrity protection algorithm, a 4-byte (32 bits) MAC-I may be finally calculated, and a Message Authentication Code for Integrity (MAC-I) field may be added to the last part of the data. In the integrity verification procedure, the reception side may compare a 4-byte X-MAC field value obtained by inversely applying the integrity verification algorithm to the received data with the MAC-I value added to the data and, when the two values are the same as each other, determine that the integrity verification for the data has been successfully performed. When the two values are different, it may be determined that the integrity verification fails and the data may be discarded. As described above, the integrity protection procedure is a very complex procedure, and thus has high data processing complexity and a long data processing time.

When the ciphering procedure is configured as indicated by reference numeral 22-10, the ciphering procedure may be performed. For example, a key stream having the same length as the data may be generated through a ciphering algorithm on the basis of a COUNT value corresponding to data to which security keys and ciphering induced or applied from the higher layer device (for example, RRC layer device or NAS layer device) are applied or bearer identifiers corresponding to the data. Ciphered data may be generated through an XOR procedure of the generated key stream and the data to be ciphered. Inversely, the reception side may perform a deciphering procedure by performing the XOR procedure for ciphered data receiving the generated key stream through a deciphering algorithm. As described above, the ciphering procedure or the deciphering procedure is a very complex procedure, and thus has high data processing complexity and a long data processing time.

Figure 23:
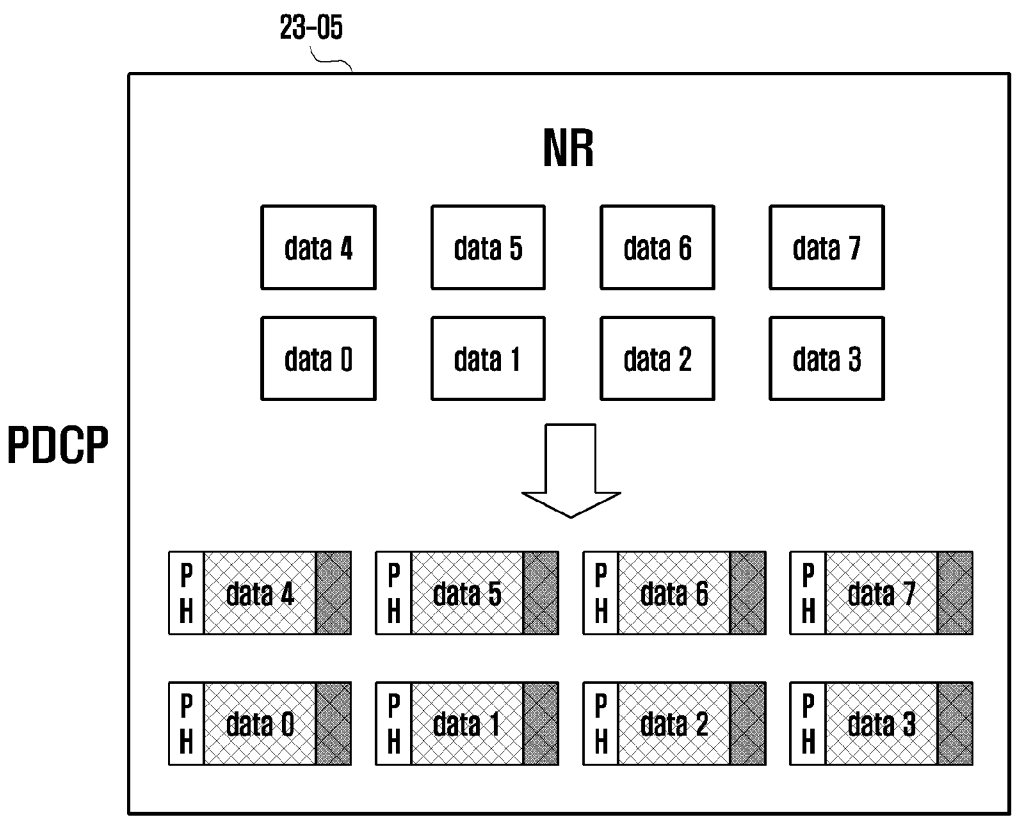
FIG. 23 illustrates a long data processing time with high complexity when a packet data convergence protocol (PDCP) layer device applies an integrity protection procedure or the ciphering procedure to data according to an embodiment of the disclosure.

FIG. 23 illustrates a long data processing time with high complexity when the PDCP layer device applies the integrity protection procedure or the ciphering procedure to data according to an embodiment of the disclosure.

Referring to FIG. 23, if the integrity protection procedure or the ciphering procedure is configured when it is assumed that the transmitting PDCP layer device 23-05 receives 8 pieces of data from the higher layer device, the transmitting PDCP layer device may perform 8 integrity protection procedures and generate 8 MAC-I fields and then should add the 8 MAC-I fields after data or should perform 8 ciphering procedures for the data. Accordingly, applying the integrity protection procedure or the ciphering procedure to each piece of data causes the performance of very complex procedures eight times and consumes a long data processing time. Also, when the receiving PDCP layer device receives 8 pieces of data from the lower layer device, the reception side should perform 8 deciphering procedures and 8 integrity verification procedures.

Figure 24:
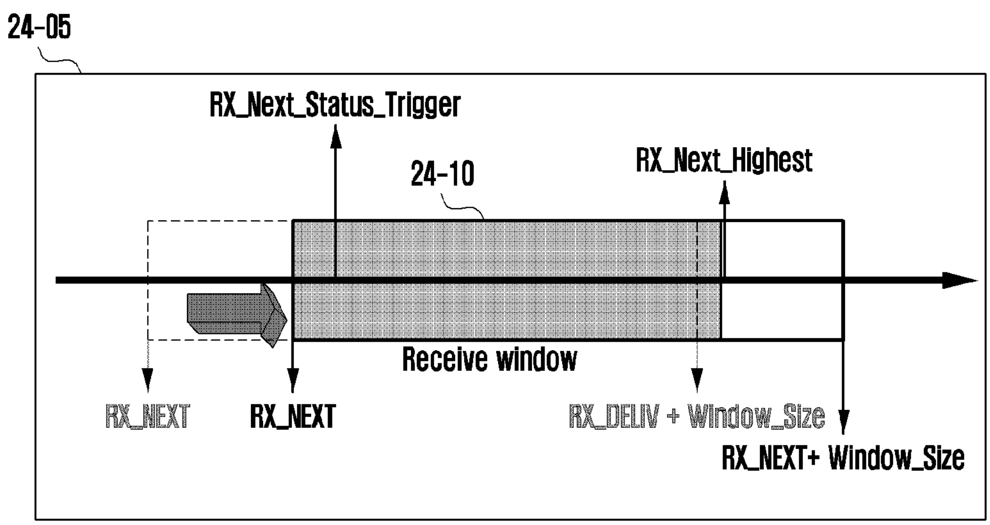
FIG. 24 illustrates an operation in which a radio link control (RLC) layer device operates an RLC reception window according to an embodiment of the disclosure.

FIG. 24 illustrates an operation in which an RLC layer device operates an RLC reception window according to an embodiment of the disclosure.

Referring to FIG. 24, the RLC reception window may be operated by window parameters as indicated by reference numeral 24-05. For example, a first parameter (RX_NEXT) may indicate a next RLC serial number of sequentially and successfully received data having the lowest RLC serial number and a second parameter (RX_NEXT_Highest) may indicate an RLC serial number considered to be subsequently received or a next RLC serial number of data having the highest RLC serial number among the received data. In the reception window, for RLC serial numbers between the first parameter and the second parameter, RLC serial numbers, data, or a mapping list indicating successful reception may be configured, and a linked list may be implemented to search for a serial number of data. The transmission RLC layer device may also operate a transmission window, configure RLC serial numbers, data, or a mapping list indicating successful reception, and implement a linked list to search for a serial number or data. The configured linked lists may be used when the RLC layer device performs an ARQ procedure and, more specifically, update the window parameters, configures an RLC state report, or performs a retransmission procedure in an RLC ARQ procedure, and also used when data is found through a search for the linked list based on the RLC serial number or information is updated. Accordingly, the length of the linked list may become longer as the number of RLC serial numbers allocated by the RLC layer device is larger, and a search time performed by the RLC serial number length may become very long as the length of the linked list is longer. Referring to FIGS. 21A to 21C, since there is no data concatenation procedure in the next-generation mobile communication system, the number of RLC serial numbers configured by the linked list becomes very large, and an RLC serial number space which should be detected in a linked list or the linked list becomes very large as indicated by reference numeral 24-10. Accordingly, when the RLC layer device performs the ARQ procedure, the data processing time increases as a data search time is longer.

Figure 25A:
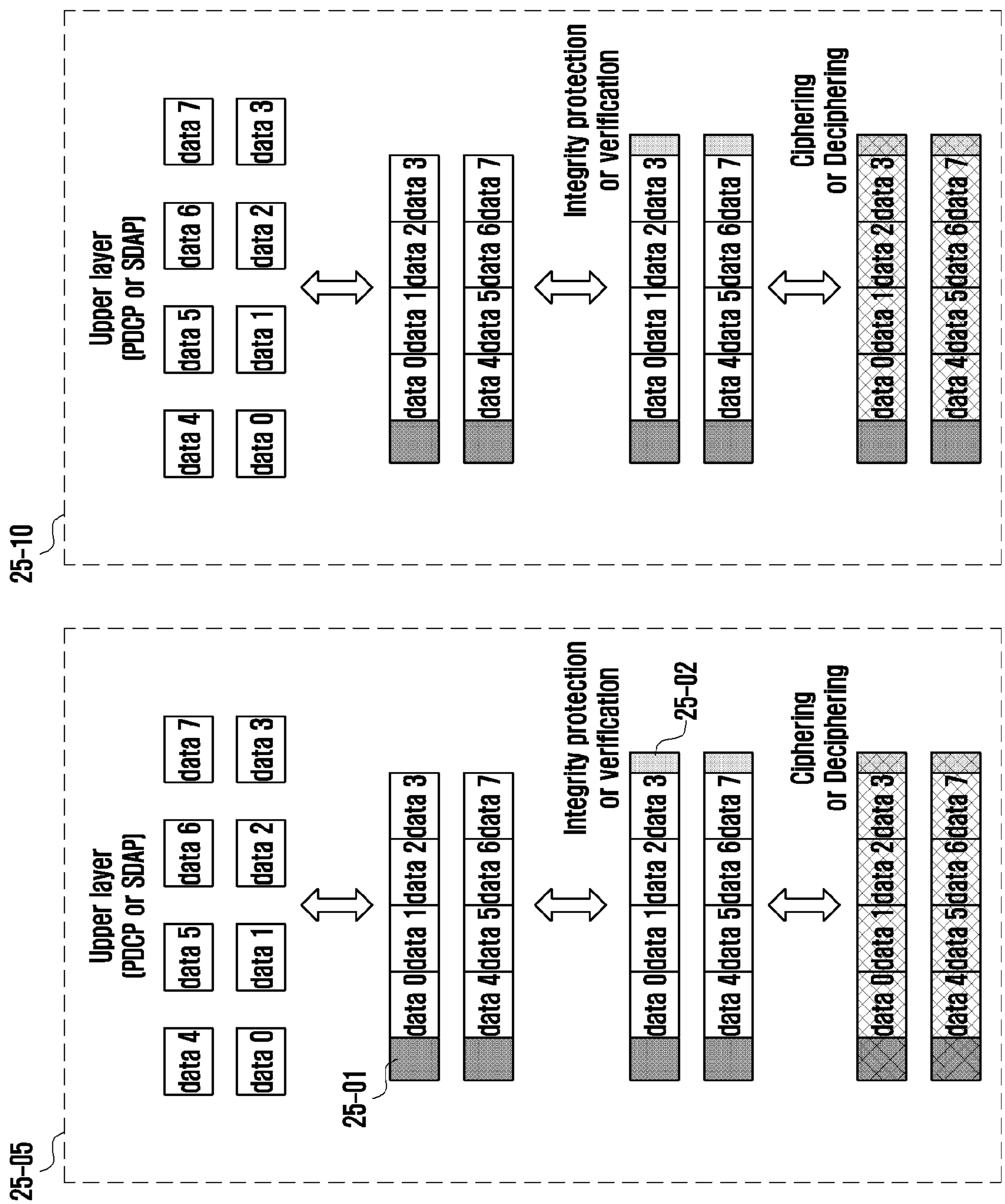
FIG. 25A illustrates embodiment 2-1 of a data concatenation procedure to reduce a number of times data is processed through an integrity protection procedure, an integrity verification procedure, a ciphering procedure, or a deciphering procedure and reduce a number of allocated RLC serial numbers to shorten a data processing time according to an embodiment of the disclosure.
Figure 25B:
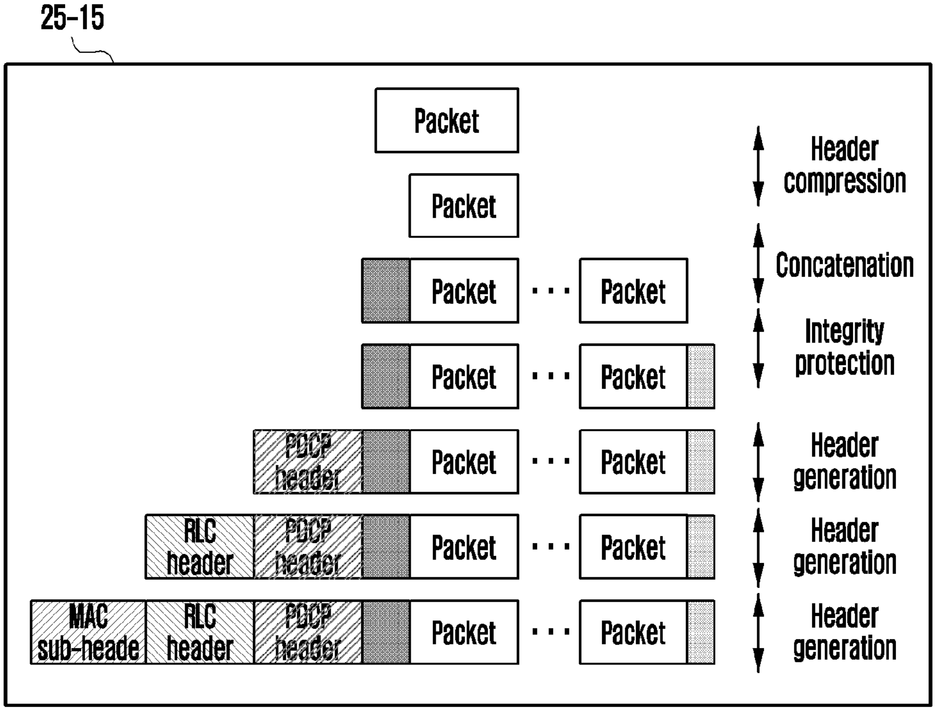
FIG. 25B illustrates embodiment 2-1 of data concatenation procedure to reduce a number of times data is processed through an integrity protection procedure, an integrity verification procedure, a ciphering procedure, or a deciphering procedure and reduce a number of allocated RLC serial numbers to shorten a data processing time according to an embodiment of the disclosure.
Figure 25B:
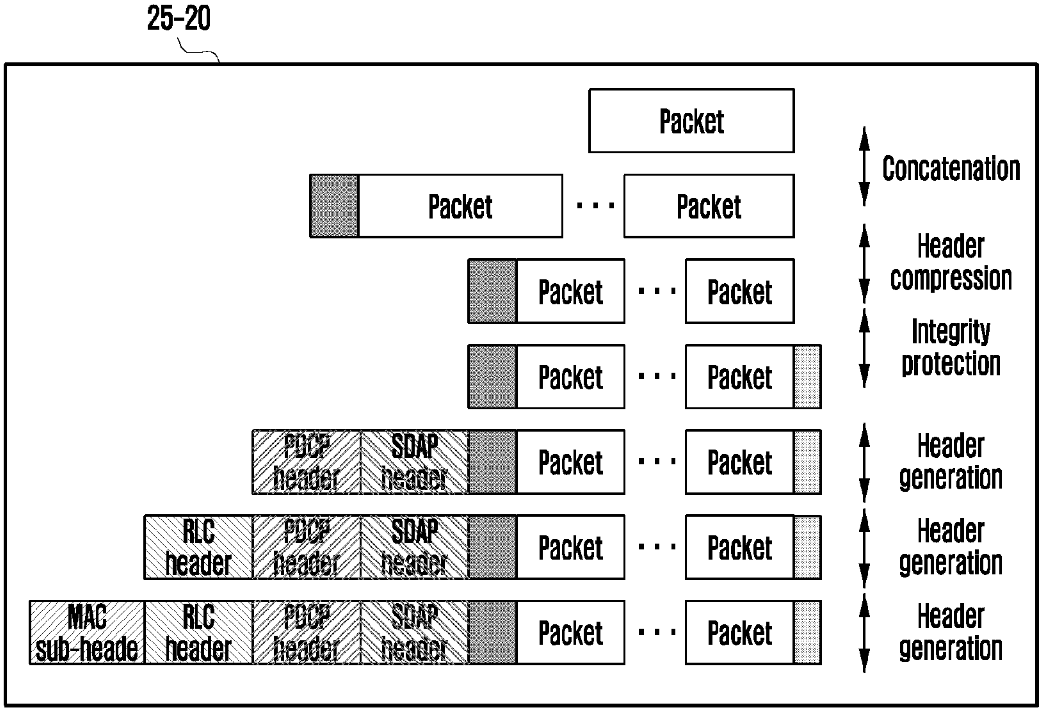

FIGS. 25A and 25B illustrate embodiment 2-1 of a data concatenation procedure to reduce a number of times data is processed through the integrity protection procedure, an integrity verification procedure, a ciphering procedure, or a deciphering procedure and reduce the number of allocated RLC serial numbers to shorten a data processing time according to various embodiments of the disclosure.

Figure 26A:
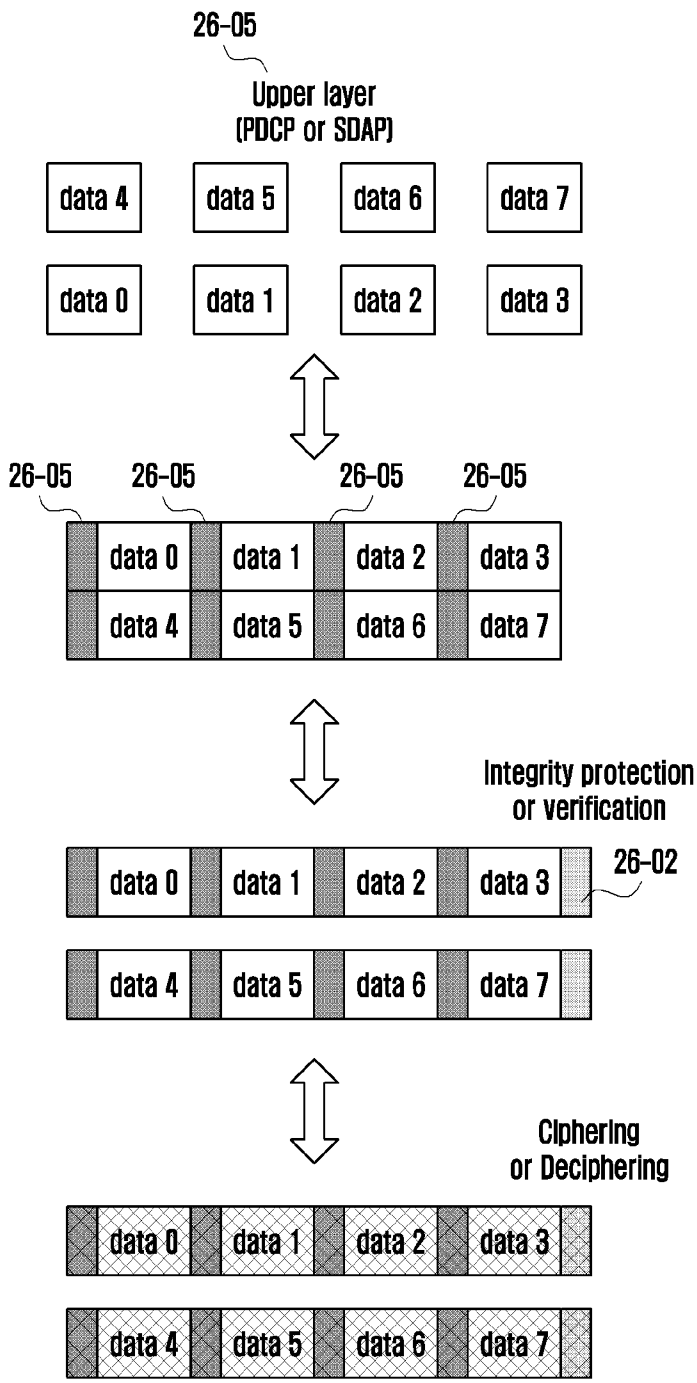
FIG. 26A illustrates embodiment 2-2 of data concatenation procedure to reduce a number of times data is processed through an integrity protection procedure, an integrity verification procedure, a ciphering procedure, or a deciphering procedure and reduce a number of allocated RLC serial numbers to shorten a data processing time according to an embodiment of the disclosure.
Figure 26B:
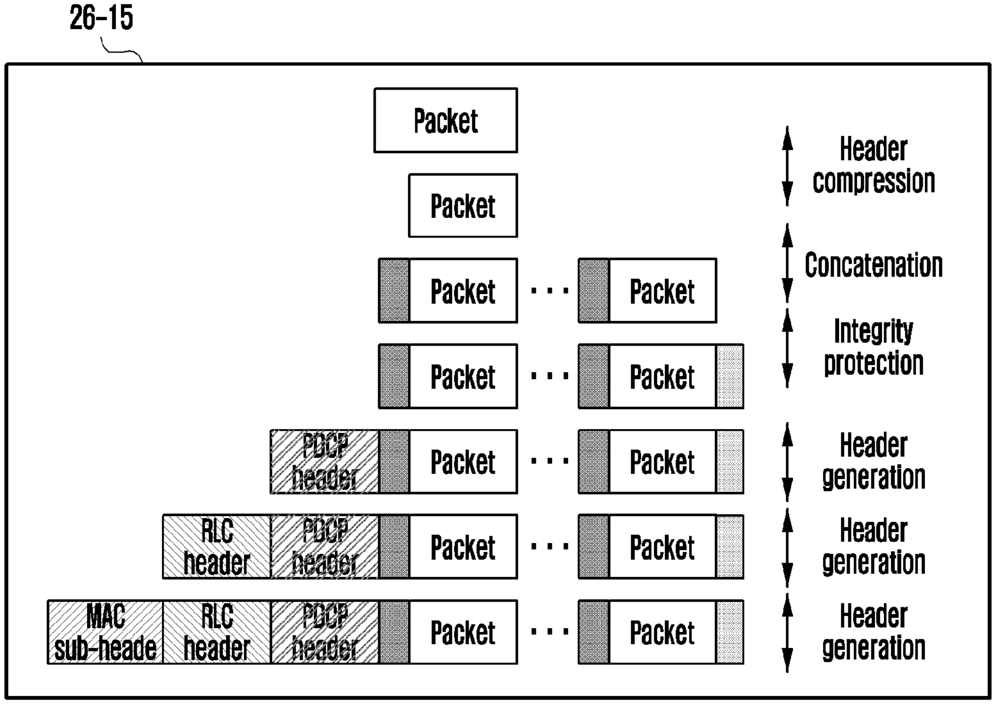
FIG. 26B illustrates embodiment 2-2 of data concatenation procedure to reduce a number of times data is processed through an integrity protection procedure, an integrity verification procedure, a ciphering procedure, or a deciphering procedure and reduce a number of allocated RLC serial numbers to shorten a data processing time according to an embodiment of the disclosure.
Figure 26B:
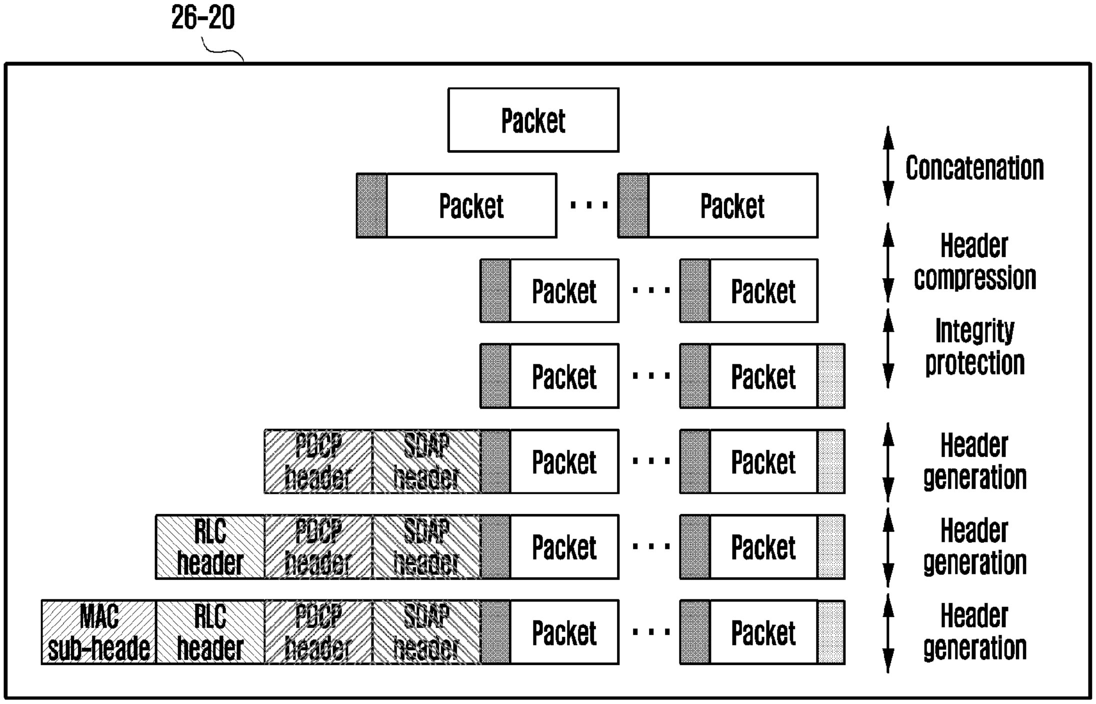

FIGS. 26A and 26B illustrate embodiment 2-2 of a data concatenation procedure to reduce a number of times data is processed through an integrity protection procedure, an integrity verification procedure, a ciphering procedure, or a deciphering procedure and reduce the number of allocated RLC serial numbers to shorten a data processing time according to various embodiments of the disclosure.

FIG. 27 illustrates embodiment 2-3 of a data concatenation procedure to reduce a number of times data is processed through an integrity protection procedure, an integrity verification procedure, a ciphering procedure, or a deciphering procedure and reduce the number of allocated RLC serial numbers to shorten a data processing time according to an embodiment of the disclosure.

The disclosure proposes various data processing methods to improve a data processing rate when the base station and the UE process data at a high data rate in the next-generation mobile communication system.

Among data processing procedures performed when the UE or the base station transmits or receives data as illustrated in FIGS. 23 and 24, a procedure having the largest processing loads or time is a ciphering procedure, a deciphering procedure, an integrity protection procedure, an integrity verification procedure of the PDCP layer device, or an Automatic Repeat Request (ARQ) procedure of the RLC layer device.

Referring to FIG. 19, the procedures may be procedures performed by the RLC layer device or the PDCP layer device configured for each bearer, and the base station may configure whether to use or not use the ciphering procedure (or deciphering procedure), integrity protection procedure (or integrity verification procedure), or the ARQ procedure (for example, configured in the RLC AM mode) for each bearer (for example, SRB or DRB) by transmitting an RRC message (for example, RRCReconfiguration message, RRCSetup message, or RRCResume message) to the UE when the UE configures the connection with the network.

Accordingly, when the ciphering procedure (or deciphering procedure) is configured and the integrity protection procedure (or integrity verification procedure) is not configured for a bearer, the UE or the base station may not perform the integrity protection procedure (or integrity verification procedure) and may perform the ciphering procedure (or deciphering procedure) for the bearer.

Further, when the ciphering procedure (or deciphering procedure) is not configured and the integrity protection procedure (or integrity verification procedure) is configured for a bearer, the UE or the base station may perform the integrity protection procedure (or integrity verification procedure) and may not perform the ciphering procedure (or deciphering procedure) for the bearer.

In addition, when both the ciphering procedure (or deciphering procedure) and the integrity protection procedure (or integrity verification procedure) are configured, the UE or the base station may perform integrity protection procedure (or integrity verification procedure) and then perform the ciphering procedure (or deciphering procedure) for the bearer.

Since the PDCP layer device perform the ciphering procedure (or deciphering procedure) or the integrity protection procedure (or integrity verification procedure) on each piece of data received from the higher layer device only once, the ciphering procedure (or deciphering procedure) or the integrity protection procedure (or integrity verification procedure) should be performed more as the larger number of data is received, and thus data processing complexity increases and a data processing time becomes longer. Further, since the RLC layer device allocates an RLC serial number to each piece of data received from the higher layer device (for example, PDCP layer device) and thus more RLC serial numbers should be allocated and used as more pieces of data are received, and accordingly, the ARQ procedure executed on the basis of the RLC serial number may be very complex and a long data processing time is needed.

Accordingly, the disclosure proposes a method of reducing a number of times the PDCP layer device performs the ciphering procedure (or deciphering procedure) or the integrity protection procedure (or integrity verification procedure) or the number of RLC serial numbers allocated and used by the RLC layer device. The ciphering procedure (or deciphering procedure) or the integrity protection procedure (or integrity verification procedure) is a procedure having large data processing loads and thus can be used using a hardware accelerator (or a hardware engine) and, if the number of calls of the hardware accelerator is reduced to perform the ciphering procedure (or deciphering procedure) or the integrity protection procedure (or integrity verification procedure), more hardware accelerator calls may be performed in parallel to process other data (for example, other bearer data), and thus it is possible to reduce a data processing time and improve a data processing rate. If the number of RLC serial numbers allocated to the data is reduced, a time spent for searching for a list with the RLC serial numbers, data, or ACK or NACK indicators can be reduced in the ARQ procedure of the RLC layer device and thus the data processing time may be reduced.

The disclosure proposes a data concatenation procedure for data (for example, SDAP SDU or PDCP SDU) received from the higher layer device by the higher layer device (for example, PDCP layer device or SDAP layer device). When the data concatenation procedure of the higher layer device is configured in the transmission side, the reception side should perform a data de-concatenation (or separation) procedure.

The disclosure proposes embodiment 2-1 of the data concatenation procedure as illustrated in FIGS. 25A and 25B, embodiment 2-2 of the data concatenation procedure as illustrated in FIGS. 26A and 26B, or embodiment 2-3 of the data concatenation procedure as illustrated in FIG. 27.

Embodiment 2-1, embodiment 2-2, or embodiment 2-3 of the higher layer device data concatenation procedure (upper layer concatenation) proposed in the disclosure may have one or a plurality of following functions.

The data concatenation procedure proposed in the disclosure may be configured or performed by the SDAP layer device, the PDCP layer device, or a new layer device, and whether to apply the data concatenation procedure for each bearer or for the downlink or the uplink may be configured in the RRC message (for example, RRCReconfiguration message, RRCSetup message, or RRCResume message) through an indicator. When the data concatenation procedure is configured in the RRC message, the number of pieces of data or the maximum size of pieces of data which can be concatenated may be configured. In another method, the number of pieces of data to be concatenated or the size of pieces of data to be concatenated may be freely determined and performed in UE implementation or base station implementation.

The UE supporting the data concatenation procedure proposed in the disclosure may report whether the maximum size in which concatenation is possible through the data concatenation procedure (for example, the maximum size of concatenated data or the maximum size to which the ciphering procedure (or deciphering procedure) or the integrity protection procedure (or integrity verification procedure) can be applied simultaneously) or the data concatenation procedure is supported through a UE capability reporting message. The maximum size of which the data which can be concatenated by the UE or the base station through the data concatenation, the maximum size of the concatenated data, or the maximum size to which the ciphering procedure (or deciphering procedure) or the integrity protection procedure (or integrity verification procedure) can be applied simultaneously may be pre-appointed or defined and used by the PDCP layer device. For example, the maximum size (for example, 8192 bytes or 9000 bytes) may be defined in the PDCP layer device-related standard.

Introduction of new fields 25-01, and 27-01 is proposed to perform the data concatenation procedure or the data separation procedure proposed in the disclosure. Some of the proposed new fields may be introduced or defined by the SDAP header or the PDCP header, or some of the new fields may be added to or introduced in the front part of each piece of data or may be added to or introduced in the first part of the entire concatenated data. When the data concatenation procedure is performed, a new field may be introduced for each piece of data and may be used for the data concatenation procedure or the data separation procedure. For example, the new fields may be located before the data and may be concatenated with the data in a structure of {[new field+data][new field+data] . . . [new field+data]} as indicated by reference numerals 26-05, 26-15, and 26-20 of FIGS. 26A and 26B. Such a structure is suitable for a data rate since data can be sequentially and rapidly processed using the new field and the processed data can be directly transmitted to a higher layer. In another method, data may be concatenated in a structure of [new field][new field] . . . [new field][data+data+ . . . + data]. Such a structure has an advantage of processing new fields at once as indicated by reference numerals 25-05, 25-10, 25-15, and 25-20 of FIG. 25A or 25B or reference numerals 27-05, 27-10, and 27-15 of FIG. 27.

In the disclosure, the UE or the base station may apply or perform the data concatenation procedure or the data separation procedure on the basis of the new fields. The new fields 25-01, and 27-01 may include one or a plurality of fields among the following fields.

C field: indicates whether a data concatenation function is performed or not. In another method, the C field may indicate whether there is data directly thereafter, there are new fields, or there is concatenated data. In another method, the C field may indicate whether the data is the last data.

E field: indicates whether there is data directly after the data, there are new fields, or there is concatenated data. In another method, the E field may indicate whether the data is the last data.

LI field: indicates the size of each of the concatenated data in units of bytes or indicates, for the concatenated data, the size of data received from the higher layer device or to be transmitted to the higher layer device in units of bytes. For example, a first L1 field may indicate the size of first data among the concatenated data in units of bytes or indicate the size of second (or next) data among the concatenated data in units of bytes. For example, the LI field may be introduced for each piece of data and may be used for the data concatenation procedure or the data separation procedure. For example, each LI field may be located before each piece of data, and the data may be concatenated in the structure of {[LI field+data] [LI field+data] . . . [LI field+data] }. Such a structure is suitable for a data rate since data can be sequentially and rapidly processed using the new field and the processed data can be directly transmitted to a higher layer. In another method, the data may be concatenated in the structure of [E field LI field] [E field LI field] . . . [E field LI field] [data+ data+ . . . + data]. Such a structure has an advantage of processing the front new fields at once in implementation. In another method, the LI field indicating the size of the last data may be omitted. This is because, when n pieces of data are concatenated and $(n-1)^{th}$ data is separated by the LI field, the remaining data is $n^{th}$ data even though the size of the remaining data is unknown. In another method, the LI field may indicate the size of concatenated data in units of bytes and, if a header compression procedure is configured, the header compression procedure may be applied and thus the size of compressed data which has been reduced may be indicated in units of bytes. In another method, the LI field may indicate the size of concatenated data in units of bytes and, if the integrity protection procedure is configured, indicate the size of data before the application of the integrity protection procedure and an MAC-I field may be added to the last part of the concatenated data. If the integrity protection procedure is configured when the data separation procedure is applied, the reception side may perform the data separation procedure in consideration of the presence of the MAC-I field having a predetermined length (for example, 4 bytes) in the last part. For example, the LI field of the last data may indicate the length of the last data except for the MAC-I field. In another method, the LI field may indicate the size of concatenated data in units of bytes and, if the header compression procedure or the integrity protection procedure is configured, indicate the size of compressed data to which the header compression procedure is applied before the application of the integrity protection procedure and an MAC-I field may be added to the last part of the concatenated data. If the header compression procedure or the integrity protection procedure is configured when the data separation procedure is applied, the reception side may perform the data separation procedure in consideration of the presence of the MAC-I field having a predetermined length (for example, 4 bytes) in the last part. For example, the LI field of the last data may indicate the length of the compressed last data to which the header compression procedure is applied except for the MAC-I field.

F field: is a field indicating a length of the LI field introduced or added for data concatenation or data separation and indicates whether the LI field is short a field (for example, 6 bytes) or a long field (or 14 bytes). Through the introduction of the F field, overheads for the LI field may be reduced.

SN field: is a field indicating the sequence of data in the concatenated data and indicates the sequence of data through, for example, sequence numbers.

The integrity protection procedure may be applied to the new fields when integrity protection is configured in the PDCP layer device for convenience of implementation of the new fields proposed in the disclosure (for example, the same processing as data is possible), and the ciphering procedure may be applied when the ciphering procedure is applied to the PDP layer device as indicated by reference numeral 25-05 of FIGS. 25A and 25B or reference numeral 26-05 of FIGS. 26A and 26B. In another method, with respect to the new fields proposed in the disclosure, in order to allow the reception side to read the new fields before the deciphering procedure, the integrity protection procedure may be applied to the new fields when integrity protection is configured in the PDCP layer device, or the ciphering procedure may not be applied when the ciphering procedure is applied to the PDCP layer device as indicated by reference numeral 25-10 of FIGS. 25A and 25B. That is, when the ciphering procedure is not applied even though the integrity protection procedure is applied, the reception side may read in advance the new fields before the deciphering procedure.

The data concatenation procedure proposed in the disclosure features that the transmission side (UE or base station) applies or performs the data concatenation procedure for data to which or for which the integrity protection procedure or the ciphering produce is not applied or is not performed. In another method, the data concatenation procedure proposed in the disclosure features that the transmission side (UE or base station) applies or performs the data concatenation procedure for data before the integrity protection procedure or the ciphering produce is applied or performed. For example, when the integrity protection procedure or the ciphering produce is configured, the data concatenation procedure may be performed or applied and then the integrity protection procedure or the ciphering produce may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is simultaneously performed for the plurality of pieces of concatenated data using one COUNT value and thus single processing is possible through one set of security key values (COUNT value, bearer identifier, security key, or the like) and a data processing time can be reduced. For example, when the plurality of pieces of data are not concatenated, the integrity protection procedure or the ciphering procedure should be performed several times on the basis of different security key values using different COUNT values each of which is used for each piece of data, so a long data processing time is needed. When the integrity protection procedure is applied, one MAC-I field is added after the concatenated data. However, when the concatenation procedure is not applied, each MAC-I field should be added after each piece of data, and thus processing becomes complex and overheads increases. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

The data separation procedure proposed in the disclosure features that the reception side (UE or base station) applies or performs the data separation procedure for concatenated data to which or for which the deciphering procedure or the integrity verification procedure is applied or performed. In another method, the data separation procedure proposed in the disclosure features that the reception side (UE or base station) applies or performs the data separation procedure for concatenated data after which the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is simultaneously performed for the plurality of pieces of concatenated data using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the SDAP layer device configures or performs the proposed data concatenation procedure as indicated by reference numeral 25-20 of FIGS. 25A and 25B or reference numeral 26-20 of FIGS. 26A and 26B, or as illustrated in FIG. 27, the SDAP layer device may not apply the data concatenation procedure to SDAP control data (SDAP control PDU 27-02). This is because the ciphering procedure or the deciphering procedure is not applied to the SDAP control data and thus, if the SDAP control data is concatenated with other data, implementation complexity may be increased when the concatenated data is ciphered or deciphered. When the SDAP layer device performs the data concatenation function, the data concatenation procedure may be performed only for data of the higher layer device corresponding to QoS flow IDs (QoS identifiers) mapped to bearers and the concatenated data may be transmitted to the PDCP layer device of the bearer. In another method, when the SDAP layer device performs the data concatenation function and performs the data concatenation procedure for data of the higher layer device corresponding to QoS flow IDs (QoS identifiers) mapped to the bearers, specifically, the data concatenation procedure may be applied only to data corresponding to the same QoS flow ID (QoS identifier) and the concatenated data may be transmitted to the PDCP layer device of the bearer. The integrity protection procedure may be applied to the SDAP control data when the integrity protection procedure is configured, and the ciphering procedure may not be applied thereto when the ciphering procedure is configured.

Based on characteristics of the data concatenation procedure proposed in the disclosure, when the SDAP layer device configures or performs the proposed data concatenation procedure as indicated by reference numeral 25-20 of FIGS. 25A and 25B or reference numeral 26-20 of FIGS. 26A and 26B, or as illustrated in FIG. 27, the transmission side (UE or base station) applies or performs the data concatenation procedure for data to which or for which the header compression procedure, the integrity protection procedure, or the ciphering procedure is not applied or performed. In another method, the transmission side (UE or base station) applies or performs the data concatenation procedure proposed in the disclosure for data before the header compression procedure, the integrity protection procedure, or the ciphering produce is applied or performed. Accordingly, a length field (for example, LI field) among new fields generated during the data concatenation procedure may configure the length of data of which the header is not compressed as a byte unit value. For example, when the header compression procedure, the integrity protection procedure, or the ciphering procedure is configured, the header compression procedure, the integrity protection procedure, or the ciphering procedure may be performed for the concatenated data after the data concatenation procedures may be performed or applied. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

Based on characteristics of the data separation procedure proposed in the disclosure, when the SDAP layer device configures or performs the proposed data concatenation procedure as indicated by reference numeral 25-20 of FIGS. 25A and 25B or reference numeral 26-20 of FIGS. 26A and 26B, or as illustrated in FIG. 27, the reception side (UE or base station) applies or performs the data separation procedure for concatenated data to which or for which the deciphering procedure, the integrity verification procedure, or the header decompression procedure is applied or performed. In another method, the reception side (UE or base station) applies or performs the data separation procedure proposed in the disclosure for concatenated data after the deciphering procedure, the integrity verification procedure, or the header decompression procedure is applied or performed. For example, when the header compression procedure, the ciphering procedure, or the integrity verification procedure is configured, the data separation procedure may be performed for the concatenated data after the deciphering procedure, the integrity verification procedure, or the header decompression procedure is performed for the received concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the SDAP layer device configures or performs the proposed data concatenation procedure as indicated by reference numeral 25-20 of FIGS. 25A and 25B or reference numeral 26-20 of FIGS. 26A and 26B, or as illustrated in FIG. 27, data processing loads and implementation complexity may increase due to the header compression procedure. Accordingly, if the data concatenation procedure or separation procedure is configured for a bearer or if the bearer in which the data concatenation procedure is configured or a higher layer device is configured to use or add the header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should perform the header compression procedure for each piece of data or the reception side should perform the header decompression procedure for each piece of data. Accordingly, the data concatenation procedure, the header compression procedure (for example, Robust Header Compression (ROHC) or Ethernet Header Compression (EHC)), or the data compression procedure (Uplink Data Compression (UDC)) may be prevented from being configured together for each bearer or higher layer device (PDCP layer device, SDAP layer device, or new layer device). For example, when the data concatenation procedure is configured, the configuration of the header compression procedure (for example, Robust Header Compression (ROHC) or Ethernet Header Compression (EHC)) or the data compression procedure (Uplink Data Compression (UDC)) may be prevented. In another method, when the header compression procedure (for example, Robust Header Compression (ROHC) or Ethernet Header Compression (EHC)) or the data compression procedure (Uplink Data Compression (UDC)) is configured, the configuration of the data concatenation procedure may be prevented. In another method, in order to more accelerate the data rate, the ciphering procedure or the integrity protection procedure may not be configured.

When the header compression procedure or the data compression procedure is not configured to accelerate the data processing or when the SDAP layer device configures or performs the proposed data concatenation procedure, the transmission side (UE or base station) may apply or perform the data concatenation procedure proposed in the disclosure for data to which or for which the integrity protection procedure or the ciphering procedure is not applied or performed. In another method, the data concatenation procedure proposed in the disclosure features that the transmission side (UE or base station) applies or performs the data concatenation procedure for data before the integrity protection procedure or the ciphering produce not applied or performed. Accordingly, a length field (for example, LI field) among new fields generated during the data concatenation procedure may configure the length of data as a byte unit value. For example, when the integrity protection procedure or the ciphering produce is configured, the data concatenation procedure may be performed or applied and then the integrity protection procedure or the ciphering produce may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the header compression procedure or the data compression procedure is not configured to accelerate the data processing or when the SDAP layer device configures or performs the proposed data concatenation procedure, the reception side (UE or base station) may apply or perform the data separation procedure proposed in the disclosure for data to which or for which the deciphering procedure or the integrity verification procedure is applied or performed. In another method, the data separation procedure proposed in the disclosure features that the reception side (UE or base station) applies or performs the data separation procedure for concatenated data after which the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the PDCP layer device configures or performs the proposed data concatenation procedure as indicated by reference numeral 25-15 of FIGS. 25A and 25B or reference numeral 19-15 of FIGS. 26A and 26B, or as illustrated in FIG. 27, the PDCP layer device may not apply the data concatenation procedure to SDAP control data (SDAP control PDU) or PDCP control data (PDCP control PDU). This is because the ciphering procedure or the deciphering procedure is not applied to the SDAP control data and thus, if the SDAP control data is concatenated with other data, implementation complexity may be increased when the concatenated data is ciphered or deciphered. Since the ciphering procedure, the deciphering procedure, the integrity protection procedure, or the integrity verification procedure is not applied to the PDCP control data, if the PDCP control data is concatenated with other data, implementation complexity may increase when the ciphering procedure, the deciphering procedure, the integrity protection procedure, or the integrity verification procedure is performed for the concatenated data. The integrity protection procedure may be applied to the SDAP control data when the integrity protection procedure is configured, and the ciphering procedure may not be applied thereto when the ciphering procedure is configured. However, the integrity protection procedure may not be applied to the PDCP control data when the integrity protection procedure is configured, and the ciphering procedure may not be applied when the ciphering procedure is configured. In another method, the integrity protection procedure may not be applied to the SDAP control data when the integrity protection procedure is configured, and the ciphering procedure may not be applied thereto when the ciphering procedure is configured.

When the PDCP layer device configures or performs the proposed data concatenation procedure as indicated by reference numeral 25-15 of FIGS. 25A and 25B or reference numeral 19-15 of FIGS. 26A and 26B, or as illustrated in FIG. 27, data processing loads and implementation complexity may increase due to the header compression procedure. Accordingly, if the data concatenation procedure or separation procedure is configured for a bearer or if the bearer in which the data concatenation procedure is configured or a higher layer device is configured to use or add the header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should perform the header compression procedure for each piece of data or the reception side should perform the header decompression procedure for each piece of data. Accordingly, the data concatenation procedure, the header compression procedure (for example, Robust Header Compression (ROHC) or Ethernet Header Compression (EHC)), or the data compression procedure (Uplink Data Compression (UDC)) may be prevented from being configured together for each bearer or higher layer device (PDCP layer device, SDAP layer device, or new layer device). For example, when the data concatenation procedure is configured, the configuration of the header compression procedure (for example, Robust Header Compression (ROHC) or Ethernet Header Compression (EHC)) or the data compression procedure (Uplink Data Compression (UDC)) may be prevented. In another method, when the header compression procedure (for example, Robust Header Compression (ROHC) or Ethernet Header Compression (EHC)) or the data compression procedure (Uplink Data Compression (UDC)) is configured, the configuration of the data concatenation procedure may be prevented. In another method, in order to more accelerate the data rate, the ciphering procedure or the integrity protection procedure may not be configured.

Based on characteristics of the data concatenation procedure proposed in the disclosure, when the PDCP layer device configures or performs the proposed data concatenation procedure as indicated by reference numeral 25-15 of FIGS. 25A and 25B or reference numeral 26-15 of FIGS. 26A and 26B, or as illustrated in FIG. 27, the transmission side (UE or base station) applies or performs the data concatenation procedure to or for data to which or for which the header compression procedure is applied or performed but the integrity protection procedure or the ciphering procedure is not applied or performed. In another method, the transmission side (UE or base station) applies or performs the header compression procedure but applies or performs the data concatenation procedure proposed in the disclosure for data to which the header compression procedure is applied before the integrity protection procedure or the ciphering produce is applied or performed. Accordingly, a length field (for example, LI field) among new fields generated during the data concatenation procedure may configure the length of data to which the header compression procedure is applied as a byte unit value. For example, when the header compression procedure, the integrity protection procedure, or the ciphering procedure is configured, the header compression procedure may be applied or performed to each piece of data, the data concatenation procedure may be performed or applied to a plurality of pieces of data, and then the integrity protection procedure or the ciphering procedure may be performed for the concatenated data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. On the other hand, since the application or performance of the header compression procedure for each piece of the concatenated data has high complexity, the concatenation may be easily implemented after the advance performance of the header compression procedure and overheads may be reduced through a reduction in the length field indicating the length of each piece of concatenated data. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

When the PDCP layer device configures or performs the proposed data concatenation procedure as indicated by reference numeral 25-15 of FIGS. 25A and 25B or reference numeral 26-15 of FIGS. 26A and 26B, or as illustrated in FIG. 27, the reception side (UE or base station) applies or performs the data separation procedure to or for concatenated data to which or for which the deciphering procedure or the integrity verification procedure is applied or performed, and may apply the header decompression procedure to each piece of the separated data. In another method, the reception side (UE or base station) applies or performs the data separation procedure proposed in the disclosure features that data separation procedure for concatenated data after the deciphering procedure or the integrity verification procedure is applied or performed, and may apply the header decompression procedure to each piece of the separated data. For example, if the header compression procedure, the ciphering procedure, or the integrity verification procedure is configured, the data separation procedure may be performed for the concatenated data after the deciphering procedure or the integrity verification procedure is performed for the received concatenated data, and the header decompression procedure may be applied to each piece of the separated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. On the other hand, since the application or performance of the header decompression procedure for each piece of the concatenated data has high complexity, the performance of the header decompression procedure after data separation may be easily implemented and overheads may be reduced through a reduction in the length field indicating the length of each piece of concatenated data. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

When the header compression procedure or the data compression procedure is not configured to accelerate the data processing or when the PDCP layer device configures or performs the proposed data concatenation procedure, the transmission side (UE or base station) may apply or perform the data concatenation procedure proposed in the disclosure for data to which or for which the integrity protection procedure or the ciphering procedure is not applied or performed. In another method, the data concatenation procedure proposed in the disclosure features that the transmission side (UE or base station) applies or performs the data concatenation procedure for data before the integrity protection procedure or the ciphering produce is applied or performed. Accordingly, a length field (for example, LI field) among new fields generated during the data concatenation procedure may configure the length of data to which the header compression procedure is applied as a byte unit value. For example, when the integrity protection procedure or the ciphering procedure is configured, the integrity protection procedure or the ciphering procedure may be performed for the concatenated data after the data concatenation procedure is performed or applied to a plurality of pieces of data. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device.

Based on characteristics of the data separation procedure proposed in the disclosure, when the header compression procedure or the data compression procedure is not configured to accelerate the data processing or when the PDCP layer device configures or performs the proposed data concatenation procedure, the reception side (UE or base station) may apply or perform the data separation procedure proposed in the disclosure for data to which or for which the deciphering procedure or the integrity verification procedure is applied or performed. In another method, the reception side (UE or base station) applies or performs the data separation procedure proposed in the disclosure for concatenated data after the deciphering procedure or the integrity verification procedure is applied or performed. For example, when the ciphering procedure or the integrity verification procedure is configured, the deciphering procedure or the integrity verification procedure may be performed for the received concatenated data and then the data separation procedure may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part.

The data concatenation procedure or separation procedure may be configured for a bearer or a higher layer device. The transmitting PDCP layer device in which no data concatenation procedure is configured may allocate one PDCP serial number (or COUNT value) to one piece of data (for example, PDCP SDU or PDCP PDU) received from a higher layer device, allocate one PDCP serial number (for example, a value obtained by performing modulo on a parameter value storing the COUNT value by the entire size of the PDCP serial number or a transmission parameter (COUNT value) modulo 2^(length of the PDCP serial number for the uplink)), increase the parameter for serial number allocation by 1, and allocate the serial number increased by 1 to the parameter for next data. However, when the data concatenation procedure is configured, the transmitting PDCP layer device may allocate one PDCP serial number (or COUNT value) to a plurality of pieces of concatenated data if the data concatenation procedure is applied to data received from the higher layer device, and may allocate one PDCP serial number, increase the parameter for serial number allocation by 1, and allocate the serial number increased by 1 to the parameter for next data (concatenated data or non-concatenated data), but may allocate one PDCP serial number of one piece of non-concatenated data if the data concatenation procedure is not applied to data received from the higher layer device, and may allocate one PDCP serial number, increase the parameter for serial number allocation by 1, and allocate the serial number increased by 1 to the parameter for next data (concatenated data or non-concatenated data). When the SDAP layer device performs the data concatenation procedure, PDCP data processing (for example, the header compression procedure, the integrity protection procedure, or the ciphering procedure) may be performed for one PDCP SDU (or SDAP data PDU) obtained by concatenating a plurality of SDAP SDUs, a PDCP header may be generated, and one PDCP serial number may be generated and allocated to the PDCP data PDU. When the PDCP layer device performs the data concatenation procedure, if a plurality of PDCP SDUs (for example, the header compression procedure) is configured, PDCP data processing (for example, the integrity protection procedure or the ciphering procedure) may be performed for one concatenated PDCP SDU obtained by concatenating a plurality of PDCP SDUs, a PDCP header may be generated, and one PDCP serial number may be generated and allocated to the PDCP data PDU.

If the data concatenation procedure or separation procedure is configured for a bearer or if the bearer in which the data concatenation procedure is configured or a higher layer device is configured to use or add the header compression procedure (for example, Robust Header Compression (ROHC) or Ethernet Header Compression (EHC)) or the data compression procedure (Uplink Data Compression (UDC)), it may have a bad influence on the data processing rate. This is because the transmission side should add the SDAP header to each piece of data or perform header compression for each piece of data and the reception side should remove the SDAP header for each piece of data or perform header decompression for each piece of data. Accordingly, the data concatenation procedure, the SAP header or header compression procedure, or the data compression procedure may be prevented from being configured together for each bearer or higher layer device (PDCP layer device, SDAP layer device, or new layer device). For example, when the data concatenation procedure is configured, the configuration of the SDAP header or header compression procedure or the data compression procedure may be prevented. In another example, when the SDAP header or header compression procedure, or the data compression procedure is configured, the configuration of the data compression procedure may be prevented.

The data concatenation procedure proposed in the disclosure may be activated, deactivated, suspended, or resumed according to an indication of the RRC message, MAC control information, or the PDCCH.

Figure 28A:
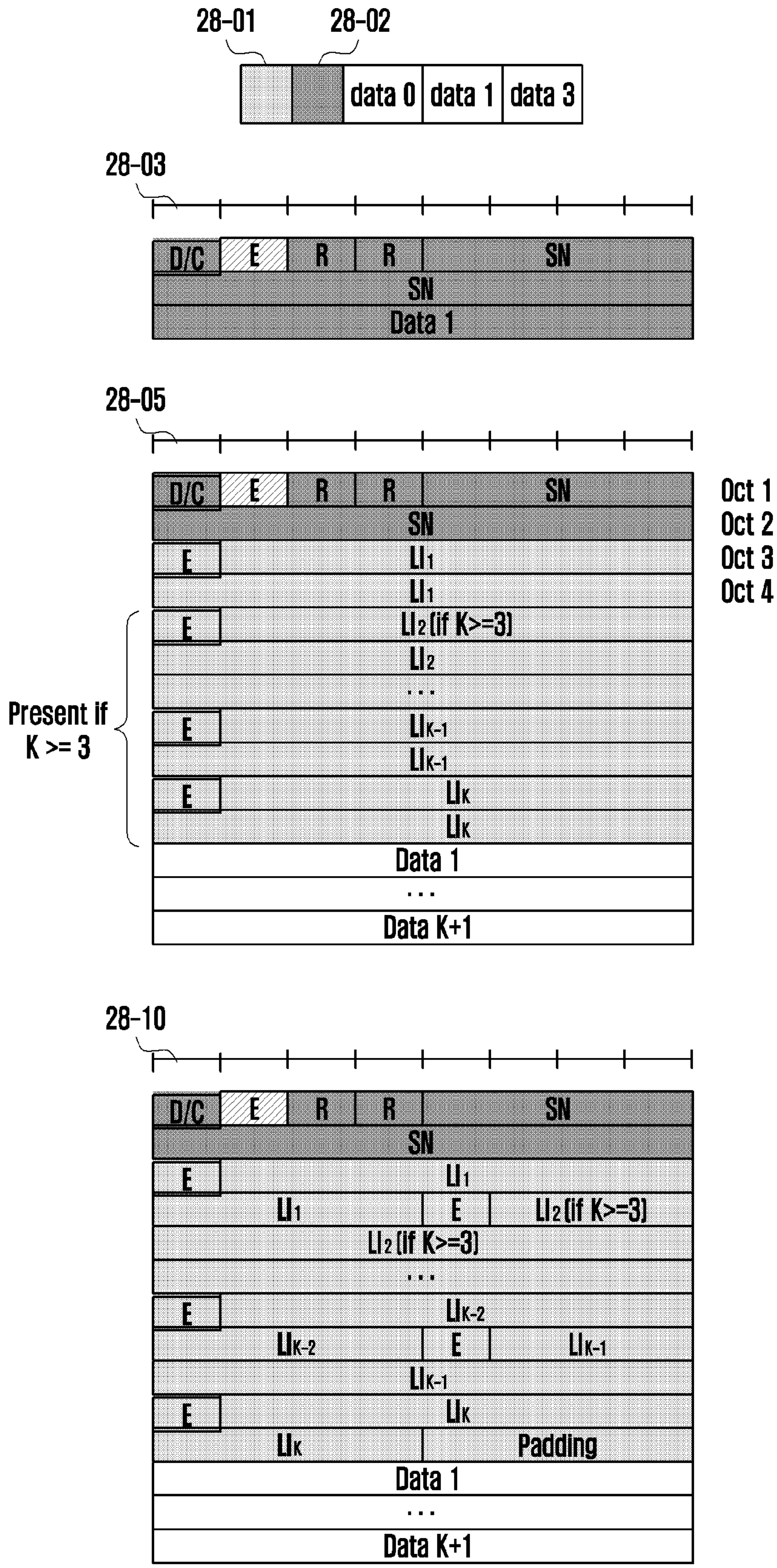
FIG. 28A illustrates a header structure of a higher layer device or a new field structure suitable for embodiment 2-1 or embodiment 2-3 of a data concatenation procedure according to an embodiment of the disclosure.

FIG. 28A illustrates a header structure of a higher layer device or a new field structure suitable for embodiment 2-1 (FIGS. 25A and 25B) or embodiment 2-3 (FIG. 27) of a data concatenation procedure according to an embodiment of the disclosure.

Figure 28B:
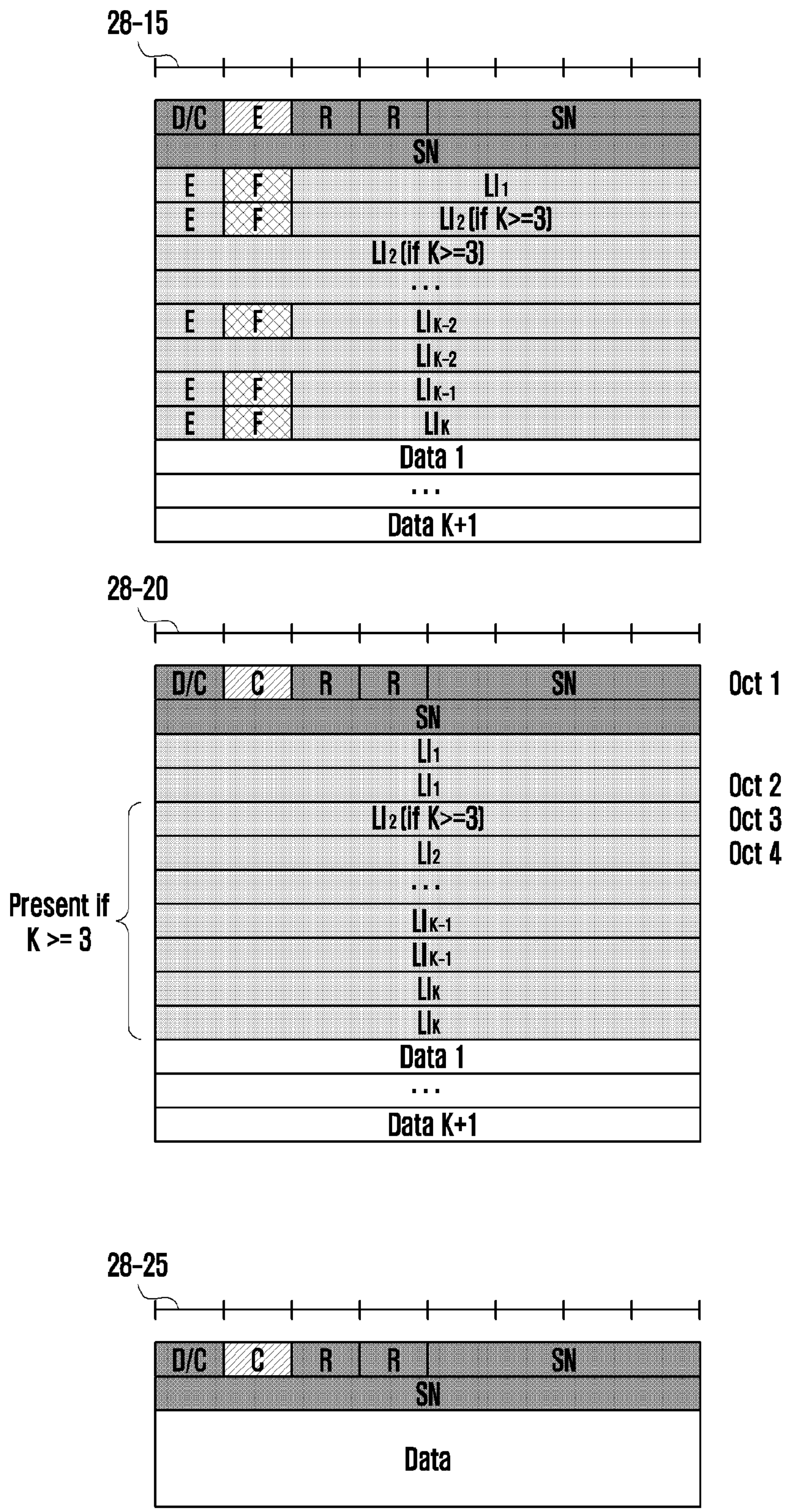
FIG. 28B illustrates a header structure of a higher layer device or a new field structure suitable for embodiment 2-1 or embodiment 2-3 of a data concatenation procedure according to an embodiment of the disclosure.

FIG. 28B illustrates a header structure of a higher layer device or a new field structure suitable for embodiment 2-1 (FIGS. 25A and 25B) or embodiment 2-3 (FIG. 27) of a data concatenation procedure according to an embodiment of the disclosure.

Figure 28C:
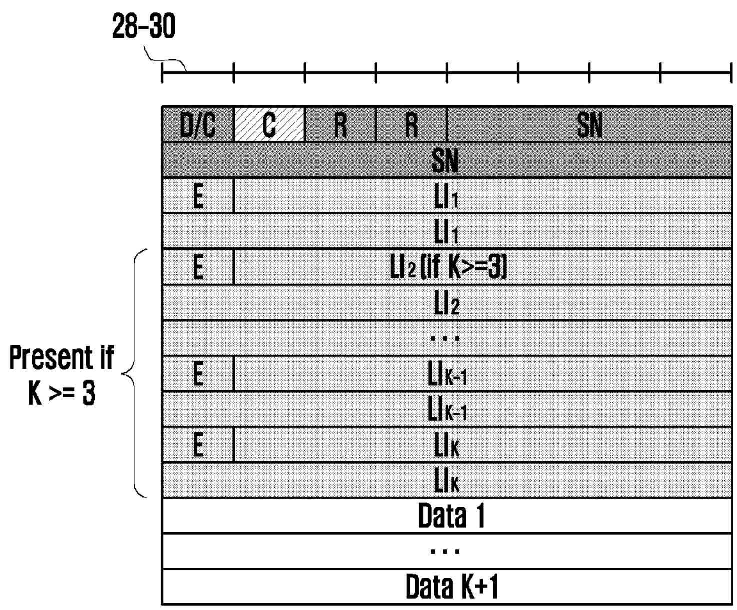
FIG. 28C illustrates a header structure of a higher layer device or a new field structure suitable for embodiment 2-1 or embodiment 2-3 of a data concatenation procedure according to an embodiment of the disclosure.
Figure 28C:
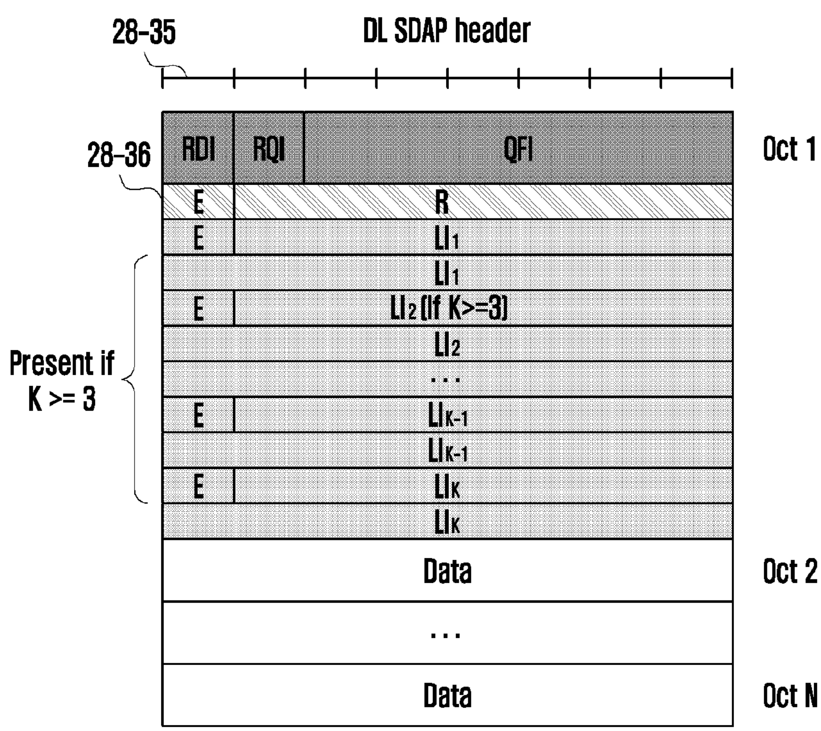

FIG. 28C illustrates a header structure of a higher layer device or a new field structure suitable for embodiment 2-1 (FIGS. 25A and 25B) or embodiment 2-3 (FIG. 27) of a data concatenation procedure according to an embodiment of the disclosure.

Figure 28D:
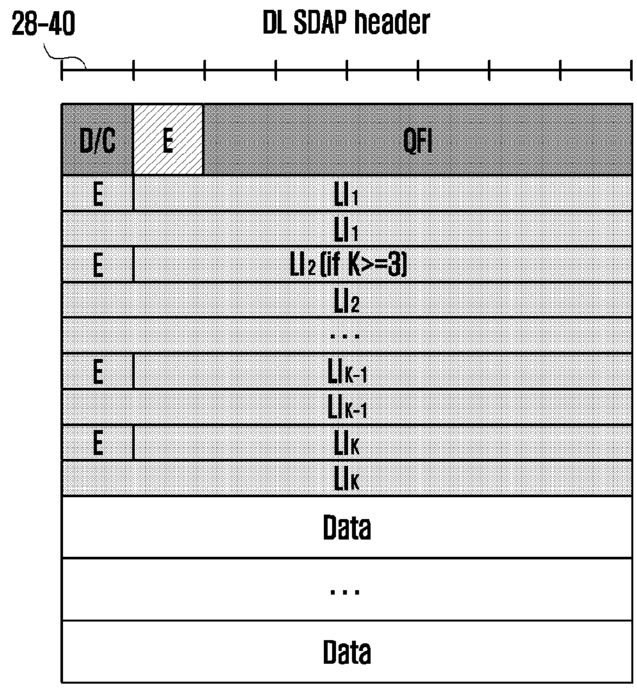
FIG. 28D illustrates a header structure of a higher layer device or a new field structure suitable for embodiment 2-1 or embodiment 2-3 of a data concatenation procedure according to an embodiment of the disclosure.
Figure 28D:
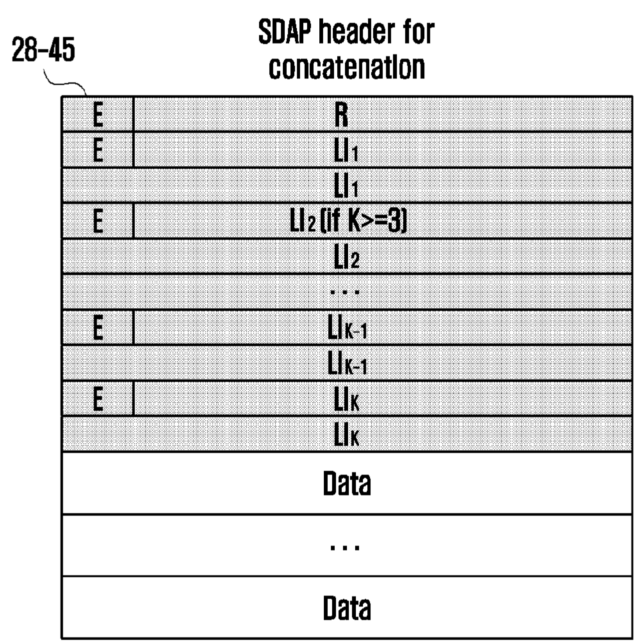

FIG. 28D illustrates a header structure of a higher layer device or a new field structure suitable for embodiment 2-1 (FIGS. 25A and 25B) or embodiment 2-3 (FIG. 27) of a data concatenation procedure according to an embodiment of the disclosure.

Referring to FIGS. 28A to 28D, a new field (for example, C field or E field) may be defined in a header 28-01 (for example, PDCP header or SDAP header) of the higher layer device to indicate whether there is a new field 28-02 thereafter, whether the concatenation procedure is applied, or there is a data field right thereafter.

Accordingly, when the data concatenation procedure is not applied to data transmitted by the higher layer device (for example, PDCP layer device or SDAP layer device), data may be configured in a structure 28-03 indicating that data is concatenated with a new field (for example, E field), there is no new field anymore, or there is data right thereafter.

When the transmitting PDCP layer device applies the data concatenation procedure to data, a new field (C field or E field) may be defined in a header (of the higher layer device (for example, PDCP header or SDAP header) to indicate whether there is a new field, whether the concatenation procedure is applied, or whether there is a data field right thereafter as indicated by reference numeral 28-05. New fields (for example, E field or LI field) corresponding to the number of pieces of data is defined and configured, and added before the concatenated data, and the data may be concatenated and located after the new fields. In the header structure 28-05, new fields 28-02 may define the size of each field to be suitable for the size of a byte unit to perform byte alignment. In another method, if the size of the configured new fields are not the byte unit, new fields 28-02 may be configured to suitable for the bytes by adding a padding to the last part without defining the byte alignment in the size of new fields as shown in the structure 28-10. In another method, it is possible to reduce overheads by introducing a new field (for example, F field) as shown in the structure 28-15 and dynamically indicating the size as a first size or a second size. Also, in the structure 28-15, the byte alignment may be performed by defining the size of new fields as indicated by reference numeral 28-05. In another method, in the structure 28-15, the byte alignment may be performed by adding the padding as indicated by reference numeral 28-10. In another method, in the header structure as indicated by reference numeral 28-05, 28-10, or 28-15, the last E field or LI fields may be omitted. For example, when n pieces of data are concatenated, only n−1 new fields may be added. This is because, if two pieces of data such as $n^{th}$ data and $n+1^{th}$ data are separated by the length field of the $n^{th}$ data, it is not needed to know the length of the last data.

In another method, when the transmitting PDCP layer device applies the data concatenation procedure to data, a new field (C field or E field) may be defined in a header of the higher layer device (for example, PDCP header or SDAP header) as indicated by reference numeral 28-20 to indicate whether there is a new field, whether the concatenation procedure is applied, or whether there is a data field right thereafter. New fields (for example, LI fields) corresponding to the number of pieces of concatenated data is defined and configured, and the new fields may be added before the data, and the data may be concatenated and located thereafter. In the header structure 28-20, new fields 28-02 may define the size of each field to be suitable for the size of a byte unit to perform byte alignment. The structure 28-20 is a useful structure when the number of pieces of data to be concatenated is configured or decided. In another method, the configured number of concatenations cannot be satisfied as shown in the structure 28-25, data may be transmitted without concatenation. If the byte alignment is not defined in the size of new fields as indicated by reference numeral 28-10 and the size of the configured new fields is not the byte unit, new fields 28-02 may be configured to be suitable for the bytes by adding the padding to the last part. In another method, it is possible to reduce overheads by introducing a new field (for example, F field) as shown in the structure 28-15 and dynamically indicating the size as a first size or a second size. In another method, in the header structure as indicated by reference numeral 28-05, 28-10, or 28-15, the last E field or LI fields may be omitted. For example, when n pieces of data are concatenated, only n−1 new fields may be added. This is because, if two pieces of data such as $n^{th}$ data and $n+1^{th}$ data are separated by the length field of the $n^{th}$ data, it is not needed to know the length of the last data.

If the data concatenation procedure is performed by the SDAP layer device, when the SDAP header 28-30 is configured in the SDAP layer device, a downlink SDAP header has no reserved field and an uplink SDAP header has no reserved field, and thus a field indicating whether there is a new field thereafter, whether the concatenation procedure is applied, or whether there is a data field right thereafter may be defined after the downlink SDAP header as indicated by reference numeral 28-36 or defined in the uplink SDAP header as indicated by reference numerals 28-35 and 28-40. Further, like in the proposed other structures, new fields may be defined and the data concatenation procedure may be performed. In another method, the data concatenation procedure may be applied by defining new fields and adding the new fields after the uplink SDAP header or the downlink SDAP header as indicated by reference numeral 28-45. In another method, if the SDAP header is not configured, the data concatenation procedure may be applied by defining new fields and placing the new fields before the data as indicated by reference numeral 28-45.

The header structures of the higher layer device or the new field structures proposed in FIGS. 28A to 28D may be combined with each other, applied, and expanded to a new structure.

FIG. 29A illustrates a header structure of a higher layer device or a new field structure suitable for embodiment 2-2 (FIGS. 26A and 26B) of a data concatenation procedure according to an embodiment of the disclosure.

FIG. 29B illustrates a header structure of a higher layer device or a new field structure suitable for embodiment 2-2 (FIGS. 26A and 26B) of a data concatenation procedure according to an embodiment of the disclosure.

FIG. 29C illustrates a header structure of a higher layer device or a new field structure suitable for embodiment 2-2 (FIGS. 26A and 26B) of a data concatenation procedure according to an embodiment of the disclosure.

FIG. 29D illustrates a header structure of a higher layer device or a new field structure suitable for embodiment 2-2 (FIGS. 26A and 26B) of a data concatenation procedure according to an embodiment of the disclosure.

Referring to FIGS. 29A to 29D, a new field (for example, C field or E field) may be defined in a header 29-01 (for example, PDCP header or SDAP header) of the higher layer device to indicate whether there is a new field 29-02 thereafter, whether the concatenation procedure is applied, or there is a data field just thereafter.

Accordingly, when the data concatenation procedure is not applied to data transmitted by the higher layer device (for example, PDCP layer device or SDAP layer device), data may be configured in a structure 29-03 indicating that data is concatenated with a new field (for example, E field), there is no new field anymore, or there is data right thereafter.

When the transmitting PDCP layer device applies the data concatenation procedure to data, a new field (C field or E field) may be defined in a header of the higher layer device (for example, PDCP header or SDAP header) as indicated by reference numeral 29-05 to indicate whether there is a new field, whether the concatenation procedure is applied, or whether there is a data field right thereafter. The data concatenation procedure may be performed by defining and configuring new fields (for example, E field or LI field) corresponding to the number of pieces of concatenated data, adding the new fields before the data, and repeating a scheme of adding the new fields before the concatenated data in the same way. In the header structure 29-05 or 29-10, new fields 29-02 may define the size of each field to be suitable for the size of a byte unit to perform byte alignment. Since the L field is located before each piece of data, if there is other data after the length indicated by the L field, it may mean that there is another L field, and thus there is no problem even if the E field is not defined. However, the E field may be defined and used for convenience of implement as indicated by reference numeral 29-10. In another method, if the byte alignment is not defined in the size of new fields like in the structure 28-05 and the size of the configured new fields is not the byte unit, new fields 28-02 may be configured to be suitable for the bytes by adding the padding to the last part. In another method, it is possible to reduce overheads by introducing a new field (for example, F field) as shown in the structure 28-20 and dynamically indicating the size as a first size or a second size. Also, in the structure 28-20, the byte alignment may be performed by defining the size of new fields as indicated by reference numeral 28-05. In another method, in the structure 28-20, the byte alignment may be performed by adding the padding as indicated by reference numeral 28-10. In another method, in the header structure 28-05, 28-10, or 28-15, the last E field or LI fields may be omitted as indicated by reference numeral 28-15. For example, when n pieces of data are concatenated, only n−1 new fields may be added. This is because, if two pieces of data such as $n^{th}$ data and $n+1^{th}$ data are separated by the length field of the $n^{th}$ data, it is not needed to know the length of the last data.

If the data concatenation procedure is performed by the SDAP layer device, when the SDAP header is configured in the SDAP layer device, a downlink SDAP header has no reserved field and an uplink SDAP header has no reserved field, and thus a field indicating whether there is a new field thereafter, whether the concatenation procedure is applied, or whether there is a data field right thereafter may be defined after the downlink SDAP header as indicated by reference numeral 28-36 or defined in the uplink SDAP header as indicated by reference numerals 28-35 and 28-40. Further, like in the proposed other structures, new fields may be defined and the data concatenation procedure may be performed. In another method, the data concatenation procedure may be applied by defining new fields and adding the new fields after the uplink SDAP header or the downlink SDAP header as indicated by reference numeral 28-45. In another method, when the SDAP header is not configured, the data concatenation procedure may be applied by defining new fields and placing the same before the data as indicated by reference numeral 28-45. When the data concatenation procedure is not applied, the structure 28-50 may be used.

The header structures of the higher layer device or the new field structures proposed in FIGS. 29A to 29D may be combined with each other, applied, and expanded to a new structure.

FIG. 30 illustrates comparison between a procedure of processing data in a next-generation mobile communication system and a data processing procedure according to an embodiment of the disclosure.

Referring to FIG. 30, if the integrity protection procedure is configured when the transmitting PDCP layer device receives four pieces of data such as first data, second data, third data, and fourth data from the higher layer device, the integrity protection procedure may be performed for each piece of the data on the basis of security key values, bearer identifiers, or COUNT values for the data, and a total of four integrity protection procedures may be performed on the basis of a total of four COUNT values. If the ciphering procedure is configured, the ciphering procedure may be performed for each piece of the data on the basis of security key values, bearer identifiers, or COUNT values for the data, and a total of four ciphering procedures may be performed on the basis of a total of four COUNT values. Further, when the receiving PDCP layer device receives four pieces of data such as first data, second data, third data, and fourth data to which the integrity protection procedure or the ciphering procedure is applied, the deciphering procedure or the integrity verification procedure may be performed for each piece of the data on the basis of security key values, bearer identifiers, or COUNT values for the data, and as a result, the deciphering procedure may be performed four times or the integrity verification procedures may be performed four times as indicated by reference numeral 30-05.

When the data concatenation procedure of the higher layer device proposed in the disclosure is configured or applied and the transmitting PDCP layer device configures the integrity protection procedure for one piece of data obtained by concatenating first data, second data, third data, and fourth data, the integrity protection procedure may be performed for the data once on the basis of security key values, bearer identifiers, or COUNT values for the data, and the integrity protection procedure may be performed for one piece of data obtained by concatenating four pieces of data on the basis of one COUNT value. If the ciphering procedure is configured, the transmitting PDCP layer device may perform the ciphering procedure for the data once on the basis of security key values or bearer identifiers for the data or COUNT values for the data, and a total of one ciphering procedures may be performed on the basis of one COUNT value. Further, when the receiving PDCP layer device receives concatenated data (first data, second data, third data, and fourth data) to which the integrity protection procedure or the ciphering procedure is applied, the deciphering procedure or the integrity verification procedure may be performed for the concatenated data on the basis of security key values or bearer identifiers for the data or COUNT values for the data, and as a result, the deciphering procedure may be performed once or the integrity verification procedures may be performed once as indicated by reference numeral 30-10.

The number of pieces of data which can be concatenated may be determined as the size of pieces of data which can be simultaneously processed when the modem of the UE performs the integrity protection procedure, the integrity verification procedure, the ciphering procedure, or the deciphering procedure. Alternatively, the number of pieces of data which can be concatenated may be determined as the size of pieces of data which is pre-appointed, defined, or configured.

Since the number of times the integrity protection procedure, the integrity verification procedure, the ciphering procedure, or the deciphering procedure is processed may be reduced as the larger number of pieces of data are concatenated when the higher layer device performs the data concatenation procedure as indicated by reference numeral 30-10, more other data can be processed in parallel and, as a result, a data processing rate may increase and a data processing time may decrease.

When the data concatenation procedure of the higher layer device is applied proposed in the disclosure as indicated by reference numeral 30-10, the number of times a security key or a key stream is generated may be reduced, the number of times a bus for transporting data is used may be reduced, and efficiency of the bus may increase since the bus is used in units of data having the large size at once as indicated by reference numeral 30-15 of FIG. 30. Further, it is possible to reduce the number of times the integrity protection procedure, the integrity verification procedure, the ciphering procedure, or the deciphering procedure is processed and, if the number of integrity protection procedure are reduced, the smaller number of MAC-I fields may be generated. When the modem of the UE performs the integrity protection procedure, the integrity verification procedure, the ciphering procedure, or the deciphering procedure while the data concatenation is performed, if pieces of data corresponding to the size of pieces of data which can be simultaneously processed are concatenated, efficiency of a hardware accelerator for performing the procedures may increase. Since one PDCP header, one RLC header, or one MAC header may be generated for the concatenated data rather than generating the PDCP header, the RLC header, or the MAC header for each piece of data, overheads may be reduced in transmission resources.

FIG. 31A illustrates a gain of a data concatenation procedure from a viewpoint of an RLC layer device according to an embodiment of the disclosure.

FIG. 31B illustrates a gain of a data concatenation procedure from a viewpoint of an RLC layer device according to an embodiment of the disclosure.

Referring to FIGS. 31A and 31B, when the data concatenation procedure is not applied as indicated by reference numeral 31-05, one RLC serial number should be allocated to each piece of data. However, when the data concatenation procedure proposed in the disclosure is applied as indicated by reference numeral 31-10, one RLC serial number is allocated to concatenated data, and thus the ARQ procedure may be efficiently performed through the smaller number of RLC serial numbers when the ARQ procedure is performed by the RLC layer device.

Referring to FIGS. 31A and 31B, when the data concatenation procedure is not applied as indicated by reference numeral 31-05, RLC serial numbers, data, linked lists indicating successful transmission, or an RLC serial number space may increase for the ARQ procedure as indicated by reference numerals 31-15 and 31-20. However, when the data concatenation procedure proposed in the disclosure is applied as indicated by reference numeral 31-10, one RLC serial number is allocated to concatenated data, and thus the linked lists or the RLC serial number space may significantly decrease as indicated by reference numerals 31-25 and 31-20, an RLC serial number search time may be reduced, a data processing rate may be improved, and a data processing time may be shortened when the RLC layer device performs the ARQ procedure.

FIG. 32 illustrates that a data concatenation procedure of a higher layer device does not influence a basic data processing procedure of a next-generation mobile communication system according to an embodiment of the disclosure.

Referring to FIG. 32, data received from the higher layer device or the header compression procedure is configured as indicated by reference numeral 32-05, and the length of header-compressed data is variable. When the integrity protection procedure or the ciphering procedure is configured for data having the variable length, the integrity protection procedure or the ciphering procedure may be applied to the data, a PDCP header, an RLC header, or a MAC header may be generated and added to the data, and the data may be transmitted.

Referring to FIG. 32, the data concatenation procedure proposed in the disclosure may be applied to data received from the higher layer device as indicated by reference numeral 32-15, and the length of the concatenated data is variable. When the integrity protection procedure or the ciphering procedure is configured for data having the variable length, the integrity protection procedure or the ciphering procedure may be applied to the data, a PDCP header, an RLC header, or a MAC header may be generated and added to the data, and the data may be transmitted. Accordingly, if it is considered that the data received from the higher layer device is concatenated data in a basic data processing procedure 32-10, the basic data processing procedure may be directly reused and thus an influence on the existing implementation may be minimized. Further, a data processing rate may be significantly improved while an influence on a hardware accelerator, a hardware engine, or modem design is minimized.

FIG. 33 illustrates a method of expanding a data concatenation function of a higher layer device and succeeding and implementing features of the data concatenation function of the higher layer device proposed above without introducing new fields or an implementation method having a similar advantage to the data concatenation function of the higher layer device without any new field according to an embodiment of the disclosure.

Referring to FIG. 33, unlike embodiment 2-1, embodiment 2-2, or embodiment 2-3 of the data concatenation procedure proposed in the disclosure, there is no new field in embodiment 2-4 of the data concatenation procedure, and thus the receiving PDCP layer device cannot separate the concatenated data if the transmitting PDCP layer device performs the data concatenation procedure and transmits the concatenated data. Accordingly, embodiment 2-4 of the data concatenation procedure proposed in the disclosure proposes a method by which the transmitting PDCP layer device allocates a PDCP serial number of a COUNT value to each piece of data received from the higher layer device (if the header compression procedure (or data compression procedure) is configured in the PDCP layer device, the header compression procedure (or data compression procedure) may be applied to each piece of data before the data concatenation procedure is performed and the data concentration procedure may be applied to the compressed data), perform the data concatenation procedure to a plurality of pieces of data, applying security keys, bearer identifiers, or a plurality of COUNT values to concatenated data obtained by concatenating the plurality of pieces of data through a multi-array implementation scheme to simultaneously perform the integrity protection procedure of the ciphering procedure to each piece of the concatenated data, perform the data separation procedure for the concatenated data to generate a PDCP header for each piece of data, and transmit the data to the lower layer device. The receiving PDCP layer device may apply each of the deciphering procedure or the integrity verification procedure to each piece of the received data on the basis of security key values, bearer identifier, or COUNT values for the data. In another method, the receiving PDCP layer device may gather data received after the application of the data concatenation procedure, perform the data concatenation procedure therefor, apply security key values, bearer identifiers, or a plurality of COUNT values to concatenated data obtained by concatenating a plurality of pieces of data through a multi-array implementation scheme, and apply the deciphering procedure or the integrity verification procedure simultaneously to each piece of the concatenated data. Further, the receiving PDCP layer device may separate each piece of data from the concatenated data and transmit the data to the higher layer device in an ascending order of the COUNT value (if the header compression procedure (or data compression procedure is configured in the PDCP layer device, the header decompression procedure (or data decompression procedure) may be applied to each piece of the data and the decompressed data may be transmitted to the higher layer device).

In embodiment 2-4 of the data concatenation procedure of the disclosure, when the data concatenation procedure is performed, the PDCP layer device may not apply the data concatenation procedure to the SDAP header, SDAP control data (SDAP control PDU), or PDCP control data (PDCP control PDU) when the integrity protection procedure, the integrity verification procedure, the ciphering procedure, or the deciphering procedure is performed. This is because the ciphering procedure or the deciphering procedure is not applied to the SDAP header or the SDAP control data and thus, if the SDAP header or the SDAP control data is concatenated with other data, implementation complexity may be increased when the concatenated data is ciphered or deciphered. Since the ciphering procedure, the deciphering procedure, the integrity protection procedure, or the integrity verification procedure is not applied to the PDCP control data, if the PDCP control data is concatenated with other data, implementation complexity may increase when the ciphering procedure, the deciphering procedure, the integrity protection procedure, or the integrity verification procedure is performed for the concatenated data. In another method, when the SDAP header is configured, the SDAP layer device may exclude the SDAP header of each piece of data when performing the data concatenation procedure. This is because the ciphering procedure or the deciphering procedure is not applied to the SDAP header. For example, the transmitting PDCP layer device may apply the data concatenation procedure of embodiment 2-4 proposed above to the data from which the SDAP header for each piece of data received from the higher layer device is excluded. For example, the receiving PDCP layer device may apply the data concatenation procedure of embodiment 2-4 proposed above to the data from which the SDAP header for each piece of data received from the lower layer device is excluded. The integrity protection procedure may be applied to the SDAP control data when the integrity protection procedure is configured, and the ciphering procedure may not be applied thereto when the ciphering procedure is configured therein. However, the integrity protection procedure may not be applied to the PDCP control data when the integrity protection procedure is configured, and the ciphering procedure may not be applied thereto when the ciphering procedure is configured. In another method, the integrity protection procedure may not be applied to the SDAP control data when the integrity protection procedure is configured, and the ciphering procedure may not be applied thereto when the ciphering procedure is configured.

In another method, in embodiment 2-4 of the data concatenation procedure of the disclosure, when the data concatenation procedure is performed, the PDCP layer device may not apply the data concatenation procedure to PDCP control data (PDCP control PDU) but may apply the data concatenation procedure to the SDAP header or SDAP control data (SDAP control PDU) when performing the integrity protection procedure or the integrity verification procedure. This is because the integrity protection or verification procedure is applied to the SDAP header or the SDAP control data but the integrity protection or verification procedure is not applied to the PDCP control data (for example, ROHC feedback, EHC feedback, or PDCP state report). For example, when the PDCP control data is concatenated with other data, implementation complexity may increase when the integrity protection or verification procedure is applied to the concatenated data. Further, the PDCP layer device may not apply the data concatenation procedure to the SDAP header, the SDAP control data, or the PDCP control data (PDCP control PDU) when performing the ciphering or deciphering procedure. This is because the ciphering or deciphering procedure is not applied to the SDAP header, the SDAP control data, or the PDCP control data (for example, ROHC feedback, EHC feedback, or PDCP state report). For example, when the SDAP header, the SDAP control data, or the PDCP control data is concatenated with other data, implementation complexity may increase when the integrity protection or verification procedure is applied to the concatenated data.

For example, the transmitting PDCP layer device may apply the proposed data concatenation procedure of embodiment 2-4 to each piece of data received from the higher layer device, data including the SDAP header, or the SDAP control data when performing the integrity protection procedure. For example, the receiving PDCP layer device may apply the proposed data concatenation procedure of embodiment 2-4 to each piece of data received from the lower layer device, data including the SDAP header, or the SDAP control data when performing the integrity verification procedure.

For example, when performing the ciphering procedure, the transmitting PDCP layer device may apply the proposed data concatenation procedure of embodiment 2-4 to data from which the SDAP control data for each piece of data received from the higher layer device is excluded or from which the SDAP header is excluded. For example, when performing the deciphering procedure, the receiving PDCP layer device may apply the proposed data concatenation procedure of embodiment 2-4 to data from which the SDAP control data for each piece of data received from the lower layer device is excluded or from which the SDAP header is excluded.

As indicated by reference numeral 33-05 of FIG. 33, when only the ciphering procedure is configured in the PDCP layer device, the data concatenation procedure may be applied to data received from the higher layer device through the application of embodiment 2-4, and the concatenated data may be simultaneously ciphered through different security key values (for example, COUNT values) in multi-array implementation. Further, the concatenated data may be separated, a PDCP header may be individually configured for each piece of the data, and the data may be transmitted to the lower layer device.

As indicated by reference numeral 33-10 of FIG. 33, when only the integrity protection procedure is configured in the PDCP layer device, the data concatenation procedure may be applied to data received from the higher layer device through the application of embodiment 2-4 and the integrity protection procedure may be simultaneously performed for the concatenated data through different security key values (for example, COUNT values) in multi-array implementation. Further, the concatenated data may be separated, a MAC-I field of 4 bytes generated through the integrity protection procedure for each piece of data may be concatenated with the last part of the data, a PDCP header may be individually configured and concatenated with the front part of the data, and the data may be transmitted to the lower layer device.

As indicated by reference numeral 33-15 of FIG. 33, when the integrity protection procedure and the ciphering procedure are configured in the PDCP layer device, the data concatenation procedure may be applied to data received from the higher layer device through the application of embodiment 2-4 and the integrity protection procedure may be simultaneously performed for the concatenated data through different security key values (for example, COUNT values) in multi-array implementation. Further, a MAC-I field of 4 bytes generated through the integrity protection procedure may be concatenated with the last part of each piece of the concatenated data, and the concatenated data may be reconfigured. The ciphering procedure may be simultaneously applied to the reconfigured concatenated data through different security key values (for example, COUNT values) in multi-array implementation. Further, the concatenated data may be separated, a PDCP header may be individually configured for each piece of the data, and the data may be transmitted to the lower layer device.

In embodiment 2-4 proposed in the disclosure, after performing the data concatenation procedure, the transmitting or receiving PDCP layer device performs the integrity protection procedure, the integrity verification procedure, the ciphering procedure, or the deciphering procedure, and thus the number of times the procedures are performed may be reduced and a data processing time may be shortened. However, since the concatenated data is separated again and each piece of the data is transmitted to the lower layer device, an RLC serial number space or the size of a linked list cannot be reduced when the RLC layer device searches for the implemented linked list.

As indicated by reference numeral 19-85 of FIG. 19, a PDCP reestablishment procedure for preventing data loss is proposed when the UE receives a handover command message (for example, RRCReconfiguration message) from the base station, the data concatenation procedure is configured in the PDCP layer device, the PDCP layer device is performing the data concatenation procedure, or the PDCP reestablishment procedure is indicated by the RRC message.

When the data concatenation procedure or the data separation procedure is configured for the PDCP layer device, the UE may perform the data concatenation function in the higher layer device and, if the UE receives the RRC message (RRCReconfiguration) indicating a handover from the base station, the RRC message includes ReconfigurationWithSynch (handover indicator), the RRC message includes an indicator (reestablishPDCP) indicating reestablishment of the PDCP layer device (PDCP re-establishment), or the RRC message includes security configuration information (security config) for changing a security key, the UE may induce the RRC layer device to generate a new security key on the basis of the security configuration information and apply the security key to each PDCP layer device. The UE may perform a PDCP reestablishment procedure in the PDCP layer device. When performing the PDCP reestablishment procedure, the UE may newly apply and transmit a data processing procedure of the PDCP layer device to data to be retransmitted or transmitted for the AM DRB on the basis of the new security key. For example, specifically, the UE may apply the data processing procedure of the PDCP layer device to retransmitted data and newly transmitted data as follows during the PDCP reestablishment procedure.

When the data processing procedure (header compression procedure, integrity protection procedure, or ciphering procedure) of the PDCP layer device is applied again to data to be retransmitted in the PDCP reestablishment procedure on the basis of a new security key, if the data concatenation procedure is configured or the data concatenation procedure is performed for previously transmitted data, the UE may newly perform the header compression procedure or perform the data concatenation procedure again equally to the concatenated data in previous transmission if the header compression procedure is configured when data to be retransmitted is newly configured. If the integrity protection procedure is configured for the equally concatenated data, the integrity protection procedure may be newly performed for the concatenated data on the basis of a new security key or, if the ciphering procedure is configured, the ciphering procedure may be performed for the concatenated data on the basis of the new security key. For example, the transmission PDCP layer device has configured and transmitted first data and second data as PDCP serial number 1 and has configured and transmitted third data as PDCP serial number 2 but, if successful transmission of PDCP serial numbers 1 and 2 is not acknowledged from a lower layer device, performs a retransmission procedure (transmits the same to the lower layer device) in the PDCP reestablishment procedure. It may be assumed that the reception side has received data corresponding to PDCP serial number 1 but has not received data corresponding to PDCP serial number 2. However, if the transmission PDCP layer device concatenates the first data, the second data, and the third data and configures and transmits the concatenated data as PDCP serial number 1, the reception side detects the data corresponding to PDCP serial number 1 as overlappingly received data and discard the same since the data has been already received. That is, the data retransmitted in the PDCP reestablishment procedure is newly concatenated through the concatenation function differently from the previous case, that is, the third data is concatenated with PDCP serial number 1, and thus data loss may occur. Accordingly, when the procedure of the PDCP layer device is newly applied to retransmitted data in the PDCP reestablishment procedure by a new security key, the data should be concatenated to be the same as the previous transmission through the data concatenation function and the procedure of the PDCP layer device should be newly applied on the basis of the new security key.

When the data processing procedure (header compression procedure, integrity protection procedure, or ciphering procedure) of the PDCP layer device is applied to data to be newly transmitted in the PDCP reestablishment procedure on the basis of a new security key, if the data concatenation procedure is configured, the UE may perform the header compression procedure or the data concatenation procedure (the data may be concatenated or may not be concatenated) if the header compression procedure is configured when data to be transmitted is configured. If the integrity protection procedure is configured for concatenated data or non-concatenated data, the integrity protection procedure may be newly performed for the concatenated data or the non-concatenated on the basis of the new security key. If the ciphering procedure is configured, the ciphering procedure may be performed for the concatenated data or the non-concatenated on the basis of the new security key and a transmission procedure (transmission to a lower layer device) may be performed.

FIG. 34 is a flowchart illustrating an operation of a PDCP layer device of a UE according to an embodiment of the disclosure.

Referring to FIG. 34, when the PDCP layer device configures or performs the proposed data concatenation procedure, if data is received from a higher layer device in operation 34-05, a transmitting PDCP layer device 34-01 may apply or perform a data concatenation procedure of operation 34-15 to or for data to which or for which the header compression procedure is applied to performed (if the header compression procedure is configured) in operation 34-10 but an integrity protection procedure of operation 34-25 or a ciphering procedure of operation 34-30 is not applied or performed. In another method, based on characteristics of the data concatenation procedure proposed in the disclosure, the transmitting PDCP layer device applies or performs the data concatenation procedure to or for data to which or for which the header compression procedure is applied or performed but the header compression procedure is applied before the integrity protection procedure or the ciphering produce is applied or performed. Accordingly, a length field (for example, LI field) among new fields generated during the data concatenation procedure of operation 34-15 may configure the length of data to which the header compression procedure is applied as a byte unit value. For example, when the header compression procedure, the integrity protection procedure, or the ciphering procedure is configured, the header compression procedure may be applied or performed to or for each piece of data and the data concatenation procedure may be performed or applied for or to a plurality of pieces of data, and then the integrity protection procedure of operation 34-25 or the ciphering procedure of operation 34-30 may be performed for the concatenated data. This is because the number of times the integrity protection procedure or the ciphering procedure is performed or the frequency thereof may be minimized and a data processing time may be reduced only when the integrity protection procedure or the ciphering procedure is simultaneously applied to the concatenated data. On the other hand, since the application or performance of the header compression procedure for each piece of the concatenated data has high complexity, the concatenation may be easily implemented after the advance performance of the header compression procedure and overheads may be reduced through a reduction in the length field indicating the length of each piece of concatenated data. Further, when the integrity protection procedure or the ciphering procedure is applied to one piece of concatenated data obtained by concatenating a plurality of pieces of data, the integrity protection procedure or the ciphering procedure is performed using one COUNT value of operation 34-20 and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device in operations 34-15 and 34-40. Prior to submitting the PDCP entity to the lower layer in operation 34-40, add a PDCP header to the entity in operation 34-35.

Based on characteristics of the data separation procedure proposed in the disclosure, when the PDCP layer device configures or performs the proposed data concatenation procedure in FIG. 34, the receiving PDCP layer device 34-02 may receive the PDCP PDU from a lower layer in operation 34-45 and remove the PDCP header in operation 34-50 and apply or perform the data separation procedure of operation 34-65 to or for concatenated data to which or for which the deciphering procedure of operation 34-55 or the integrity verification procedure of operation 34-60 is applied or performed, and may apply the header decompression procedure of operation 34-70 to each piece of the separated data. In another method, the reception side (UE or base station) applies or performs the data separation procedure proposed in the disclosure features that data separation procedure for concatenated data after the deciphering procedure or the integrity verification procedure is applied or performed, and may apply the header decompression procedure to each piece of the separated data. For example, if the header compression procedure, the ciphering procedure, or the integrity verification procedure is configured, the data separation procedure may be performed for the concatenated data after the deciphering procedure or the integrity verification procedure is performed for the received concatenated data, and the header decompression procedure may be applied to each piece of the separated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. On the other hand, since the application or performance of the header decompression procedure for each piece of the concatenated data has high complexity, the performance of the header decompression procedure after data separation may be easily implemented and overheads may be reduced through a reduction in the length field indicating the length of each piece of concatenated data. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part in operation 34-75.

FIG. 35 is a flowchart illustrating an operation of an SDAP layer device (or new layer device) of a UE according to an embodiment of the disclosure.

Referring to FIG. 35, based on characteristics of the data concatenation procedure proposed in the disclosure, when the SDAP layer device (or new layer device) configures or performs the proposed data concatenation procedure, the transmitting SDAP layer device 35-01 applies or performs the data concatenation procedure to or for data to which or for which the header compression procedure, the integrity protection procedure, or the ciphering procedure is not applied or performed. In another method, based on characteristics of the data concatenation procedure proposed in the disclosure, the transmission side (UE or base station) applies or performs the data concatenation procedure of operation 35-05 to or for data before the header compression procedure, the integrity protection procedure, or the ciphering produce is applied or performed. Accordingly, a length field (for example, LI field) among new fields generated during the data concatenation procedure may configure the length of data of which the header is not compressed as a byte unit value. When the SDAP layer device performs the data concatenation function, the data concatenation procedure may be performed only for data of the higher layer device corresponding to QoS flow IDs (QoS identifiers) mapped to bearers and the concatenated data may be transmitted to the PDCP layer device of the bearer. In another method, when the SDAP layer device performs the data concatenation function and performs the data concatenation procedure for data of the higher layer device corresponding to QoS flow IDs (QoS identifiers) mapped to the bearers, specifically, the data concatenation procedure may be applied only to data corresponding to the same QoS flow ID (QoS identifier) and the concatenated data may be transmitted to the PDCP layer device of the bearer. For example, when the header compression procedure, the integrity protection procedure, or the ciphering procedure is configured, the data concatenation procedure of operation 35-10 may be performed or applied, the concatenated data may be transmitted to the PDCP layer device in operation 35-20, and the header compression procedure, the integrity protection procedure, or the ciphering procedure may be performed. When the SDAP header is configured, the SDAP header may be configured and added before the concatenated data in operation 35-15 before the concatenated data is transmitted to the lower layer device. This is because the number of times the integrity protection procedure or the ciphering procedure is performed or the frequency thereof may be minimized and a data processing time may be reduced only when the integrity protection procedure or the ciphering procedure is applied to the concatenated data simultaneously. Further, when the integrity protection procedure or the ciphering procedure is applied to one piece of concatenated data obtained by concatenating a plurality of pieces of data, the integrity protection procedure or the ciphering procedure is performed using one COUNT value and thus single processing is possible through one set of security key values (COUNT value, bearer identifier, security key, or the like) and a data processing time can be reduced. For example, when pieces of data are not concatenated, the integrity protection procedure or the ciphering procedure should be performed several times on the basis of a set of different security key values using different COUNT values each of which is used for each piece of data, so a long data processing time is needed. When the data concatenation procedure is applied to or performed for the data, the data concatenation procedure may be applied in an order of reception from the higher layer device or the data may be concatenated in an order from the first. This is because the reception side can sequentially transmit data separated from the concatenated data to the higher layer device only when pieces of data are sequentially concatenated from the first during the data concatenation procedure. For example, pieces of data concatenated with the concatenated data to which one PDCP serial number is allocated are arranged in an order of reception from the higher layer device in operation 35-20.

Based on characteristics of the data separation procedure proposed in the disclosure, when the SDAP layer device (or new layer device) configures or performs the proposed data concatenation procedure, the receiving SDAP layer device 35-02 applies or performs the proposed data separation procedure to or for concatenated data to which or for which the deciphering procedure, the integrity verification procedure, or the header decompression procedure is applied or performed in FIG. 35. In another method, based on characteristics of the data separation procedure proposed in the disclosure, when the receiving SDAP layer device may receive concatenated data from the higher layer device in operation 35-25 after the deciphering procedure, the integrity verification procedure, or the header decompression procedure is applied or performed and may apply or perform the data separation procedure of operation 35-35. When the SDAP header is configured and data is received from the lower layer device, the SDAP header may be removed and processed in operation 35-30. For example, when the header compression procedure, the ciphering procedure, or the integrity verification procedure is configured, the deciphering procedure, the integrity verification procedure, or the header decompression procedure is performed for the received concatenated data, and then the data separation procedure of operation 35-35 may be performed for the concatenated data. This is because the number of times the deciphering procedure or the integrity verification procedure is performed or the frequency thereof may be minimized and a data processing time may be reduced only when the deciphering procedure or the integrity verification procedure is applied to the concatenated data simultaneously. Further, when the deciphering procedure or the integrity protection procedure is applied to one piece of concatenated data obtained by concatenating a plurality of pieces of data, the deciphering procedure or the integrity protection procedure is performed using one COUNT value and thus single processing is possible through one set of security key values (COUNT value, bearer identifier, security key, or the like) and a data processing time can be reduced. For example, when the plurality of pieces of data are not concatenated, the deciphering procedure or the integrity protection procedure should be performed several times on the basis of a set of different security key values using different COUNT values each of which is used for each piece of data, so a long data processing time is needed. Further, only when the data separation procedure is applied or performed for the concatenated data, the data may be separated sequentially from the first part of the concatenated data, data processing may be performed sequentially from the first part, and the data may be transmitted to the higher layer device. For example, pieces of data concatenated with the concatenated data to which one PDCP serial number is allocated should be transmitted to the higher layer device sequentially from the first part in operation 35-40.

FIG. 36 illustrates a structure of a UE according to an embodiment of the disclosure.

Referring to FIG. 36, the UE includes a Radio Frequency (RF) processing unit 36-10, a baseband processing unit 36-20, a storage unit 36-30, and a controller 36-40.

The RF processing unit 36-10 performs a function of transmitting and receiving a signal through a radio channel such as converting or amplifying a band of the signal. That is, the RF processing unit 36-10 up-converts a baseband signal provided from the baseband processing unit 36-20 into an RF band signal, transmits the RF band signal through an antenna, and then down-converts the RF band signal received through the antenna into a baseband signal. For example, the RF processing unit 36-10 may include a transmission filter, a reception filter, an amplifier, a mixer, an oscillator, a Digital-to-Analog Converter (DAC), an Analog-to-Digital Converter (ADC), and the like. Although FIG. 36 illustrates only one antenna, the UE may include a plurality of antennas. The RF processing unit 36-10 may include a plurality of RF chains. Moreover, the RF processing unit 36-10 may perform beamforming. For the beamforming, the RF processing unit 36-10 may control a phase and a size of each of the signals transmitted/received through a plurality of antennas or antenna elements. The RF processing unit may perform MIMO and receive a plurality of layers when performing the MIMO operation. The RF processing unit 36-10 may appropriately configure a plurality of antennas or antenna elements to perform reception beam sweeping or control a reception beam direction and width to make the reception beam coordinate with the transmission beam according to the control of the controller.

The baseband processing unit 36-20 performs a function for a conversion between a baseband signal and a bitstream according to a physical layer standard of the system. For example, in data transmission, the baseband processing unit 36-20 generates complex symbols by encoding and modulating a transmission bitstream. Further, in data reception, the baseband processing unit 36-20 reconstructs a reception bitstream by demodulating and decoding a baseband signal provided from the RF processing unit 36-10. For example, in an Orthogonal Frequency Division Multiplexing (OFDM) scheme, when data is transmitted, the baseband processing unit 36-20 generates complex symbols by encoding and modulating a transmission bitstream, mapping the complex symbols to subcarriers, and then configures OFDM symbols through an Inverse Fast Fourier Transform (IFFT) operation and a Cyclic Prefix (CP) insertion. Further, in data reception, the baseband processing unit 36-20 divides the baseband signal provided from the RF processing unit 36-10 in units of OFDM symbols, reconstructs the signals mapped to the subcarriers through a Fast Fourier Transform (FFT) operation, and then reconstructs a reception bitstream through demodulation and decoding.

The baseband processing unit 36-20 and the RF processing unit 36-10 may transmit and receive the signal as described above. Accordingly, each of the baseband processing unit 36-20 and the RF processing unit 36-10 may be called a transmitter, a receiver, a transceiver, or a communication unit. Further, at least one of the baseband processing unit 36-20 and the RF processing unit 36-10 may a plurality of communication modules to support a plurality of different radio access technologies. At least one of the baseband processing unit 36-20 and the RF processing unit 36-10 may include different communication modules to process signals in different frequency bands. For example, the different radio-access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage unit 36-30 stores data such as a basic program, an application, configuration information, and the like for the operation of the UE. The storage unit 36-30 provides stored data according to a request from the controller 36-40.

The controller 36-40 controls the overall operation of the UE. For example, the controller 36-40 transmits and receives signals through the baseband processing unit 36-20 and the RF processing unit 36-10. Further, the controller 36-40 reads data in the storage unit 36-30 and reads the data. To this end, the controller 36-40 may include at least one processor. For example, the controller 36-40 may include a Communication Processor (CP) that performs a control for communication, and an Application Processor (AP) that controls a higher layer such as an application. The controller 36-40 may include a multi-connection processing unit 36-42.

FIG. 37 is a block diagram illustrating a base station (or a Transmission/Reception Point (TRP)) in a wireless communication system according to an embodiment of the disclosure.

Referring to FIG. 37, the base station includes an RF processing unit 37-10, a baseband processing unit 37-20, a backhaul communication unit 37-30, a storage unit 37-40, and a controller 37-50.

The RF processing unit 37-10 performs a function of transmitting and receiving a signal through a radio channel such as converting or amplifying a band of the signal. That is, the RF processing unit 37-10 up-converts a baseband signal provided from the baseband processing unit 37-20 into an RF band signal and then transmits the converted signal through an antenna, and down-converts an RF band signal received through the antenna into a baseband signal. For example, the RF processing unit 37-10 may include a transmission filter, a reception filter, an amplifier, a mixer, an oscillator, a DAC, an ADC, and the like. Although FIG. 37 illustrates only one antenna, the first access node may include a plurality of antennas. The RF processing unit 37-10 may include a plurality of RF chains. The RF processing unit 37-10 may perform beamforming. For the beamforming, the RF processing unit 37-10 may control the phase and the size of each of the signals transmitted and received through a plurality of antennas or antenna elements. The RF processing unit may perform a downlink MIMO operation by transmitting one or more layers.

The baseband processing unit 37-20 performs a function of performing conversion between a baseband signal and a bitstream according to a physical-layer standard of the first radio-access technology. For example, in data transmission, the baseband processing unit 37-20 generates complex symbols by encoding and modulating a transmission bitstream. Further, in data reception, the baseband processing unit 37-20 reconstructs a reception bitstream by demodulating and decoding a baseband signal provided from the RF processing unit 37-10. For example, according to an OFDM scheme, in data transmission, the baseband processing unit 37-20 may generate complex symbols by encoding and modulating the transmission bitstream, map the complex symbols to subcarriers, and then configure OFDM symbols through an IFFT operation and CP insertion. In addition, in data reception, the baseband processing unit 37-20 divides a baseband signal provided from the RF processing unit 37-10 in units of OFDM symbols, recovers signals mapped with sub-carriers through an FFT operation, and then reconstructs a reception bit string through demodulation and decoding. The baseband processing unit 37-20 and the RF processing unit 37-10 may transmit and receive the signal as described above. Accordingly, each of the baseband processing unit 37-20 and the RF processing unit 37-10 may be referred to as a transmitter, a receiver, a transceiver, a communication unit, or a wireless communication unit.

The communication unit 37-30 provides an interface for communicating with other nodes within the network.

The storage unit 37-40 may store a basic program, an application, configuration information, and the like for the operation of the MeNB. Particularly, the storage unit 37-40 may store information on bearers allocated to the accessed UE, a measurement result reported from the accessed UE, and the like. Further, the storage unit 37-40 may store information which is a reference for determining whether to provide or stop multiple connections to the UE. The storage unit 37-40 provides stored data according to a request from the controller 37-50.

The controller 37-50 controls the overall operation of the MeNB. For example, the controller 37-50 may transmit and receive a signal through the baseband processing unit 37-20 and the RF processing unit 37-10 or through the backhaul communication unit 37-30. Further, the controller 37-50 reads data in the storage unit 37-40 and reads the data. To this end, the controller 37-50 may include at least one processor 37-52.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
- receiving, from a base station, a first radio resource control (RRC) message indicating that a secondary cell group (SCG) is in a deactivated state;
- deactivating the SCG and resetting a medium access control (MAC) entity for the SCG based on the first RRC message, wherein the resetting of the MAC entity comprises stopping at least one timer in the MAC entity except a time alignment timer;
- receiving, from the base station, a second RRC message indicating that the SCG is in an activated state;
- based on the SCG being indicated in the activated state, identifying whether the time alignment timer is running; and
- based on identifying that the time alignment timer is not running, performing a random access procedure for SCG activation.

2. The method of claim 1, further comprising:
- activating the SCG based on the second RRC message.

3. The method of claim 2, further comprising:
- performing at least one of a physical downlink control channel (PDCCH) monitoring on a primary SCG cell (PSCell) of the activated SCG, an uplink transmission on the PSCell, a channel state information reporting on the PSCell, or a sound reference signal (SRS) transmission on the PSCell.

4. The method of claim 1, wherein in case that a parameter for synchronous reconfiguration is included in the second RRC message, the random access procedure for SCG activation is performed in response to the second RRC message.

5. The method of claim 1, wherein in case that the time alignment timer is running upon receiving the second RRC message, the random access procedure for SCG activation is not performed.

6. A method performed by a base station in a wireless communication system, the method comprising:
- identifying that a secondary cell group (SCG) associated with a terminal is to be deactivated;
- transmitting, to the terminal, a first radio resource control (RRC) message indicating that the SCG is in a deactivated state, wherein the SCG is deactivated and a reset of a medium access control (MAC) entity for the SCG is triggered based on the first RRC message, and wherein at least one timer in the MAC entity, except a time alignment timer, is stopped based on the reset of the MAC entity;
- identifying that the SCG is to be activated;
- transmitting, to the terminal, a second RRC message indicating that the SCG is in an activated state, wherein the time alignment timer is not running upon transmitting the second RRC message; and
- performing a random access procedure for SCG activation with the terminal.

7. The method of claim 6, wherein the SCG is activated based on the second RRC message.

8. The method of claim 7, wherein at least one of a physical downlink control channel (PDCCH) monitoring on a primary SCG cell (PSCell) of the activated SCG, an uplink transmission on the PSCell, a channel state information reporting on the PSCell, or a sound reference signal (SRS) transmission on the PSCell is performed.

9. The method of claim 6, wherein in case that a parameter for synchronous reconfiguration is included in the second RRC message, the random access procedure for SCG activation is performed in response to the second RRC message.

10. The method of claim 6, wherein in case that the time alignment timer is running upon transmitting the second RRC message, the random access procedure for SCG activation is not performed.

11. A terminal in a wireless communication system, the terminal comprising:
- a transceiver; and
- a controller configured to:
  - receive, from a base station via the transceiver, a first radio resource control (RRC) message indicating that a secondary cell group (SCG) is in a deactivated state, and
  - deactivate the SCG and reset a medium access control (MAC) entity for the SCG based on the first RRC message, wherein, for the resetting of the MAC entity, the controller is further configured to stop at least one timer in the MAC entity except a time alignment timer,
- wherein the controller is further configured to:
  - receive, from the base station via the transceiver, a second RRC message indicating that the SCG is in an activated state, and
  - based on the SCG being indicated in the activated state, identify whether the time alignment timer is running, and
  - based on identifying that the time alignment timer is not running, perform a random access procedure for SCG activation.

12. The terminal of claim 11, wherein the controller is further configured to:
- activate the SCG based on the second RRC message.

13. The terminal of claim 12, wherein the controller is further configured to:
- perform at least one of a physical downlink control channel (PDCCH) monitoring on a primary SCG cell (PSCell) of the activated SCG, an uplink transmission on the PSCell, a channel state information reporting on the PSCell, or a sound reference signal (SRS) transmission on the PSCell.

14. The terminal of claim 11, wherein in case that a parameter for synchronous reconfiguration is included in the second RRC message, the random access procedure for SCG activation is performed in response to the second RRC message.

15. The terminal of claim 11, wherein in case that the time alignment timer is running upon receiving the second RRC message, the random access procedure for SCG activation is not performed.

16. A base station in a wireless communication system, the base station comprising:

a transceiver; and a controller configured to:

identify that a secondary cell group (SCG) associated with a terminal is to be deactivated, transmit, to the terminal via the transceiver, a first radio resource control (RRC) message indicating that the SCG is in deactivated state, wherein the SCG is deactivated and a reset of a medium access control (MAC) entity for the SCG is triggered based on the first RRC message, and wherein at least one timer in the MAC entity, except a time alignment timer, is stopped based on the reset of the MAC entity, identify that the SCG is to be activated, transmit, to the terminal via the transceiver, a second RRC message indicating that the SCG is in an activated state, wherein the time alignment timer is not running upon transmitting the second RRC message, and perform a random access procedure for SCG activation with the terminal.

17. The base station of claim 16, wherein the SCG is activated based on the second RRC message.

18. The base station of claim 17, wherein at least one of a physical downlink control channel (PDCCH) monitoring on a primary SCG cell (PSCell) of the activated SCG, an uplink transmission on the PSCell, a channel state information reporting on the PSCell, or a sound reference signal (SRS) transmission on the PSCell is performed.

19. The base station of claim 16, wherein in case that a parameter for synchronous reconfiguration is included in the second RRC message, the random access procedure for SCG activation is performed in response to the second RRC message.

20. The base station of claim 16, wherein in case that the time alignment timer is running upon transmitting the second RRC message, the random access procedure for SCG activation is not performed.

* * * * *